United States Patent
Sholl et al.

(10) Patent No.: US 12,026,843 B2
(45) Date of Patent: Jul. 2, 2024

(54) SYSTEMS AND METHODS FOR USING MACHINE LEARNING MODELS TO EFFECT VIRTUAL TRY-ON AND STYLING ON ACTUAL USERS

(71) Applicant: Zelig Technology, LLC, Los Angeles, CA (US)

(72) Inventors: Sandra Sholl, West Hollywood, CA (US); Adam Freede, West Hollywood, CA (US); Samuel Aronoff, Granada Hills, CA (US); Md Modasshir, Los Angeles, CA (US); Bailey Kong, Arcadia, CA (US); Roger Sheu, San Marino, CA (US); Alexander Rodriguez, Marina del Rey, CA (US); Amy McDermott, West Hollywood, CA (US); Brooke Larney, West Hollywood, CA (US)

(73) Assignee: Zelig Technology, LLC, West Hollywood, CA (US)

( * ) Notice: Subject to any disclaimer, the term of this patent is extended or adjusted under 35 U.S.C. 154(b) by 0 days.

(21) Appl. No.: 18/377,729

(22) Filed: Oct. 6, 2023

(65) Prior Publication Data
US 2024/0119681 A1    Apr. 11, 2024

Related U.S. Application Data

(63) Continuation of application No. 18/217,412, filed on Jun. 30, 2023.
(Continued)

(51) Int. Cl.
G06T 19/00  (2011.01)
G06T 3/18   (2024.01)
(Continued)

(52) U.S. Cl.
CPC .............. G06T 19/006 (2013.01); G06T 3/18 (2024.01); G06T 5/77 (2024.01); G06T 7/12 (2017.01);
(Continued)

(58) Field of Classification Search
None
See application file for complete search history.

(56) References Cited

U.S. PATENT DOCUMENTS

| 2014/0010449 A1* | 1/2014 | Haaramo | G06T 19/00 382/173 |
| 2016/0042443 A1* | 2/2016 | Osada | G06T 11/60 345/87 |

(Continued)

FOREIGN PATENT DOCUMENTS

WO   2024006570 A1   1/2024

OTHER PUBLICATIONS

Masuch et al., "Emotional Agents for Interactive Environments", Department of Simulation and Graphics, 2006.
(Continued)

*Primary Examiner* — Martin Mushambo
(74) *Attorney, Agent, or Firm* — Patent Law Works LLP

(57) ABSTRACT

Disclosed are example embodiments of systems and methods for virtual try-on of articles of clothing. An example method of virtual try-on of articles of clothing includes selecting a garment from a pre-existing database. The method also includes loading a photo of a source model wearing the selected garment. Additionally, the method includes generating a semantic segmentation of the model image. The method also includes extracting the selected garment from the photo of the model. Additionally, the method includes determining a correspondence between a target model and the source model by performing a feature
(Continued)

point detection and description of the target model and the source model, and performing feature matching and correspondence validation. The method also includes performing garment warping and alignment of the extracted garment. Additionally, the method includes overlaying and rendering the garment.

20 Claims, 149 Drawing Sheets

Related U.S. Application Data

(60) Provisional application No. 63/358,038, filed on Jul. 1, 2022.

(51) Int. Cl.
*G06T 5/77* (2024.01)
*G06T 7/12* (2017.01)
*G06V 10/44* (2022.01)
*G06V 10/54* (2022.01)
*G06V 10/56* (2022.01)
*G06V 10/60* (2022.01)

(52) U.S. Cl.
CPC .............. *G06V 10/44* (2022.01); *G06V 10/54* (2022.01); *G06V 10/56* (2022.01); *G06V 10/60* (2022.01)

(56) References Cited

U.S. PATENT DOCUMENTS

| | | | | |
|---|---|---|---|---|
| 2018/0240280 | A1* | 8/2018 | Chen | G06T 19/20 |
| 2019/0043269 | A1* | 2/2019 | Lin | G06T 7/62 |
| 2020/0286160 | A1* | 9/2020 | Bruch | G06Q 30/0643 |
| 2021/0133919 | A1* | 5/2021 | Ayush | G06T 11/60 |
| 2021/0209774 | A1* | 7/2021 | Ma | G06V 40/10 |
| 2022/0031068 | A1* | 2/2022 | Jang | D06F 34/28 |
| 2022/0189087 | A1* | 6/2022 | Shuvi | G06T 11/60 |

OTHER PUBLICATIONS

Rombach et al., "High-Resolution Image Synthesis with Latent Diffusion Models", Ludwig Maximilian University of Munich & IWR, Heidelberg University, Germany, 2022.

Ronneberger et al. "U-Net Convolutional Networks for Biomedical Image Segmentation", Computer Science Department and BIOSS Centre for Biological Signalling Studies, University of Freiburg, Germany, 2015.

Johnson et al., "Perceptual Losses for Real-Time Style Transfer and Super-Resolution", Department of Computer Science, Stanford University, 2016.

Detone et al., "Superpoint Self-Supervised Interest Point Detection and Description", 2018.

Gong et al., "Instance-level Human Parsing Via Part Grouping Network " Sun Yat-sen University, Sense Time Group (Limited), CVTE Research, 2018.

Minar et al., "Cloth-VTON: Clothing Three-Dimensional Reconstruction for Hybrid Image-Based Virtual Try-On." CVF Open Access, Jan. 1, 1970, openaccess.thecvf.com/content/ACCV2020/html/Minar_CloTH-VTON_Clothing_Three- dimensional_reconstruction_for_Hybrid_image-based_Virtual_Try-ON_ACCV_2020_paper.html?ref=https%3A%2F% 2Fgithubhelp.com.

Wang et al., "High-Resolution Image Synthesis and Semantic Manipulation with Conditional GANs", 2018.

Wang et at., "Toward Characteristic- Preserving Image-based Virtual Try-On Network", Sun Yat-sen University, China SenseTime Group Limited, 2018.

Li et al., "Self-Correction for Human Parsing", ReLER Lab, Centre for Artificial Intelligence, University of Technology Sydney Baidu Research, 2019.

Sarlin et al., "Superglue Learning Feature Matching with Graph Neural Networks", 2020.

Kirillow et al., "Segment Anything", Meta AI Research, FAIR, 2023.

International Search Report for Internation Application No. PCT/US23/26812, mailed on Nov. 15, 2023, 4 pgs.

* cited by examiner

*Styling Combinations for Tops:*

| COMBO | | | | |
|---|---|---|---|---|
| SLEEVES | TUCK | BUTTON | COLLAR | ALL VARIATIONS |
| Buttoned | Half Tucked | Fully Buttoned | Folded | Sleeves Buttoned, Half Tucked, Fully Buttoned, Collar Folded |
| Buttoned | Half Tucked | Fully Buttoned | N/A | Sleeves Buttoned, Half Tucked, Fully Buttoned |
| Buttoned | Half Tucked | Fully Buttoned | Popped | Sleeves Buttoned, Half Tucked, Fully Buttoned, Collar Popped |
| Buttoned | Half Tucked | Fully Buttoned | Tied | Sleeves Buttoned, Half Tucked, Fully Buttoned, Collar Tied |
| Buttoned | Half Tucked | Fully Buttoned | Untied | Sleeves Buttoned, Half Tucked, Fully Buttoned, Collar Untied |
| Buttoned | Half Tucked | Top & Bottom Unbuttoned | Folded | Sleeves Buttoned, Half Tucked, Top & Bottom Unbuttoned, Collar Folded |
| Buttoned | Half Tucked | Top & Bottom Unbuttoned | N/A | Sleeves Buttoned, Half Tucked, Top & Bottom Unbuttoned |
| Buttoned | Half Tucked | Top & Bottom Unbuttoned | Popped | Sleeves Buttoned, Half Tucked, Top & Bottom Unbuttoned, Collar Popped |
| Buttoned | Half Tucked | Top & Bottom Unbuttoned | Tied | Sleeves Buttoned, Half Tucked, Top & Bottom Unbuttoned, Collar Tied |
| Buttoned | Half Tucked | Top & Bottom Unbuttoned | Untied | Sleeves Buttoned, Half Tucked, Top & Bottom Unbuttoned, Collar Untied |
| Buttoned | Tucked | Fully Buttoned | Folded | Sleeves Buttoned, Tucked, Fully Buttoned, Collar Folded |
| Buttoned | Tucked | Fully Buttoned | N/A | Sleeves Buttoned, Tucked, Fully Buttoned |
| Buttoned | Tucked | Fully Buttoned | Popped | Sleeves Buttoned, Tucked, Fully Buttoned, Collar Popped |
| Buttoned | Tucked | Fully Buttoned | Tied | Sleeves Buttoned, Tucked, Fully Buttoned, Collar Tied |
| Buttoned | Tucked | Fully Buttoned | Untied | Sleeves Buttoned, Tucked, Fully Buttoned, Collar Untied |
| Buttoned | Tucked | N/A | Folded | Sleeves Buttoned, Tucked, Collar Untied |
| Buttoned | Tucked | N/A | N/A | Sleeves Buttoned, Tucked |
| Buttoned | Tucked | N/A | Popped | Sleeves Buttoned, Tucked, Collar Popped |
| Buttoned | Tucked | N/A | Tied | Sleeves Buttoned, Tucked, Collar Tied |

FIG. 15A

Styling Combinations for Tops (continued):

| COMBO | | | | |
|---|---|---|---|---|
| SLEEVES | TUCK | BUTTON | COLLAR | ALL VARIATIONS |
| Buttoned | Tucked | N/A | Untied | Sleeves Buttoned, Tucked, Collar Untied |
| Buttoned | Tucked | Top & Bottom Unbuttoned | Folded | Sleeves Buttoned, Tucked, Top & Bottom Unbuttoned, Collar Folded |
| Buttoned | Tucked | Top & Bottom Unbuttoned | N/A | Sleeves Buttoned, Tucked, Top & Bottom Unbuttoned |
| Buttoned | Tucked | Top & Bottom Unbuttoned | Popped | Sleeves Buttoned, Tucked, Top & Bottom Unbuttoned, Collar Popped |
| Buttoned | Tucked | Top & Bottom Unbuttoned | Tied | Sleeves Buttoned, Tucked, Top & Bottom Unbuttoned, Collar Tied |
| Buttoned | Tucked | Top & Bottom Unbuttoned | Untied | Sleeves Buttoned, Tucked, Top & Bottom Unbuttoned, Collar Untied |
| Buttoned | Tucked | Top Unbuttoned | Folded | Sleeves Buttoned, Tucked, Top Unbuttoned, Collar Folded |
| Buttoned | Tucked | Top Unbuttoned | N/A | Sleeves Buttoned, Tucked, Top Unbuttoned |
| Buttoned | Tucked | Top Unbuttoned | Popped | Sleeves Buttoned, Tucked, Top Unbuttoned, Collar Popped |
| Buttoned | Tucked | Top Unbuttoned | Tied | Sleeves Buttoned, Tucked, Top Unbuttoned, Collar Tied |
| Buttoned | Tucked | Top Unbuttoned | Untied | Sleeves Buttoned, Tucked, Top Unbuttoned, Collar Untied |
| Buttoned | Tucked | Unbuttoned | Folded | Sleeves Buttoned, Tucked, Unbuttoned, Collar Folded |
| Buttoned | Tucked | Unbuttoned | N/A | Sleeves Buttoned, Tucked, Unbuttoned |
| Buttoned | Tucked | Unbuttoned | Popped | Sleeves Buttoned, Tucked, Unbuttoned, Collar Popped |
| Buttoned | Tucked | Unbuttoned | Tied | Sleeves Buttoned, Tucked, Unbuttoned, Collar Tied |
| Buttoned | Tucked | Unbuttoned | Untied | Sleeves Buttoned, Tucked, Unbuttoned, Collar Untied |
| Buttoned | Untucked | Fully Buttoned | Folded | Sleeves Buttoned, Untucked, Fully Buttoned, Collar Folded |
| Buttoned | Untucked | Fully Buttoned | N/A | Sleeves Buttoned, Untucked, Fully Buttoned |
| Buttoned | Untucked | Fully Buttoned | Popped | Sleeves Buttoned, Untucked, Fully Buttoned, Collar Popped |
| Buttoned | Untucked | Fully Buttoned | Tied | Sleeves Buttoned, Untucked, Fully Buttoned, Collar Tied |
| Buttoned | Untucked | Fully Buttoned | Untied | Sleeves Buttoned, Untucked, Fully Buttoned, Collar Untied |
| Buttoned | Untucked | N/A | Folded | Sleeves Buttoned, Untucked, Collar Folded |
| Buttoned | Untucked | N/A | N/A | Sleeves Buttoned, Untucked |
| Buttoned | Untucked | N/A | Popped | Sleeves Buttoned, Untucked, Collar Popped |
| Buttoned | Untucked | N/A | Tied | Sleeves Buttoned, Untucked, Collar Tied |
| Buttoned | Untucked | N/A | Untied | Sleeves Buttoned, Untucked, Collar Untied |

FIG. 15B

*Styling Combinations for Tops (continued):*

| COMBO | | | | |
|---|---|---|---|---|
| SLEEVES | TUCK | BUTTON | COLLAR | ALL VARIATIONS |
| Buttoned | Untucked | Top & Bottom Unbuttoned | Folded | Sleeves Buttoned, Untucked, Top & Bottom Unbuttoned, Collar Folded |
| Buttoned | Untucked | Top & Bottom Unbuttoned | N/A | Sleeves Buttoned, Untucked, Top & Bottom Unbuttoned |
| Buttoned | Untucked | Top & Bottom Unbuttoned | Popped | Sleeves Buttoned, Untucked, Top & Bottom Unbuttoned, Collar Popped |
| Buttoned | Untucked | Top & Bottom Unbuttoned | Tied | Sleeves Buttoned, Untucked, Top & Bottom Unbuttoned, Collar Tied |
| Buttoned | Untucked | Top & Bottom Unbuttoned | Untied | Sleeves Buttoned, Untucked, Top & Bottom Unbuttoned, Collar Untied |
| Buttoned | Untucked | Top Unbuttoned | Folded | Sleeves Buttoned, Untucked, Top Unbuttoned, Collar Folded |
| Buttoned | Untucked | Top Unbuttoned | N/A | Sleeves Buttoned, Untucked, Top Unbuttoned |
| Buttoned | Untucked | Top Unbuttoned | Popped | Sleeves Buttoned, Untucked, Top Unbuttoned, Collar Popped |
| Buttoned | Untucked | Top Unbuttoned | Tied | Sleeves Buttoned, Untucked, Top Unbuttoned, Collar Tied |
| Buttoned | Untucked | Top Unbuttoned | Untied | Sleeves Buttoned, Untucked, Top Unbuttoned, Collar Untied |
| Buttoned | Untucked | Unbuttoned | Folded | Sleeves Buttoned, Untucked, Unbuttoned, Collar Folded |
| Buttoned | Untucked | Unbuttoned | N/A | Sleeves Buttoned, Untucked, Unbuttoned |
| Buttoned | Untucked | Unbuttoned | Popped | Sleeves Buttoned, Untucked, Unbuttoned, Collar Popped |
| Buttoned | Untucked | Unbuttoned | Tied | Sleeves Buttoned, Untucked, Unbuttoned, Collar Tied |
| Buttoned | Tucked | Unbuttoned | Untied | Sleeves Buttoned, Untucked, Unbuttoned, Collar Untied |
| Buttoned | Half Tucked | Fully Buttoned | Folded | Sleeves Buttoned, Half tucked, Fully Buttoned, Collar Folded |
| Buttoned | Half Tucked | Fully Buttoned | N/A | Sleeves Buttoned, Half tucked, Fully Buttoned |
| Buttoned | Half Tucked | Fully Buttoned | Popped | Sleeves Buttoned, Half tucked, Fully Buttoned, Collar Popped |
| Buttoned | Half Tucked | Fully Buttoned | Tied | Sleeves Buttoned, Half tucked, Fully Buttoned, Collar Tied |
| Buttoned | Half Tucked | Fully Buttoned | Untied | Sleeves Buttoned, Half tucked, Fully Buttoned, Collar Untied |
| Buttoned | Half Tucked | Top & Bottom Unbuttoned | Folded | Sleeves Buttoned, Half Tucked, Top & Bottom Unbuttoned, Collar Folded |
| Buttoned | Half Tucked | Top & Bottom Unbuttoned | N/A | Sleeves Buttoned, Hlaf Tucked, Top & Bottom Unbuttoned |
| Buttoned | Half Tucked | Top & Bottom Unbuttoned | Popped | Sleeves Buttoned, Half Tucked, Top & Bottom Unbuttoned, Collar Popped |
| Buttoned | Half Tucked | Top & Bottom Unbuttoned | Tied | Sleeves Buttoned, Half Tucked, Top & Bottom Unbuttoned, Collar Tied |
| Buttoned | Half Tucked | Top & Bottom Unbuttoned | Untied | Sleeves Buttoned, Half Tucked, Top & Bottom Unbuttoned, Collar Tied |

FIG. 15C

*Styling Combinations for Tops (continued):*

| COMBO | | | | |
|---|---|---|---|---|
| SLEEVES | TUCK | BUTTON | COLLAR | ALL VARIATIONS |
| Cuffed | Tucked | Fully Buttoned | Folded | Sleeves Buttoned, Tucked, Fully Buttoned, Collar Folded |
| Cuffed | Tucked | Fully Buttoned | N/A | Sleeves Buttoned, Tucked, Fully Buttoned |
| Cuffed | Tucked | Fully Buttoned | Popped | Sleeves Buttoned, Tucked, Fully Buttoned, Collar Popped |
| Cuffed | Tucked | Fully Buttoned | Tied | Sleeves Buttoned, Tucked, Fully Buttoned, Collar Tied |
| Cuffed | Tucked | Fully Buttoned | Untied | Sleeves Buttoned, Tucked, Fully Buttoned, Collar Untied |
| Cuffed | Tucked | N/A | Folded | Sleeves Buttoned, Tucked, Collar Folded |
| Cuffed | Tucked | N/A | N/A | Sleeves Buttoned, Tucked |
| Cuffed | Tucked | N/A | Popped | Sleeves Buttoned, Tucked, Collar Popped |
| Cuffed | Tucked | N/A | Tied | Sleeves Buttoned, Tucked, Collar Tied |
| Cuffed | Tucked | N/A | Untied | Sleeves Buttoned, Tucked, Collar Untied |
| Cuffed | Tucked | Top & Bottom Unbuttoned | Folded | Cuffed, Tucked, Top & Bottom Unbuttoned, Collar Folded |
| Cuffed | Tucked | Top & Bottom Unbuttoned | N/A | Cuffed, Tucked, Top & Bottom Unbuttoned |
| Cuffed | Tucked | Top & Bottom Unbuttoned | Popped | Cuffed, Tucked, Top & Bottom Unbuttoned, Collar Popped |
| Cuffed | Tucked | Top & Bottom Unbuttoned | Tied | Cuffed, Tucked, Top & Bottom Unbuttoned, Collar Tied |
| Cuffed | Tucked | Top & Bottom Unbuttoned | Untied | Cuffed, Tucked, Top & Bottom Unbuttoned, Collar Untied |
| Cuffed | Tucked | Top Unbuttoned | Folded | Cuffed, Tucked, Top Unbuttoned, Collar Folded |
| Cuffed | Untucked | Top Unbuttoned | N/A | Cuffed, Tucked, Top Unbuttoned |
| Cuffed | Untucked | Top Unbuttoned | Popped | Cuffed, Tucked, Top Unbuttoned, Collar Popped |
| Cuffed | Untucked | Top Unbuttoned | Tied | Cuffed, Tucked, Top Unbuttoned, Collar Tied |
| Cuffed | Untucked | Top Unbuttoned | Untied | Cuffed, Tucked, Top Unbuttoned, Collar Untied |
| Cuffed | Untucked | Unbuttoned | Folded | Cuffed, Untucked, Unbuttoned, Collar Folded |
| Cuffed | Untucked | Unbuttoned | N/A | Cuffed, Untucked, Unbuttoned |
| Cuffed | Untucked | Unbuttoned | Popped | Cuffed, Untucked, Unbuttoned, Collar Popped |
| Cuffed | Untucked | Unbuttoned | Tied | Cuffed, Untucked, Unbuttoned, Collar Tied |
| Cuffed | Untucked | Unbuttoned | Untied | Cuffed, Untucked, Unbuttoned, Collar Untied |
| Cuffed | Untucked | Fully Buttoned | Folded | Cuffed, Untucked, Fully Buttoned, Collar Folded |
| Cuffed | Untucked | Fully Buttoned | N/A | Cuffed, Untucked, Fully Buttoned |

FIG. 15D

*Styling Combinations for Tops (continued):*

| COMBO | | | | |
|---|---|---|---|---|
| SLEEVES | TUCK | BUTTON | COLLAR | ALL VARIATIONS |
| Cuffed | Untucked | Fully Buttoned | Popped | Sleeves Buttoned, Tucked, Fully Buttoned, Collar Folded |
| Cuffed | Untucked | Fully Buttoned | Tied | Sleeves Buttoned, Tucked, Fully Buttoned |
| Cuffed | Untucked | Fully Buttoned | Untied | Sleeves Buttoned, Tucked, Fully Buttoned, Collar Popped |
| Cuffed | Untucked | N/A | Folded | Sleeves Buttoned, Tucked, Fully Buttoned, Collar Tied |
| Cuffed | Untucked | N/A | N/A | Sleeves Buttoned, Tucked, Fully Buttoned, Collar Untied |
| Cuffed | Untucked | N/A | Popped | Sleeves Buttoned, Tucked, Collar Folded |
| Cuffed | Untucked | N/A | Tied | Sleeves Buttoned, Tucked |
| Cuffed | Untucked | N/A | Untied | Sleeves Buttoned, Tucked, Collar Popped |
| Cuffed | Untucked | Top & Bottom Unbuttoned | Folded | Cuffed, Untucked, Top & Bottom Unbuttoned, Collar Folded |
| Cuffed | Untucked | Top & Bottom Unbuttoned | N/A | Cuffed, Untucked, Top & Bottom Unbuttoned |
| Cuffed | Untucked | Top & Bottom Unbuttoned | Popped | Cuffed, Untucked, Top & Bottom Unbuttoned, Collar Popped |
| Cuffed | Untucked | Top & Bottom Unbuttoned | Tied | Cuffed, Untucked, Top & Bottom Unbuttoned, Collar Tied |
| Cuffed | Untucked | Top & Bottom Unbuttoned | Untied | Cuffed, Untucked, Top & Bottom Unbuttoned, Collar Untied |
| Cuffed | Untucked | Top Unbuttoned | Folded | Cuffed, Untucked, Top Unbuttoned, Collar Folded |
| Cuffed | Untucked | Top Unbuttoned | N/A | Cuffed, Untucked, Top Unbuttoned |
| Cuffed | Untucked | Top Unbuttoned | Popped | Cuffed, Untucked, Top Unbuttoned, Collar Popped |
| Cuffed | Untucked | Top Unbuttoned | Tied | Cuffed, Untucked, Top Unbuttoned, Collar Tied |
| Cuffed | Untucked | Top Unbuttoned | Untied | Cuffed, Untucked, Top Unbuttoned, Collar Untied |
| Cuffed | Untucked | Unbuttoned | Folded | Cuffed, Untucked, Unbuttoned, Collar Folded |
| Cuffed | Untucked | Unbuttoned | N/A | Cuffed, Untucked, Unbuttoned |
| Cuffed | Untucked | Unbuttoned | Popped | Cuffed, Untucked, Unbuttoned, Collar Popped |
| Cuffed | Untucked | Unbuttoned | Tied | Cuffed, Untucked, Unbuttoned, Collar Tied |
| Cuffed | Untucked | Unbuttoned | Untied | Cuffed, Untucked, Unbuttoned, Collar Untied |
| N/A | Half Tucked | Fully Buttoned | Folded | Half Tucked, Fully Buttoned, Collar Folded |
| N/A | Half Tucked | Fully Buttoned | N/A | Half Tucked, Fully Buttoned |
| N/A | Half Tucked | Fully Buttoned | Popped | Half Tucked, Fully Buttoned, Collar Popped |
| N/A | Half Tucked | Fully Buttoned | Tied | Half Tucked, Fully Buttoned, Collar Tied |

FIG. 15E

*Styling Combinations for Tops (continued):*

| COMBO | | | | |
|---|---|---|---|---|
| SLEEVES | TUCK | BUTTON | COLLAR | ALL VARIATIONS |
| N/A | Half Tucked | Fully Buttoned | Untied | Half Tucked, Fully Buttoned, Collar Untied |
| N/A | Half Tucked | Top & Bottom Unbuttoned | Folded | Half Tucked, Top & Bottom Unbuttoned, Collar Folded |
| N/A | Half Tucked | Top & Bottom Unbuttoned | N/A | Half Tucked, Top & Bottom Unbuttoned |
| N/A | Half Tucked | Top & Bottom Unbuttoned | Popped | Half Tucked, Top & Bottom Unbuttoned, Collar Popped |
| N/A | Half Tucked | Top & Bottom Unbuttoned | Tied | Half Tucked, Top & Bottom Unbuttoned, Collar Tied |
| N/A | Half Tucked | Top & Bottom Unbuttoned | Untied | Half Tucked, Top & Bottom Unbuttoned, Collar Untied |
| N/A | Tucked | Fully Buttoned | Folded | Tucked, Fully Buttoned, Collar Folded |
| N/A | Tucked | Fully Buttoned | N/A | Tucked, Fully Buttoned |
| N/A | Tucked | Fully Buttoned | Popped | Tucked, Fully Buttoned, Collar Popped |
| N/A | Tucked | Fully Buttoned | Tied | Tucked, Fully Buttoned, Collar Tied |
| N/A | Tucked | Fully Buttoned | Untied | Tucked, Fully Buttoned, Collar Untied |
| N/A | Tucked | N/A | Folded | Tucked, Collar Folded |
| N/A | Tucked | N/A | N/A | Tucked, Collar Folded |
| N/A | Tucked | N/A | Popped | Tucked, Collar Popped |
| N/A | Tucked | N/A | Tied | Tucked, Collar Tied |
| N/A | Tucked | N/A | Untied | Tucked, Collar Untied |
| N/A | Tucked | Top & Bottom Unbuttoned | Folded | Tucked, Top & Bottom Unbuttoned, Collar Folded |
| N/A | Tucked | Top & Bottom Unbuttoned | N/A | Tucked, Top & Bottom Unbuttoned |
| N/A | Tucked | Top & Bottom Unbuttoned | Popped | Tucked, Top & Bottom Unbuttoned, Collar Popped |
| N/A | Tucked | Top & Bottom Unbuttoned | Tied | Tucked, Top & Bottom Unbuttoned, Collar Tied |
| N/A | Tucked | Top & Bottom Unbuttoned | Untied | Tucked, Top & Bottom Unbuttoned, Collar Untied |
| N/A | Tucked | Top Unbuttoned | Folded | Tucked, Top Unbuttoned, Collar Folded |
| N/A | Tucked | Top Unbuttoned | N/A | Tucked, Top Unbuttoned |
| N/A | Tucked | Top Unbuttoned | Popped | Tucked, Top Unbuttoned, Collar Popped |
| N/A | Tucked | Top Unbuttoned | Tied | Tucked, Top Unbuttoned, Collar Tied |
| N/A | Tucked | Top Unbuttoned | Untied | Tucked, Top Unbuttoned, Collar Untied |
| N/A | Tucked | Unbuttoned | Folded | Tucked, Unbuttoned, Collar Folded |
| N/A | Tucked | Unbuttoned | N/A | Tucked, Unbuttoned |

FIG. 15F

*Styling Combinations for Tops (continued):*

| COMBO ||||| 
|---|---|---|---|---|
| SLEEVES | TUCK | BUTTON | COLLAR | ALL VARIATIONS |
| N/A | Tucked | Unbuttoned | Popped | Tucked, Unbuttoned, Collar Popped |
| N/A | Tucked | Unbuttoned | Tied | Tucked, Unbuttoned, Collar Tied |
| N/A | Tucked | Unbuttoned | Untied | Tucked, Unbuttoned, Collar Untied |
| N/A | Untucked | Fully Buttoned | Folded | Untucked, Fully Buttoned, Collar Folded |
| N/A | Untucked | Fully Buttoned | N/A | Untucked, Fully Buttoned |
| N/A | Untucked | Fully Buttoned | Popped | Untucked, Fully Buttoned, Collar Popped |
| N/A | Untucked | Fully Buttoned | Tied | Untucked, Fully Buttoned, Collar Tied |
| N/A | Untucked | Fully Buttoned | Untied | Untucked, Fully Buttoned, Collar Untied |
| N/A | Untucked | N/A | Folded | Untucked, Collar Folded |
| N/A | Untucked | N/A | N/A | Untucked |
| N/A | Untucked | N/A | Popped | Untucked, Collar Popped |
| N/A | Untucked | N/A | Tied | Untucked, Collar Tied |
| N/A | Untucked | N/A | Untied | Untucked, Collar Untied |
| N/A | Untucked | Top & Bottom Unbuttoned | Folded | Untucked, Top & Bottom Unbuttoned, Collar Folded |
| N/A | Untucked | Top & Bottom Unbuttoned | N/A | Untucked, Top & Bottom Unbuttoned |
| N/A | Untucked | Top & Bottom Unbuttoned | Popped | Untucked, Top & Bottom Unbuttoned, Collar Popped |
| N/A | Untucked | Top & Bottom Unbuttoned | Tied | Untucked, Top & Bottom Unbuttoned, Collar Tied |
| N/A | Untucked | Top & Bottom Unbuttoned | Untied | Untucked, Top & Bottom Unbuttoned, Collar Untied |
| N/A | Untucked | Top Unbuttoned | Folded | Untucked, Top Unbuttoned, Collar Folded |
| N/A | Untucked | Top Unbuttoned | N/A | Untucked, Top Unbuttoned |
| N/A | Untucked | Top Unbuttoned | Popped | Untucked, Top Unbuttoned, Collar Popped |
| N/A | Untucked | Top Unbuttoned | Tied | Untucked, Top Unbuttoned, Collar Tied |
| N/A | Untucked | Top Unbuttoned | Untied | Untucked, Top Unbuttoned, Collar Untied |
| N/A | Untucked | Unbuttoned | Folded | Untucked, Unbuttoned, Collar Folded |
| N/A | Untucked | Unbuttoned | N/A | Untucked, Unbuttoned |
| N/A | Untucked | Unbuttoned | Popped | Untucked, Unbuttoned, Collar Popped |
| N/A | Untucked | Unbuttoned | Tied | Untucked, Unbuttoned, Collar Tied |
| N/A | Untucked | Unbuttoned | Untied | Untucked, Unbuttoned, Collar Untied |

FIG. 15G

*Styling Combinations for Tops (continued):*

| COMBO | | | | |
|---|---|---|---|---|
| SLEEVES | TUCK | BUTTON | COLLAR | ALL VARIATIONS |
| Pushed Up | Half Tucked | Fully Buttoned | Folded | Sleeves Pushed Up, Half Tucked, Fully Buttoned, Collar Folded |
| Pushed Up | Half Tucked | Fully Buttoned | N/A | Sleeves Pushed Up, Half Tucked, Fully Buttoned |
| Pushed Up | Half Tucked | Fully Buttoned | Popped | Sleeves Pushed Up, Half Tucked, Fully Buttoned, Collar Popped |
| Pushed Up | Half Tucked | Fully Buttoned | Tied | Sleeves Pushed Up, Half Tucked, Fully Buttoned, Collar Tied |
| Pushed Up | Half Tucked | Fully Buttoned | Untied | Sleeves Pushed Up, Half Tucked, Fully Buttoned, Collar Untied |
| Pushed Up | Half Tucked | Top & Bottom Unbuttoned | Folded | Sleeves Pushed Up, Half Tucked, Top & Bottom Unbuttoned, Collar Folded |
| Pushed Up | Half Tucked | Top & Bottom Unbuttoned | N/A | Sleeves Pushed Up, Half Tucked, Top & Bottom Unbuttoned |
| Pushed Up | Half Tucked | Top & Bottom Unbuttoned | Popped | Sleeves Pushed Up, Half Tucked, Top & Bottom Unbuttoned, Collar Popped |
| Pushed Up | Half Tucked | Top & Bottom Unbuttoned | Tied | Sleeves Pushed Up, Half Tucked, Top & Bottom Unbuttoned, Collar Tied |
| Pushed Up | Half Tucked | Top & Bottom Unbuttoned | Untied | Sleeves Pushed Up, Half Tucked, Top & Bottom Unbuttoned, Collar Untied |
| Pushed Up | Tucked | Fully Buttoned | Folded | Sleeves Pushed Up, Tucked, Fully Buttoned, Collar Folded |
| Pushed Up | Tucked | Fully Buttoned | N/A | Sleeves Pushed Up, Tucked, Fully Buttoned |
| Pushed Up | Tucked | Fully Buttoned | Popped | Sleeves Pushed Up, Tucked, Fully Buttoned, Collar Popped |
| Pushed Up | Tucked | Fully Buttoned | Tied | Sleeves Pushed Up, Tucked, Fully Buttoned, Collar Tied |
| Pushed Up | Tucked | Fully Buttoned | Untied | Sleeves Pushed Up, Tucked, Fully Buttoned, Collar Untied |
| Pushed Up | Tucked | N/A | Folded | Sleeves Pushed Up, Tucked, Collar Folded |
| Pushed Up | Tucked | N/A | N/A | Sleeves Pushed Up, Tucked |
| Pushed Up | Tucked | N/A | Popped | Sleeves Pushed Up, Tucked, Collar Popped |
| Pushed Up | Tucked | N/A | Tied | Sleeves Pushed Up, Tucked, Collar Tied |
| Pushed Up | Tucked | N/A | Untied | Sleeves Pushed Up, Tucked, Collar Untied |
| Pushed Up | Tucked | Top & Bottom Unbuttoned | Folded | Sleeves Pushed Up, Tucked, Top & Bottom Unbuttoned, Collar Folded |
| Pushed Up | Tucked | Top & Bottom Unbuttoned | N/A | Sleeves Pushed Up, Tucked, Top & Bottom Unbuttoned |
| Pushed Up | Tucked | Top & Bottom Unbuttoned | Popped | Sleeves Pushed Up, Tucked, Top & Bottom Unbuttoned, Collar Popped |
| Pushed Up | Tucked | Top & Bottom Unbuttoned | Tied | Sleeves Pushed Up, Tucked, Top & Bottom Unbuttoned, Collar Tied |

FIG. 15H

*Styling Combinations for Tops (continued):*

| COMBO | | | | |
|---|---|---|---|---|
| SLEEVES | TUCK | BUTTON | COLLAR | ALL VARIATIONS |
| Pushed Up | Tucked | Top & Bottom Unbuttoned | Popped | Sleeves Pushed Up, Tucked, Top & Bottom Unbuttoned, Collar Untied |
| Pushed Up | Tucked | Top Unbuttoned | Folded | Sleeves Pushed Up, Tucked, Top Unbuttoned, Collar Folded |
| Pushed Up | Tucked | Top Unbuttoned | N/A | Sleeves Pushed Up, Tucked, Top Unbuttoned |
| Pushed Up | Tucked | Top Unbuttoned | Popped | Sleeves Pushed Up, Tucked, Top Unbuttoned, Collar Popped |
| Pushed Up | Tucked | Top Unbuttoned | Tied | Sleeves Pushed Up, Tucked, Top Unbuttoned, Collar Tied |
| Pushed Up | Tucked | Top Unbuttoned | Untied | Sleeves Pushed Up, Tucked, Top Unbuttoned, Collar Untied |
| Pushed Up | Tucked | Unbuttoned | Folded | Sleeves Pushed Up, Tucked, Unbuttoned, Collar Folded |
| Pushed Up | Tucked | Unbuttoned | N/A | Sleeves Pushed Up, Tucked, Unbuttoned |
| Pushed Up | Tucked | Unbuttoned | Popped | Sleeves Pushed Up, Tucked, Unbuttoned, Collar Popped |
| Pushed Up | Tucked | Unbuttoned | Tied | Sleeves Pushed Up, Tucked, Unbuttoned, Collar Tied |
| Pushed Up | Tucked | Unbuttoned | Untied | Sleeves Pushed Up, Tucked, Unbuttoned, Collar Untied |
| Pushed Up | Untucked | Fully Buttoned | Folded | Sleeves Pushed Up, Untucked, Fully Buttoned, Collar Folded |
| Pushed Up | Untucked | Fully Buttoned | N/A | Sleeves Pushed Up, Untucked, Fully Buttoned |
| Pushed Up | Untucked | Fully Buttoned | Popped | Sleeves Pushed Up, Untucked, Fully Buttoned, Collar Popped |
| Pushed Up | Untucked | Fully Buttoned | Tied | Sleeves Pushed Up, Untucked, Fully Buttoned, Collar Tied |
| Pushed Up | Untucked | Fully Buttoned | Untied | Sleeves Pushed Up, Untucked, Fully Buttoned, Collar Untied |
| Pushed Up | Untucked | N/A | Folded | Sleeves Pushed Up, Untucked, Collar Folded |
| Pushed Up | Untucked | N/A | N/A | Sleeves Pushed Up, Untucked |
| Pushed Up | Untucked | N/A | Popped | Sleeves Pushed Up, Untucked, Collar Popped |
| Pushed Up | Untucked | N/A | Tied | Sleeves Pushed Up, Untucked, Collar Tied |
| Pushed Up | Untucked | N/A | Untied | Sleeves Pushed Up, Untucked, Collar Untied |
| Pushed Up | Untucked | Top & Bottom Unbuttoned | Folded | Sleeves Pushed Up, Untucked, Top & Bottom Unbuttoned, Collar Folded |
| Pushed Up | Untucked | Top & Bottom Unbuttoned | N/A | Sleeves Pushed Up, Untucked, Top & Bottom Unbuttoned |
| Pushed Up | Untucked | Top & Bottom Unbuttoned | Popped | Sleeves Pushed Up, Untucked, Top & Bottom Unbuttoned, Collar Popped |
| Pushed Up | Untucked | Top & Bottom Unbuttoned | Tied | Sleeves Pushed Up, Untucked, Top & Bottom Unbuttoned, Collar Tied |
| Pushed Up | Untucked | Top & Bottom Unbuttoned | Untied | Sleeves Pushed Up, Untucked, Top & Bottom Unbuttoned, Collar Untied |

FIG. 15I

*Styling Combinations for Tops (continued):*

| COMBO ||||| 
|---|---|---|---|---|
| SLEEVES | TUCK | BUTTON | COLLAR | ALL VARIATIONS |
| Pushed Up | Untucked | Top Unbuttoned | Folded | Sleeves Pushed Up, Untucked, Top Unbuttoned, Collar Folded |
| Pushed Up | Untucked | Top Unbuttoned | N/A | Sleeves Pushed Up, Untucked, Top Unbuttoned |
| Pushed Up | Untucked | Top Unbuttoned | Popped | Sleeves Pushed Up, Untucked, Top Unbuttoned, Collar Popped |
| Pushed Up | Untucked | Top Unbuttoned | Tied | Sleeves Pushed Up, Untucked, Top Unbuttoned, Collar Tied |
| Pushed Up | Untucked | Top Unbuttoned | Untied | Sleeves Pushed Up, Untucked, Top Unbuttoned, Collar Untied |
| Pushed Up | Untucked | Unbuttoned | Folded | Sleeves Pushed Up, Untucked, Unbuttoned, Collar Folded |
| Pushed Up | Untucked | Unbuttoned | N/A | Sleeves Pushed Up, Untucked, Unbuttoned |
| Pushed Up | Untucked | Unbuttoned | Popped | Sleeves Pushed Up, Untucked, Unbuttoned, Collar Popped |
| Pushed Up | Untucked | Unbuttoned | Tied | Sleeves Pushed Up, Untucked, Unbuttoned, Collar Tied |
| Pushed Up | Untucked | Unbuttoned | Untied | Sleeves Pushed Up, Untucked, Unbuttoned, Collar Untied |
| Rolled | Half Tucked | Fully Buttoned | Folded | Sleeves Rolled, Half Tucked, Fully Buttoned, Collar Folded |
| Rolled | Half Tucked | Fully Buttoned | N/A | Sleeves Rolled, Half Tucked, Fully Buttoned |
| Rolled | Half Tucked | Fully Buttoned | Popped | Sleeves Rolled, Half Tucked, Fully Buttoned, Collar Popped |
| Rolled | Half Tucked | Fully Buttoned | Tied | Sleeves Rolled, Half Tucked, Fully Buttoned, Collar Tied |
| Rolled | Half Tucked | Fully Buttoned | Untied | Sleeves Rolled, Half Tucked, Fully Buttoned, Collar Untied |
| Rolled | Half Tucked | Top & Bottom Unbuttoned | Folded | Sleeves Rolled, Half Tucked, Top & Bottom Unbuttoned, Collar Folded |
| Rolled | Half Tucked | Top & Bottom Unbuttoned | N/A | Sleeves Rolled, Half Tucked, Top & Bottom Unbuttoned |
| Rolled | Half Tucked | Top & Bottom Unbuttoned | Popped | Sleeves Rolled, Half Tucked, Top & Bottom Unbuttoned, Collar Popped |
| Rolled | Half Tucked | Top & Bottom Unbuttoned | Tied | Sleeves Rolled, Half Tucked, Top & Bottom Unbuttoned, Collar Tied |
| Rolled | Half Tucked | Top & Bottom Unbuttoned | Untied | Sleeves Rolled, Half Tucked, Top & Bottom Unbuttoned, Collar Untied |
| Rolled | Tucked | Fully Buttoned | Folded | Sleeves Rolled, Tucked, Fully Buttoned, Collar Folded |
| Rolled | Tucked | Fully Buttoned | N/A | Sleeves Rolled, Tucked, Fully Buttoned |
| Rolled | Tucked | Fully Buttoned | Popped | Sleeves Rolled, Tucked, Fully Buttoned, Collar Popped |
| Rolled | Tucked | Fully Buttoned | Tied | Sleeves Rolled, Tucked, Fully Buttoned, Collar Tied |
| Rolled | Tucked | Fully Buttoned | Untied | Sleeves Rolled, Tucked, Fully Buttoned, Collar Untied |
| Rolled | Tucked | N/A | Folded | Sleeves Rolled, Tucked, Collar Untied |

FIG. 15J

*Styling Combinations for Tops (continued):*

| COMBO | | | | |
|---|---|---|---|---|
| SLEEVES | TUCK | BUTTON | COLLAR | ALL VARIATIONS |
| Rolled | Tucked | N/A | N/A | Sleeves Rolled, Tucked |
| Rolled | Tucked | N/A | Popped | Sleeves Rolled, Tucked, Collar Popped |
| Rolled | Tucked | N/A | Tied | Sleeves Rolled, Tucked, Collar Tied |
| Rolled | Tucked | N/A | Untied | Sleeves Rolled, Tucked, Collar Untied |
| Rolled | Tucked | Top & Bottom Unbuttoned | Folded | Sleeves Rolled, Tucked, Top & Bottom Unbuttoned, Collar Folded |
| Rolled | Tucked | Top & Bottom Unbuttoned | N/A | Sleeves Rolled, Tucked, Top & Bottom Unbuttoned |
| Rolled | Tucked | Top & Bottom Unbuttoned | Popped | Sleeves Rolled, Tucked, Top & Bottom Unbuttoned, Collar Popped |
| Rolled | Tucked | Top & Bottom Unbuttoned | Tied | Sleeves Rolled, Tucked, Top & Bottom Unbuttoned, Collar Tied |
| Rolled | Tucked | Top & Bottom Unbuttoned | Untied | Sleeves Rolled, Tucked, Top & Bottom Unbuttoned, Collar Untied |
| Rolled | Tucked | Top Unbuttoned | Folded | Sleeves Rolled, Tucked, Top Unbuttoned, Collar Folded |
| Rolled | Tucked | Top Unbuttoned | N/A | Sleeves Rolled, Tucked, Top Unbuttoned |
| Rolled | Tucked | Top Unbuttoned | Popped | Sleeves Rolled, Tucked, Top Unbuttoned, Collar Popped |
| Rolled | Tucked | Top Unbuttoned | Tied | Sleeves Rolled, Tucked, Top Unbuttoned, Collar Tied |
| Rolled | Tucked | Top Unbuttoned | Untied | Sleeves Rolled, Tucked, Top Unbuttoned, Collar Untied |
| Rolled | Tucked | Unbuttoned | Folded | Sleeves Rolled, Half Tucked, Unbuttoned, Collar Folded |
| Rolled | Tucked | Unbuttoned | N/A | Sleeves Rolled, Half Tucked, Unbuttoned |
| Rolled | Tucked | Unbuttoned | Popped | Sleeves Rolled, Half Tucked, Unbuttoned, Collar Popped |
| Rolled | Tucked | Unbuttoned | Tied | Sleeves Rolled, Half Tucked, Unbuttoned, Collar Tied |
| Rolled | Tucked | Unbuttoned | Untied | Sleeves Rolled, Half Tucked, Unbuttoned, Collar Untied |
| Rolled | Untucked | Fully Buttoned | Folded | Sleeves Rolled, Untucked, Fully Buttoned, Collar Folded |
| Rolled | Untucked | Fully Buttoned | N/A | Sleeves Rolled, Untucked, Fully Buttoned |
| Rolled | Untucked | Fully Buttoned | Popped | Sleeves Rolled, Untucked, Fully Buttoned, Collar Popped |
| Rolled | Untucked | Fully Buttoned | Tied | Sleeves Rolled, Untucked, Fully Buttoned, Collar Tied |
| Rolled | Untucked | Fully Buttoned | Untied | Sleeves Rolled, Untucked, Fully Buttoned, Collar Untied |
| Rolled | Untucked | N/A | Folded | Sleeves Rolled, Untucked, Collar Folded |
| Rolled | Untucked | N/A | N/A | Sleeves Rolled, Untucked |
| Rolled | Untucked | N/A | Popped | Sleeves Rolled, Untucked, Collar Popped |

FIG. 15K

*Styling Combinations for Tops (continued):*

| COMBO ||||| 
|---|---|---|---|---|
| SLEEVES | TUCK | BUTTON | COLLAR | ALL VARIATIONS |
| Rolled | Untucked | N/A | Tied | Sleeves Rolled, Untucked, Collar Tied |
| Rolled | Untucked | N/A | Untied | Sleeves Rolled, Untucked, Collar Untied |
| Rolled | Untucked | Top & Bottom Unbuttoned | Folded | Sleeves Rolled, Untucked, Top & Bottom Unbuttoned, Collar Folded |
| Rolled | Untucked | Top & Bottom Unbuttoned | N/A | Sleeves Rolled, Untucked, Top & Bottom Unbuttoned |
| Rolled | Untucked | Top & Bottom Unbuttoned | Popped | Sleeves Rolled, Untucked, Top & Bottom Unbuttoned, Collar Popped |
| Rolled | Untucked | Top & Bottom Unbuttoned | Tied | Sleeves Rolled, Untucked, Top & Bottom Unbuttoned, Collar Tied |
| Rolled | Untucked | Top & Bottom Unbuttoned | Untied | Sleeves Rolled, Untucked, Top & Bottom Unbuttoned, Collar Untied |
| Rolled | Untucked | Top Unbuttoned | Folded | Sleeves Rolled, Untucked, Top Unbuttoned, Collar Folded |
| Rolled | Untucked | Top Unbuttoned | N/A | Sleeves Rolled, Untucked, Top Unbuttoned |
| Rolled | Untucked | Top Unbuttoned | Popped | Sleeves Rolled, Untucked, Top Unbuttoned, Collar Popped |
| Rolled | Untucked | Top Unbuttoned | Tied | Sleeves Rolled, Untucked, Top Unbuttoned, Collar Tied |
| Rolled | Untucked | Top Unbuttoned | Untied | Sleeves Rolled, Untucked, Top Unbuttoned, Collar Untied |
| Rolled | Untucked | Unbuttoned | Folded | Sleeves Rolled, Untucked, Unbuttoned, Collar Folded |
| Rolled | Untucked | Unbuttoned | N/A | Sleeves Rolled, Untucked, Unbuttoned |
| Rolled | Untucked | Unbuttoned | Popped | Sleeves Rolled, Untucked, Unbuttoned, Collar Popped |
| Rolled | Untucked | Unbuttoned | Tied | Sleeves Rolled, Untucked, Unbuttoned, Collar Tied |
| Rolled | Untucked | Unbuttoned | Untied | Sleeves Rolled, Untucked, Unbuttoned, Collar Untied |
| Unbuttoned | Half Tucked | Fully Buttoned | Folded | Sleeves Unbuttoned, Half Tucked, Fully Buttoned, Collar Folded |
| Unbuttoned | Half Tucked | Fully Buttoned | N/A | Sleeves Unbuttoned, Half Tucked, Fully Buttoned |
| Unbuttoned | Half Tucked | Fully Buttoned | Popped | Sleeves Unbuttoned, Half Tucked, Fully Buttoned, Collar Popped |
| Unbuttoned | Half Tucked | Fully Buttoned | Tied | Sleeves Unbuttoned, Half Tucked, Fully Buttoned, Collar Tied |
| Unbuttoned | Half Tucked | Fully Buttoned | Untied | Sleeves Unbuttoned, Half Tucked, Fully Buttoned, Collar Tied |
| Unbuttoned | Half Tucked | Top & Bottom Unbuttoned | Folded | Sleeves Unbuttoned, Half Tucked, Top & Bottom Unbuttoned, Collar Folded |
| Unbuttoned | Half Tucked | Top & Bottom Unbuttoned | N/A | Sleeves Unbuttoned, Half Tucked, Top & Bottom Unbuttoned |

FIG. 15L

*Styling Combinations for Tops (continued):*

| COMBO | | | | |
|---|---|---|---|---|
| SLEEVES | TUCK | BUTTON | COLLAR | ALL VARIATIONS |
| Unbuttoned | Half Tucked | Top & Bottom Unbuttoned | Popped | Sleeves Unbuttoned, Half Tucked, Top & Bottom Unbuttoned, Collar Popped |
| Unbuttoned | Half Tucked | Top & Bottom Unbuttoned | Untied | Sleeves Unbuttoned, Half Tucked, Top & Bottom Unbuttoned, Collar Untied |
| Unbuttoned | Half Tucked | Top & Bottom Unbuttoned | Tied | Sleeves Unbuttoned, Half Tucked, Top & Bottom Unbuttoned, Collar Tied |
| Unbuttoned | Tucked | Fully Buttoned | Folded | Sleeves Unbuttoned, Tucked, Fully Buttoned, Collar Folded |
| Unbuttoned | Tucked | Fully Buttoned | N/A | Sleeves Unbuttoned, Tucked, Fully Buttoned |
| Unbuttoned | Tucked | Fully Buttoned | Popped | Sleeves Unbuttoned, Tucked, Fully Buttoned, Collar Popped |
| Unbuttoned | Tucked | Fully Buttoned | Tied | Sleeves Unbuttoned, Tucked, Fully Buttoned, Collar Tied |
| Unbuttoned | Tucked | Fully Buttoned | Untied | Sleeves Unbuttoned, Tucked, Fully Buttoned, Collar Untied |
| Unbuttoned | Tucked | N/A | Folded | Sleeves Unbuttoned, Tucked, Collar Folded |
| Unbuttoned | Tucked | N/A | N/A | Sleeves Unbuttoned, Tucked |
| Unbuttoned | Tucked | N/A | Popped | Sleeves Unbuttoned, Tucked, Collar Popped |
| Unbuttoned | Tucked | N/A | Tied | Sleeves Unbuttoned, Tucked, Collar Tied |
| Unbuttoned | Tucked | N/A | Untied | Sleeves Unbuttoned, Tucked, Collar Untied |
| Unbuttoned | Tucked | Top & Bottom Untucked | Folded | Sleeves Unbuttoned, Tucked, Top & Bottom Unbuttoned, Collar Folded |
| Unbuttoned | Tucked | Top & Bottom Untucked | N/A | Sleeves Unbuttoned, Tucked, Top & Bottom Unbuttoned |
| Unbuttoned | Tucked | Top & Bottom Untucked | Popped | Sleeves Unbuttoned, Tucked, Top & Bottom Unbuttoned, Collar Popped |
| Unbuttoned | Tucked | Top & Bottom Untucked | Tied | Sleeves Unbuttoned, Tucked, Top & Bottom Unbuttoned, Collar Tied |
| Unbuttoned | Tucked | Top & Bottom Untucked | Untied | Sleeves Unbuttoned, Tucked, Top & Bottom Unbuttoned, Collar Untied |
| Unbuttoned | Tucked | Top Unbuttoned | Folded | Sleeves Unbuttoned, Tucked, Top Unbuttoned, Collar Folded |
| Unbuttoned | Tucked | Top Unbuttoned | N/A | Sleeves Unbuttoned, Tucked, Top Unbuttoned |
| Unbuttoned | Tucked | Top Unbuttoned | Popped | Sleeves Unbuttoned, Tucked, Top Unbuttoned, Collar Popped |
| Unbuttoned | Tucked | Top Unbuttoned | Tied | Sleeves Unbuttoned, Tucked, Top Unbuttoned, Collar Tied |
| Unbuttoned | Tucked | Top Unbuttoned | Untied | Sleeves Unbuttoned, Tucked, Top Unbuttoned, Collar Untied |
| Unbuttoned | Tucked | Unbuttoned | Folded | Sleeves Unbuttoned, Tucked, Unbuttoned, Collar Folded |
| Unbuttoned | Tucked | Unbuttoned | N/A | Sleeves Unbuttoned, Tucked, Unbuttoned |

FIG. 15M

*Styling Combinations for Tops (continued):*

| COMBO | | | | |
|---|---|---|---|---|
| SLEEVES | TUCK | BUTTON | COLLAR | ALL VARIATIONS |
| Unbuttoned | Tucked | Unbuttoned | Popped | Sleeves Unbuttoned, Tucked, Unbuttoned, Collar Popped |
| Unbuttoned | Tucked | Unbuttoned | Tied | Sleeves Unbuttoned, Tucked, Unbuttoned, Collar Tied |
| Unbuttoned | Tucked | Unbuttoned | Untied | Sleeves Unbuttoned, Tucked, Unbuttoned, Collar Untied |
| Unbuttoned | Untucked | Fully Buttoned | Folded | Sleeves Unbuttoned, Untucked, Fully Buttoned, Collar Folded |
| Unbuttoned | Untucked | Fully Buttoned | N/A | Sleeves Unbuttoned, Untucked, Fully Buttoned |
| Unbuttoned | Untucked | Fully Buttoned | Popped | Sleeves Unbuttoned, Untucked, Fully Buttoned, Collar Popped |
| Unbuttoned | Untucked | Fully Buttoned | Tied | Sleeves Unbuttoned, Untucked, Fully Buttoned, Collar Tied |
| Unbuttoned | Untucked | Fully Buttoned | Untied | Sleeves Unbuttoned, Tucked, Fully Buttoned, Collar Untied |
| Unbuttoned | Untucked | N/A | Folded | Sleeves Unbuttoned, Tucked, Collar Folded |
| Unbuttoned | Untucked | N/A | N/A | Sleeves Unbuttoned, Tucked |
| Unbuttoned | Untucked | N/A | Popped | Sleeves Unbuttoned, Tucked, Collar Popped |
| Unbuttoned | Untucked | N/A | Tied | Sleeves Unbuttoned, Tucked, Collar Tied |
| Unbuttoned | Untucked | N/A | Untied | Sleeves Unbuttoned, Tucked, Collar Untied |
| Unbuttoned | Untucked | Top & Bottom Untucked | Folded | Sleeves Unbuttoned, Tucked, Top & Bottom Unbuttoned, Collar Folded |
| Unbuttoned | Untucked | Top & Bottom Untucked | N/A | Sleeves Unbuttoned, Tucked, Top & Bottom Unbuttoned |
| Unbuttoned | Untucked | Top & Bottom Untucked | Popped | Sleeves Unbuttoned, Tucked, Top & Bottom Unbuttoned, Collar Popped |
| Unbuttoned | Untucked | Top & Bottom Untucked | Tied | Sleeves Unbuttoned, Tucked, Top & Bottom Unbuttoned, Collar Tied |
| Unbuttoned | Untucked | Top & Bottom Untucked | Untied | Sleeves Unbuttoned, Tucked, Top & Bottom Unbuttoned, Collar Untied |
| Unbuttoned | Untucked | Top Unbuttoned | Folded | Sleeves Unbuttoned, Tucked, Top Unbuttoned, Collar Folded |
| Unbuttoned | Untucked | Top Unbuttoned | N/A | Sleeves Unbuttoned, Tucked, Top Unbuttoned |
| Unbuttoned | Untucked | Top Unbuttoned | Popped | Sleeves Unbuttoned, Tucked, Top Unbuttoned, Collar Popped |
| Unbuttoned | Untucked | Top Unbuttoned | Tied | Sleeves Unbuttoned, Tucked, Top Unbuttoned, Collar Tied |
| Unbuttoned | Untucked | Top Unbuttoned | Untied | Sleeves Unbuttoned, Tucked, Top Unbuttoned, Collar Untied |
| Unbuttoned | Untucked | Unbuttoned | Folded | Sleeves Unbuttoned, Tucked, Unbuttoned, Collar Folded |
| Unbuttoned | Untucked | Unbuttoned | N/A | Sleeves Unbuttoned, Tucked, Unbuttoned |

FIG. 15N

*Styling Combinations for Tops (continued):*

| COMBO | | | | |
|---|---|---|---|---|
| SLEEVES | TUCK | BUTTON | COLLAR | ALL VARIATIONS |
| Unbuttoned | Untucked | Unbuttoned | NA | Sleeves Unbuttoned, Tucked, Unbuttoned, Collar Popped |
| Unbuttoned | Untucked | Unbuttoned | Popped | Sleeves Unbuttoned, Tucked, Unbuttoned, Collar Tied |
| Unbuttoned | Untucked | Unbuttoned | Tied | Sleeves Unbuttoned, Tucked, Unbuttoned, Collar Untied |
| Unbuttoned | Untucked | Unbuttoned | Untied | Sleeves Unbuttoned, Tucked, Unbuttoned, Collar Untied |

FIG. 15O

Long Sleeve - *Length*
<u>Styling Segment: Sleeve</u>
- *Wrist -Falls between beginning of wrist to middle of hand*
- *Mid Hand -Falls between middle of hand to top of knuckles*
- *Fingers -Falls between knuckles to top of fingers*

Long Sleeve - *Fit*
<u>Styling Segment: Sleeve</u>
- *Tight* - *Garment fits to the shape of the model's arm*
- *Relaxed* - *Falls around arm, no pulling of material to shape garment*
- *Oversized* - *Baggy/billowing sleeve that creates an oversized look*

Tight        Relaxed        Oversized

Long Sleeve - *Styling Option*
Styling Segment: Sleeve
- *Cuffed* - *Layer of fabric at the lower edge of the sleeve that is folded upward*
- *Rolled* - *Falls around arm, no pulling of material to shape garment*
- *Pushed Up* - *Gather and pull of the sleeve that sits just below the elbow, bunching the remaining sleeve at the bottom*
- *Buttoned* - *Layer of fabric at the lower edge of the sleeve that is tightened around the waist*
- *Unbuttoned* - *Layer of fabric at the lower edge of the sleeve that loosely falls around the hand*

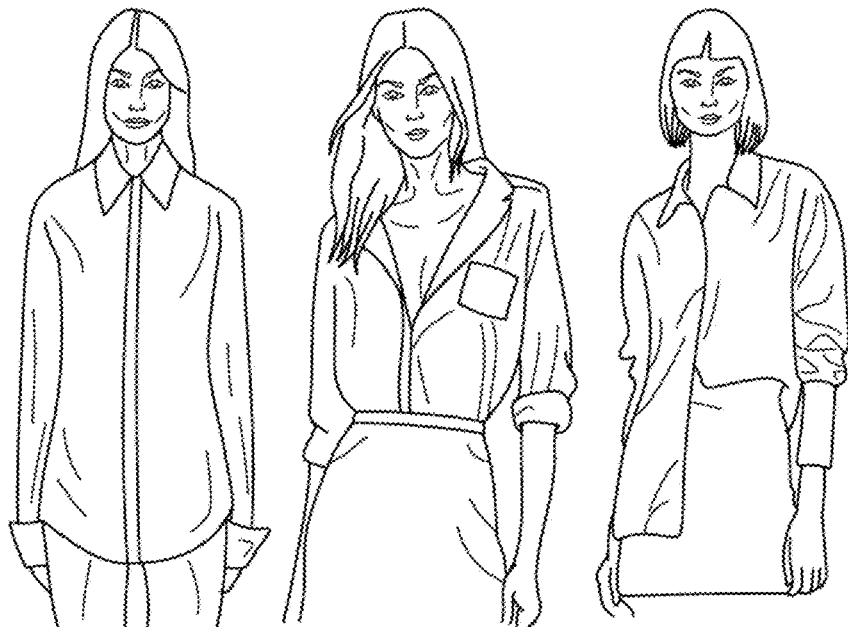

Cuffed     Rolled     Pushed Up

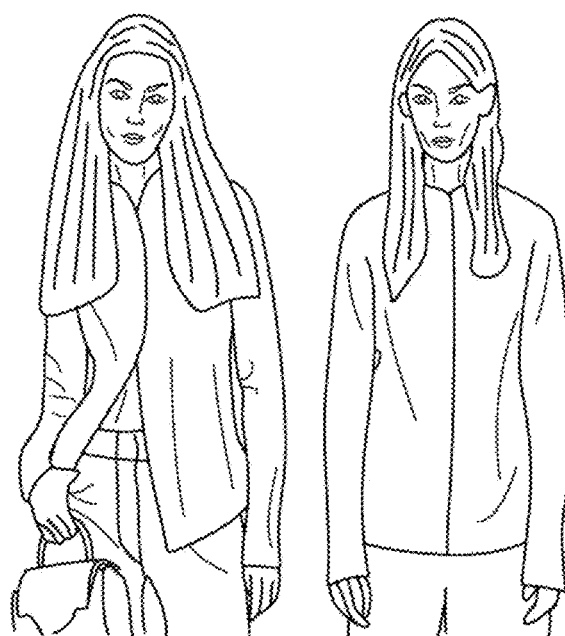

Buttoned     Unbuttoned

FIG. 16C

Tuck- Length
Styling Segment: Bodice
- Cropped - Falls between beginning of ribs to the middle of waist
- Standard - Falls between middle of waist to bottom of hips
- Long - Falls between bottom of hips to mid thigh Tuck-Fit
Styling Segment: Bodice
- Tight - Garment fits to the shape of the model's bodice
- Relaxed - Falls around bodice, no pulling of material to shape garment
- Oversized - Baggy or loose-fitting bodice that creates an oversized look Buttons - Styling Options
Styling Segment: Bodice
- *Fully Buttoned* - All button embellishments are fastened
- *Unbuttoned* - All button embellishments are undone
- *Top Unbuttoned* - Right side of the garment is tucked into bottoms, remaining material is untucked
- *Top & Bottom Unbuttoned* - Right side of the garment is tucked into bottoms, remaining material is untucked
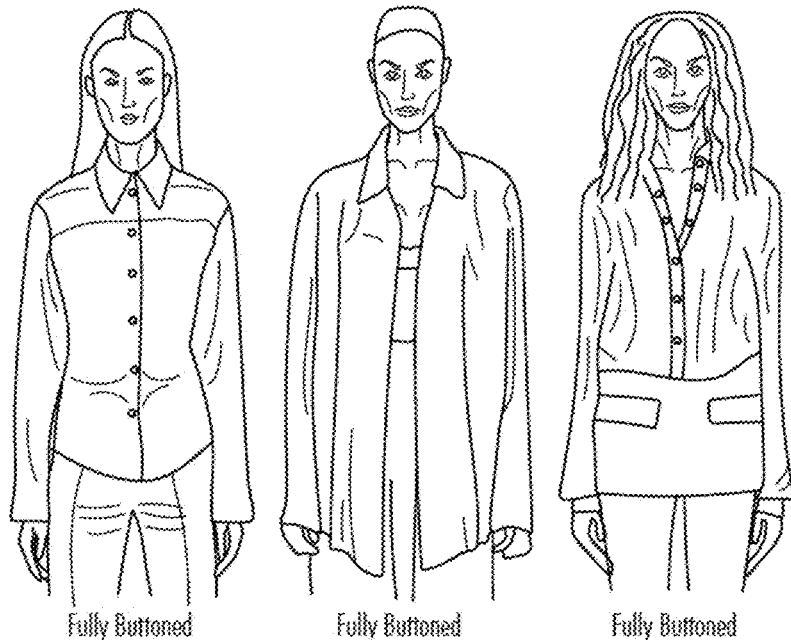
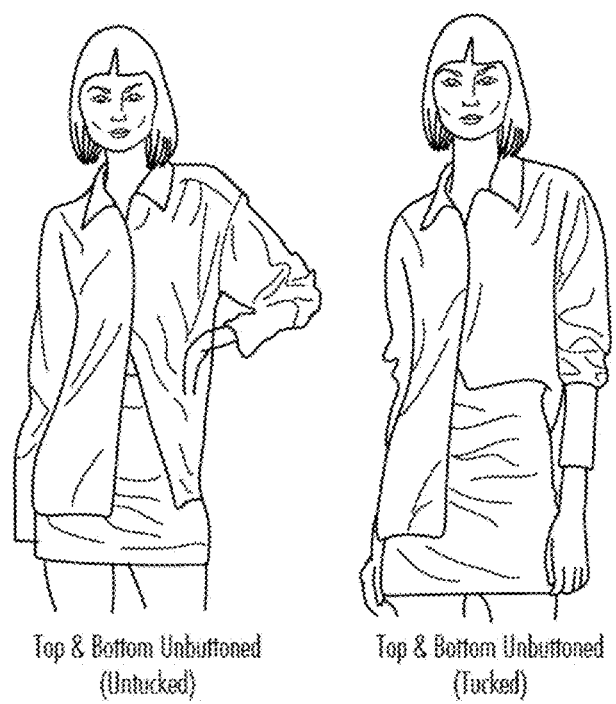
FIG. 16G Buttons - *Tuck*
<u>Styling Segment: Bodice</u>
- *Untucked* - *Garment is completely untucked*
- *Tucked* - *Garment is fully or half tucked into bottoms*

Untucked | Tucked | Tucked - please see styling options for reference

Collar - Type
Styling Segment: Neck
- Collar - The extra layer of fabric at the top of the garment that can be folded or popped
- PussyBow - The extra material at the top of the garment that can be bow tied Collar - Styling Options
Styling Segment: Neck
- *Folded* - The layer of fabric at the top of the garment is folded down around the entire neck
- *Popped* - The layer of fabric at the top of the garment is unfolded/lifted up around the model's neck, but starts to angle down toward the front
- *Tied* - The extra material at the top fo the garment that is bow tied at the neck
- *Untied* - The extra material at the top of the garment that is untied, loosely falling on bodice

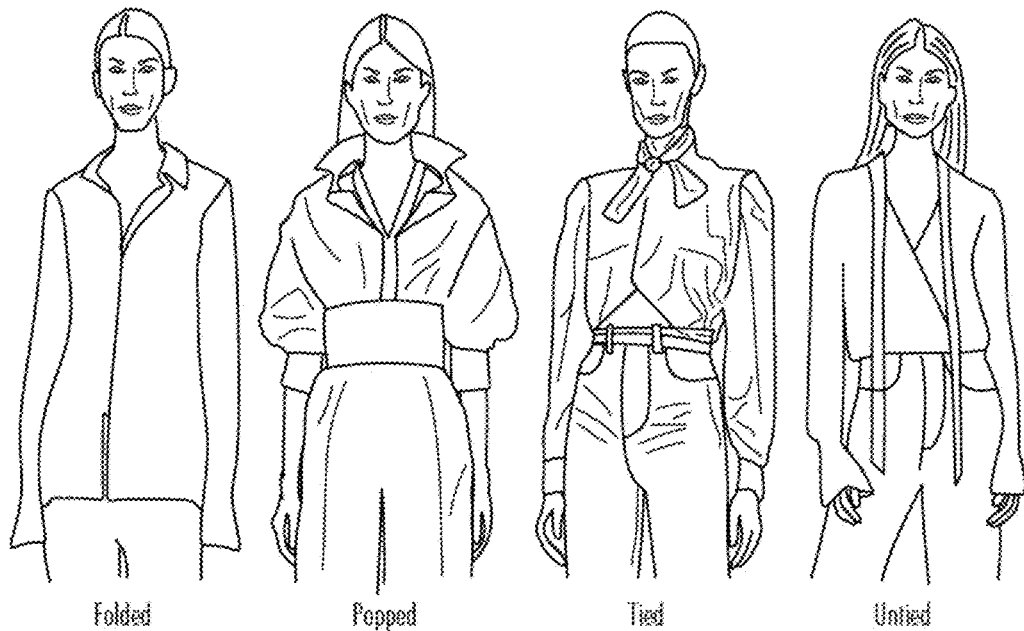

FIG. 16J

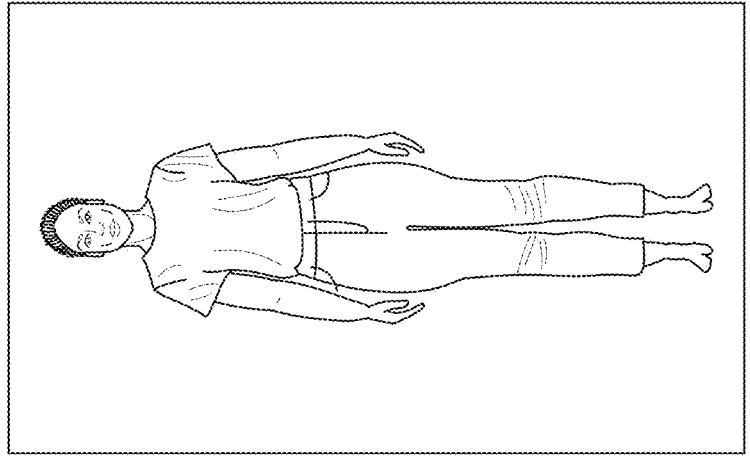
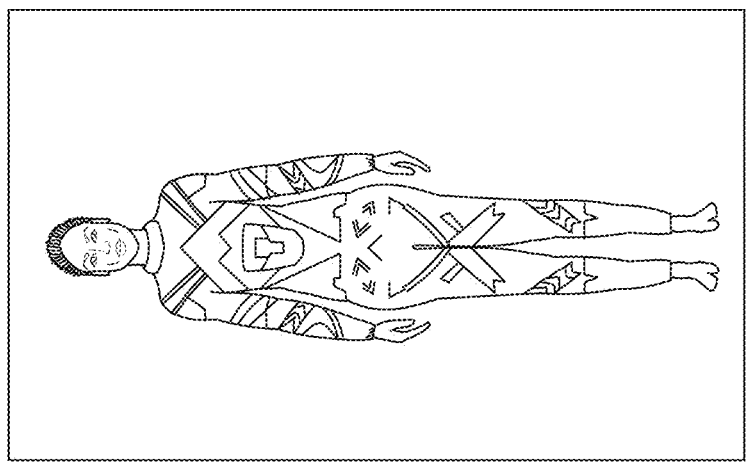
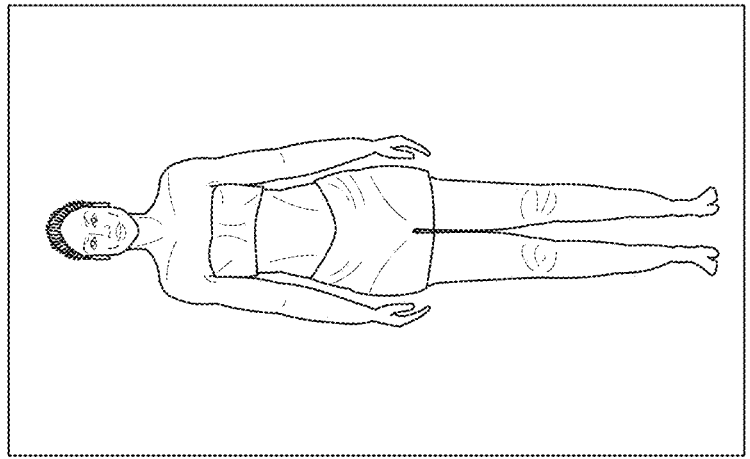
FIG. 19C

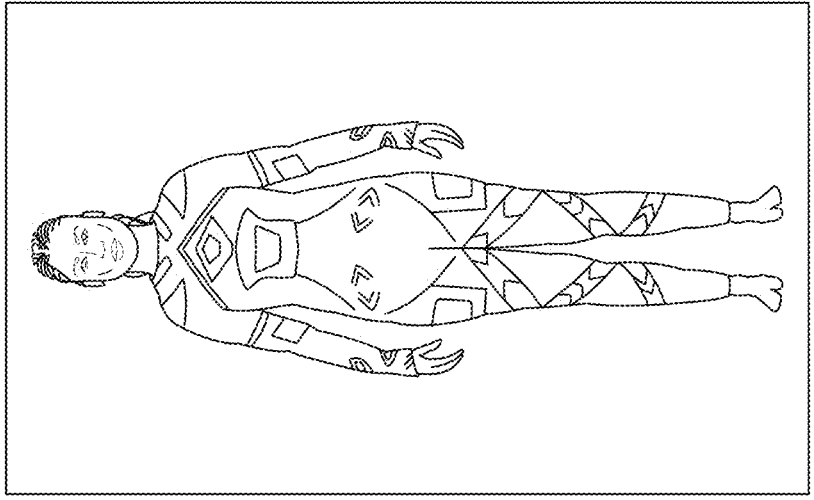
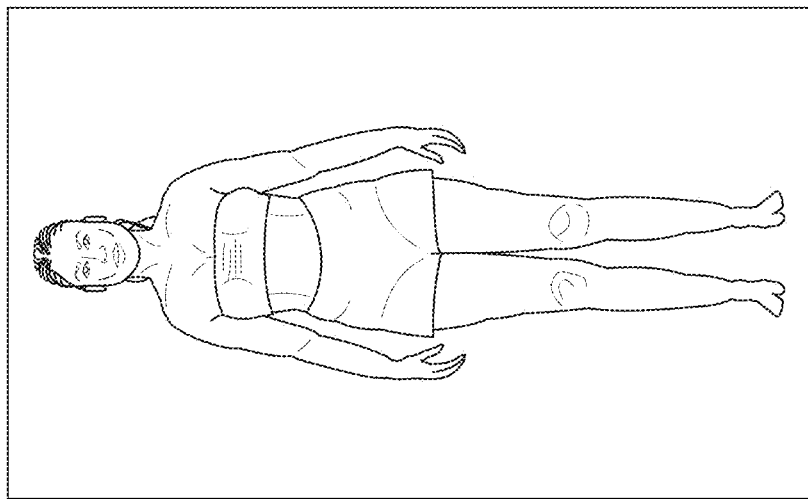
FIG. 19D

Issue: Misaligned Models
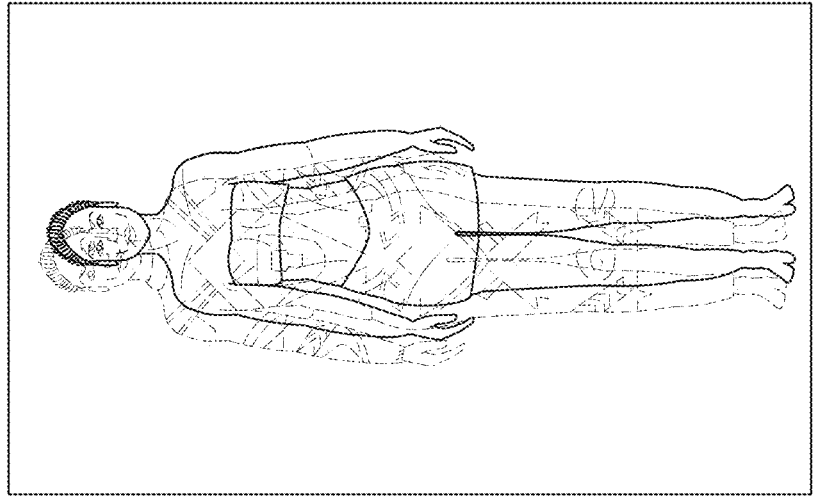
Well aligned
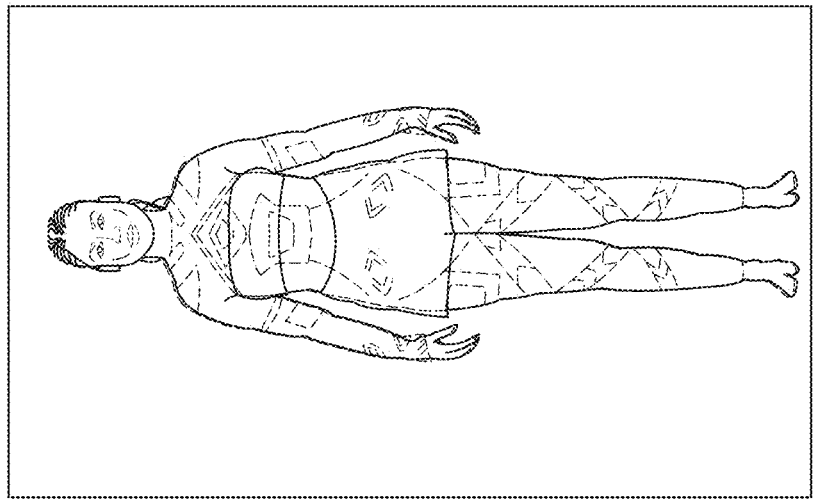
Misaligned
FIG. 19E

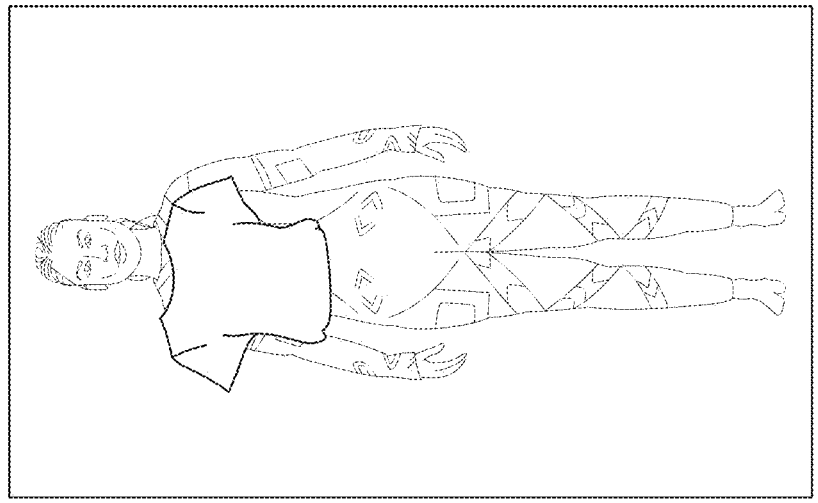
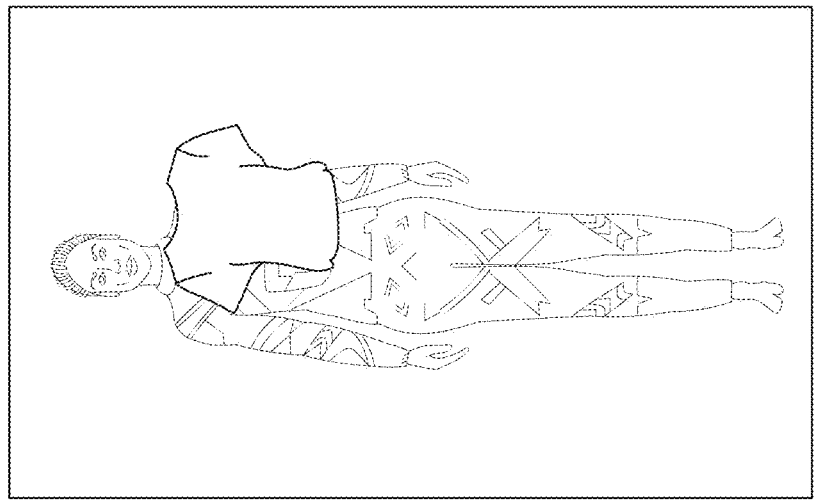
FIG. 19F

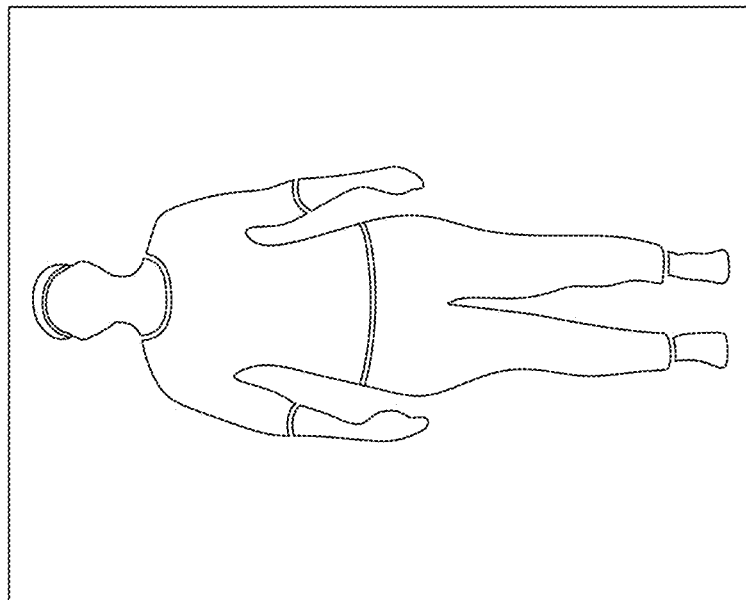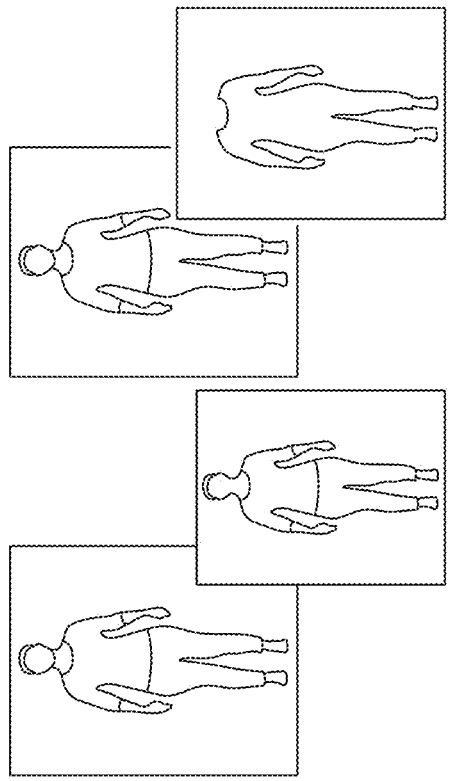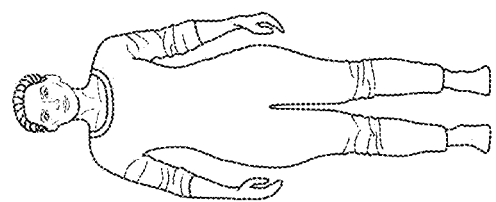
FIG. 22
Segmentation: SCHP - Guided SAM
• Segmentation - Identifying which pixels in an image correspond to specific predefined labels

- Transferring correspondence points on undergarment shots.

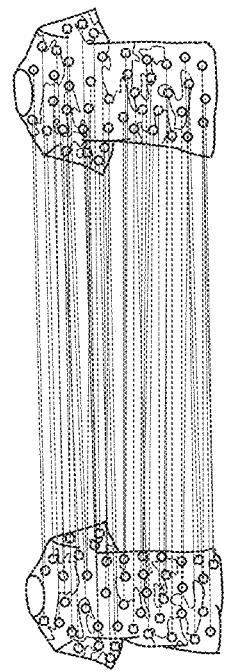
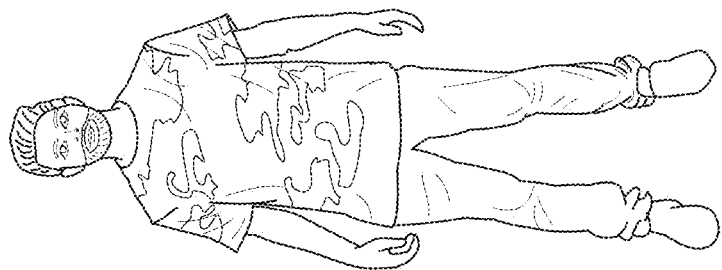
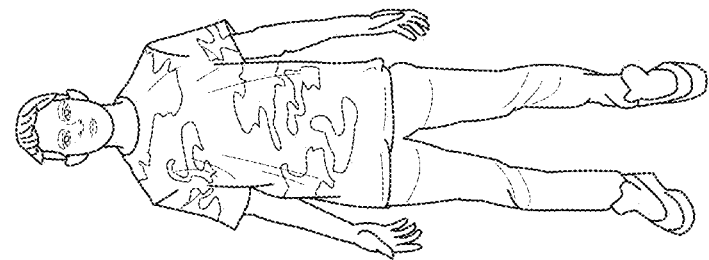
Version 1: Off-the-shelf Complex Patterns – Top Only
FIG. 24B

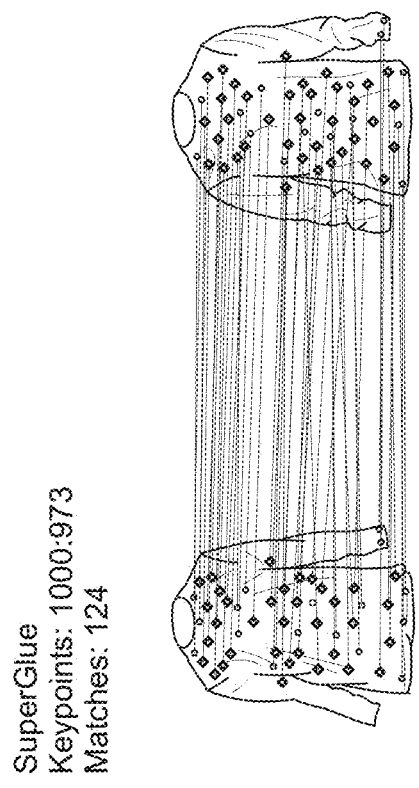
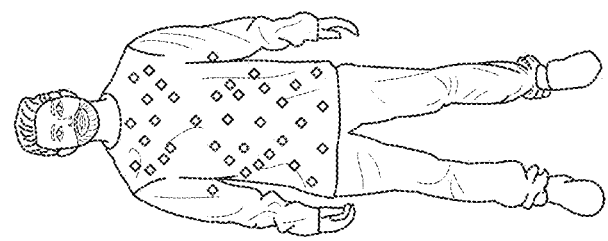
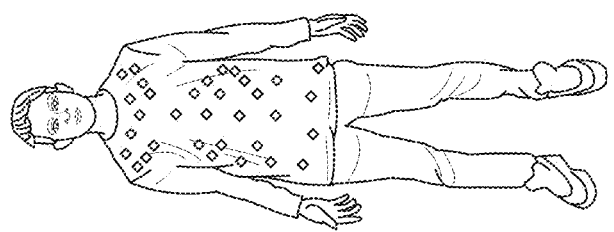
FIG. 24C

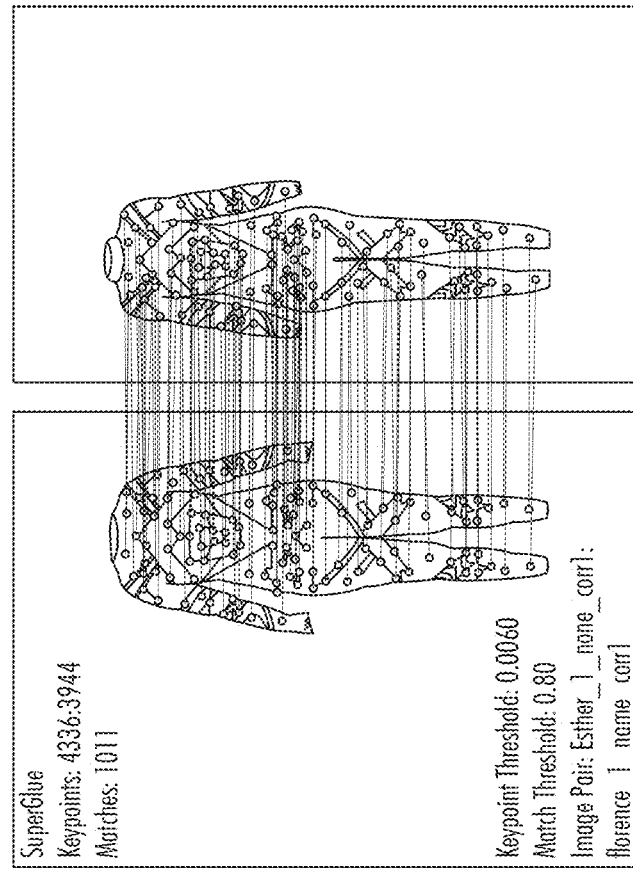
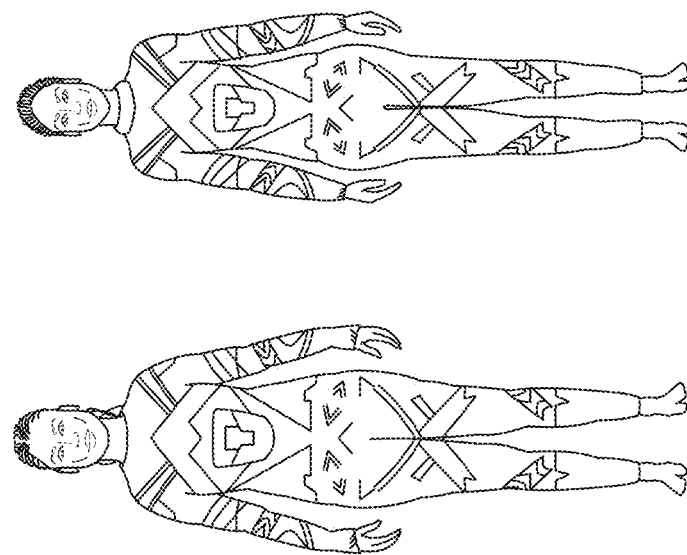
FIG. 24D

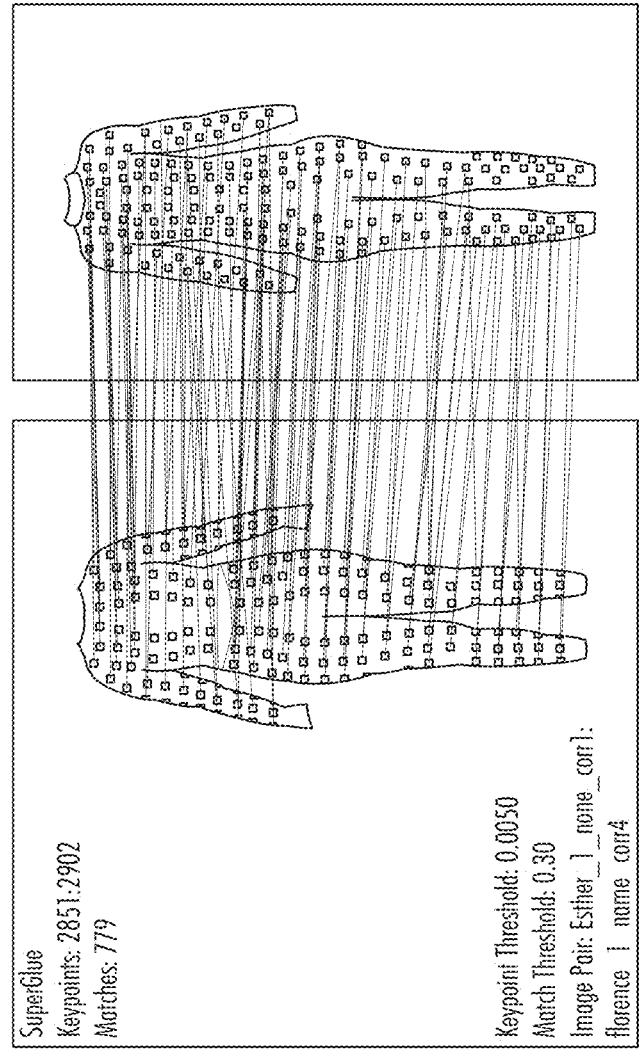
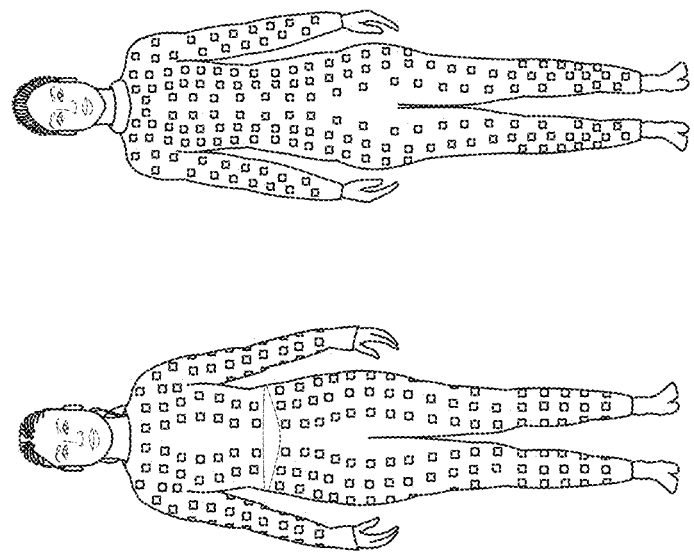
FIG. 24E

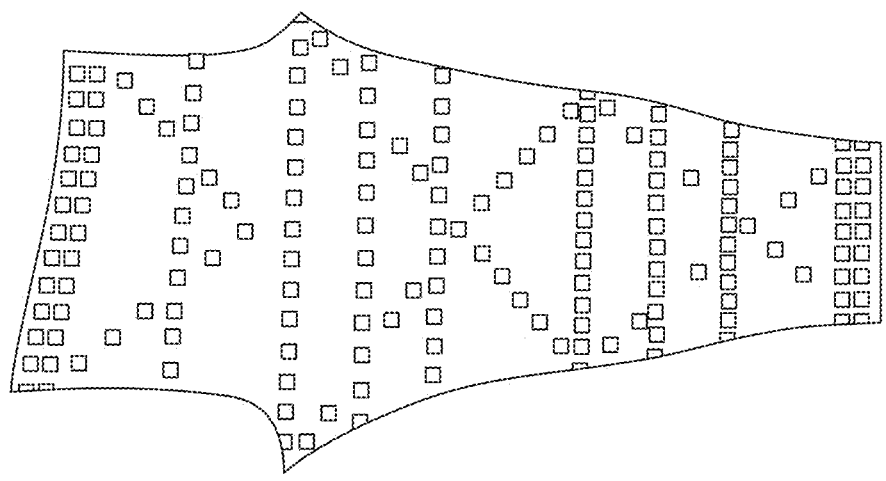
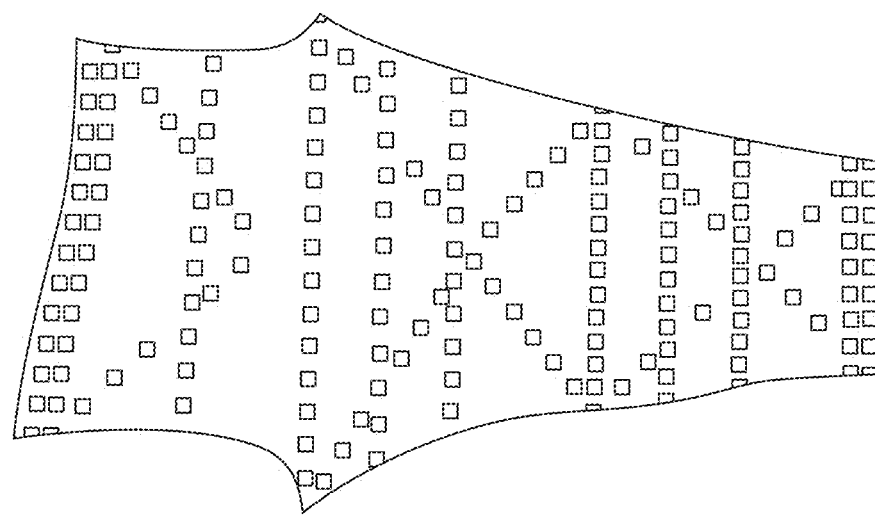
FIG. 24F

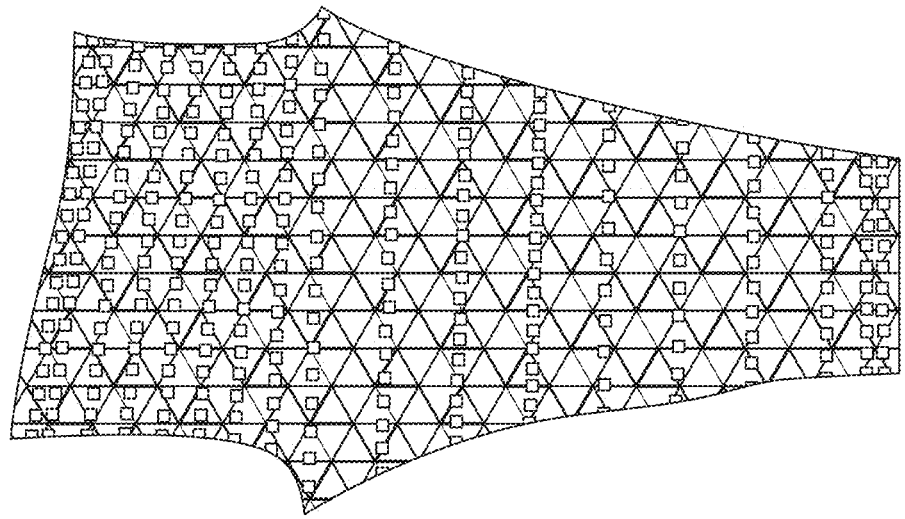
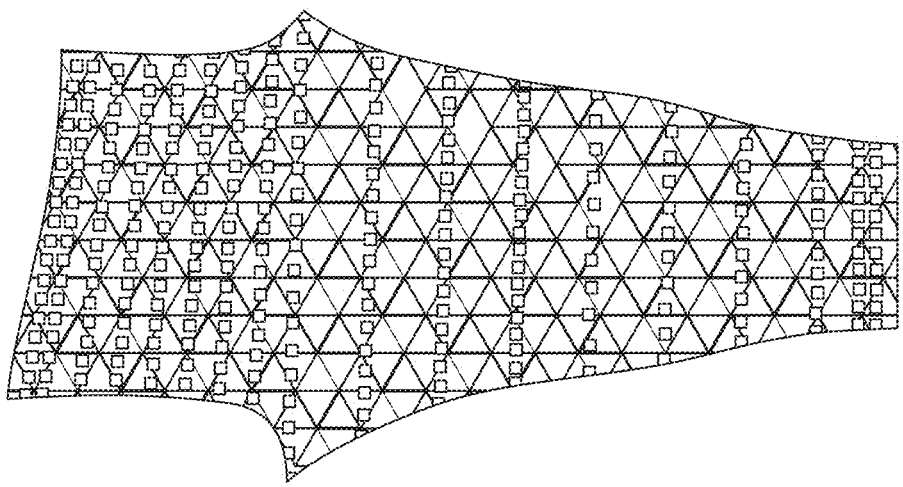
FIG. 24G

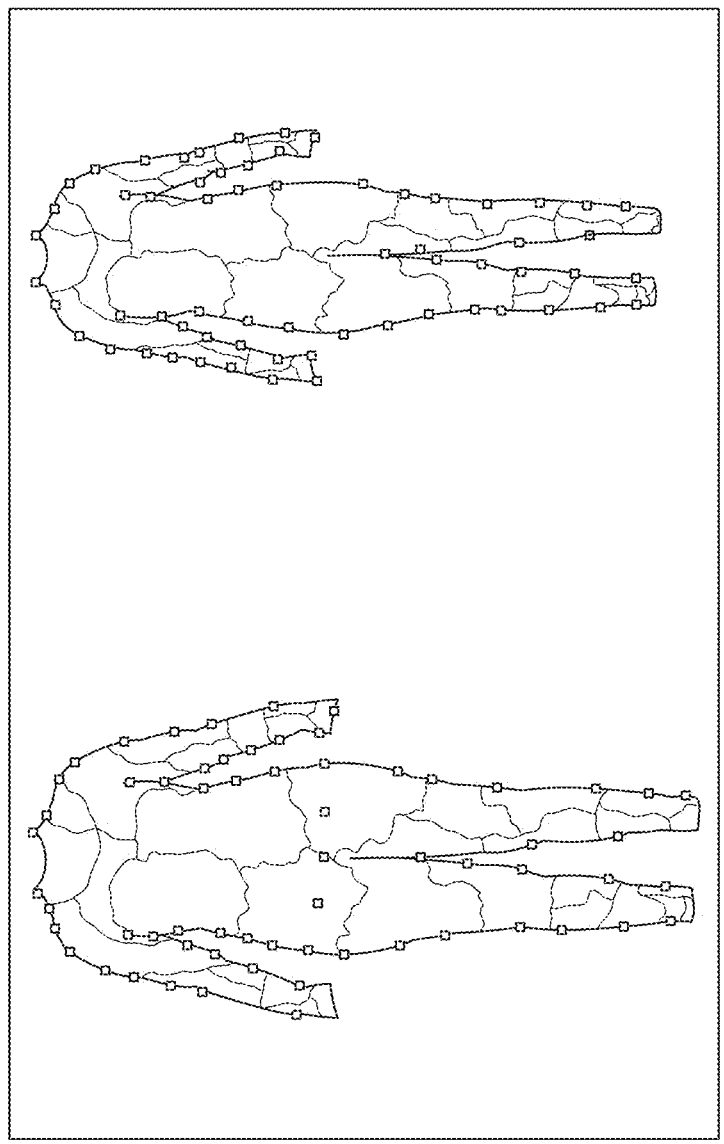
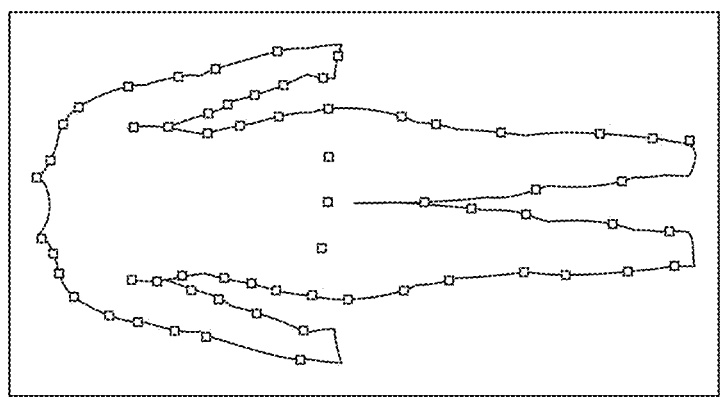
FIG. 24I

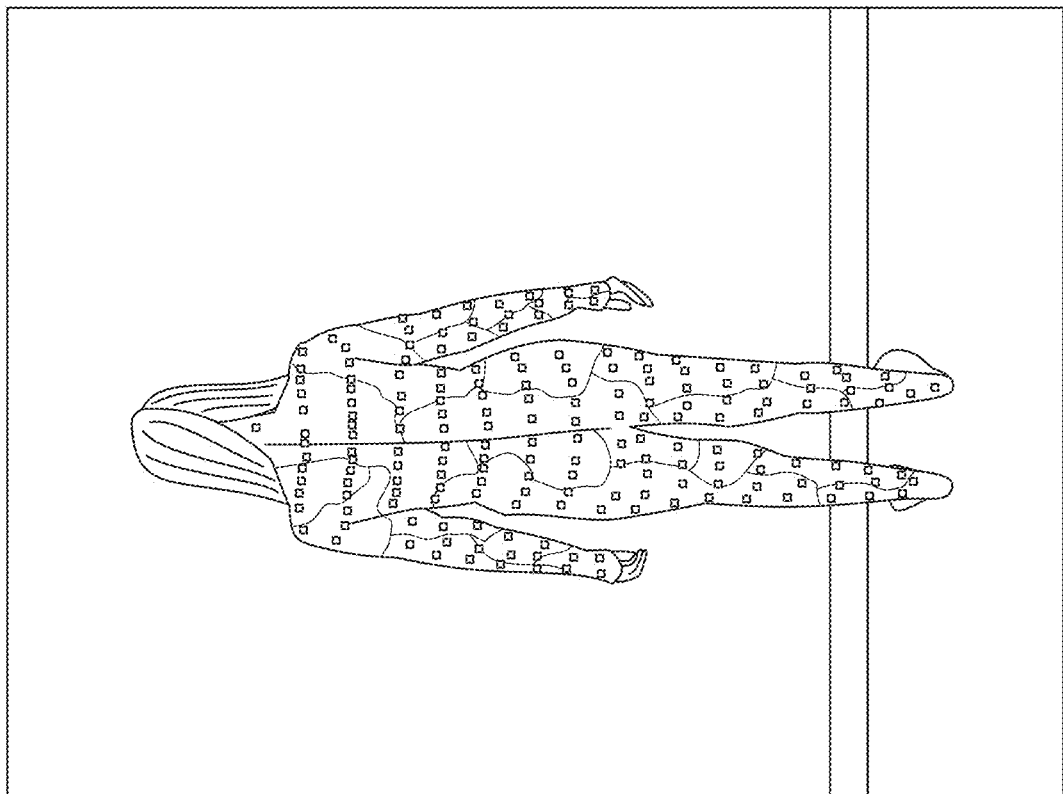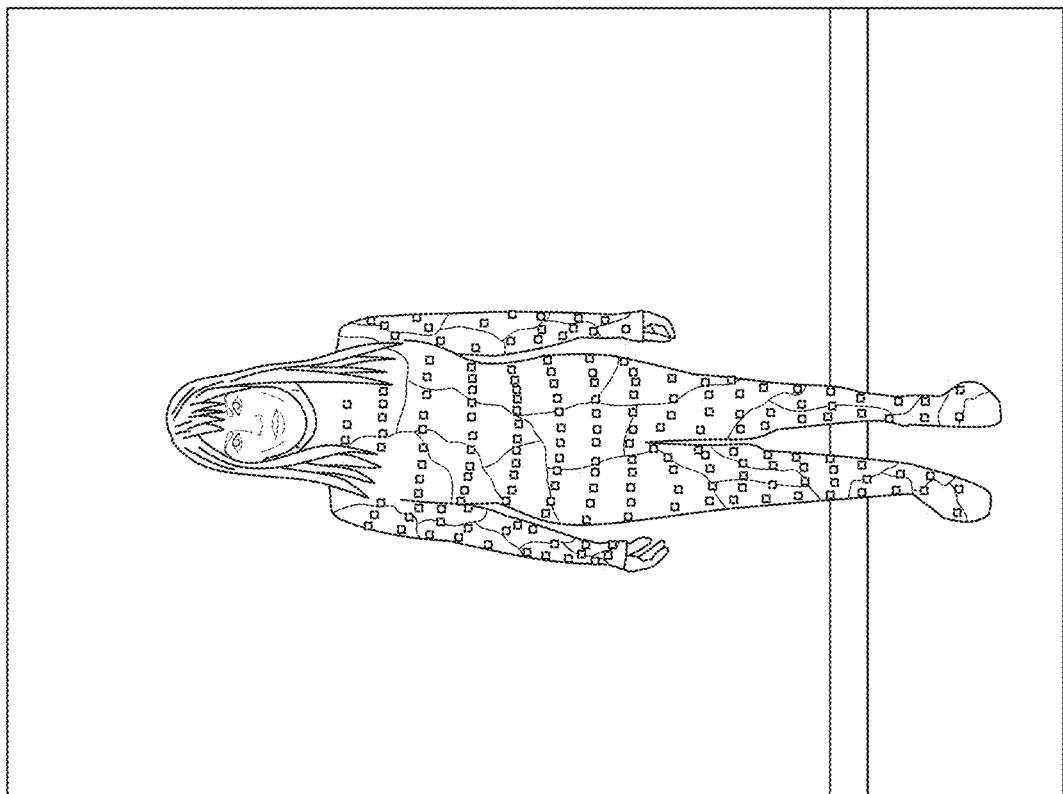
FIG. 24K

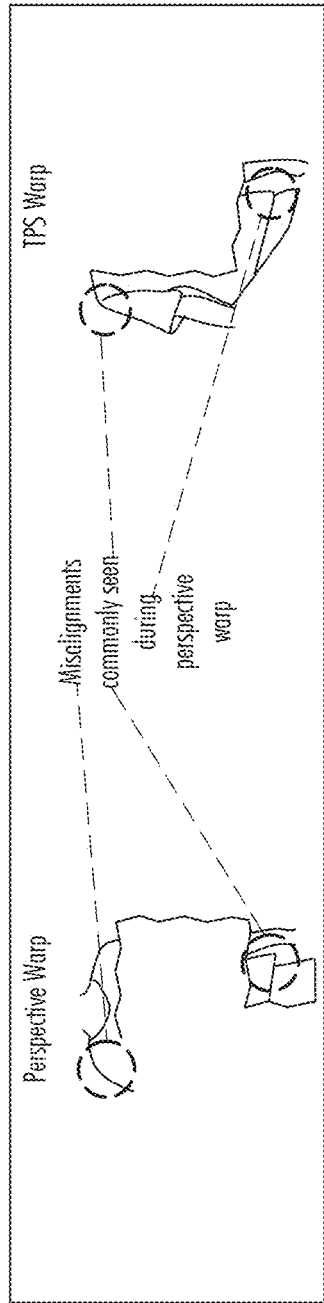
FIG. 27A1
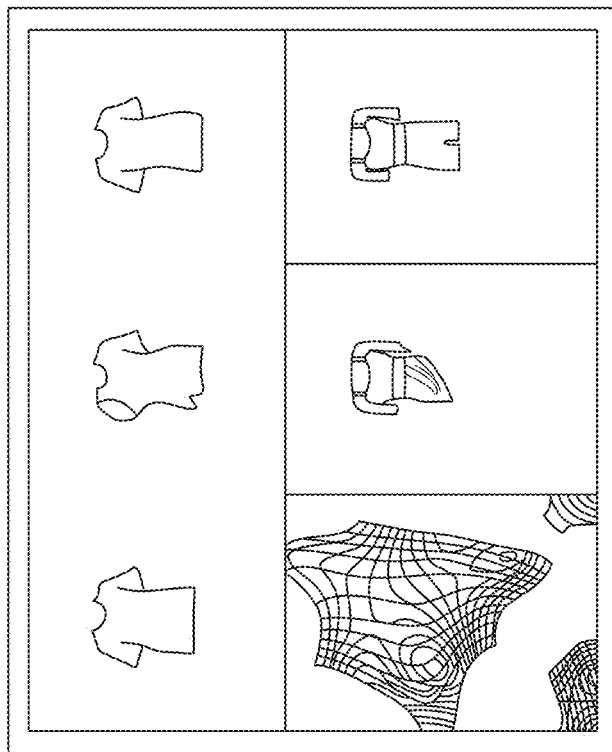
FIG. 27A2

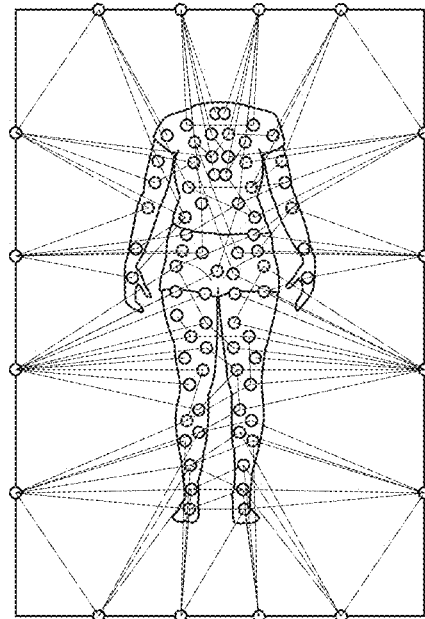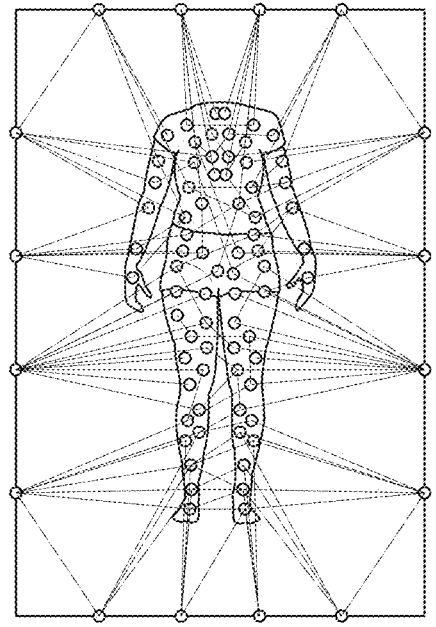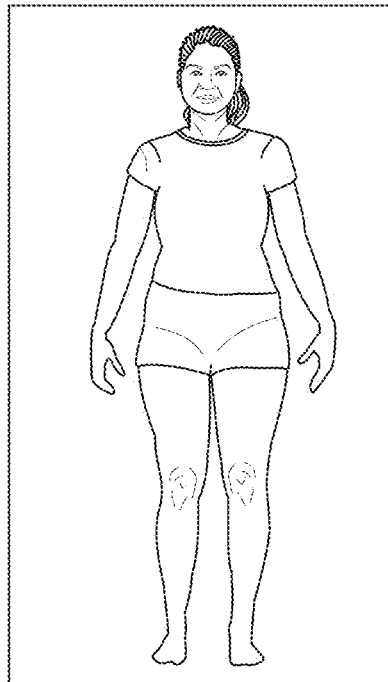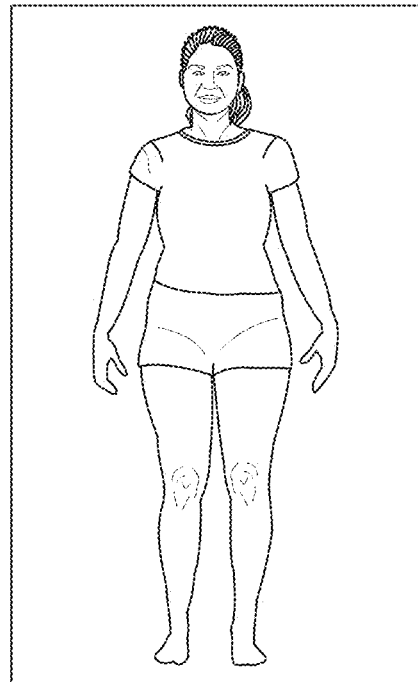
FIG. 27B

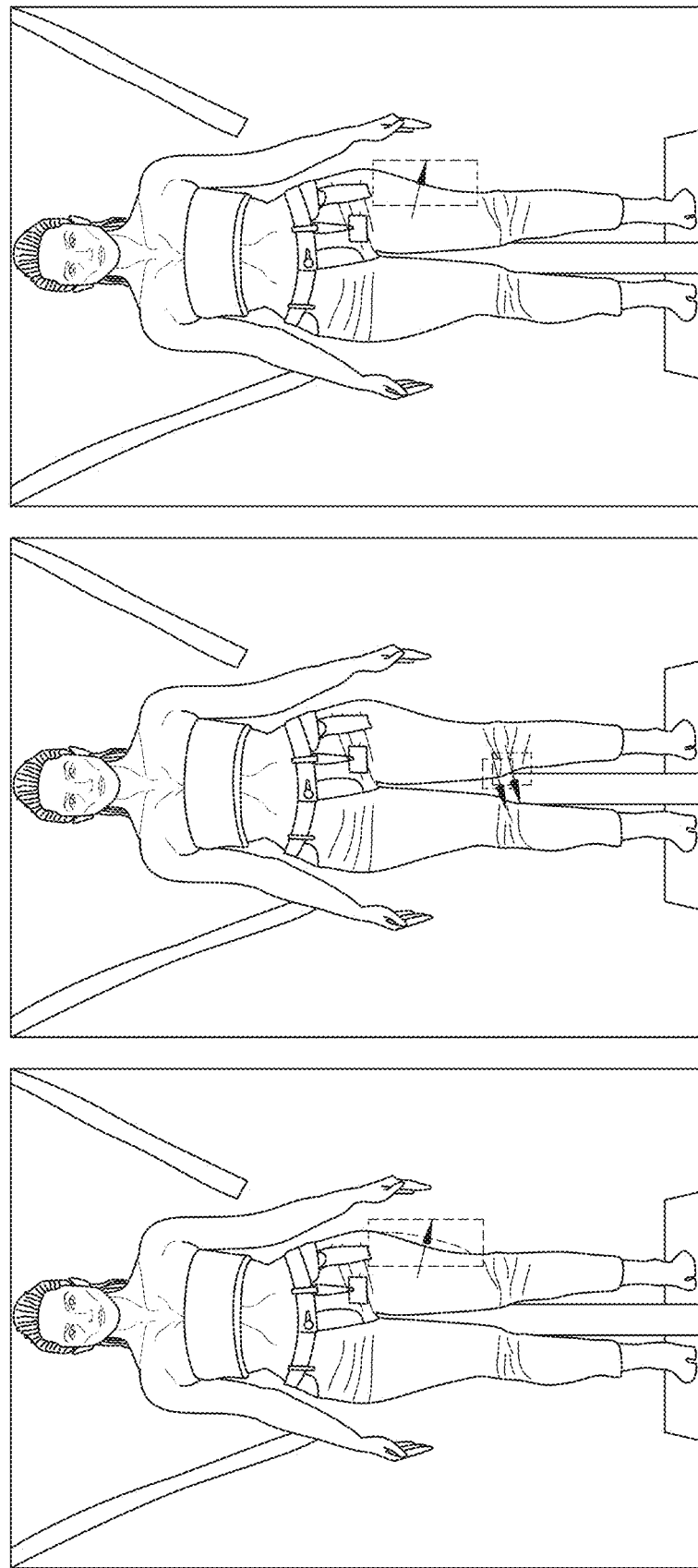

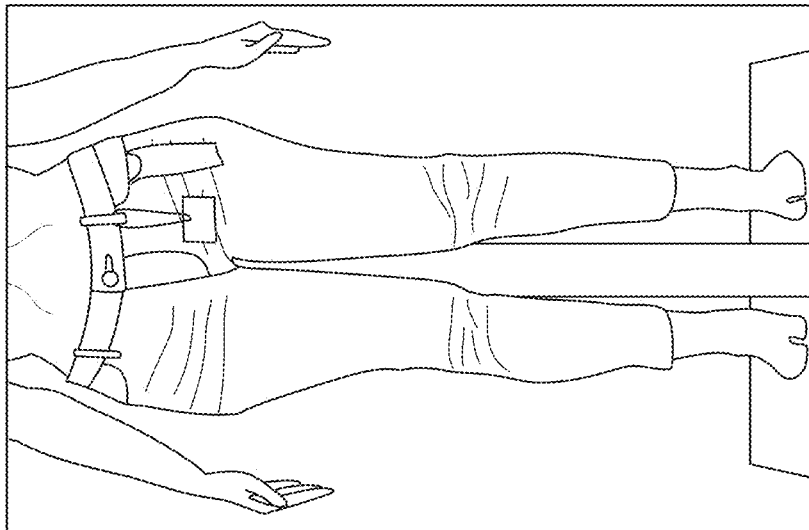
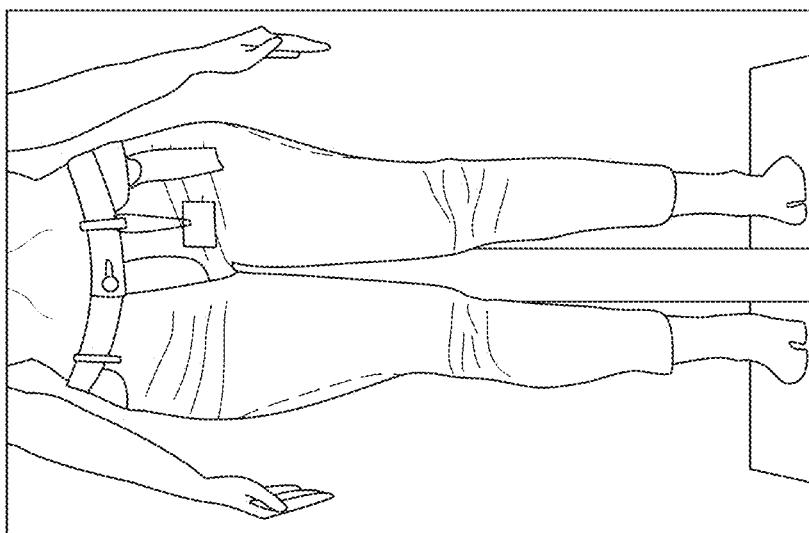
FIG. 27F

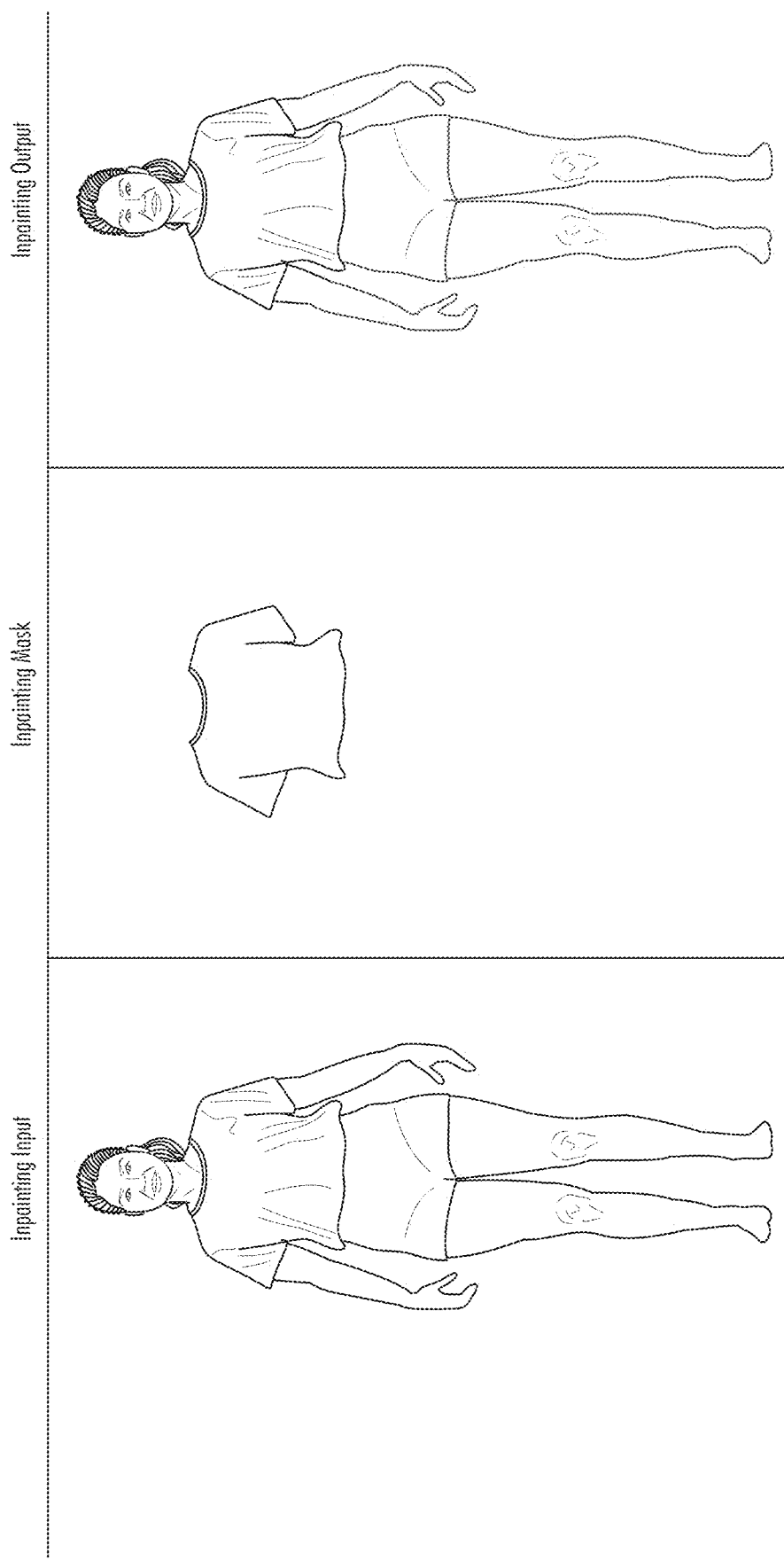

Data Requirements of CV vs ML

| | CV | ML |
|---|---|---|
| Data Quality | Near pixel perfect | Higher better; Sufficient volume of quality can overcome imperfections |
| Data Characteristic | Every piece contains exactly everything required | Pieces contain disparate information that need to be aggregated |
| Data Volume | Linear to the range of products/poses/body shapes required | Ideally same as CV; depends on desired generalizability (for scale) |

FIG. 32

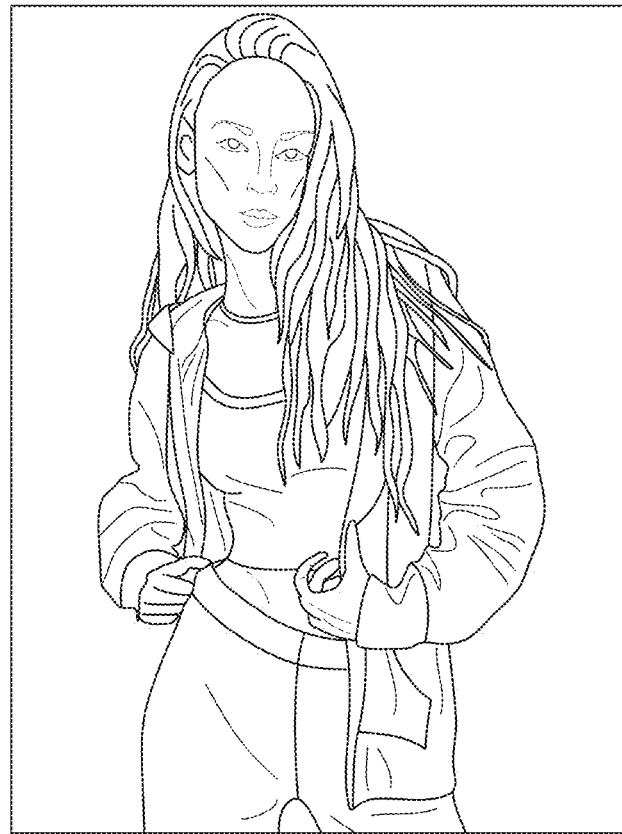
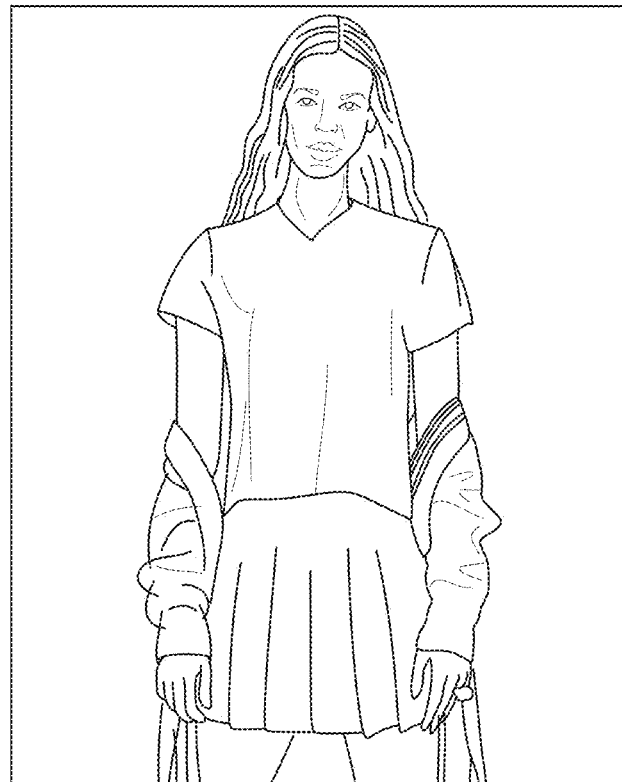
FIG. 35

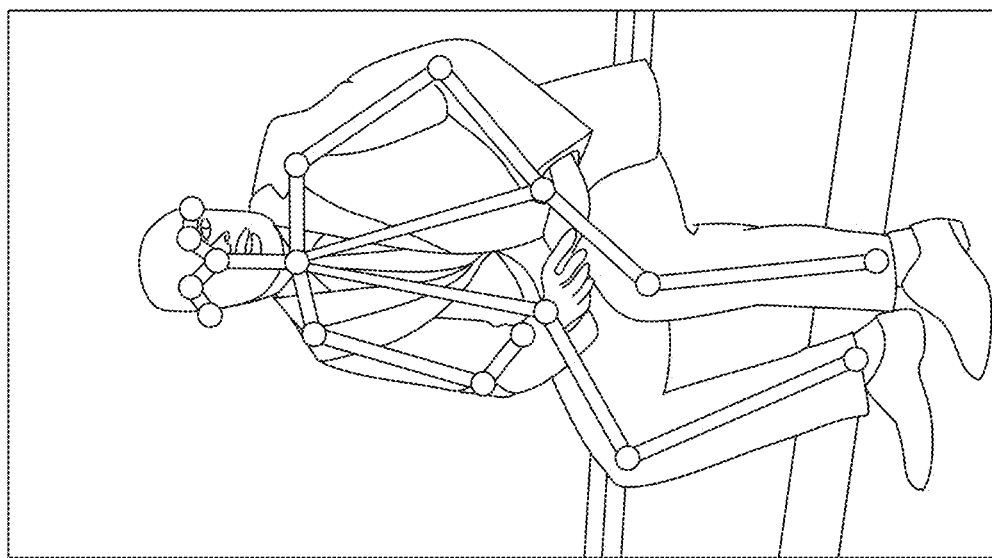
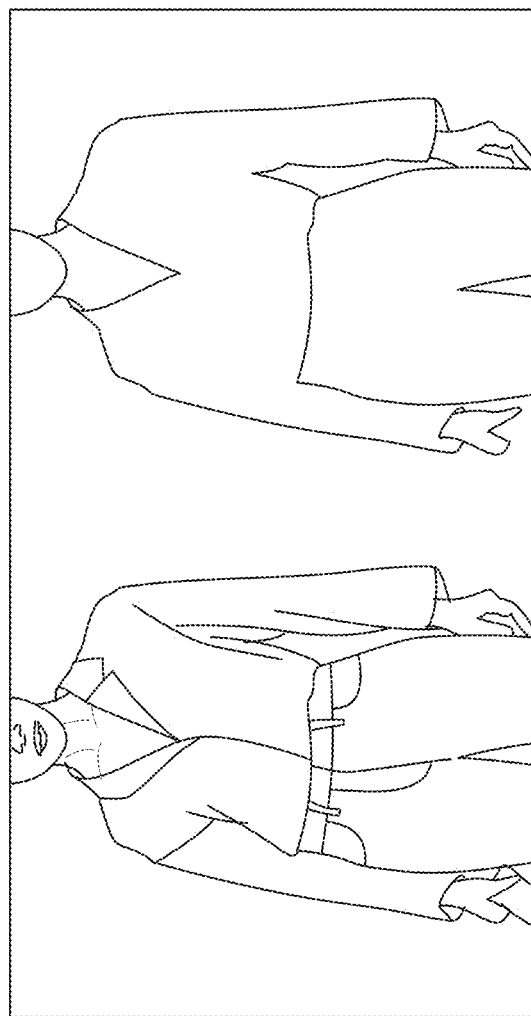
FIG. 38

ZELIG Styler Sizes (Mobile)
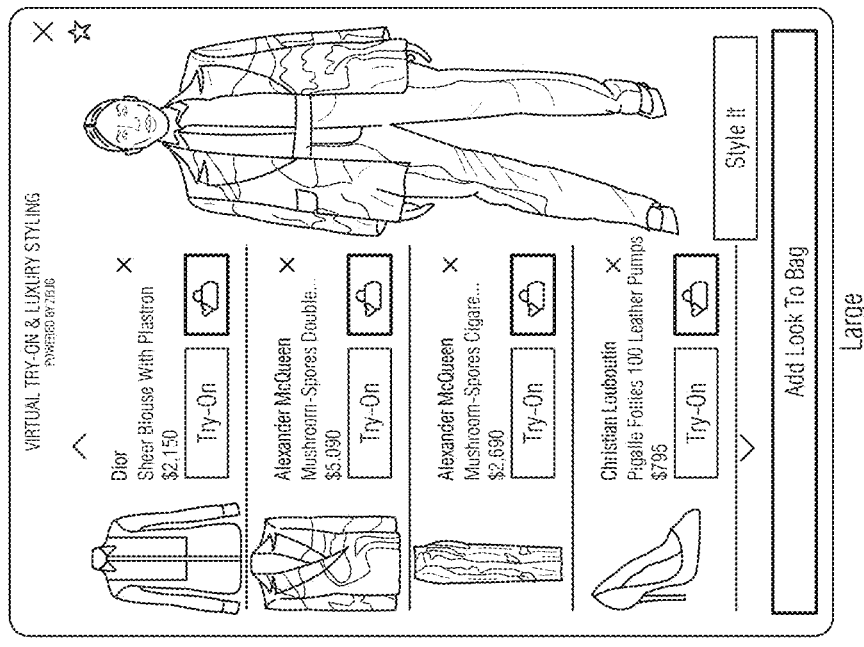
Large
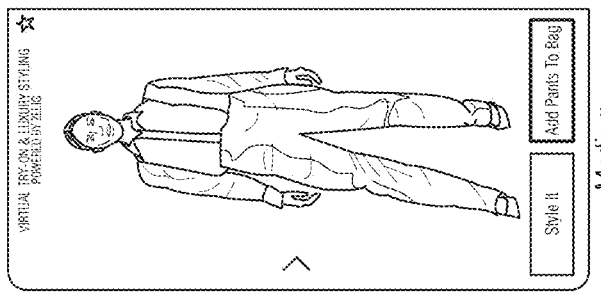
Medium
Small
FIG. 39

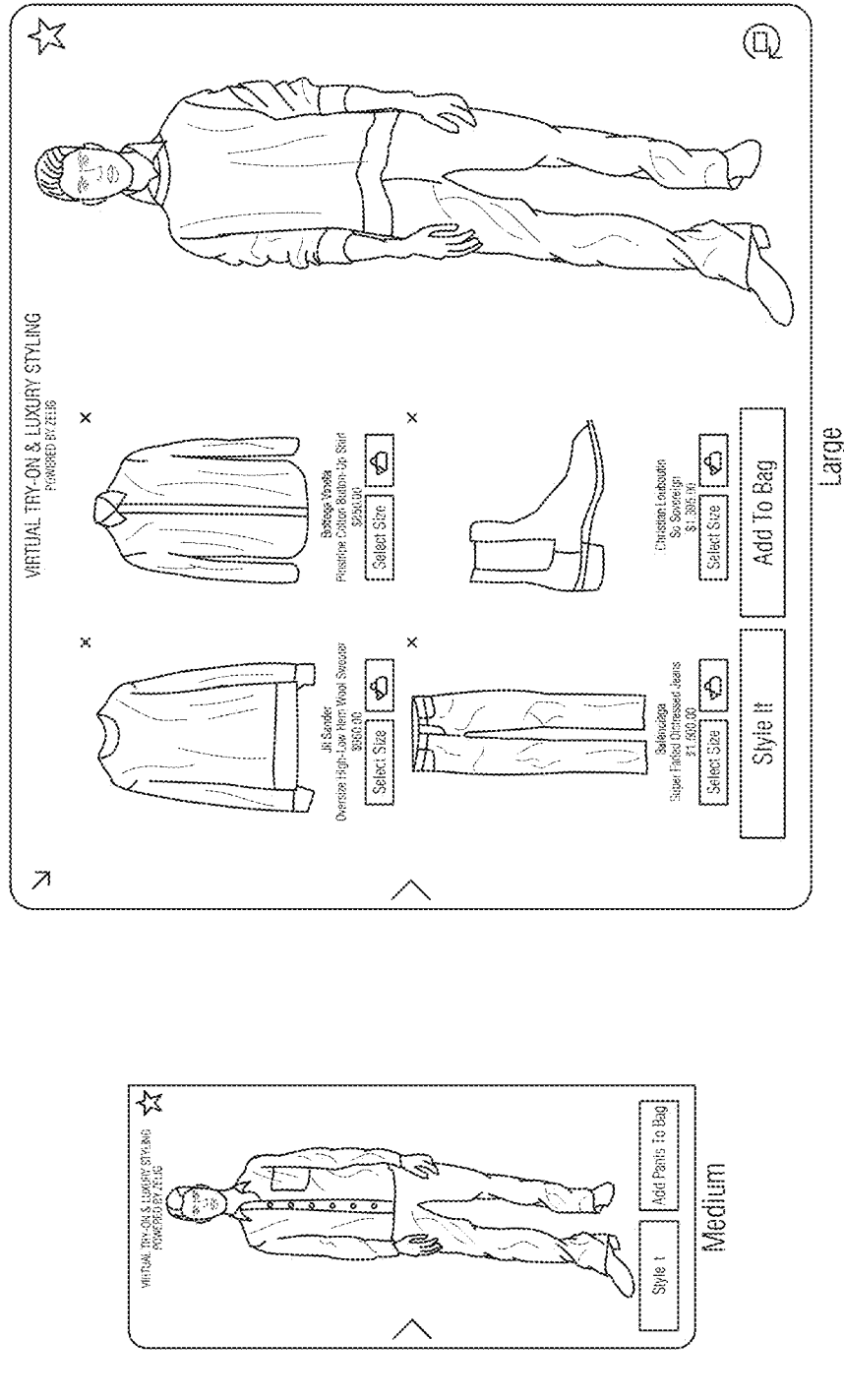
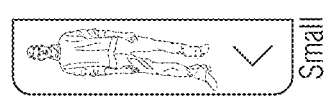
FIG. 43

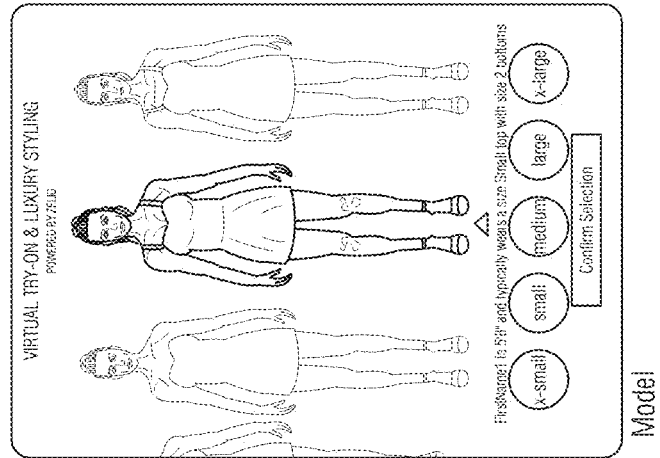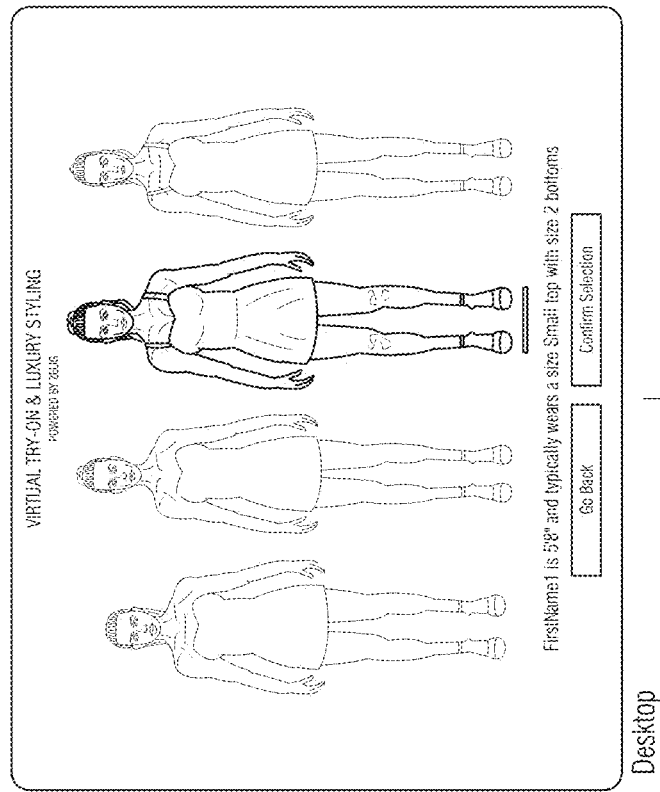
FIG. 52

Feature #4.1:
Try-On Items with ZELIG Styler (Follows you while shopping on the site)
See yourself in any garment with the ZELIG Styler that will follow the user throughout the shopping experience. Use the small styler for simple try-on, expand to the medium for styling, adding to cart and favoriting a look or open up to the large styler for all the options.

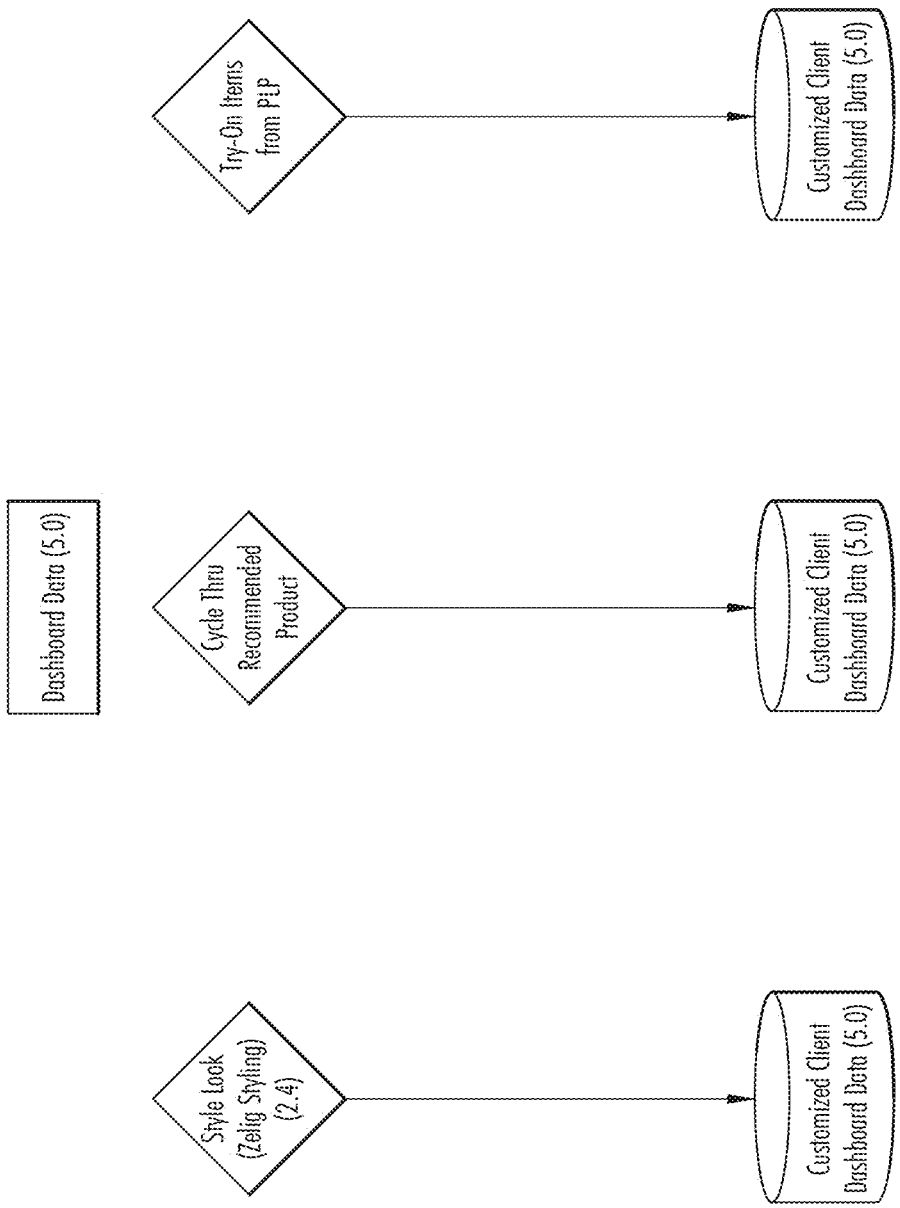

Sample User Flow

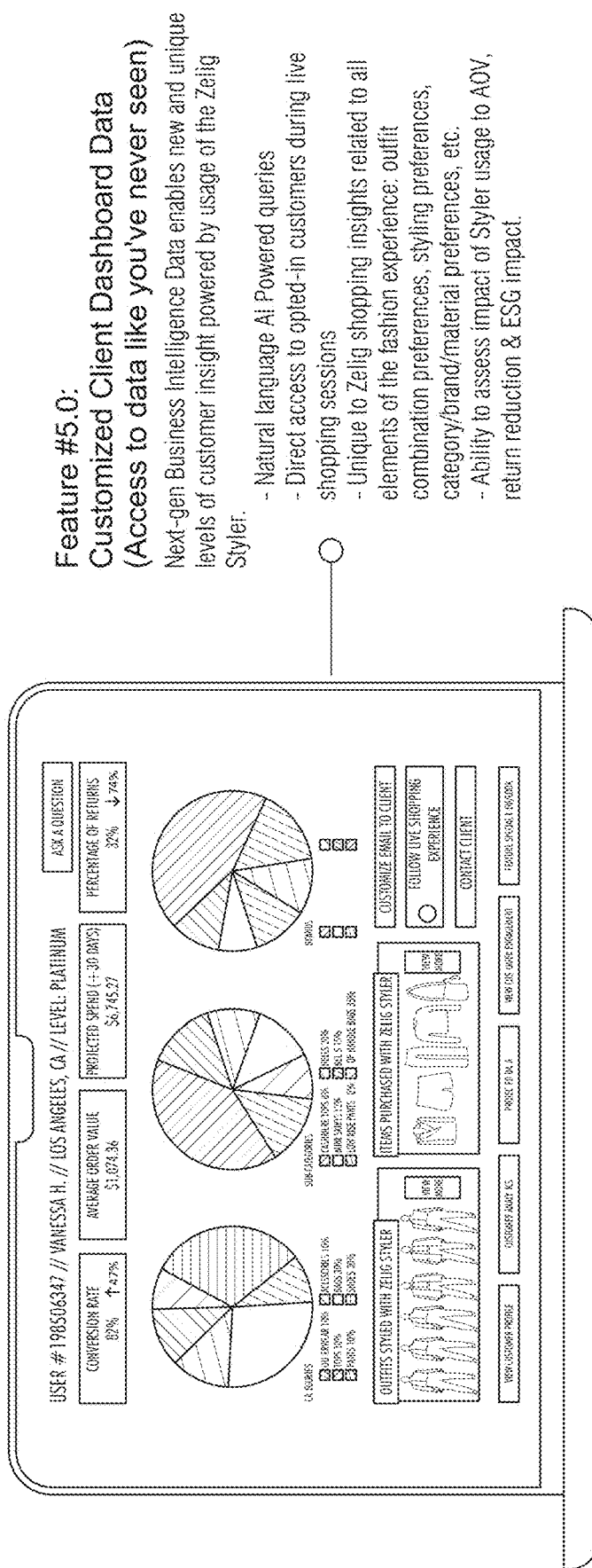

Feature #5.0:
Customized Client Dashboard Data
(Access to data like you've never seen)

Next-gen Business Intelligence Data enables new and unique levels of customer insight powered by usage of the Zelig Styler.

- Natural language AI Powered queries
- Direct access to opted-in customers during live shopping sessions
- Unique to Zelig shopping insights related to all elements of the fashion experience: outfit combination preferences, styling preferences, category/brand/material preferences, etc.
- Ability to assess impact of Styler usage to AOV, return reduction & ESG impact.

FIG. 58

| SLEEVES | TUCK | BUTTON | COLLAR | COMBINATIONS |
|---|---|---|---|---|
| Sleeves Rolled | Front Tucked | Bottom Unbuttoned | Collar Bow Tied | Sleeves Rolled, Front Tucked, Bottom Unbuttoned, Collar Bow Tied |
| Sleeves Rolled | Front Tucked | Bottom Unbuttoned | Collar Folded | Sleeves Rolled, Front Tucked, Bottom Unbuttoned, Collar Folded |
| Sleeves Rolled | Front Tucked | Bottom Unbuttoned | Collar Knot Tied | Sleeves Rolled, Front Tucked, Bottom Unbuttoned, Collar Knot Tied |
| Sleeves Rolled | Front Tucked | Bottom Unbuttoned | Collar Popped | Sleeves Rolled, Front Tucked, Bottom Unbuttoned, Collar Popped |
| Sleeves Rolled | Front Tucked | Bottom Unbuttoned | Collar Unified | Sleeves Rolled, Front Tucked, Bottom Unbuttoned, Collar Unified |
| Sleeves Rolled | Front Tucked | Bottom Unbuttoned | NA | Sleeves Rolled, Front Tucked, Bottom Unbuttoned |
| Sleeves Rolled | Front Tucked | Deep Unbuttoned | Collar Bow Tied | Sleeves Rolled, Front Tucked, Deep Unbuttoned, Collar Bow Tied |
| Sleeves Rolled | Front Tucked | Deep Unbuttoned | Collar Folded | Sleeves Rolled, Front Tucked, Deep Unbuttoned, Collar Folded |
| Sleeves Rolled | Front Tucked | Deep Unbuttoned | Collar Knot Tied | Sleeves Rolled, Front Tucked, Deep Unbuttoned, Collar Knot Tied |
| Sleeves Rolled | Front Tucked | Deep Unbuttoned | Collar Popped | Sleeves Rolled, Front Tucked, Deep Unbuttoned, Collar Popped |
| Sleeves Rolled | Front Tucked | Deep Unbuttoned | Collar Unified | Sleeves Rolled, Front Tucked, Deep Unbuttoned, Collar Unified |
| Sleeves Rolled | Front Tucked | Deep Unbuttoned | NA | Sleeves Rolled, Front Tucked, Deep Unbuttoned |
| Sleeves Rolled | Front Tucked | Fully Buttoned | Collar Bow Tied | Sleeves Rolled, Front Tucked, Fully Buttoned, Collar Bow Tied |
| Sleeves Rolled | Front Tucked | Fully Buttoned | Collar Folded | Sleeves Rolled, Front Tucked, Fully Buttoned, Collar Folded |
| Sleeves Rolled | Front Tucked | Fully Buttoned | Collar Knot Tied | Sleeves Rolled, Front Tucked, Fully Buttoned, Collar Knot Tied |
| Sleeves Rolled | Front Tucked | Fully Buttoned | Collar Popped | Sleeves Rolled, Front Tucked, Fully Buttoned, Collar Popped |
| Sleeves Rolled | Front Tucked | Fully Buttoned | Collar Unified | Sleeves Rolled, Front Tucked, Fully Buttoned, Collar Unified |
| Sleeves Rolled | Front Tucked | Fully Buttoned | NA | Sleeves Rolled, Front Tucked, Fully Buttoned |
| Sleeves Rolled | Front Tucked | Fully Unbuttoned | Collar Bow Tied | Sleeves Rolled, Front Tucked, Fully Unbuttoned, Collar Bow Tied |
| Sleeves Rolled | Front Tucked | Fully Unbuttoned | Collar Folded | Sleeves Rolled, Front Tucked, Fully Unbuttoned, Collar Folded |
| Sleeves Rolled | Front Tucked | Fully Unbuttoned | Collar Knot Tied | Sleeves Rolled, Front Tucked, Fully Unbuttoned, Collar Knot Tied |
| Sleeves Rolled | Front Tucked | Fully Unbuttoned | Collar Popped | Sleeves Rolled, Front Tucked, Fully Unbuttoned, Collar Popped |
| Sleeves Rolled | Front Tucked | Fully Unbuttoned | Collar Unified | Sleeves Rolled, Front Tucked, Fully Unbuttoned, Collar Unified |
| Sleeves Rolled | Front Tucked | Fully Unbuttoned | NA | Sleeves Rolled, Front Tucked, Fully Unbuttoned |
| Sleeves Rolled | Front Tucked | N/A | Collar Bow Tied | Sleeves Rolled, Front Tucked, Collar Bow Tied |
| Sleeves Rolled | Front Tucked | N/A | Collar Folded | Sleeves Rolled, Front Tucked, Collar Folded |
| Sleeves Rolled | Front Tucked | N/A | Collar Knot Tied | Sleeves Rolled, Front Tucked, Collar Knot Tied |

FIG. 62A

| | | | |
|---|---|---|---|
| Sleeves Rolled | Front Tucked | NA | Sleeves Rolled, Front Tucked, Collar Popped |
| Sleeves Rolled | Front Tucked | NA | Sleeves Rolled, Front Tucked, Collar Untied |
| Sleeves Rolled | Front Tucked | NA | Sleeves Rolled, Front Tucked |
| Sleeves Rolled | Front Tucked | Top & Bottom Unbuttoned | Sleeves Rolled, Front Tucked, Top & Bottom Unbuttoned, Collar Bow Tied |
| Sleeves Rolled | Front Tucked | Top & Bottom Unbuttoned | Sleeves Rolled, Front Tucked, Top & Bottom Unbuttoned, Collar Folded |
| Sleeves Rolled | Front Tucked | Top & Bottom Unbuttoned | Sleeves Rolled, Front Tucked, Top & Bottom Unbuttoned, Collar Knot Tied |
| Sleeves Rolled | Front Tucked | Top & Bottom Unbuttoned | Sleeves Rolled, Front Tucked, Top & Bottom Unbuttoned, Collar Popped |
| Sleeves Rolled | Front Tucked | Top & Bottom Unbuttoned | Sleeves Rolled, Front Tucked, Top & Bottom Unbuttoned, Collar Untied |
| Sleeves Rolled | Front Tucked | Top & Bottom Unbuttoned | Sleeves Rolled, Front Tucked, Top & Bottom Unbuttoned |
| Sleeves Rolled | Front Tucked | Top Unbuttoned | Sleeves Rolled, Front Tucked, Top Unbuttoned, Collar Bow Tied |
| Sleeves Rolled | Front Tucked | Top Unbuttoned | Sleeves Rolled, Front Tucked, Top Unbuttoned, Collar Folded |
| Sleeves Rolled | Front Tucked | Top Unbuttoned | Sleeves Rolled, Front Tucked, Top Unbuttoned, Collar Knot Tied |
| Sleeves Rolled | Front Tucked | Top Unbuttoned | Sleeves Rolled, Front Tucked, Top Unbuttoned, Collar Popped |
| Sleeves Rolled | Front Tucked | Top Unbuttoned | Sleeves Rolled, Front Tucked, Top Unbuttoned, Collar Untied |
| Sleeves Rolled | Front Tucked | Top Unbuttoned | Sleeves Rolled, Front Tucked, Top Unbuttoned |
| Sleeves Rolled | Half Tucked | Bottom Unbuttoned | Sleeves Rolled, Half Tucked, Top & Bottom Unbuttoned, Collar Bow Tied |
| Sleeves Rolled | Half Tucked | Bottom Unbuttoned | Sleeves Rolled, Half Tucked, Top & Bottom Unbuttoned, Collar Folded |
| Sleeves Rolled | Half Tucked | Bottom Unbuttoned | Sleeves Rolled, Half Tucked, Top & Bottom Unbuttoned, Collar Knot Tied |
| Sleeves Rolled | Half Tucked | Bottom Unbuttoned | Sleeves Rolled, Half Tucked, Top & Bottom Unbuttoned, Collar Popped |
| Sleeves Rolled | Half Tucked | Bottom Unbuttoned | Sleeves Rolled, Half Tucked, Top & Bottom Unbuttoned, Collar Untied |
| Sleeves Rolled | Half Tucked | Bottom Unbuttoned | Sleeves Rolled, Half Tucked, Top & Bottom Unbuttoned |
| Sleeves Rolled | Half Tucked | Deep Unbuttoned | Sleeves Rolled, Half Tucked, Bottom Unbuttoned, Collar Bow Tied |
| Sleeves Rolled | Half Tucked | Deep Unbuttoned | Sleeves Rolled, Half Tucked, Bottom Unbuttoned, Collar Folded |
| Sleeves Rolled | Half Tucked | Deep Unbuttoned | Sleeves Rolled, Half Tucked, Bottom Unbuttoned, Collar Knot Tied |
| Sleeves Rolled | Half Tucked | Deep Unbuttoned | Sleeves Rolled, Half Tucked, Bottom Unbuttoned, Collar Popped |
| Sleeves Rolled | Half Tucked | Deep Unbuttoned | Sleeves Rolled, Half Tucked, Bottom Unbuttoned, Collar Untied |
| Sleeves Rolled | Half Tucked | Deep Unbuttoned | Sleeves Rolled, Half Tucked, Bottom Unbuttoned |
| Sleeves Rolled | Half Tucked | Fully Buttoned | Sleeves Rolled, Half Tucked, Deep Unbuttoned, Collar Bow Tied |

FIG. 62B

| | | | |
|---|---|---|---|
| Sleeves Rolled | Half Tucked | Fully Buttoned | Collar Folded | Sleeves Rolled, Half Tucked, Fully Buttoned, Collar Folded |
| Sleeves Rolled | Half Tucked | Fully Buttoned | Collar Knot Tied | Sleeves Rolled, Half Tucked, Fully Buttoned, Collar Knotted |
| Sleeves Rolled | Half Tucked | Fully Buttoned | Collar Popped | Sleeves Rolled, Half Tucked, Fully Buttoned, Collar Popped |
| Sleeves Rolled | Half Tucked | Fully Buttoned | Collar Untied | Sleeves Rolled, Half Tucked, Fully Buttoned, Collar Untied |
| Sleeves Rolled | Half Tucked | Fully Buttoned | NA | Sleeves Rolled, Half Tucked, Fully Buttoned |
| Sleeves Rolled | Half Tucked | Fully Unbuttoned | Collar Bow Tied | Sleeves Rolled, Half Tucked, Fully Unbuttoned, Collar Bow Tied |
| Sleeves Rolled | Half Tucked | Fully Unbuttoned | Collar Folded | Sleeves Rolled, Half Tucked, Fully Unbuttoned, Collar Folded |
| Sleeves Rolled | Half Tucked | Fully Unbuttoned | Collar Knot Tied | Sleeves Rolled, Half Tucked, Fully Unbuttoned, Collar Knot Tied |
| Sleeves Rolled | Half Tucked | Fully Unbuttoned | Collar Popped | Sleeves Rolled, Half Tucked, Fully Unbuttoned, Collar Popped |
| Sleeves Rolled | Half Tucked | Fully Unbuttoned | Collar Untied | Sleeves Rolled, Half Tucked, Fully Unbuttoned, Collar Untied |
| Sleeves Rolled | Half Tucked | Fully Unbuttoned | NA | Sleeves Rolled, Half Tucked, Fully Unbuttoned |
| Sleeves Rolled | Half Tucked | NA | Collar Bow Tied | Sleeves Rolled, Half Tucked, Collar Bow Tied |
| Sleeves Rolled | Half Tucked | NA | Collar Folded | Sleeves Rolled, Half Tucked, Collar Folded |
| Sleeves Rolled | Half Tucked | NA | Collar Knot Tied | Sleeves Rolled, Half Tucked, Collar Knot Tied |
| Sleeves Rolled | Half Tucked | NA | Collar Popped | Sleeves Rolled, Half Tucked, Collar Popped |
| Sleeves Rolled | Half Tucked | NA | Collar Untied | Sleeves Rolled, Half Tucked, Untied |
| Sleeves Rolled | Half Tucked | NA | NA | Sleeves Rolled, Half Tucked |
| Sleeves Rolled | Half Tucked | Top & Bottom Unbuttoned | Collar Bow Tied | Sleeves Rolled, Half Tucked, Top & Bottom Unbuttoned, Collar Bow Tied |
| Sleeves Rolled | Half Tucked | Top & Bottom Unbuttoned | Collar Folded | Sleeves Rolled, Half Tucked, Top & Bottom Unbuttoned, Collar Folded |
| Sleeves Rolled | Half Tucked | Top & Bottom Unbuttoned | Collar Knot Tied | Sleeves Rolled, Half Tucked, Top & Bottom Unbuttoned, Collar Knot Tied |
| Sleeves Rolled | Half Tucked | Top & Bottom Unbuttoned | Collar Popped | Sleeves Rolled, Half Tucked, Top & Bottom Unbuttoned, Collar Popped |
| Sleeves Rolled | Half Tucked | Top & Bottom Unbuttoned | Collar Untied | Sleeves Rolled, Half Tucked, Top & Bottom Unbuttoned, Collar Untied |
| Sleeves Rolled | Half Tucked | Top & Bottom Unbuttoned | NA | Sleeves Rolled, Half Tucked, Top & Bottom Unbuttoned |
| Sleeves Rolled | Half Tucked | Top Unbuttoned | Collar Bow Tied | Sleeves Rolled, Half Tucked, Top Unbuttoned, Collar Bow Tied |
| Sleeves Rolled | Half Tucked | Top Unbuttoned | Collar Folded | Sleeves Rolled, Half Tucked, Top Unbuttoned, Collar Folded |
| Sleeves Rolled | Half Tucked | Top Unbuttoned | Collar Knot Tied | Sleeves Rolled, Half Tucked, Top Unbuttoned, Collar Knot Tied |
| Sleeves Rolled | Half Tucked | Top Unbuttoned | Collar Popped | Sleeves Rolled, Half Tucked, Top Unbuttoned, Collar Popped |
| Sleeves Rolled | Half Tucked | Top Unbuttoned | Collar Untied | Sleeves Rolled, Half Tucked, Top Unbuttoned, Collar Untied |

FIG. 62C

| | | | |
|---|---|---|---|
| Sleeves Rolled | Half Tucked | Top Unbuttoned | Sleeves Rolled, Half Tucked, Top Unbuttoned |
| Sleeves Rolled | Tucked | Bottom Unbuttoned | Colar Bow Tied | Sleeves Rolled, Tucked, Bottom Unbuttoned, Collar Bow Tied |
| Sleeves Rolled | Tucked | Bottom Unbuttoned | Collar Folded | Sleeves Rolled, Tucked, Bottom Unbuttoned, Collar Folded |
| Sleeves Rolled | Tucked | Bottom Unbuttoned | Collar Knot Tied | Sleeves Rolled, Tucked, Bottom Unbuttoned, Collar Knot Tied |
| Sleeves Rolled | Tucked | Bottom Unbuttoned | Collar Popped | Sleeves Rolled, Tucked, Bottom Unbuttoned, Collar Popped |
| Sleeves Rolled | Tucked | Bottom Unbuttoned | Collar Untied | Sleeves Rolled, Tucked, Bottom Unbuttoned, Collar Untied |
| Sleeves Rolled | Tucked | Bottom Unbuttoned | NA | Sleeves Rolled, Tucked, Bottom Unbuttoned |
| Sleeves Rolled | Tucked | Deep Unbuttoned | Collar Bow Tied | Sleeves Rolled, Tucked, Deep Unbuttoned, Collar Bow Tied |
| Sleeves Rolled | Tucked | Deep Unbuttoned | Collar Folded | Sleeves Rolled, Tucked, Deep Unbuttoned, Collar Folded |
| Sleeves Rolled | Tucked | Deep Unbuttoned | Collar Knot Tied | Sleeves Rolled, Tucked, Deep Unbuttoned, Collar Knot Tied |
| Sleeves Rolled | Tucked | Deep Unbuttoned | Collar Popped | Sleeves Rolled, Tucked, Deep Unbuttoned, Collar Popped |
| Sleeves Rolled | Tucked | Deep Unbuttoned | Collar Untied | Sleeves Rolled, Tucked, Deep Unbuttoned, Collar Untied |
| Sleeves Rolled | Tucked | Deep Unbuttoned | NA | Sleeves Rolled, Tucked, Deep Unbuttoned |
| Sleeves Rolled | Tucked | Fully Buttoned | Collar Bow Tied | Sleeves Rolled, Tucked, Fully Buttoned, Collar Bow Tied |
| Sleeves Rolled | Tucked | Fully Buttoned | Collar Folded | Sleeves Rolled, Tucked, Fully Buttoned, Collar Folded |
| Sleeves Rolled | Tucked | Fully Buttoned | Collar Knot Tied | Sleeves Rolled, Tucked, Fully Buttoned, Collar Knot Tied |
| Sleeves Rolled | Tucked | Fully Buttoned | Collar Popped | Sleeves Rolled, Tucked, Fully Buttoned, Collar Popped |
| Sleeves Rolled | Tucked | Fully Buttoned | Collar Untied | Sleeves Rolled, Tucked, Fully Buttoned, Collar Untied |
| Sleeves Rolled | Tucked | Fully Buttoned | NA | Sleeves Rolled, Tucked, Fully Buttoned |
| Sleeves Rolled | Tucked | Fully Unbuttoned | Collar Bow Tied | Sleeves Rolled, Tucked, Fully Unbuttoned, Collar Bow Tied |
| Sleeves Rolled | Tucked | Fully Unbuttoned | Collar Folded | Sleeves Rolled, Tucked, Fully Unbuttoned, Collar Folded |
| Sleeves Rolled | Tucked | Fully Unbuttoned | Collar Knot Tied | Sleeves Rolled, Tucked, Fully Unbuttoned, Collar Knot Tied |
| Sleeves Rolled | Tucked | Fully Unbuttoned | Collar Popped | Sleeves Rolled, Tucked, Fully Unbuttoned, Collar Popped |
| Sleeves Rolled | Tucked | Fully Unbuttoned | Collar Untied | Sleeves Rolled, Tucked, Fully Unbuttoned, Collar Untied |
| Sleeves Rolled | Tucked | Fully Unbuttoned | NA | Sleeves Rolled, Tucked, Fully Unbuttoned |
| Sleeves Rolled | Tucked | NA | Collar Bow Tied | Sleeves Rolled, Tucked, Collar Bow Tied |
| Sleeves Rolled | Tucked | NA | Collar Folded | Sleeves Rolled, Tucked, Collar Folded |
| Sleeves Rolled | Tucked | NA | Collar Knot Tied | Sleeves Rolled, Tucked, Collar Knot Tied |

FIG. 62D

| | | | |
|---|---|---|---|
| Sleeves Rolled | Tucked | NA | Collar Popped |
| Sleeves Rolled | Tucked | NA | Collar Untied |
| Sleeves Rolled | Tucked | NA | NA |
| Sleeves Rolled | Tucked | Top & Bottom Unbuttoned | Collar Bow Tied |
| Sleeves Rolled | Tucked | Top & Bottom Unbuttoned | Collar Folded |
| Sleeves Rolled | Tucked | Top & Bottom Unbuttoned | Collar Knot Tied |
| Sleeves Rolled | Tucked | Top & Bottom Unbuttoned | Collar Popped |
| Sleeves Rolled | Tucked | Top & Bottom Unbuttoned | Collar Untied |
| Sleeves Rolled | Tucked | Top & Bottom Unbuttoned | NA |
| Sleeves Rolled | Tucked | Top Unbuttoned | Collar Bow Tied |
| Sleeves Rolled | Tucked | Top Unbuttoned | Collar Folded |
| Sleeves Rolled | Tucked | Top Unbuttoned | Collar Knot Tied |
| Sleeves Rolled | Tucked | Top Unbuttoned | Collar Popped |
| Sleeves Rolled | Tucked | Top Unbuttoned | Collar Untied |
| Sleeves Rolled | Tucked | Top Unbuttoned | NA |
| Sleeves Rolled | Untucked | Bottom Unbuttoned | Collar Bow Tied |
| Sleeves Rolled | Untucked | Bottom Unbuttoned | Collar Folded |
| Sleeves Rolled | Untucked | Bottom Unbuttoned | Collar Knot Tied |
| Sleeves Rolled | Untucked | Bottom Unbuttoned | Collar Popped |
| Sleeves Rolled | Untucked | Bottom Unbuttoned | Collar Untied |
| Sleeves Rolled | Untucked | Bottom Unbuttoned | NA |
| Sleeves Rolled | Untucked | Deep Unbuttoned | Collar Bow Tied |
| Sleeves Rolled | Untucked | Deep Unbuttoned | Collar Folded |
| Sleeves Rolled | Untucked | Deep Unbuttoned | Collar Knot Tied |
| Sleeves Rolled | Untucked | Deep Unbuttoned | Collar Popped |
| Sleeves Rolled | Untucked | Deep Unbuttoned | Collar Untied |
| Sleeves Rolled | Untucked | Deep Unbuttoned | NA |
| Sleeves Rolled | Untucked | Fully Buttoned | Collar Bow Tied |

| |
|---|
| Sleeves Rolled, Tucked, Collar Popped |
| Sleeves Rolled, Tucked, Collar Untied |
| Sleeves Rolled, Tucked |
| Sleeves Rolled, Tucked, Top & Bottom Unbuttoned, Collar Bow Tied |
| Sleeves Rolled, Tucked, Top & Bottom Unbuttoned, Collar Folded |
| Sleeves Rolled, Tucked, Top & Bottom Unbuttoned, Collar Knot Tied |
| Sleeves Rolled, Tucked, Top & Bottom Unbuttoned, Collar Popped |
| Sleeves Rolled, Tucked, Top & Bottom Unbuttoned, Collar Untied |
| Sleeves Rolled, Tucked, Top & Bottom Unbuttoned |
| Sleeves Rolled, Tucked, Top Unbuttoned, Collar Bow Tied |
| Sleeves Rolled, Tucked, Top Unbuttoned, Collar Folded |
| Sleeves Rolled, Tucked, Top Unbuttoned, Collar Knot Tied |
| Sleeves Rolled, Tucked, Top Unbuttoned, Collar Popped |
| Sleeves Rolled, Tucked, Top Unbuttoned, Collar Untied |
| Sleeves Rolled, Tucked, Top Unbuttoned |
| Sleeves Rolled, Untucked, Bottom Unbuttoned, Collar Bow Tied |
| Sleeves Rolled, Untucked, Bottom Unbuttoned, Collar Folded |
| Sleeves Rolled, Untucked, Bottom Unbuttoned, Collar Knot Tied |
| Sleeves Rolled, Untucked, Bottom Unbuttoned, Collar Popped |
| Sleeves Rolled, Untucked, Bottom Unbuttoned, Collar Untied |
| Sleeves Rolled, Untucked, Bottom Unbuttoned |
| Sleeves Rolled, Untucked, Deep Unbuttoned, Collar Bow Tied |
| Sleeves Rolled, Untucked, Deep Unbuttoned, Collar Folded |
| Sleeves Rolled, Untucked, Deep Unbuttoned, Collar Knot Tied |
| Sleeves Rolled, Untucked, Deep Unbuttoned, Collar Popped |
| Sleeves Rolled, Untucked, Deep Unbuttoned, Collar Untied |
| Sleeves Rolled, Untucked, Deep Unbuttoned |
| Sleeves Rolled, Untucked, Fully Buttoned, Collar Bow Tied |

FIG. 62E

| | | | |
|---|---|---|---|
| Sleeves Rolled | Untucked | Fully Buttoned | Collar Folded | Sleeves Rolled, Untucked, Fully Buttoned, Collar Folded |
| Sleeves Rolled | Untucked | Fully Buttoned | Collar Knot Tied | Sleeves Rolled, Untucked, Fully Buttoned, Collar Knot Tied |
| Sleeves Rolled | Untucked | Fully Buttoned | Collar Popped | Sleeves Rolled, Untucked, Fully Buttoned, Collar Popped |
| Sleeves Rolled | Untucked | Fully Buttoned | Collar Untied | Sleeves Rolled, Untucked, Fully Buttoned, Collar Untied |
| Sleeves Rolled | Untucked | Fully Buttoned | NA | Sleeves Rolled, Untucked, Fully Buttoned |
| Sleeves Rolled | Untucked | Fully Unbuttoned | Collar Bow Tied | Sleeves Rolled, Untucked, Fully Unbuttoned, Collar Bow Tied |
| Sleeves Rolled | Untucked | Fully Unbuttoned | Collar Folded | Sleeves Rolled, Untucked, Fully Unbuttoned, Collar Folded |
| Sleeves Rolled | Untucked | Fully Unbuttoned | Collar Knot Tied | Sleeves Rolled, Untucked, Fully Unbuttoned, Collar Knot Tied |
| Sleeves Rolled | Untucked | Fully Unbuttoned | Collar Popped | Sleeves Rolled, Untucked, Fully Unbuttoned, Collar Popped |
| Sleeves Rolled | Untucked | Fully Unbuttoned | Collar Untied | Sleeves Rolled, Untucked, Fully Unbuttoned, Collar Untied |
| Sleeves Rolled | Untucked | Fully Unbuttoned | NA | Sleeves Rolled, Untucked, Fully Unbuttoned |
| Sleeves Rolled | Untucked | NA | Collar Bow Tied | Sleeves Rolled, Untucked, Collar Bow Tied |
| Sleeves Rolled | Untucked | NA | Collar Folded | Sleeves Rolled, Untucked, Collar Folded |
| Sleeves Rolled | Untucked | NA | Collar Knot Tied | Sleeves Rolled, Untucked, Collar Knot Tied |
| Sleeves Rolled | Untucked | NA | Collar Popped | Sleeves Rolled, Untucked, Collar Popped |
| Sleeves Rolled | Untucked | NA | Collar Untied | Sleeves Rolled, Untucked, Collar Untied |
| Sleeves Rolled | Untucked | NA | NA | Sleeves Rolled, Untucked |
| Sleeves Rolled | Untucked | Top & Bottom Unbuttoned | Collar Bow Tied | Sleeves Rolled, Untucked, Top & Bottom Unbuttoned, Collar Bow Tied |
| Sleeves Rolled | Untucked | Top & Bottom Unbuttoned | Collar Folded | Sleeves Rolled, Untucked, Top & Bottom Unbuttoned, Collar Folded |
| Sleeves Rolled | Untucked | Top & Bottom Unbuttoned | Collar Knot Tied | Sleeves Rolled, Untucked, Top & Bottom Unbuttoned, Collar Knot Tied |
| Sleeves Rolled | Untucked | Top & Bottom Unbuttoned | Collar Popped | Sleeves Rolled, Untucked, Top & Bottom Unbuttoned, Collar Popped |
| Sleeves Rolled | Untucked | Top & Bottom Unbuttoned | Collar Untied | Sleeves Rolled, Untucked, Top & Bottom Unbuttoned, Collar Untied |
| Sleeves Rolled | Untucked | Top & Bottom Unbuttoned | NA | Sleeves Rolled, Untucked, Top & Bottom Unbuttoned |
| Sleeves Rolled | Untucked | Top Unbuttoned | Collar Bow Tied | Sleeves Rolled, Untucked, Top Unbuttoned, Collar Bow Tied |
| Sleeves Rolled | Untucked | Top Unbuttoned | Collar Folded | Sleeves Rolled, Untucked, Top Unbuttoned, Collar Folded |
| Sleeves Rolled | Untucked | Top Unbuttoned | Collar Knot Tied | Sleeves Rolled, Untucked, Top Unbuttoned, Collar Knot Tied |
| Sleeves Rolled | Untucked | Top Unbuttoned | Collar Popped | Sleeves Rolled, Untucked, Top Unbuttoned, Collar Popped |
| Sleeves Rolled | Untucked | Top Unbuttoned | Collar Untied | Sleeves Rolled, Untucked, Top Unbuttoned, Collar Untied |

FIG. 62F

| | | | | |
|---|---|---|---|---|
| Sleeves Rolled | Untucked | Top Unbuttoned | NA | Sleeves Rolled, Untucked, Top Unbuttoned |
| Sleeves Pushed Up | Front Tucked | Bottom Unbuttoned | Collar Bow Tied | Sleeves Pushed Up, Front Tucked, Bottom Unbuttoned, Collar Bow Tied |
| Sleeves Pushed Up | Front Tucked | Bottom Unbuttoned | Collar Folded | Sleeves Pushed Up, Front Tucked, Bottom Unbuttoned, Collar Folded |
| Sleeves Pushed Up | Front Tucked | Bottom Unbuttoned | Collar Knot Tied | Sleeves Pushed Up, Front Tucked, Bottom Unbuttoned, Collar Knot Tied |
| Sleeves Pushed Up | Front Tucked | Bottom Unbuttoned | Collar Popped | Sleeves Pushed Up, Front Tucked, Bottom Unbuttoned, Collar Popped |
| Sleeves Pushed Up | Front Tucked | Bottom Unbuttoned | Collar Unified | Sleeves Pushed Up, Front Tucked, Bottom Unbuttoned, Collar Unified |
| Sleeves Pushed Up | Front Tucked | Bottom Unbuttoned | NA | Sleeves Pushed Up, Front Tucked, Bottom Unbuttoned |
| Sleeves Pushed Up | Front Tucked | Deep Unbuttoned | Collar Bow Tied | Sleeves Pushed Up, Front Tucked, Deep Unbuttoned, Collar Bow Tied |
| Sleeves Pushed Up | Front Tucked | Deep Unbuttoned | Collar Folded | Sleeves Pushed Up, Front Tucked, Deep Unbuttoned, Collar Folded |
| Sleeves Pushed Up | Front Tucked | Deep Unbuttoned | Collar Knot Tied | Sleeves Pushed Up, Front Tucked, Deep Unbuttoned, Collar Knot Tied |
| Sleeves Pushed Up | Front Tucked | Deep Unbuttoned | Collar Popped | Sleeves Pushed Up, Front Tucked, Deep Unbuttoned, Collar Popped |
| Sleeves Pushed Up | Front Tucked | Deep Unbuttoned | Collar Unified | Sleeves Pushed Up, Front Tucked, Deep Unbuttoned, Collar Unified |
| Sleeves Pushed Up | Front Tucked | Deep Unbuttoned | NA | Sleeves Pushed Up, Front Tucked, Deep Unbuttoned |
| Sleeves Pushed Up | Front Tucked | Fully Buttoned | Collar Bow Tied | Sleeves Pushed Up, Front Tucked, Fully Buttoned, Collar Bow Tied |
| Sleeves Pushed Up | Front Tucked | Fully Buttoned | Collar Folded | Sleeves Pushed Up, Front Tucked, Fully Buttoned, Collar Folded |
| Sleeves Pushed Up | Front Tucked | Fully Buttoned | Collar Knot Tied | Sleeves Pushed Up, Front Tucked, Fully Buttoned, Collar Knot Tied |
| Sleeves Pushed Up | Front Tucked | Fully Buttoned | Collar Popped | Sleeves Pushed Up, Front Tucked, Fully Buttoned, Collar Popped |
| Sleeves Pushed Up | Front Tucked | Fully Buttoned | Collar Unified | Sleeves Pushed Up, Front Tucked, Fully Buttoned, Collar Unified |
| Sleeves Pushed Up | Front Tucked | Fully Buttoned | NA | Sleeves Pushed Up, Front Tucked, Fully Buttoned |
| Sleeves Pushed Up | Front Tucked | Fully Unbuttoned | Collar Bow Tied | Sleeves Pushed Up, Front Tucked, Fully Unbuttoned, Collar Bow Tied |
| Sleeves Pushed Up | Front Tucked | Fully Unbuttoned | Collar Folded | Sleeves Pushed Up, Front Tucked, Fully Unbuttoned, Collar Folded |
| Sleeves Pushed Up | Front Tucked | Fully Unbuttoned | Collar Knot Tied | Sleeves Pushed Up, Front Tucked, Fully Unbuttoned, Collar Knot Tied |
| Sleeves Pushed Up | Front Tucked | Fully Unbuttoned | Collar Popped | Sleeves Pushed Up, Front Tucked, Fully Unbuttoned, Collar Popped |
| Sleeves Pushed Up | Front Tucked | Fully Unbuttoned | Collar Unified | Sleeves Pushed Up, Front Tucked, Fully Unbuttoned, Collar Unified |
| Sleeves Pushed Up | Front Tucked | NA | Collar Bow Tied | Sleeves Pushed Up, Front Tucked, Collar Bow Tied |
| Sleeves Pushed Up | Front Tucked | NA | Collar Folded | Sleeves Pushed Up, Front Tucked, Collar Folded |
| Sleeves Pushed Up | Front Tucked | NA | Collar Knot Tied | Sleeves Pushed Up, Front Tucked, Collar Knot Tied |

FIG. 62G

| Sleeves Pushed Up | Front Tucked | NA | Collar Popped | Sleeves Pushed Up, Front Tucked, Collar Popped |
| Sleeves Pushed Up | Front Tucked | NA | Collar Unified | Sleeves Pushed Up, Front Tucked, Collar Unified |
| Sleeves Pushed Up | Front Tucked | NA | NA | Sleeves Pushed Up, Front Tucked |
| Sleeves Pushed Up | Front Tucked | Top & Bottom Unbuttoned | Collar Bow Tied | Sleeves Pushed Up, Front Tucked, Top & Bottom Unbuttoned, Collar Bow Tied |
| Sleeves Pushed Up | Front Tucked | Top & Bottom Unbuttoned | Collar Folded | Sleeves Pushed Up, Front Tucked, Top & Bottom Unbuttoned, Collar Folded |
| Sleeves Pushed Up | Front Tucked | Top & Bottom Unbuttoned | Collar Knot Tied | Sleeves Pushed Up, Front Tucked, Top & Bottom Unbuttoned, Collar Knot Tied |
| Sleeves Pushed Up | Front Tucked | Top & Bottom Unbuttoned | Collar Popped | Sleeves Pushed Up, Front Tucked, Top & Bottom Unbuttoned, Collar Popped |
| Sleeves Pushed Up | Front Tucked | Top & Bottom Unbuttoned | Collar Unified | Sleeves Pushed Up, Front Tucked, Top & Bottom Unbuttoned, Collar Unified |
| Sleeves Pushed Up | Front Tucked | Top & Bottom Unbuttoned | NA | Sleeves Pushed Up, Front Tucked, Top & Bottom Unbuttoned |
| Sleeves Pushed Up | Front Tucked | Top Unbuttoned | Collar Bow Tied | Sleeves Pushed Up, Front Tucked, Top Unbuttoned, Collar Bow Tied |
| Sleeves Pushed Up | Front Tucked | Top Unbuttoned | Collar Folded | Sleeves Pushed Up, Front Tucked, Top Unbuttoned, Collar Folded |
| Sleeves Pushed Up | Front Tucked | Top Unbuttoned | Collar Knot Tied | Sleeves Pushed Up, Front Tucked, Top Unbuttoned, Collar Knot Tied |
| Sleeves Pushed Up | Front Tucked | Top Unbuttoned | Collar Popped | Sleeves Pushed Up, Front Tucked, Top Unbuttoned, Collar Popped |
| Sleeves Pushed Up | Front Tucked | Top Unbuttoned | Collar Unified | Sleeves Pushed Up, Front Tucked, Top Unbuttoned, Collar Unified |
| Sleeves Pushed Up | Front Tucked | Top Unbuttoned | NA | Sleeves Pushed Up, Front Tucked, Top Unbuttoned |
| Sleeves Pushed Up | Half Tucked | Bottom Unbuttoned | Collar Bow Tied | Sleeves Pushed Up, Half Tucked, Bottom Unbuttoned, Collar Bow Tied |
| Sleeves Pushed Up | Half Tucked | Bottom Unbuttoned | Collar Folded | Sleeves Pushed Up, Half Tucked, Bottom Unbuttoned, Collar Folded |
| Sleeves Pushed Up | Half Tucked | Bottom Unbuttoned | Collar Knot Tied | Sleeves Pushed Up, Half Tucked, Bottom Unbuttoned, Collar Knot Tied |
| Sleeves Pushed Up | Half Tucked | Bottom Unbuttoned | Collar Popped | Sleeves Pushed Up, Half Tucked, Bottom Unbuttoned, Collar Popped |
| Sleeves Pushed Up | Half Tucked | Bottom Unbuttoned | Collar Unified | Sleeves Pushed Up, Half Tucked, Bottom Unbuttoned, Collar Unified |
| Sleeves Pushed Up | Half Tucked | Bottom Unbuttoned | NA | Sleeves Pushed Up, Half Tucked, Bottom Unbuttoned |
| Sleeves Pushed Up | Half Tucked | Deep Unbuttoned | Collar Bow Tied | Sleeves Pushed Up, Half Tucked, Deep Unbuttoned, Collar Bow Tied |
| Sleeves Pushed Up | Half Tucked | Deep Unbuttoned | Collar Folded | Sleeves Pushed Up, Half Tucked, Deep Unbuttoned, Collar Folded |
| Sleeves Pushed Up | Half Tucked | Deep Unbuttoned | Collar Knot Tied | Sleeves Pushed Up, Half Tucked, Deep Unbuttoned, Collar Knot Tied |
| Sleeves Pushed Up | Half Tucked | Deep Unbuttoned | Collar Popped | Sleeves Pushed Up, Half Tucked, Deep Unbuttoned, Collar Popped |
| Sleeves Pushed Up | Half Tucked | Deep Unbuttoned | Collar Unified | Sleeves Pushed Up, Half Tucked, Deep Unbuttoned, Collar Unified |
| Sleeves Pushed Up | Half Tucked | Deep Unbuttoned | NA | Sleeves Pushed Up, Half Tucked, Deep Unbuttoned |
| Sleeves Pushed Up | Half Tucked | Fully Unbuttoned | Collar Bow Tied | Sleeves Pushed Up, Half Tucked, Fully Unbuttoned, Collar Bow Tied |

FIG. 62H

| Sleeves | Tucked | Buttoned | Collar | Combined |
|---|---|---|---|---|
| Sleeves Pushed Up | Half Tucked | Fully Buttoned | Collar Folded | Sleeves Pushed Up, Half Tucked, Fully Buttoned, Collar Folded |
| Sleeves Pushed Up | Half Tucked | Fully Buttoned | Collar Knot Tied | Sleeves Pushed Up, Half Tucked, Fully Buttoned, Collar Knot Tied |
| Sleeves Pushed Up | Half Tucked | Fully Buttoned | Collar Popped | Sleeves Pushed Up, Half Tucked, Fully Buttoned, Collar Popped |
| Sleeves Pushed Up | Half Tucked | Fully Buttoned | Collar Untied | Sleeves Pushed Up, Half Tucked, Fully Buttoned, Collar Untied |
| Sleeves Pushed Up | Half Tucked | Fully Buttoned | NA | Sleeves Pushed Up, Half Tucked, Fully Buttoned |
| Sleeves Pushed Up | Half Tucked | Fully Unbuttoned | Collar Bow Tied | Sleeves Pushed Up, Half Tucked, Fully Unbuttoned, Collar Bow Tied |
| Sleeves Pushed Up | Half Tucked | Fully Unbuttoned | Collar Folded | Sleeves Pushed Up, Half Tucked, Fully Unbuttoned, Collar Folded |
| Sleeves Pushed Up | Half Tucked | Fully Unbuttoned | Collar Knot Tied | Sleeves Pushed Up, Half Tucked, Fully Unbuttoned, Collar Knot Tied |
| Sleeves Pushed Up | Half Tucked | Fully Unbuttoned | Collar Popped | Sleeves Pushed Up, Half Tucked, Fully Unbuttoned, Collar Popped |
| Sleeves Pushed Up | Half Tucked | Fully Unbuttoned | Collar Untied | Sleeves Pushed Up, Half Tucked, Fully Unbuttoned, Collar Untied |
| Sleeves Pushed Up | Half Tucked | Fully Unbuttoned | NA | Sleeves Pushed Up, Half Tucked, Fully Unbuttoned |
| Sleeves Pushed Up | Half Tucked | NA | Collar Bow Tied | Sleeves Pushed Up, Half Tucked, Collar Bow Tied |
| Sleeves Pushed Up | Half Tucked | NA | Collar Folded | Sleeves Pushed Up, Half Tucked, Collar Folded |
| Sleeves Pushed Up | Half Tucked | NA | Collar Knot Tied | Sleeves Pushed Up, Half Tucked, Collar Knot Tied |
| Sleeves Pushed Up | Half Tucked | NA | Collar Popped | Sleeves Pushed Up, Half Tucked, Collar Popped |
| Sleeves Pushed Up | Half Tucked | NA | Collar Untied | Sleeves Pushed Up, Half Tucked, Collar Untied |
| Sleeves Pushed Up | Half Tucked | NA | NA | Sleeves Pushed Up, Half Tucked |
| Sleeves Pushed Up | Half Tucked | Top & Bottom Unbuttoned | Collar Bow Tied | Sleeves Pushed Up, Half Tucked, Top & Bottom Unbuttoned, Collar Bow Tied |
| Sleeves Pushed Up | Half Tucked | Top & Bottom Unbuttoned | Collar Folded | Sleeves Pushed Up, Half Tucked, Top & Bottom Unbuttoned, Collar Folded |
| Sleeves Pushed Up | Half Tucked | Top & Bottom Unbuttoned | Collar Knot Tied | Sleeves Pushed Up, Half Tucked, Top & Bottom Unbuttoned, Collar Knot Tied |
| Sleeves Pushed Up | Half Tucked | Top & Bottom Unbuttoned | Collar Popped | Sleeves Pushed Up, Half Tucked, Top & Bottom Unbuttoned, Collar Popped |
| Sleeves Pushed Up | Half Tucked | Top & Bottom Unbuttoned | Collar Untied | Sleeves Pushed Up, Half Tucked, Top & Bottom Unbuttoned, Collar Untied |
| Sleeves Pushed Up | Half Tucked | Top & Bottom Unbuttoned | NA | Sleeves Pushed Up, Half Tucked, Top & Bottom Unbuttoned |
| Sleeves Pushed Up | Half Tucked | Top Unbuttoned | Collar Bow Tied | Sleeves Pushed Up, Half Tucked, Top Bottom Unbuttoned, Collar Bow Tied |
| Sleeves Pushed Up | Half Tucked | Top Unbuttoned | Collar Folded | Sleeves Pushed Up, Half Tucked, Top Bottom Unbuttoned, Collar Folded |
| Sleeves Pushed Up | Half Tucked | Top Unbuttoned | Collar Knot Tied | Sleeves Pushed Up, Half Tucked, Top Bottom Unbuttoned, Collar Knot Tied |
| Sleeves Pushed Up | Half Tucked | Top Unbuttoned | Collar Popped | Sleeves Pushed Up, Half Tucked, Top Bottom Unbuttoned, Collar Popped |
| Sleeves Pushed Up | Half Tucked | Top Unbuttoned | Collar Untied | Sleeves Pushed Up, Half Tucked, Top Bottom Unbuttoned, Collar Untied |

FIG. 62I

| Sleeves | Tuck | Button | Collar | Combined |
|---|---|---|---|---|
| Sleeves Pushed Up | Half Tucked | Top Unbuttoned | NA | Sleeves Pushed Up, Half Tucked, Top Unbuttoned |
| Sleeves Pushed Up | Tucked | Bottom Unbuttoned | Collar Bow Tied | Sleeves Pushed Up, Tucked, Bottom Unbuttoned, Collar Bow Tied |
| Sleeves Pushed Up | Tucked | Bottom Unbuttoned | Collar Folded | Sleeves Pushed Up, Tucked, Bottom Unbuttoned, Collar Folded |
| Sleeves Pushed Up | Tucked | Bottom Unbuttoned | Collar Knot Tied | Sleeves Pushed Up, Tucked, Bottom Unbuttoned, Collar Knot Tied |
| Sleeves Pushed Up | Tucked | Bottom Unbuttoned | Collar Popped | Sleeves Pushed Up, Tucked, Bottom Unbuttoned, Collar Popped |
| Sleeves Pushed Up | Tucked | Bottom Unbuttoned | Collar Unified | Sleeves Pushed Up, Tucked, Bottom Unbuttoned, Collar Unified |
| Sleeves Pushed Up | Tucked | Bottom Unbuttoned | NA | Sleeves Pushed Up, Tucked, Bottom Unbuttoned |
| Sleeves Pushed Up | Tucked | Deep Unbuttoned | Collar Bow Tied | Sleeves Pushed Up, Tucked, Deep Unbuttoned, Collar Bow Tied |
| Sleeves Pushed Up | Tucked | Deep Unbuttoned | Collar Folded | Sleeves Pushed Up, Tucked, Deep Unbuttoned, Collar Folded |
| Sleeves Pushed Up | Tucked | Deep Unbuttoned | Collar Knot Tied | Sleeves Pushed Up, Tucked, Deep Unbuttoned, Collar Knot Tied |
| Sleeves Pushed Up | Tucked | Deep Unbuttoned | Collar Popped | Sleeves Pushed Up, Tucked, Deep Unbuttoned, Collar Popped |
| Sleeves Pushed Up | Tucked | Deep Unbuttoned | Collar Unified | Sleeves Pushed Up, Tucked, Deep Unbuttoned, Collar Unified |
| Sleeves Pushed Up | Tucked | Deep Unbuttoned | NA | Sleeves Pushed Up, Tucked, Deep Unbuttoned |
| Sleeves Pushed Up | Tucked | Fully Buttoned | Collar Bow Tied | Sleeves Pushed Up, Tucked, Fully Buttoned, Collar Bow Tied |
| Sleeves Pushed Up | Tucked | Fully Buttoned | Collar Folded | Sleeves Pushed Up, Tucked, Fully Buttoned, Collar Folded |
| Sleeves Pushed Up | Tucked | Fully Buttoned | Collar Knot Tied | Sleeves Pushed Up, Tucked, Fully Buttoned, Collar Knot Tied |
| Sleeves Pushed Up | Tucked | Fully Buttoned | Collar Popped | Sleeves Pushed Up, Tucked, Fully Buttoned, Collar Popped |
| Sleeves Pushed Up | Tucked | Fully Buttoned | Collar Unified | Sleeves Pushed Up, Tucked, Fully Buttoned, Collar Unified |
| Sleeves Pushed Up | Tucked | Fully Buttoned | NA | Sleeves Pushed Up, Tucked, Fully Buttoned |
| Sleeves Pushed Up | Tucked | Fully Unbuttoned | Collar Bow Tied | Sleeves Pushed Up, Tucked, Fully Unbuttoned, Collar Bow Tied |
| Sleeves Pushed Up | Tucked | Fully Unbuttoned | Collar Folded | Sleeves Pushed Up, Tucked, Fully Unbuttoned, Collar Folded |
| Sleeves Pushed Up | Tucked | Fully Unbuttoned | Collar Knot Tied | Sleeves Pushed Up, Tucked, Fully Unbuttoned, Collar Knot Tied |
| Sleeves Pushed Up | Tucked | Fully Unbuttoned | Collar Popped | Sleeves Pushed Up, Tucked, Fully Unbuttoned, Collar Popped |
| Sleeves Pushed Up | Tucked | Fully Unbuttoned | Collar Unified | Sleeves Pushed Up, Tucked, Fully Unbuttoned, Collar Unified |
| Sleeves Pushed Up | Tucked | Fully Unbuttoned | NA | Sleeves Pushed Up, Tucked, Fully Unbuttoned |
| Sleeves Pushed Up | Tucked | NA | Collar Bow Tied | Sleeves Pushed Up, Tucked, Collar Bow Tied |
| Sleeves Pushed Up | Tucked | NA | Collar Folded | Sleeves Pushed Up, Tucked, Collar Folded |
| Sleeves Pushed Up | Tucked | NA | Collar Knot Tied | Sleeves Pushed Up, Tucked, Collar Knot Tied |

FIG. 62J

| Sleeves Pushed Up | Tucked | NA | Collar Popped | Sleeves Pushed Up, Tucked, Collar Popped |
| Sleeves Pushed Up | Tucked | NA | Collar Untied | Sleeves Pushed Up, Tucked, Collar Untied |
| Sleeves Pushed Up | Tucked | NA | NA | Sleeves Pushed Up, Tucked |
| Sleeves Pushed Up | Tucked | Top & Bottom Unbuttoned | Collar Bow Tied | Sleeves Pushed Up, Tucked, Top & Bottom Unbuttoned, Collar Bow Tied |
| Sleeves Pushed Up | Tucked | Top & Bottom Unbuttoned | Collar Folded | Sleeves Pushed Up, Tucked, Top & Bottom Unbuttoned, Collar Folded |
| Sleeves Pushed Up | Tucked | Top & Bottom Unbuttoned | Collar Knot Tied | Sleeves Pushed Up, Tucked, Top & Bottom Unbuttoned, Collar Knot Tied |
| Sleeves Pushed Up | Tucked | Top & Bottom Unbuttoned | Collar Popped | Sleeves Pushed Up, Tucked, Top & Bottom Unbuttoned, Collar Popped |
| Sleeves Pushed Up | Tucked | Top & Bottom Unbuttoned | Collar Untied | Sleeves Pushed Up, Tucked, Top & Bottom Unbuttoned, Collar Untied |
| Sleeves Pushed Up | Tucked | Top & Bottom Unbuttoned | NA | Sleeves Pushed Up, Tucked, Top & Bottom Unbuttoned |
| Sleeves Pushed Up | Tucked | Top Unbuttoned | Collar Bow Tied | Sleeves Pushed Up, Tucked, Top Unbuttoned, Collar Bow Tied |
| Sleeves Pushed Up | Tucked | Top Unbuttoned | Collar Folded | Sleeves Pushed Up, Tucked, Top Unbuttoned, Collar Folded |
| Sleeves Pushed Up | Tucked | Top Unbuttoned | Collar Knot Tied | Sleeves Pushed Up, Tucked, Top Unbuttoned, Collar Knot Tied |
| Sleeves Pushed Up | Tucked | Top Unbuttoned | Collar Popped | Sleeves Pushed Up, Tucked, Top Unbuttoned, Collar Popped |
| Sleeves Pushed Up | Tucked | Top Unbuttoned | Collar Untied | Sleeves Pushed Up, Tucked, Top Unbuttoned, Collar Untied |
| Sleeves Pushed Up | Tucked | Top Unbuttoned | NA | Sleeves Pushed Up, Tucked, Top Unbuttoned |
| Sleeves Pushed Up | Untucked | Bottom Unbuttoned | Collar Bow Tied | Sleeves Pushed Up, Tucked, Bottom Unbuttoned, Collar Bow Tied |
| Sleeves Pushed Up | Untucked | Bottom Unbuttoned | Collar Folded | Sleeves Pushed Up, Tucked, Bottom Unbuttoned, Collar Folded |
| Sleeves Pushed Up | Untucked | Bottom Unbuttoned | Collar Knot Tied | Sleeves Pushed Up, Tucked, Bottom Unbuttoned, Collar Knot Tied |
| Sleeves Pushed Up | Untucked | Bottom Unbuttoned | Collar Popped | Sleeves Pushed Up, Tucked, Bottom Unbuttoned, Collar Popped |
| Sleeves Pushed Up | Untucked | Bottom Unbuttoned | Collar Untied | Sleeves Pushed Up, Tucked, Bottom Unbuttoned, Collar Untied |
| Sleeves Pushed Up | Untucked | Bottom Unbuttoned | NA | Sleeves Pushed Up, Tucked, Bottom Unbuttoned |
| Sleeves Pushed Up | Untucked | Deep Unbuttoned | Collar Bow Tied | Sleeves Pushed Up, Tucked, Deep Unbuttoned, Collar Bow Tied |
| Sleeves Pushed Up | Untucked | Deep Unbuttoned | Collar Folded | Sleeves Pushed Up, Tucked, Deep Unbuttoned, Collar Folded |
| Sleeves Pushed Up | Untucked | Deep Unbuttoned | Collar Knot Tied | Sleeves Pushed Up, Tucked, Deep Unbuttoned, Collar Knot Tied |
| Sleeves Pushed Up | Untucked | Deep Unbuttoned | Collar Popped | Sleeves Pushed Up, Tucked, Deep Unbuttoned, Collar Popped |
| Sleeves Pushed Up | Untucked | Deep Unbuttoned | Collar Untied | Sleeves Pushed Up, Tucked, Deep Unbuttoned, Collar Untied |
| Sleeves Pushed Up | Untucked | Deep Unbuttoned | NA | Sleeves Pushed Up, Tucked, Deep Unbuttoned |
| Sleeves Pushed Up | Untucked | Fully Buttoned | Collar Bow Tied | Sleeves Pushed Up, Tucked, Fully Buttoned, Collar Bow Tied |

FIG. 62K

| | | | |
|---|---|---|---|
| Sleeves Pushed Up | Untucked | Fully Buttoned | Collar Folded |
| Sleeves Pushed Up | Untucked | Fully Buttoned | Collar Knot Tied |
| Sleeves Pushed Up | Untucked | Fully Buttoned | Collar Popped |
| Sleeves Pushed Up | Untucked | Fully Buttoned | Collar Untied |
| Sleeves Pushed Up | Untucked | Fully Buttoned | NA |
| Sleeves Pushed Up | Untucked | Fully Unbuttoned | Collar Bow Tied |
| Sleeves Pushed Up | Untucked | Fully Unbuttoned | Collar Folded |
| Sleeves Pushed Up | Untucked | Fully Unbuttoned | Collar Knot Tied |
| Sleeves Pushed Up | Untucked | Fully Unbuttoned | Collar Popped |
| Sleeves Pushed Up | Untucked | Fully Unbuttoned | Collar Untied |
| Sleeves Pushed Up | Untucked | NA | Collar Bow Tied |
| Sleeves Pushed Up | Untucked | NA | Collar Folded |
| Sleeves Pushed Up | Untucked | NA | Collar Knot Tied |
| Sleeves Pushed Up | Untucked | NA | Collar Popped |
| Sleeves Pushed Up | Untucked | NA | Collar Untied |
| Sleeves Pushed Up | Untucked | NA | NA |
| Sleeves Pushed Up | Untucked | Top & Bottom Unbuttoned | Collar Bow Tied |
| Sleeves Pushed Up | Untucked | Top & Bottom Unbuttoned | Collar Folded |
| Sleeves Pushed Up | Untucked | Top & Bottom Unbuttoned | Collar Knot Tied |
| Sleeves Pushed Up | Untucked | Top & Bottom Unbuttoned | Collar Popped |
| Sleeves Pushed Up | Untucked | Top & Bottom Unbuttoned | Collar Untied |
| Sleeves Pushed Up | Untucked | Top & Bottom Unbuttoned | NA |
| Sleeves Pushed Up | Untucked | Top Unbuttoned | Collar Bow Tied |
| Sleeves Pushed Up | Untucked | Top Unbuttoned | Collar Folded |
| Sleeves Pushed Up | Untucked | Top Unbuttoned | Collar Knot Tied |
| Sleeves Pushed Up | Untucked | Top Unbuttoned | Collar Popped |
| Sleeves Pushed Up | Untucked | Top Unbuttoned | Collar Untied |
| Sleeves Pushed Up, Tucked, Fully Buttoned, Collar Folded | | | |
| Sleeves Pushed Up, Tucked, Fully Buttoned, Collar Knot Tied | | | |
| Sleeves Pushed Up, Tucked, Fully Buttoned, Collar Popped | | | |
| Sleeves Pushed Up, Tucked, Fully Buttoned, Collar Untied | | | |
| Sleeves Pushed Up, Tucked, Fully Buttoned | | | |
| Sleeves Pushed Up, Tucked, Fully Unbuttoned, Collar Bow Tied | | | |
| Sleeves Pushed Up, Tucked, Fully Unbuttoned, Collar Folded | | | |
| Sleeves Pushed Up, Tucked, Fully Unbuttoned, Collar Knot Tied | | | |
| Sleeves Pushed Up, Tucked, Fully Unbuttoned, Collar Popped | | | |
| Sleeves Pushed Up, Tucked, Fully Unbuttoned, Collar Untied | | | |
| Sleeves Pushed Up, Tucked, Fully Unbuttoned | | | |
| Sleeves Pushed Up, Tucked, Collar Bow Tied | | | |
| Sleeves Pushed Up, Tucked, Collar Folded | | | |
| Sleeves Pushed Up, Tucked, Collar Knot Tied | | | |
| Sleeves Pushed Up, Tucked, Collar Popped | | | |
| Sleeves Pushed Up, Tucked, Collar Untied | | | |
| Sleeves Pushed Up, Tucked | | | |
| Sleeves Pushed Up, Tucked, Top & Bottom Unbuttoned, Collar Bow Tied | | | |
| Sleeves Pushed Up, Tucked, Top & Bottom Unbuttoned, Collar Folded | | | |
| Sleeves Pushed Up, Tucked, Top & Bottom Unbuttoned, Collar Knot Tied | | | |
| Sleeves Pushed Up, Tucked, Top & Bottom Unbuttoned, Collar Popped | | | |
| Sleeves Pushed Up, Tucked, Top & Bottom Unbuttoned, Collar Untied | | | |
| Sleeves Pushed Up, Tucked, Top & Bottom Unbuttoned | | | |
| Sleeves Pushed Up, Tucked, Top Unbuttoned, Collar Bow Tied | | | |
| Sleeves Pushed Up, Tucked, Top Unbuttoned, Collar Folded | | | |
| Sleeves Pushed Up, Tucked, Top Unbuttoned, Collar Knot Tied | | | |
| Sleeves Pushed Up, Tucked, Top Unbuttoned, Collar Popped | | | |
| Sleeves Pushed Up, Tucked, Top Unbuttoned, Collar Untied | | | |

FIG. 62L

| Sleeves Pushed Up | Untucked | Top Unbuttoned | NA | Sleeves Pushed Up, Untucked, Top Unbuttoned |
|---|---|---|---|---|
| Sleeves Down | Front Tucked | Bottom Unbuttoned | Collar Bow Tied | Sleeves Down, Front Tucked, Bottom Unbuttoned, Collar Bow Tied |
| Sleeves Down | Front Tucked | Bottom Unbuttoned | Collar Folded | Sleeves Down, Front Tucked, Bottom Unbuttoned, Collar Folded |
| Sleeves Down | Front Tucked | Bottom Unbuttoned | Collar Knot Tied | Sleeves Down, Front Tucked, Bottom Unbuttoned, Collar Knot Tied |
| Sleeves Down | Front Tucked | Bottom Unbuttoned | Collar Popped | Sleeves Down, Front Tucked, Bottom Unbuttoned, Collar Popped |
| Sleeves Down | Front Tucked | Bottom Unbuttoned | Collar Unified | Sleeves Down, Front Tucked, Bottom Unbuttoned, Collar Unified |
| Sleeves Down | Front Tucked | Bottom Unbuttoned | NA | Sleeves Down, Front Tucked, Bottom Unbuttoned |
| Sleeves Down | Front Tucked | Deep Unbuttoned | Collar Bow Tied | Sleeves Down, Front Tucked, Deep Unbuttoned, Collar Bow Tied |
| Sleeves Down | Front Tucked | Deep Unbuttoned | Collar Folded | Sleeves Down, Front Tucked, Deep Unbuttoned, Collar Folded |
| Sleeves Down | Front Tucked | Deep Unbuttoned | Collar Knot Tied | Sleeves Down, Front Tucked, Deep Unbuttoned, Collar Knot Tied |
| Sleeves Down | Front Tucked | Deep Unbuttoned | Collar Popped | Sleeves Down, Front Tucked, Deep Unbuttoned, Collar Popped |
| Sleeves Down | Front Tucked | Deep Unbuttoned | Collar Unified | Sleeves Down, Front Tucked, Deep Unbuttoned, Collar Unified |
| Sleeves Down | Front Tucked | Deep Unbuttoned | NA | Sleeves Down, Front Tucked, Deep Unbuttoned |
| Sleeves Down | Front Tucked | Fully Buttoned | Collar Bow Tied | Sleeves Down, Front Tucked, Fully Buttoned, Collar Bow Tied |
| Sleeves Down | Front Tucked | Fully Buttoned | Collar Folded | Sleeves Down, Front Tucked, Fully Buttoned, Collar Folded |
| Sleeves Down | Front Tucked | Fully Buttoned | Collar Knot Tied | Sleeves Down, Front Tucked, Fully Buttoned, Collar Knot Tied |
| Sleeves Down | Front Tucked | Fully Buttoned | Collar Popped | Sleeves Down, Front Tucked, Fully Buttoned, Collar Popped |
| Sleeves Down | Front Tucked | Fully Buttoned | Collar Unified | Sleeves Down, Front Tucked, Fully Buttoned, Collar Unified |
| Sleeves Down | Front Tucked | Fully Buttoned | NA | Sleeves Down, Front Tucked, Fully Buttoned |
| Sleeves Down | Front Tucked | Fully Unbuttoned | Collar Bow Tied | Sleeves Down, Front Tucked, Fully Unbuttoned, Collar Bow Tied |
| Sleeves Down | Front Tucked | Fully Unbuttoned | Collar Folded | Sleeves Down, Front Tucked, Fully Unbuttoned, Collar Folded |
| Sleeves Down | Front Tucked | Fully Unbuttoned | Collar Knot Tied | Sleeves Down, Front Tucked, Fully Unbuttoned, Collar Knot Tied |
| Sleeves Down | Front Tucked | Fully Unbuttoned | Collar Popped | Sleeves Down, Front Tucked, Fully Unbuttoned, Collar Popped |
| Sleeves Down | Front Tucked | Fully Unbuttoned | Collar Unified | Sleeves Down, Front Tucked, Fully Unbuttoned, Collar Unified |
| Sleeves Down | Front Tucked | Fully Unbuttoned | NA | Sleeves Down, Front Tucked, Fully Unbuttoned |
| Sleeves Down | Front Tucked | NA | Collar Bow Tied | Sleeves Down, Front Tucked, Collar Bow Tied |
| Sleeves Down | Front Tucked | NA | Collar Folded | Sleeves Down, Front Tucked, Collar Folded |
| Sleeves Down | Front Tucked | NA | Collar Knot Tied | Sleeves Down, Front Tucked, Collar Knot Tied |

FIG. 62M

| | | | |
|---|---|---|---|
| Sleeves Down | Front Tucked | NA | Collar Popped | Sleeves Down, Front Tucked, Collar Popped |
| Sleeves Down | Front Tucked | NA | Collar Untied | Sleeves Down, Front Tucked, Collar Untied |
| Sleeves Down | Front Tucked | NA | NA | Sleeves Down, Front Tucked |
| Sleeves Down | Front Tucked | Top & Bottom Unbuttoned | Collar Bow Tied | Sleeves Down, Front Tucked, Top & Bottom Unbuttoned, Collar Bow Tied |
| Sleeves Down | Front Tucked | Top & Bottom Unbuttoned | Collar Folded | Sleeves Down, Front Tucked, Top & Bottom Unbuttoned, Collar Folded |
| Sleeves Down | Front Tucked | Top & Bottom Unbuttoned | Collar Knot Tied | Sleeves Down, Front Tucked, Top & Bottom Unbuttoned, Collar Knot Tied |
| Sleeves Down | Front Tucked | Top & Bottom Unbuttoned | Collar Popped | Sleeves Down, Front Tucked, Top & Bottom Unbuttoned, Collar Popped |
| Sleeves Down | Front Tucked | Top & Bottom Unbuttoned | Collar Untied | Sleeves Down, Front Tucked, Top & Bottom Unbuttoned, Collar Untied |
| Sleeves Down | Front Tucked | Top & Bottom Unbuttoned | NA | Sleeves Down, Front Tucked, Top & Bottom Unbuttoned |
| Sleeves Down | Front Tucked | Top Unbuttoned | Collar Bow Tied | Sleeves Down, Front Tucked, Top Unbuttoned, Collar Bow Tied |
| Sleeves Down | Front Tucked | Top Unbuttoned | Collar Folded | Sleeves Down, Front Tucked, Top Unbuttoned, Collar Folded |
| Sleeves Down | Front Tucked | Top Unbuttoned | Collar Knot Tied | Sleeves Down, Front Tucked, Top Unbuttoned, Collar Knot Tied |
| Sleeves Down | Front Tucked | Top Unbuttoned | Collar Popped | Sleeves Down, Front Tucked, Top Unbuttoned, Collar Popped |
| Sleeves Down | Front Tucked | Top Unbuttoned | Collar Untied | Sleeves Down, Front Tucked, Top Unbuttoned, Collar Untied |
| Sleeves Down | Front Tucked | Top Unbuttoned | NA | Sleeves Down, Front Tucked, Top Unbuttoned |
| Sleeves Down | Half Tucked | Bottom Unbuttoned | Collar Bow Tied | Sleeves Down, Half Tucked, Bottom Unbuttoned, Collar Bow Tied |
| Sleeves Down | Half Tucked | Bottom Unbuttoned | Collar Folded | Sleeves Down, Half Tucked, Bottom Unbuttoned, Collar Folded |
| Sleeves Down | Half Tucked | Bottom Unbuttoned | Collar Knot Tied | Sleeves Down, Half Tucked, Bottom Unbuttoned, Collar Knot Tied |
| Sleeves Down | Half Tucked | Bottom Unbuttoned | Collar Popped | Sleeves Down, Half Tucked, Bottom Unbuttoned, Collar Popped |
| Sleeves Down | Half Tucked | Bottom Unbuttoned | Collar Untied | Sleeves Down, Half Tucked, Bottom Unbuttoned, Collar Untied |
| Sleeves Down | Half Tucked | Bottom Unbuttoned | NA | Sleeves Down, Half Tucked, Bottom Unbuttoned |
| Sleeves Down | Half Tucked | Deep Unbuttoned | Collar Bow Tied | Sleeves Down, Half Tucked, Deep Unbuttoned, Collar Bow Tied |
| Sleeves Down | Half Tucked | Deep Unbuttoned | Collar Folded | Sleeves Down, Half Tucked, Deep Unbuttoned, Collar Folded |
| Sleeves Down | Half Tucked | Deep Unbuttoned | Collar Knot Tied | Sleeves Down, Half Tucked, Deep Unbuttoned, Collar Knot Tied |
| Sleeves Down | Half Tucked | Deep Unbuttoned | Collar Popped | Sleeves Down, Half Tucked, Deep Unbuttoned, Collar Popped |
| Sleeves Down | Half Tucked | Deep Unbuttoned | Collar Untied | Sleeves Down, Half Tucked, Deep Unbuttoned, Collar Untied |
| Sleeves Down | Half Tucked | Deep Unbuttoned | NA | Sleeves Down, Half Tucked, Deep Unbuttoned |
| Sleeves Down | Half Tucked | Fully Buttoned | Collar Bow Tied | Sleeves Down, Half Tucked, Fully Buttoned, Collar Bow Tied |

FIG. 62N

| | | | |
|---|---|---|---|
| Sleeves Down | Half Tucked | Fully Buttoned | Collar Folded | Sleeves Down, Half Tucked, Fully Buttoned, Collar Folded |
| Sleeves Down | Half Tucked | Fully Buttoned | Collar Knot Tied | Sleeves Down, Half Tucked, Fully Buttoned, Collar Knot Tied |
| Sleeves Down | Half Tucked | Fully Buttoned | Collar Popped | Sleeves Down, Half Tucked, Fully Buttoned, Collar Popped |
| Sleeves Down | Half Tucked | Fully Buttoned | Collar Untied | Sleeves Down, Half Tucked, Fully Buttoned, Collar Untied |
| Sleeves Down | Half Tucked | Fully Buttoned | NA | Sleeves Down, Half Tucked, Fully Buttoned |
| Sleeves Down | Half Tucked | Fully Unbuttoned | Collar Bow Tied | Sleeves Down, Half Tucked, Fully Unbuttoned, Collar Bow Tied |
| Sleeves Down | Half Tucked | Fully Unbuttoned | Collar Folded | Sleeves Down, Half Tucked, Fully Unbuttoned, Collar Folded |
| Sleeves Down | Half Tucked | Fully Unbuttoned | Collar Knot Tied | Sleeves Down, Half Tucked, Fully Unbuttoned, Collar Knot Tied |
| Sleeves Down | Half Tucked | Fully Unbuttoned | Collar Popped | Sleeves Down, Half Tucked, Fully Unbuttoned, Collar Popped |
| Sleeves Down | Half Tucked | Fully Unbuttoned | Collar Untied | Sleeves Down, Half Tucked, Fully Unbuttoned, Collar Untied |
| Sleeves Down | Half Tucked | Fully Unbuttoned | NA | Sleeves Down, Half Tucked, Fully Unbuttoned |
| Sleeves Down | Half Tucked | NA | Collar Bow Tied | Sleeves Down, Half Tucked, Collar Bow Tied |
| Sleeves Down | Half Tucked | NA | Collar Folded | Sleeves Down, Half Tucked, Collar Folded |
| Sleeves Down | Half Tucked | NA | Collar Knot Tied | Sleeves Down, Half Tucked, Collar Knot Tied |
| Sleeves Down | Half Tucked | NA | Collar Popped | Sleeves Down, Half Tucked, Collar Popped |
| Sleeves Down | Half Tucked | NA | Collar Untied | Sleeves Down, Half Tucked, Collar Untied |
| Sleeves Down | Half Tucked | NA | NA | Sleeves Down, Half Tucked |
| Sleeves Down | Half Tucked | Top & Bottom Unbuttoned | Collar Bow Tied | Sleeves Down, Half Tucked, Top & Bottom Unbuttoned, Collar Bow Tied |
| Sleeves Down | Half Tucked | Top & Bottom Unbuttoned | Collar Folded | Sleeves Down, Half Tucked, Top & Bottom Unbuttoned, Collar Folded |
| Sleeves Down | Half Tucked | Top & Bottom Unbuttoned | Collar Knot Tied | Sleeves Down, Half Tucked, Top & Bottom Unbuttoned, Collar Knot Tied |
| Sleeves Down | Half Tucked | Top & Bottom Unbuttoned | Collar Popped | Sleeves Down, Half Tucked, Top & Bottom Unbuttoned, Collar Popped |
| Sleeves Down | Half Tucked | Top & Bottom Unbuttoned | Collar Untied | Sleeves Down, Half Tucked, Top & Bottom Unbuttoned, Collar Untied |
| Sleeves Down | Half Tucked | Top & Bottom Unbuttoned | NA | Sleeves Down, Half Tucked, Top & Bottom Unbuttoned |
| Sleeves Down | Half Tucked | Top Unbuttoned | Collar Bow Tied | Sleeves Down, Half Tucked, Top Unbuttoned, Collar Bow Tied |
| Sleeves Down | Half Tucked | Top Unbuttoned | Collar Folded | Sleeves Down, Half Tucked, Top Unbuttoned, Collar Folded |
| Sleeves Down | Half Tucked | Top Unbuttoned | Collar Knot Tied | Sleeves Down, Half Tucked, Top Unbuttoned, Collar Knot Tied |
| Sleeves Down | Half Tucked | Top Unbuttoned | Collar Popped | Sleeves Down, Half Tucked, Top Unbuttoned, Collar Popped |
| Sleeves Down | Half Tucked | Top Unbuttoned | Collar Untied | Sleeves Down, Half Tucked, Top Unbuttoned, Collar Untied |

FIG. 62O

| | | | |
|---|---|---|---|
| Sleeves Down | Half Tucked | Top Unbuttoned | NA | Sleeves Down, Half Tucked, Top Unbuttoned |
| Sleeves Down | Tucked | Bottom Unbuttoned | Collar Bow Tied | Sleeves Down, Tucked, Bottom Unbuttoned, Collar Bow Tied |
| Sleeves Down | Tucked | Bottom Unbuttoned | Collar Folded | Sleeves Down, Tucked, Bottom Unbuttoned, Collar Folded |
| Sleeves Down | Tucked | Bottom Unbuttoned | Collar Knot Tied | Sleeves Down, Tucked, Bottom Unbuttoned, Collar Knot Tied |
| Sleeves Down | Tucked | Bottom Unbuttoned | Collar Popped | Sleeves Down, Tucked, Bottom Unbuttoned, Collar Popped |
| Sleeves Down | Tucked | Bottom Unbuttoned | Collar Unified | Sleeves Down, Tucked, Bottom Unbuttoned, Collar Unified |
| Sleeves Down | Tucked | Bottom Unbuttoned | NA | Sleeves Down, Tucked, Bottom Unbuttoned |
| Sleeves Down | Tucked | Deep Unbuttoned | Collar Bow Tied | Sleeves Down, Tucked, Deep Unbuttoned, Collar Bow Tied |
| Sleeves Down | Tucked | Deep Unbuttoned | Collar Folded | Sleeves Down, Tucked, Deep Unbuttoned, Collar Folded |
| Sleeves Down | Tucked | Deep Unbuttoned | Collar Knot Tied | Sleeves Down, Tucked, Deep Unbuttoned, Collar Knot Tied |
| Sleeves Down | Tucked | Deep Unbuttoned | Collar Popped | Sleeves Down, Tucked, Deep Unbuttoned, Collar Popped |
| Sleeves Down | Tucked | Deep Unbuttoned | Collar Unified | Sleeves Down, Tucked, Deep Unbuttoned, Collar Unified |
| Sleeves Down | Tucked | Deep Unbuttoned | NA | Sleeves Down, Tucked, Deep Unbuttoned |
| Sleeves Down | Tucked | Fully Buttoned | Collar Bow Tied | Sleeves Down, Tucked, Fully Buttoned, Collar Bow Tied |
| Sleeves Down | Tucked | Fully Buttoned | Collar Folded | Sleeves Down, Tucked, Fully Buttoned, Collar Folded |
| Sleeves Down | Tucked | Fully Buttoned | Collar Knot Tied | Sleeves Down, Tucked, Fully Buttoned, Collar Knot Tied |
| Sleeves Down | Tucked | Fully Buttoned | Collar Popped | Sleeves Down, Tucked, Fully Buttoned, Collar Popped |
| Sleeves Down | Tucked | Fully Buttoned | Collar Unified | Sleeves Down, Tucked, Fully Buttoned, Collar Unified |
| Sleeves Down | Tucked | Fully Buttoned | NA | Sleeves Down, Tucked, Fully Buttoned |
| Sleeves Down | Tucked | Fully Unbuttoned | Collar Bow Tied | Sleeves Down, Tucked, Fully Unbuttoned, Collar Bow Tied |
| Sleeves Down | Tucked | Fully Unbuttoned | Collar Folded | Sleeves Down, Tucked, Fully Unbuttoned, Collar Folded |
| Sleeves Down | Tucked | Fully Unbuttoned | Collar Knot Tied | Sleeves Down, Tucked, Fully Unbuttoned, Collar Knot Tied |
| Sleeves Down | Tucked | Fully Unbuttoned | Collar Popped | Sleeves Down, Tucked, Fully Unbuttoned, Collar Popped |
| Sleeves Down | Tucked | Fully Unbuttoned | Collar Unified | Sleeves Down, Tucked, Fully Unbuttoned, Collar Unified |
| Sleeves Down | Tucked | Fully Unbuttoned | NA | Sleeves Down, Tucked, Fully Unbuttoned |
| Sleeves Down | Tucked | NA | Collar Bow Tied | Sleeves Down, Collar Bow Tied |
| Sleeves Down | Tucked | NA | Collar Folded | Sleeves Down, Collar Folded |
| Sleeves Down | Tucked | NA | Collar Knot Tied | Sleeves Down, Collar Knot Tied |

FIG. 62P

| | | | |
|---|---|---|---|
| Sleeves Down | Tucked | NA | Collar Popped | Sleeves Down, Tucked, Collar Popped |
| Sleeves Down | Tucked | NA | Collar Unified | Sleeves Down, Tucked, Collar Unified |
| Sleeves Down | Tucked | NA | NA | Sleeves Down, Tucked |
| Sleeves Down | Tucked | Top & Bottom Unbuttoned | Collar Bow Tied | Sleeves Down, Tucked, Top & Bottom Unbuttoned, Collar Bow Tied |
| Sleeves Down | Tucked | Top & Bottom Unbuttoned | Collar Folded | Sleeves Down, Tucked, Top & Bottom Unbuttoned, Collar Folded |
| Sleeves Down | Tucked | Top & Bottom Unbuttoned | Collar Knot Tied | Sleeves Down, Tucked, Top & Bottom Unbuttoned, Collar Knot Tied |
| Sleeves Down | Tucked | Top & Bottom Unbuttoned | Collar Popped | Sleeves Down, Tucked, Top & Bottom Unbuttoned, Collar Popped |
| Sleeves Down | Tucked | Top & Bottom Unbuttoned | Collar Unified | Sleeves Down, Tucked, Top & Bottom Unbuttoned, Collar Unified |
| Sleeves Down | Tucked | Top & Bottom Unbuttoned | NA | Sleeves Down, Tucked, Top & Bottom Unbuttoned |
| Sleeves Down | Tucked | Top Unbuttoned | Collar Bow Tied | Sleeves Down, Tucked, Top Unbuttoned, Collar Bow Tied |
| Sleeves Down | Tucked | Top Unbuttoned | Collar Folded | Sleeves Down, Tucked, Top Unbuttoned, Collar Folded |
| Sleeves Down | Tucked | Top Unbuttoned | Collar Knot Tied | Sleeves Down, Tucked, Top Unbuttoned, Collar Knot Tied |
| Sleeves Down | Tucked | Top Unbuttoned | Collar Popped | Sleeves Down, Tucked, Top Unbuttoned, Collar Popped |
| Sleeves Down | Tucked | Top Unbuttoned | Collar Unified | Sleeves Down, Tucked, Top Unbuttoned, Collar Unified |
| Sleeves Down | Tucked | Top Unbuttoned | NA | Sleeves Down, Tucked, Top Unbuttoned |
| Sleeves Down | Untucked | Bottom Unbuttoned | Collar Bow Tied | Sleeves Down, Untucked, Bottom Unbuttoned, Collar Bow Tied |
| Sleeves Down | Untucked | Bottom Unbuttoned | Collar Folded | Sleeves Down, Untucked, Bottom Unbuttoned, Collar Folded |
| Sleeves Down | Untucked | Bottom Unbuttoned | Collar Knot Tied | Sleeves Down, Untucked, Bottom Unbuttoned, Collar Knot Tied |
| Sleeves Down | Untucked | Bottom Unbuttoned | Collar Popped | Sleeves Down, Untucked, Bottom Unbuttoned, Collar Popped |
| Sleeves Down | Untucked | Bottom Unbuttoned | Collar Unified | Sleeves Down, Untucked, Bottom Unbuttoned, Collar Unified |
| Sleeves Down | Untucked | Bottom Unbuttoned | NA | Sleeves Down, Untucked, Bottom Unbuttoned |
| Sleeves Down | Untucked | Deep Unbuttoned | Collar Bow Tied | Sleeves Down, Untucked, Deep Unbuttoned, Collar Bow Tied |
| Sleeves Down | Untucked | Deep Unbuttoned | Collar Folded | Sleeves Down, Untucked, Deep Unbuttoned, Collar Folded |
| Sleeves Down | Untucked | Deep Unbuttoned | Collar Knot Tied | Sleeves Down, Untucked, Deep Unbuttoned, Collar Knot Tied |
| Sleeves Down | Untucked | Deep Unbuttoned | Collar Popped | Sleeves Down, Untucked, Deep Unbuttoned, Collar Popped |
| Sleeves Down | Untucked | Deep Unbuttoned | Collar Unified | Sleeves Down, Untucked, Deep Unbuttoned, Collar Unified |
| Sleeves Down | Untucked | Deep Unbuttoned | NA | Sleeves Down, Untucked, Deep Unbuttoned |
| Sleeves Down | Untucked | Fully Buttoned | Collar Bow Tied | Sleeves Down, Untucked, Fully Buttoned, Collar Bow Tied |

FIG. 62Q

| | | | |
|---|---|---|---|
| Sleeves Down | Untucked | Fully Buttoned | Collar Folded | Sleeves Down, Untucked, Fully Buttoned, Collar Folded |
| Sleeves Down | Untucked | Fully Buttoned | Collar Knot Tied | Sleeves Down, Untucked, Fully Buttoned, Collar Knot Tied |
| Sleeves Down | Untucked | Fully Buttoned | Collar Popped | Sleeves Down, Untucked, Fully Buttoned, Collar Popped |
| Sleeves Down | Untucked | Fully Buttoned | Collar Untied | Sleeves Down, Untucked, Fully Buttoned, Collar Untied |
| Sleeves Down | Untucked | Fully Buttoned | NA | Sleeves Down, Untucked, Fully Buttoned |
| Sleeves Down | Untucked | Fully Unbuttoned | Collar Bow Tied | Sleeves Down, Untucked, Fully Unbuttoned, Collar Bow Tied |
| Sleeves Down | Untucked | Fully Unbuttoned | Collar Folded | Sleeves Down, Untucked, Fully Unbuttoned, Collar Folded |
| Sleeves Down | Untucked | Fully Unbuttoned | Collar Knot Tied | Sleeves Down, Untucked, Fully Unbuttoned, Collar Knot Tied |
| Sleeves Down | Untucked | Fully Unbuttoned | Collar Popped | Sleeves Down, Untucked, Fully Unbuttoned, Collar Popped |
| Sleeves Down | Untucked | Fully Unbuttoned | Collar Untied | Sleeves Down, Untucked, Fully Unbuttoned, Collar Untied |
| Sleeves Down | Untucked | Fully Unbuttoned | NA | Sleeves Down, Untucked, Fully Unbuttoned |
| Sleeves Down | Untucked | NA | Collar Bow Tied | Sleeves Down, Untucked, Collar Bow Tied |
| Sleeves Down | Untucked | NA | Collar Folded | Sleeves Down, Untucked, Collar Folded |
| Sleeves Down | Untucked | NA | Collar Knot Tied | Sleeves Down, Untucked, Collar Knot Tied |
| Sleeves Down | Untucked | NA | Collar Popped | Sleeves Down, Untucked, Collar Popped |
| Sleeves Down | Untucked | NA | Collar Untied | Sleeves Down, Untucked, Collar Untied |
| Sleeves Down | Untucked | NA | NA | Sleeves Down, Untucked |
| Sleeves Down | Untucked | Top & Bottom Unbuttoned | Collar Bow Tied | Sleeves Down, Untucked, Top & Bottom Unbuttoned, Collar Bow Tied |
| Sleeves Down | Untucked | Top & Bottom Unbuttoned | Collar Folded | Sleeves Down, Untucked, Top & Bottom Unbuttoned, Collar Folded |
| Sleeves Down | Untucked | Top & Bottom Unbuttoned | Collar Knot Tied | Sleeves Down, Untucked, Top & Bottom Unbuttoned, Collar Knot Tied |
| Sleeves Down | Untucked | Top & Bottom Unbuttoned | Collar Popped | Sleeves Down, Untucked, Top & Bottom Unbuttoned, Collar Popped |
| Sleeves Down | Untucked | Top & Bottom Unbuttoned | Collar Untied | Sleeves Down, Untucked, Top & Bottom Unbuttoned, Collar Untied |
| Sleeves Down | Untucked | Top & Bottom Unbuttoned | NA | Sleeves Down, Untucked, Top & Bottom Unbuttoned |
| Sleeves Down | Untucked | Top Unbuttoned | Collar Bow Tied | Sleeves Down, Untucked, Top Unbuttoned, Collar Bow Tied |
| Sleeves Down | Untucked | Top Unbuttoned | Collar Folded | Sleeves Down, Untucked, Top Unbuttoned, Collar Folded |
| Sleeves Down | Untucked | Top Unbuttoned | Collar Knot Tied | Sleeves Down, Untucked, Top Unbuttoned, Collar Knot Tied |
| Sleeves Down | Untucked | Top Unbuttoned | Collar Popped | Sleeves Down, Untucked, Top Unbuttoned, Collar Popped |
| Sleeves Down | Untucked | Top Unbuttoned | Collar Untied | Sleeves Down, Untucked, Top Unbuttoned, Collar Untied |

FIG. 62R

| Sleeves Down | Untucked | Top Unbuttoned | NA | Sleeves Down, Untucked, Top Unbuttoned |
|---|---|---|---|---|
| Sleeves Cuffed | Front Tucked | Bottom Unbuttoned | Collar Bow Tied | Sleeves Cuffed, Front Tucked, Bottom Unbuttoned, Collar Bow Tied |
| Sleeves Cuffed | Front Tucked | Bottom Unbuttoned | Collar Folded | Sleeves Cuffed, Front Tucked, Bottom Unbuttoned, Collar Folded |
| Sleeves Cuffed | Front Tucked | Bottom Unbuttoned | Collar Knot Tied | Sleeves Cuffed, Front Tucked, Bottom Unbuttoned, Collar Knot Tied |
| Sleeves Cuffed | Front Tucked | Bottom Unbuttoned | Collar Popped | Sleeves Cuffed, Front Tucked, Bottom Unbuttoned, Collar Popped |
| Sleeves Cuffed | Front Tucked | Bottom Unbuttoned | Collar Untied | Sleeves Cuffed, Front Tucked, Bottom Unbuttoned, Collar Untied |
| Sleeves Cuffed | Front Tucked | Bottom Unbuttoned | NA | Sleeves Cuffed, Front Tucked, Bottom Unbuttoned |
| Sleeves Cuffed | Front Tucked | Deep Unbuttoned | Collar Bow Tied | Sleeves Cuffed, Front Tucked, Deep Unbuttoned, Collar Bow Tied |
| Sleeves Cuffed | Front Tucked | Deep Unbuttoned | Collar Folded | Sleeves Cuffed, Front Tucked, Deep Unbuttoned, Collar Folded |
| Sleeves Cuffed | Front Tucked | Deep Unbuttoned | Collar Knot Tied | Sleeves Cuffed, Front Tucked, Deep Unbuttoned, Collar Knot Tied |
| Sleeves Cuffed | Front Tucked | Deep Unbuttoned | Collar Popped | Sleeves Cuffed, Front Tucked, Deep Unbuttoned, Collar Popped |
| Sleeves Cuffed | Front Tucked | Deep Unbuttoned | Collar Untied | Sleeves Cuffed, Front Tucked, Deep Unbuttoned, Collar Untied |
| Sleeves Cuffed | Front Tucked | Deep Unbuttoned | NA | Sleeves Cuffed, Front Tucked, Deep Unbuttoned |
| Sleeves Cuffed | Front Tucked | Fully Buttoned | Collar Bow Tied | Sleeves Cuffed, Front Tucked, Fully Buttoned, Collar Bow Tied |
| Sleeves Cuffed | Front Tucked | Fully Buttoned | Collar Folded | Sleeves Cuffed, Front Tucked, Fully Buttoned, Collar Folded |
| Sleeves Cuffed | Front Tucked | Fully Buttoned | Collar Knot Tied | Sleeves Cuffed, Front Tucked, Fully Buttoned, Collar Knot Tied |
| Sleeves Cuffed | Front Tucked | Fully Buttoned | Collar Popped | Sleeves Cuffed, Front Tucked, Fully Buttoned, Collar Popped |
| Sleeves Cuffed | Front Tucked | Fully Buttoned | Collar Untied | Sleeves Cuffed, Front Tucked, Fully Buttoned, Collar Untied |
| Sleeves Cuffed | Front Tucked | Fully Buttoned | NA | Sleeves Cuffed, Front Tucked, Fully Buttoned |
| Sleeves Cuffed | Front Tucked | Fully Unbuttoned | Collar Bow Tied | Sleeves Cuffed, Front Tucked, Fully Unbuttoned, Collar Bow Tied |
| Sleeves Cuffed | Front Tucked | Fully Unbuttoned | Collar Folded | Sleeves Cuffed, Front Tucked, Fully Unbuttoned, Collar Folded |
| Sleeves Cuffed | Front Tucked | Fully Unbuttoned | Collar Knot Tied | Sleeves Cuffed, Front Tucked, Fully Unbuttoned, Collar Knot Tied |
| Sleeves Cuffed | Front Tucked | Fully Unbuttoned | Collar Popped | Sleeves Cuffed, Front Tucked, Fully Unbuttoned, Collar Popped |
| Sleeves Cuffed | Front Tucked | Fully Unbuttoned | Collar Untied | Sleeves Cuffed, Front Tucked, Fully Unbuttoned, Collar Untied |
| Sleeves Cuffed | Front Tucked | NA | Collar Bow Tied | Sleeves Cuffed, Front Tucked, Collar Bow Tied |
| Sleeves Cuffed | Front Tucked | NA | Collar Folded | Sleeves Cuffed, Front Tucked, Collar Folded |
| Sleeves Cuffed | Front Tucked | NA | Collar Knot Tied | Sleeves Cuffed, Front Tucked, Collar Knot Tied |

FIG. 62S

| | | | |
|---|---|---|---|
| Sleeves Down | Front Tucked | NA | Collar Popped |
| Sleeves Cuffed | Front Tucked | NA | Collar Untied |
| Sleeves Cuffed | Front Tucked | NA | NA |
| Sleeves Cuffed | Front Tucked | Top & Bottom Unbuttoned | Collar Bow Tied |
| Sleeves Cuffed | Front Tucked | Top & Bottom Unbuttoned | Collar Folded |
| Sleeves Cuffed | Front Tucked | Top & Bottom Unbuttoned | Collar Knot Tied |
| Sleeves Cuffed | Front Tucked | Top & Bottom Unbuttoned | Collar Popped |
| Sleeves Cuffed | Front Tucked | Top & Bottom Unbuttoned | Collar Untied |
| Sleeves Cuffed | Front Tucked | Top & Bottom Unbuttoned | NA |
| Sleeves Cuffed | Front Tucked | Top Unbuttoned | Collar Bow Tied |
| Sleeves Cuffed | Front Tucked | Top Unbuttoned | Collar Folded |
| Sleeves Cuffed | Front Tucked | Top Unbuttoned | Collar Knot Tied |
| Sleeves Cuffed | Front Tucked | Top Unbuttoned | Collar Popped |
| Sleeves Cuffed | Front Tucked | Top Unbuttoned | Collar Untied |
| Sleeves Cuffed | Front Tucked | Top Unbuttoned | NA |
| Sleeves Cuffed | Half Tucked | Bottom Unbuttoned | Collar Bow Tied |
| Sleeves Cuffed | Half Tucked | Bottom Unbuttoned | Collar Folded |
| Sleeves Cuffed | Half Tucked | Bottom Unbuttoned | Collar Knot Tied |
| Sleeves Cuffed | Half Tucked | Bottom Unbuttoned | Collar Popped |
| Sleeves Cuffed | Half Tucked | Bottom Unbuttoned | Collar Untied |
| Sleeves Cuffed | Half Tucked | Bottom Unbuttoned | NA |
| Sleeves Cuffed | Half Tucked | Deep Unbuttoned | Collar Bow Tied |
| Sleeves Cuffed | Half Tucked | Deep Unbuttoned | Collar Folded |
| Sleeves Cuffed | Half Tucked | Deep Unbuttoned | Collar Knot Tied |
| Sleeves Cuffed | Half Tucked | Deep Unbuttoned | Collar Popped |
| Sleeves Cuffed | Half Tucked | Deep Unbuttoned | Collar Untied |
| Sleeves Cuffed | Half Tucked | Deep Unbuttoned | NA |
| Sleeves Cuffed | Half Tucked | Fully Buttoned | Collar Bow Tied |

| |
|---|
| Sleeves Cuffed, Front Tucked, Collar Popped |
| Sleeves Cuffed, Front Tucked, Collar Knot Untied |
| Sleeves Cuffed, Front Tucked |
| Sleeves Cuffed, Front Tucked, Top & Bottom Unbuttoned, Collar Bow Tied |
| Sleeves Cuffed, Front Tucked, Top & Bottom Unbuttoned, Collar Folded |
| Sleeves Cuffed, Front Tucked, Top & Bottom Unbuttoned, Collar Knot Tied |
| Sleeves Cuffed, Front Tucked, Top & Bottom Unbuttoned, Collar Popped |
| Sleeves Cuffed, Front Tucked, Top & Bottom Unbuttoned, Collar Untied |
| Sleeves Cuffed, Front Tucked, Top & Bottom Unbuttoned |
| Sleeves Cuffed, Front Tucked, Top Unbuttoned, Collar Bow Tied |
| Sleeves Cuffed, Front Tucked, Top Unbuttoned, Collar Folded |
| Sleeves Cuffed, Front Tucked, Top Unbuttoned, Collar Knot Tied |
| Sleeves Cuffed, Front Tucked, Top Unbuttoned, Collar Popped |
| Sleeves Cuffed, Front Tucked, Top Unbuttoned, Collar Untied |
| Sleeves Cuffed, Front Tucked, Top Unbuttoned |
| Sleeves Cuffed, Half Tucked, Bottom Unbuttoned, Collar Bow Tied |
| Sleeves Cuffed, Half Tucked, Bottom Unbuttoned, Collar Folded |
| Sleeves Cuffed, Half Tucked, Bottom Unbuttoned, Collar Knot Tied |
| Sleeves Cuffed, Half Tucked, Bottom Unbuttoned, Collar Popped |
| Sleeves Cuffed, Half Tucked, Bottom Unbuttoned, Collar Untied |
| Sleeves Cuffed, Half Tucked, Bottom Unbuttoned |
| Sleeves Cuffed, Half Tucked, Deep Unbuttoned, Collar Bow Tied |
| Sleeves Cuffed, Half Tucked, Deep Unbuttoned, Collar Folded |
| Sleeves Cuffed, Half Tucked, Deep Unbuttoned, Collar Knot Tied |
| Sleeves Cuffed, Half Tucked, Deep Unbuttoned, Collar Popped |
| Sleeves Cuffed, Half Tucked, Deep Unbuttoned, Collar Untied |
| Sleeves Cuffed, Half Tucked, Deep Unbuttoned |
| Sleeves Cuffed, Half Tucked, Fully Buttoned, Collar Bow Tied |

FIG. 62T

| | | | |
|---|---|---|---|
| Sleeves Cuffed | Half Tucked | Fully Buttoned | Collar Folded | Sleeves Cuffed, Half Tucked, Fully Buttoned, Collar Folded |
| Sleeves Cuffed | Half Tucked | Fully Buttoned | Collar Knot Tied | Sleeves Cuffed, Half Tucked, Fully Buttoned, Collar Knot Tied |
| Sleeves Cuffed | Half Tucked | Fully Buttoned | Collar Popped | Sleeves Cuffed, Half Tucked, Fully Buttoned, Collar Popped |
| Sleeves Cuffed | Half Tucked | Fully Buttoned | Collar Untied | Sleeves Cuffed, Half Tucked, Fully Buttoned, Collar Untied |
| Sleeves Cuffed | Half Tucked | Fully Buttoned | NA | Sleeves Cuffed, Half Tucked, Fully Buttoned |
| Sleeves Cuffed | Half Tucked | Fully Unbuttoned | Collar Bow Tied | Sleeves Cuffed, Half Tucked, Fully Unbuttoned, Collar Bow Tied |
| Sleeves Cuffed | Half Tucked | Fully Unbuttoned | Collar Folded | Sleeves Cuffed, Half Tucked, Fully Unbuttoned, Collar Folded |
| Sleeves Cuffed | Half Tucked | Fully Unbuttoned | Collar Knot Tied | Sleeves Cuffed, Half Tucked, Fully Unbuttoned, Collar Knot Tied |
| Sleeves Cuffed | Half Tucked | Fully Unbuttoned | Collar Popped | Sleeves Cuffed, Half Tucked, Fully Unbuttoned, Collar Popped |
| Sleeves Cuffed | Half Tucked | Fully Unbuttoned | Collar Untied | Sleeves Cuffed, Half Tucked, Fully Unbuttoned, Collar Untied |
| Sleeves Cuffed | Half Tucked | Fully Unbuttoned | NA | Sleeves Cuffed, Half Tucked, Fully Unbuttoned |
| Sleeves Cuffed | Half Tucked | NA | Collar Bow Tied | Sleeves Cuffed, Half Tucked, Collar Bow Tied |
| Sleeves Cuffed | Half Tucked | NA | Collar Folded | Sleeves Cuffed, Half Tucked, Collar Folded |
| Sleeves Cuffed | Half Tucked | NA | Collar Knot Tied | Sleeves Cuffed, Half Tucked, Collar Knot Tied |
| Sleeves Cuffed | Half Tucked | NA | Collar Popped | Sleeves Cuffed, Half Tucked, Collar Popped |
| Sleeves Cuffed | Half Tucked | NA | Collar Untied | Sleeves Cuffed, Half Tucked, Collar Untied |
| Sleeves Cuffed | Half Tucked | NA | NA | Sleeves Cuffed, Half Tucked |
| Sleeves Cuffed | Half Tucked | Top & Bottom Unbuttoned | Collar Bow Tied | Sleeves Cuffed, Half Tucked, Top & Bottom Unbuttoned, Collar Bow Tied |
| Sleeves Cuffed | Half Tucked | Top & Bottom Unbuttoned | Collar Folded | Sleeves Cuffed, Half Tucked, Top & Bottom Unbuttoned, Collar Folded |
| Sleeves Cuffed | Half Tucked | Top & Bottom Unbuttoned | Collar Knot Tied | Sleeves Cuffed, Half Tucked, Top & Bottom Unbuttoned, Collar Knot Tied |
| Sleeves Cuffed | Half Tucked | Top & Bottom Unbuttoned | Collar Popped | Sleeves Cuffed, Half Tucked, Top & Bottom Unbuttoned, Collar Popped |
| Sleeves Cuffed | Half Tucked | Top & Bottom Unbuttoned | Collar Untied | Sleeves Cuffed, Half Tucked, Top & Bottom Unbuttoned, Collar Untied |
| Sleeves Cuffed | Half Tucked | Top & Bottom Unbuttoned | NA | Sleeves Cuffed, Half Tucked, Top & Bottom Unbuttoned |
| Sleeves Cuffed | Half Tucked | Top Unbuttoned | Collar Bow Tied | Sleeves Cuffed, Half Tucked, Top Unbuttoned, Collar Bow Tied |
| Sleeves Cuffed | Half Tucked | Top Unbuttoned | Collar Folded | Sleeves Cuffed, Half Tucked, Top Unbuttoned, Collar Folded |
| Sleeves Cuffed | Half Tucked | Top Unbuttoned | Collar Knot Tied | Sleeves Cuffed, Half Tucked, Top Unbuttoned, Collar Knot Tied |
| Sleeves Cuffed | Half Tucked | Top Unbuttoned | Collar Popped | Sleeves Cuffed, Half Tucked, Top Unbuttoned, Collar Popped |
| Sleeves Cuffed | Half Tucked | Top Unbuttoned | Collar Untied | Sleeves Cuffed, Half Tucked, Top Unbuttoned, Collar Untied |

FIG. 62U

| Sleeves Cuffed | Half Tucked | Top Unbuttoned | NA | Sleeves Cuffed, Half Tucked, Top Unbuttoned |
|---|---|---|---|---|
| Sleeves Cuffed | Tucked | Bottom Unbuttoned | Collar Bow Tied | Sleeves Cuffed, Tucked, Bottom Unbuttoned, Collar Bow Tied |
| Sleeves Cuffed | Tucked | Bottom Unbuttoned | Collar Folded | Sleeves Cuffed, Tucked, Bottom Unbuttoned, Collar Folded |
| Sleeves Cuffed | Tucked | Bottom Unbuttoned | Collar Knot Tied | Sleeves Cuffed, Tucked, Bottom Unbuttoned, Collar Knot Tied |
| Sleeves Cuffed | Tucked | Bottom Unbuttoned | Collar Popped | Sleeves Cuffed, Tucked, Bottom Unbuttoned, Collar Popped |
| Sleeves Cuffed | Tucked | Bottom Unbuttoned | Collar Untied | Sleeves Cuffed, Tucked, Bottom Unbuttoned, Collar Untied |
| Sleeves Cuffed | Tucked | Bottom Unbuttoned | NA | Sleeves Cuffed, Tucked, Bottom Unbuttoned |
| Sleeves Cuffed | Tucked | Deep Unbuttoned | Collar Bow Tied | Sleeves Cuffed, Tucked, Deep Unbuttoned, Collar Bow Tied |
| Sleeves Cuffed | Tucked | Deep Unbuttoned | Collar Folded | Sleeves Cuffed, Tucked, Deep Unbuttoned, Collar Folded |
| Sleeves Cuffed | Tucked | Deep Unbuttoned | Collar Knot Tied | Sleeves Cuffed, Tucked, Deep Unbuttoned, Collar Knot Tied |
| Sleeves Cuffed | Tucked | Deep Unbuttoned | Collar Popped | Sleeves Cuffed, Tucked, Deep Unbuttoned, Collar Popped |
| Sleeves Cuffed | Tucked | Deep Unbuttoned | Collar Untied | Sleeves Cuffed, Tucked, Deep Unbuttoned, Collar Untied |
| Sleeves Cuffed | Tucked | Deep Unbuttoned | NA | Sleeves Cuffed, Tucked, Deep Unbuttoned |
| Sleeves Cuffed | Tucked | Fully Buttoned | Collar Bow Tied | Sleeves Cuffed, Tucked, Fully Buttoned, Collar Bow Tied |
| Sleeves Cuffed | Tucked | Fully Buttoned | Collar Folded | Sleeves Cuffed, Tucked, Fully Buttoned, Collar Folded |
| Sleeves Cuffed | Tucked | Fully Buttoned | Collar Knot Tied | Sleeves Cuffed, Tucked, Fully Buttoned, Collar Knot Tied |
| Sleeves Cuffed | Tucked | Fully Buttoned | Collar Popped | Sleeves Cuffed, Tucked, Fully Buttoned, Collar Popped |
| Sleeves Cuffed | Tucked | Fully Buttoned | Collar Untied | Sleeves Cuffed, Tucked, Fully Buttoned, Collar Untied |
| Sleeves Cuffed | Tucked | Fully Buttoned | NA | Sleeves Cuffed, Tucked, Fully Buttoned |
| Sleeves Cuffed | Tucked | Fully Unbuttoned | Collar Bow Tied | Sleeves Cuffed, Tucked, Fully Unbuttoned, Collar Bow Tied |
| Sleeves Cuffed | Tucked | Fully Unbuttoned | Collar Folded | Sleeves Cuffed, Tucked, Fully Unbuttoned, Collar Folded |
| Sleeves Cuffed | Tucked | Fully Unbuttoned | Collar Knot Tied | Sleeves Cuffed, Tucked, Fully Unbuttoned, Collar Knot Tied |
| Sleeves Cuffed | Tucked | Fully Unbuttoned | Collar Popped | Sleeves Cuffed, Tucked, Fully Unbuttoned, Collar Popped |
| Sleeves Cuffed | Tucked | Fully Unbuttoned | Collar Untied | Sleeves Cuffed, Tucked, Fully Unbuttoned, Collar Untied |
| Sleeves Cuffed | Tucked | Fully Unbuttoned | NA | Sleeves Cuffed, Tucked, Fully Unbuttoned |
| Sleeves Cuffed | Tucked | NA | Collar Bow Tied | Sleeves Cuffed, Tucked, Collar Bow Tied |
| Sleeves Cuffed | Tucked | NA | Collar Folded | Sleeves Cuffed, Tucked, Collar Folded |
| Sleeves Cuffed | Tucked | NA | Collar Knot Tied | Sleeves Cuffed, Tucked, Collar Knot Tied |

FIG. 62V

| | | | |
|---|---|---|---|
| Sleeves Cuffed | Tucked | NA | Collar Popped |
| Sleeves Cuffed | Tucked | NA | Collar Untied |
| Sleeves Cuffed | Tucked | NA | NA |
| Sleeves Cuffed | Tucked | Top & Bottom Unbuttoned | Collar Bow Tied |
| Sleeves Cuffed | Tucked | Top & Bottom Unbuttoned | Collar Folded |
| Sleeves Cuffed | Tucked | Top & Bottom Unbuttoned | Collar Knot Tied |
| Sleeves Cuffed | Tucked | Top & Bottom Unbuttoned | Collar Popped |
| Sleeves Cuffed | Tucked | Top & Bottom Unbuttoned | Collar Untied |
| Sleeves Cuffed | Tucked | Top & Bottom Unbuttoned | NA |
| Sleeves Cuffed | Tucked | Top Unbuttoned | Collar Bow Tied |
| Sleeves Cuffed | Tucked | Top Unbuttoned | Collar Folded |
| Sleeves Cuffed | Tucked | Top Unbuttoned | Collar Knot Tied |
| Sleeves Cuffed | Tucked | Top Unbuttoned | Collar Popped |
| Sleeves Cuffed | Tucked | Top Unbuttoned | Collar Untied |
| Sleeves Cuffed | Tucked | Top Unbuttoned | NA |
| Sleeves Cuffed | Untucked | Bottom Unbuttoned | Collar Bow Tied |
| Sleeves Cuffed | Untucked | Bottom Unbuttoned | Collar Folded |
| Sleeves Cuffed | Untucked | Bottom Unbuttoned | Collar Knot Tied |
| Sleeves Cuffed | Untucked | Bottom Unbuttoned | Collar Popped |
| Sleeves Cuffed | Untucked | Bottom Unbuttoned | Collar Untied |
| Sleeves Cuffed | Untucked | Bottom Unbuttoned | NA |
| Sleeves Cuffed | Untucked | Deep Unbuttoned | Collar Bow Tied |
| Sleeves Cuffed | Untucked | Deep Unbuttoned | Collar Folded |
| Sleeves Cuffed | Untucked | Deep Unbuttoned | Collar Knot Tied |
| Sleeves Cuffed | Untucked | Deep Unbuttoned | Collar Popped |
| Sleeves Cuffed | Untucked | Deep Unbuttoned | Collar Untied |
| Sleeves Cuffed | Untucked | Deep Unbuttoned | NA |
| Sleeves Cuffed | Untucked | Fully Buttoned | Collar Bow Tied |

| |
|---|
| Sleeves Cuffed, Tucked, Collar Popped |
| Sleeves Cuffed, Tucked, Collar Untied |
| Sleeves Cuffed, Tucked |
| Sleeves Cuffed, Tucked, Top & Bottom Unbuttoned, Collar Bow Tied |
| Sleeves Cuffed, Tucked, Top & Bottom Unbuttoned, Collar Folded |
| Sleeves Cuffed, Tucked, Top & Bottom Unbuttoned, Collar Knot Tied |
| Sleeves Cuffed, Tucked, Top & Bottom Unbuttoned, Collar Popped |
| Sleeves Cuffed, Tucked, Top & Bottom Unbuttoned, Collar Untied |
| Sleeves Cuffed, Tucked, Top & Bottom Unbuttoned |
| Sleeves Cuffed, Tucked, Top Unbuttoned, Collar Bow Tied |
| Sleeves Cuffed, Tucked, Top Unbuttoned, Collar Folded |
| Sleeves Cuffed, Tucked, Top Unbuttoned, Collar Knot Tied |
| Sleeves Cuffed, Tucked, Top Unbuttoned, Collar Popped |
| Sleeves Cuffed, Tucked, Top Unbuttoned, Collar Untied |
| Sleeves Cuffed, Tucked, Top Unbuttoned |
| Sleeves Cuffed, Untucked, Bottom Unbuttoned, Collar Bow Tied |
| Sleeves Cuffed, Untucked, Bottom Unbuttoned, Collar Folded |
| Sleeves Cuffed, Untucked, Bottom Unbuttoned, Collar Knot Tied |
| Sleeves Cuffed, Untucked, Bottom Unbuttoned, Collar Popped |
| Sleeves Cuffed, Untucked, Bottom Unbuttoned, Collar Untied |
| Sleeves Cuffed, Untucked, Bottom Unbuttoned |
| Sleeves Cuffed, Untucked, Deep Unbuttoned, Collar Bow Tied |
| Sleeves Cuffed, Untucked, Deep Unbuttoned, Collar Folded |
| Sleeves Cuffed, Untucked, Deep Unbuttoned, Collar Knot Tied |
| Sleeves Cuffed, Untucked, Deep Unbuttoned, Collar Popped |
| Sleeves Cuffed, Untucked, Deep Unbuttoned, Collar Untied |
| Sleeves Cuffed, Untucked, Deep Unbuttoned |
| Sleeves Cuffed, Untucked, Fully Buttoned, Collar Bow Tied |

FIG. 62W

| Sleeves | Tucked | Buttoned | Collar | Combined |
|---|---|---|---|---|
| Sleeves Cuffed | Untucked | Fully Buttoned | Collar Folded | Sleeves Cuffed, Untucked, Fully Buttoned, Collar Folded |
| Sleeves Cuffed | Untucked | Fully Buttoned | Collar Knot Tied | Sleeves Cuffed, Untucked, Fully Buttoned, Collar Knot Tied |
| Sleeves Cuffed | Untucked | Fully Buttoned | Collar Popped | Sleeves Cuffed, Untucked, Fully Buttoned, Collar Popped |
| Sleeves Cuffed | Untucked | Fully Buttoned | Collar Untied | Sleeves Cuffed, Untucked, Fully Buttoned, Collar Untied |
| Sleeves Cuffed | Untucked | Fully Buttoned | NA | Sleeves Cuffed, Untucked, Fully Buttoned |
| Sleeves Cuffed | Untucked | Fully Unbuttoned | Collar Bow Tied | Sleeves Cuffed, Untucked, Fully Unbuttoned, Collar Bow Tied |
| Sleeves Cuffed | Untucked | Fully Unbuttoned | Collar Folded | Sleeves Cuffed, Untucked, Fully Unbuttoned, Collar Folded |
| Sleeves Cuffed | Untucked | Fully Unbuttoned | Collar Knot Tied | Sleeves Cuffed, Untucked, Fully Unbuttoned, Collar Knot Tied |
| Sleeves Cuffed | Untucked | Fully Unbuttoned | Collar Popped | Sleeves Cuffed, Untucked, Fully Unbuttoned, Collar Popped |
| Sleeves Cuffed | Untucked | Fully Unbuttoned | Collar Untied | Sleeves Cuffed, Untucked, Fully Unbuttoned, Collar Untied |
| Sleeves Cuffed | Untucked | Fully Unbuttoned | NA | Sleeves Cuffed, Untucked, Fully Unbuttoned |
| Sleeves Cuffed | Untucked | NA | Collar Bow Tied | Sleeves Cuffed, Untucked, Collar Bow Tied |
| Sleeves Cuffed | Untucked | NA | Collar Folded | Sleeves Cuffed, Untucked, Collar Folded |
| Sleeves Cuffed | Untucked | NA | Collar Knot Tied | Sleeves Cuffed, Untucked, Collar Knot Tied |
| Sleeves Cuffed | Untucked | NA | Collar Popped | Sleeves Cuffed, Untucked, Collar Popped |
| Sleeves Cuffed | Untucked | NA | Collar Untied | Sleeves Cuffed, Untucked, Collar Untied |
| Sleeves Cuffed | Untucked | NA | NA | Sleeves Cuffed, Untucked |
| Sleeves Cuffed | Untucked | Top & Bottom Unbuttoned | Collar Bow Tied | Sleeves Cuffed, Untucked, Top & Bottom Unbuttoned, Collar Bow Tied |
| Sleeves Cuffed | Untucked | Top & Bottom Unbuttoned | Collar Folded | Sleeves Cuffed, Untucked, Top & Bottom Unbuttoned, Collar Folded |
| Sleeves Cuffed | Untucked | Top & Bottom Unbuttoned | Collar Knot Tied | Sleeves Cuffed, Untucked, Top & Bottom Unbuttoned, Collar Knot Tied |
| Sleeves Cuffed | Untucked | Top & Bottom Unbuttoned | Collar Popped | Sleeves Cuffed, Untucked, Top & Bottom Unbuttoned, Collar Popped |
| Sleeves Cuffed | Untucked | Top & Bottom Unbuttoned | Collar Untied | Sleeves Cuffed, Untucked, Top & Bottom Unbuttoned, Collar Untied |
| Sleeves Cuffed | Untucked | Top & Bottom Unbuttoned | NA | Sleeves Cuffed, Untucked, Top & Bottom Unbuttoned |
| Sleeves Cuffed | Untucked | Top Unbuttoned | Collar Bow Tied | Sleeves Cuffed, Untucked, Top Unbuttoned, Collar Bow Tied |
| Sleeves Cuffed | Untucked | Top Unbuttoned | Collar Folded | Sleeves Cuffed, Untucked, Top Unbuttoned, Collar Folded |
| Sleeves Cuffed | Untucked | Top Unbuttoned | Collar Knot Tied | Sleeves Cuffed, Untucked, Top Unbuttoned, Collar Knot Tied |
| Sleeves Cuffed | Untucked | Top Unbuttoned | Collar Popped | Sleeves Cuffed, Untucked, Top Unbuttoned, Collar Popped |
| Sleeves Cuffed | Untucked | Top Unbuttoned | Collar Untied | Sleeves Cuffed, Untucked, Top Unbuttoned, Collar Untied |

FIG. 62X

| Sleeves Cuffed | Untucked | Top Unbuttoned | | Sleeves Cuffed, Untucked, Top Unbuttoned |
|---|---|---|---|---|
| NA | Front Tucked | Bottom Unbuttoned | NA | Front Tucked, Bottom Unbuttoned, Collar Bow Tied |
| NA | Front Tucked | Bottom Unbuttoned | Collar Bow Tied | Front Tucked, Bottom Unbuttoned, Collar Folded |
| NA | Front Tucked | Bottom Unbuttoned | Collar Folded | Front Tucked, Bottom Unbuttoned, Collar Knot Tied |
| NA | Front Tucked | Bottom Unbuttoned | Collar Knot Tied | Front Tucked, Bottom Unbuttoned, Collar Popped |
| NA | Front Tucked | Bottom Unbuttoned | Collar Popped | Front Tucked, Bottom Unbuttoned, Collar Untied |
| NA | Front Tucked | Bottom Unbuttoned | Collar Untied | Front Tucked, Bottom Unbuttoned |
| NA | Front Tucked | Deep Unbuttoned | NA | Front Tucked, Deep Unbuttoned, Collar Bow Tied |
| NA | Front Tucked | Deep Unbuttoned | Collar Bow Tied | Front Tucked, Deep Unbuttoned, Collar Folded |
| NA | Front Tucked | Deep Unbuttoned | Collar Folded | Front Tucked, Deep Unbuttoned, Collar Knot Tied |
| NA | Front Tucked | Deep Unbuttoned | Collar Knot Tied | Front Tucked, Deep Unbuttoned, Collar Popped |
| NA | Front Tucked | Deep Unbuttoned | Collar Popped | Front Tucked, Deep Unbuttoned, Collar Untied |
| NA | Front Tucked | Deep Unbuttoned | Collar Untied | Front Tucked, Deep Unbuttoned |
| NA | Front Tucked | Fully Buttoned | NA | Front Tucked, Fully Buttoned, Collar Bow Tied |
| NA | Front Tucked | Fully Buttoned | Collar Bow Tied | Front Tucked, Fully Buttoned, Collar Folded |
| NA | Front Tucked | Fully Buttoned | Collar Folded | Front Tucked, Fully Buttoned, Collar Knot Tied |
| NA | Front Tucked | Fully Buttoned | Collar Knot Tied | Front Tucked, Fully Buttoned, Collar Popped |
| NA | Front Tucked | Fully Buttoned | Collar Popped | Front Tucked, Fully Buttoned, Collar Untied |
| NA | Front Tucked | Fully Buttoned | Collar Untied | Front Tucked, Fully Buttoned |
| NA | Front Tucked | Fully Unbuttoned | NA | Front Tucked, Fully Unbuttoned, Collar Bow Tied |
| NA | Front Tucked | Fully Unbuttoned | Collar Bow Tied | Front Tucked, Fully Unbuttoned, Collar Folded |
| NA | Front Tucked | Fully Unbuttoned | Collar Folded | Front Tucked, Fully Unbuttoned, Collar Knot Tied |
| NA | Front Tucked | Fully Unbuttoned | Collar Knot Tied | Front Tucked, Fully Unbuttoned, Collar Popped |
| NA | Front Tucked | Fully Unbuttoned | Collar Popped | Front Tucked, Fully Unbuttoned, Collar Untied |
| NA | Front Tucked | Fully Unbuttoned | Collar Untied | Front Tucked, Fully Unbuttoned |
| NA | Front Tucked | NA | Collar Bow Tied | Front Tucked, Collar Bow Tied |
| NA | Front Tucked | NA | Collar Folded | Front Tucked, Collar Folded |
| NA | Front Tucked | NA | Collar Knot Tied | Front Tucked, Collar Knot Tied |

FIG. 62Y

| NA | Front Tucked | NA | Collar Popped | Front Tucked, Collar Popped |
|---|---|---|---|---|
| NA | Front Tucked | NA | Collar Unified | Front Tucked, Collar Unified |
| NA | Front Tucked | NA | NA | Front Tucked |
| NA | Front Tucked | Top & Bottom Unbuttoned | Collar Bow Tied | Front Tucked, Top & Bottom Unbuttoned, Collar Bow Tied |
| NA | Front Tucked | Top & Bottom Unbuttoned | Collar Folded | Front Tucked, Top & Bottom Unbuttoned, Collar Folded |
| NA | Front Tucked | Top & Bottom Unbuttoned | Collar Knot Tied | Front Tucked, Top & Bottom Unbuttoned, Collar Knot Tied |
| NA | Front Tucked | Top & Bottom Unbuttoned | Collar Popped | Front Tucked, Top & Bottom Unbuttoned, Collar Popped |
| NA | Front Tucked | Top & Bottom Unbuttoned | Collar Unified | Front Tucked, Top & Bottom Unbuttoned, Collar Unified |
| NA | Front Tucked | Top & Bottom Unbuttoned | NA | Front Tucked, Top & Bottom Unbuttoned |
| NA | Front Tucked | Top Unbuttoned | Collar Bow Tied | Front Tucked, Top Unbuttoned, Collar Bow Tied |
| NA | Front Tucked | Top Unbuttoned | Collar Folded | Front Tucked, Top Unbuttoned, Collar Folded |
| NA | Front Tucked | Top Unbuttoned | Collar Knot Tied | Front Tucked, Top Unbuttoned, Collar Knot Tied |
| NA | Front Tucked | Top Unbuttoned | Collar Popped | Front Tucked, Top Unbuttoned, Collar Popped |
| NA | Front Tucked | Top Unbuttoned | Collar Unified | Front Tucked, Top Unbuttoned, Collar Unified |
| NA | Front Tucked | Top Unbuttoned | NA | Front Tucked, Top Unbuttoned |
| NA | Half Tucked | Bottom Unbuttoned | Collar Bow Tied | Half Tucked, Bottom Unbuttoned, Collar Bow Tied |
| NA | Half Tucked | Bottom Unbuttoned | Collar Folded | Half Tucked, Bottom Unbuttoned, Collar Folded |
| NA | Half Tucked | Bottom Unbuttoned | Collar Knot Tied | Half Tucked, Bottom Unbuttoned, Collar Knot Tied |
| NA | Half Tucked | Bottom Unbuttoned | Collar Popped | Half Tucked, Bottom Unbuttoned, Collar Popped |
| NA | Half Tucked | Bottom Unbuttoned | Collar Unified | Half Tucked, Bottom Unbuttoned, Collar Unified |
| NA | Half Tucked | Bottom Unbuttoned | NA | Half Tucked, Bottom Unbuttoned |
| NA | Half Tucked | Deep Unbuttoned | Collar Bow Tied | Half Tucked, Deep Unbuttoned, Collar Bow Tied |
| NA | Half Tucked | Deep Unbuttoned | Collar Folded | Half Tucked, Deep Unbuttoned, Collar Folded |
| NA | Half Tucked | Deep Unbuttoned | Collar Knot Tied | Half Tucked, Deep Unbuttoned, Collar Knot Tied |
| NA | Half Tucked | Deep Unbuttoned | Collar Popped | Half Tucked, Deep Unbuttoned, Collar Popped |
| NA | Half Tucked | Deep Unbuttoned | Collar Unified | Half Tucked, Deep Unbuttoned, Collar Unified |
| NA | Half Tucked | Deep Unbuttoned | NA | Half Tucked, Deep Unbuttoned |
| NA | Half Tucked | Fully Buttoned | Collar Bow Tied | Half Tucked, Fully Buttoned, Collar Bow Tied |

FIG. 62Z

| | | | | |
|---|---|---|---|---|
| NA | Half Tucked | NA | Collar Folded | Half Tucked, Fully Buttoned, Collar Folded |
| NA | Half Tucked | Fully Buttoned | Collar Knot Tied | Half Tucked, Fully Buttoned, Collar Knot Tied |
| NA | Half Tucked | Fully Buttoned | Collar Popped | Half Tucked, Fully Buttoned, Collar Popped |
| NA | Half Tucked | Fully Buttoned | Collar Untied | Half Tucked, Fully Buttoned, Collar Untied |
| NA | Half Tucked | Fully Buttoned | NA | Half Tucked, Fully Buttoned |
| NA | Half Tucked | Fully Unbuttoned | Collar Bow Tied | Half Tucked, Fully Unbuttoned, Collar Folded |
| NA | Half Tucked | Fully Unbuttoned | Collar Folded | Half Tucked, Fully Unbuttoned, Collar Folded |
| NA | Half Tucked | Fully Unbuttoned | Collar Knot Tied | Half Tucked, Fully Unbuttoned, Collar Knot Tied |
| NA | Half Tucked | Fully Unbuttoned | Collar Popped | Half Tucked, Fully Unbuttoned, Collar Popped |
| NA | Half Tucked | Fully Unbuttoned | Collar Untied | Half Tucked, Fully Unbuttoned, Collar Untied |
| NA | Half Tucked | Fully Unbuttoned | NA | Half Tucked, Fully Unbuttoned |
| NA | Half Tucked | NA | Collar Bow Tied | Half Tucked, Collar Folded |
| NA | Half Tucked | NA | Collar Folded | Half Tucked, Collar Folded |
| NA | Half Tucked | NA | Collar Knot Tied | Half Tucked, Collar Knot Tied |
| NA | Half Tucked | NA | Collar Popped | Half Tucked, Collar Popped |
| NA | Half Tucked | NA | Collar Untied | Half Tucked, Collar Untied |
| NA | Half Tucked | NA | NA | Half Tucked |
| NA | Half Tucked | Top & Bottom Unbuttoned | Collar Bow Tied | Half Tucked, Top & Bottom Unbuttoned, Collar Bow Tied |
| NA | Half Tucked | Top & Bottom Unbuttoned | Collar Folded | Half Tucked, Top & Bottom Unbuttoned, Collar Folded |
| NA | Half Tucked | Top & Bottom Unbuttoned | Collar Knot Tied | Half Tucked, Top & Bottom Unbuttoned, Collar Knot Tied |
| NA | Half Tucked | Top & Bottom Unbuttoned | Collar Popped | Half Tucked, Top & Bottom Unbuttoned, Collar Popped |
| NA | Half Tucked | Top & Bottom Unbuttoned | Collar Untied | Half Tucked, Top & Bottom Unbuttoned, Collar Untied |
| NA | Half Tucked | Top & Bottom Unbuttoned | NA | Half Tucked, Top & Bottom Unbuttoned |
| NA | Half Tucked | Top Unbuttoned | Collar Bow Tied | Half Tucked, Top Unbuttoned, Collar Bow Tied |
| NA | Half Tucked | Top Unbuttoned | Collar Folded | Half Tucked, Top Unbuttoned, Collar Folded |
| NA | Half Tucked | Top Unbuttoned | Collar Knot Tied | Half Tucked, Top Unbuttoned, Collar Knot Tied |
| NA | Half Tucked | Top Unbuttoned | Collar Popped | Half Tucked, Top Unbuttoned, Collar Popped |
| NA | Half Tucked | Top Unbuttoned | Collar Untied | Half Tucked, Top Unbuttoned, Collar Untied |

FIG. 62AA

| | Half Tucked | Top Unbuttoned | NA | Half Tucked, Top Unbuttoned |
|---|---|---|---|---|
| NA | Tucked | Bottom Unbuttoned | Collar Bow Tied | Tucked, Bottom Unbuttoned, Collar Bow Tied |
| NA | Tucked | Bottom Unbuttoned | Collar Folded | Tucked, Bottom Unbuttoned, Collar Folded |
| NA | Tucked | Bottom Unbuttoned | Collar Knot Tied | Tucked, Bottom Unbuttoned, Collar Knot Tied |
| NA | Tucked | Bottom Unbuttoned | Collar Popped | Tucked, Bottom Unbuttoned, Collar Popped |
| NA | Tucked | Bottom Unbuttoned | Collar Untied | Tucked, Bottom Unbuttoned, Collar Untied |
| NA | Tucked | Bottom Unbuttoned | NA | Tucked, Bottom Unbuttoned |
| NA | Tucked | Deep Unbuttoned | Collar Bow Tied | Tucked, Deep Unbuttoned, Collar Bow Tied |
| NA | Tucked | Deep Unbuttoned | Collar Folded | Tucked, Deep Unbuttoned, Collar Folded |
| NA | Tucked | Deep Unbuttoned | Collar Knot Tied | Tucked, Deep Unbuttoned, Collar Knot Tied |
| NA | Tucked | Deep Unbuttoned | Collar Popped | Tucked, Deep Unbuttoned, Collar Popped |
| NA | Tucked | Deep Unbuttoned | Collar Untied | Tucked, Deep Unbuttoned, Collar Untied |
| NA | Tucked | Deep Unbuttoned | NA | Tucked, Deep Unbuttoned |
| NA | Tucked | Fully Buttoned | Collar Bow Tied | Tucked, Fully Buttoned, Collar Bow Tied |
| NA | Tucked | Fully Buttoned | Collar Folded | Tucked, Fully Buttoned, Collar Folded |
| NA | Tucked | Fully Buttoned | Collar Knot Tied | Tucked, Fully Buttoned, Collar Knot Tied |
| NA | Tucked | Fully Buttoned | Collar Popped | Tucked, Fully Buttoned, Collar Popped |
| NA | Tucked | Fully Buttoned | Collar Untied | Tucked, Fully Buttoned, Collar Untied |
| NA | Tucked | Fully Buttoned | NA | Tucked, Fully Buttoned |
| NA | Tucked | Fully Unbuttoned | Collar Bow Tied | Tucked, Fully Unbuttoned, Collar Bow Tied |
| NA | Tucked | Fully Unbuttoned | Collar Folded | Tucked, Fully Unbuttoned, Collar Folded |
| NA | Tucked | Fully Unbuttoned | Collar Knot Tied | Tucked, Fully Unbuttoned, Collar Knot Tied |
| NA | Tucked | Fully Unbuttoned | Collar Popped | Tucked, Fully Unbuttoned, Collar Popped |
| NA | Tucked | Fully Unbuttoned | Collar Untied | Tucked, Fully Unbuttoned, Collar Untied |
| NA | Tucked | Fully Unbuttoned | NA | Tucked, Fully Unbuttoned |
| NA | Tucked | NA | Collar Bow Tied | Tucked, Collar Bow Tied |
| NA | Tucked | NA | Collar Folded | Tucked, Collar Folded |
| NA | Tucked | NA | Collar Knot Tied | Tucked, Collar Knot Tied |

FIG. 62AB

| | | | |
|---|---|---|---|
| NA | Tucked | NA | Tucked, Collar Popped |
| NA | Tucked | NA | Tucked, Collar Untied |
| NA | Tucked | NA | Tucked |
| NA | Tucked | Top & Bottom Unbuttoned | Tucked, Top & Bottom Unbuttoned, Collar Bow Tied |
| NA | Tucked | Top & Bottom Unbuttoned | Tucked, Top & Bottom Unbuttoned, Collar Folded |
| NA | Tucked | Top & Bottom Unbuttoned | Tucked, Top & Bottom Unbuttoned, Collar Knot Tied |
| NA | Tucked | Top & Bottom Unbuttoned | Tucked, Top & Bottom Unbuttoned, Collar Popped |
| NA | Tucked | Top & Bottom Unbuttoned | Tucked, Top & Bottom Unbuttoned, Collar Untied |
| NA | Tucked | Top & Bottom Unbuttoned | Tucked, Top & Bottom Unbuttoned |
| NA | Tucked | Top Unbuttoned | Tucked, Top Unbuttoned, Collar Bow Tied |
| NA | Tucked | Top Unbuttoned | Tucked, Top Unbuttoned, Collar Folded |
| NA | Tucked | Top Unbuttoned | Tucked, Top Unbuttoned, Collar Knot Tied |
| NA | Tucked | Top Unbuttoned | Tucked, Top Unbuttoned, Collar Popped |
| NA | Tucked | Top Unbuttoned | Tucked, Top Unbuttoned, Collar Untied |
| NA | Tucked | Top Unbuttoned | Tucked, Top Unbuttoned |
| NA | Untucked | Bottom Unbuttoned | Untucked, Bottom Unbuttoned, Collar Bow Tied |
| NA | Untucked | Bottom Unbuttoned | Untucked, Bottom Unbuttoned, Collar Folded |
| NA | Untucked | Bottom Unbuttoned | Untucked, Bottom Unbuttoned, Collar Knot Tied |
| NA | Untucked | Bottom Unbuttoned | Untucked, Bottom Unbuttoned, Collar Popped |
| NA | Untucked | Bottom Unbuttoned | Untucked, Bottom Unbuttoned, Collar Untied |
| NA | Untucked | Bottom Unbuttoned | Untucked, Bottom Unbuttoned |
| NA | Untucked | Deep Unbuttoned | Untucked, Deep Unbuttoned, Collar Bow Tied |
| NA | Untucked | Deep Unbuttoned | Untucked, Deep Unbuttoned, Collar Folded |
| NA | Untucked | Deep Unbuttoned | Untucked, Deep Unbuttoned, Collar Knot Tied |
| NA | Untucked | Deep Unbuttoned | Untucked, Deep Unbuttoned, Collar Popped |
| NA | Untucked | Deep Unbuttoned | Untucked, Deep Unbuttoned, Collar Untied |
| NA | Untucked | Deep Unbuttoned | Untucked, Deep Unbuttoned |
| NA | Untucked | Fully Unbuttoned | Untucked, Fully Unbuttoned, Collar Bow Tied |

FIG. 62AC

| | | | |
|---|---|---|---|
| NA | Untucked | Fully Buttoned | Collar Folded | Untucked, Fully Buttoned, Collar Folded |
| NA | Untucked | Fully Buttoned | Collar Knot Tied | Untucked, Fully Buttoned, Collar Knot Tied |
| NA | Untucked | Fully Buttoned | Collar Popped | Untucked, Fully Buttoned, Collar Popped |
| NA | Untucked | Fully Buttoned | Collar Untied | Untucked, Fully Buttoned, Collar Untied |
| NA | Untucked | Fully Buttoned | NA | Untucked, Fully Buttoned |
| NA | Untucked | Fully Unbuttoned | Collar Bow Tied | Untucked, Fully Unbuttoned, Collar Bow Tied |
| NA | Untucked | Fully Unbuttoned | Collar Folded | Untucked, Fully Unbuttoned, Collar Folded |
| NA | Untucked | Fully Unbuttoned | Collar Knot Tied | Untucked, Fully Unbuttoned, Collar Knot Tied |
| NA | Untucked | Fully Unbuttoned | Collar Popped | Untucked, Fully Unbuttoned, Collar Popped |
| NA | Untucked | Fully Unbuttoned | Collar Untied | Untucked, Fully Unbuttoned, Collar Untied |
| NA | Untucked | Fully Unbuttoned | NA | Untucked, Fully Unbuttoned |
| NA | Untucked | NA | Collar Bow Tied | Untucked, Collar Bow Tied |
| NA | Untucked | NA | Collar Folded | Untucked, Collar Folded |
| NA | Untucked | NA | Collar Knot Tied | Untucked, Collar Knot Tied |
| NA | Untucked | NA | Collar Popped | Untucked, Collar Popped |
| NA | Untucked | NA | Collar Untied | Untucked, Collar Untied |
| NA | Untucked | NA | NA | Untucked |
| NA | Untucked | Top & Bottom Unbuttoned | Collar Bow Tied | Untucked, Top & Bottom Unbuttoned, Collar Bow Tied |
| NA | Untucked | Top & Bottom Unbuttoned | Collar Folded | Untucked, Top & Bottom Unbuttoned, Collar Folded |
| NA | Untucked | Top & Bottom Unbuttoned | Collar Knot Tied | Untucked, Top & Bottom Unbuttoned, Collar Knot Tied |
| NA | Untucked | Top & Bottom Unbuttoned | Collar Popped | Untucked, Top & Bottom Unbuttoned, Collar Popped |
| NA | Untucked | Top & Bottom Unbuttoned | Collar Untied | Untucked, Top & Bottom Unbuttoned, Collar Untied |
| NA | Untucked | Top & Bottom Unbuttoned | NA | Untucked, Top & Bottom Unbuttoned |
| NA | Untucked | Top Unbuttoned | Collar Bow Tied | Untucked, Top Unbuttoned, Collar Bow Tied |
| NA | Untucked | Top Unbuttoned | Collar Folded | Untucked, Top Unbuttoned, Collar Folded |
| NA | Untucked | Top Unbuttoned | Collar Knot Tied | Untucked, Top Unbuttoned, Collar Knot Tied |
| NA | Untucked | Top Unbuttoned | Collar Popped | Untucked, Top Unbuttoned, Collar Popped |
| NA | Untucked | Top Unbuttoned | Collar Untied | Untucked, Top Unbuttoned, Collar Untied |

FIG. 62AD

| NA | Untucked | Top Unbuttoned | NA | Untucked, Top Unbuttoned |

FIG. 62AE

| TYPE | STYLING | COMBINATIONS |
|---|---|---|
| Jacket/ Coat Over Shirt | Intended Silhouette | Jacket/ Coat Over Shirt: Intended Silhouette |
| Button Down Over Shirt | Intended Silhouette | Button Down Over Shirt: Intended Silhouette |
| Shirt Over Shirt | Intended Silhouette | Shirt Over Shirt: Intended Silhouette |
| Knitwear Over Shirt | Intended Silhouette | Knitwear Over Shirt: Intended Silhouette |
| Jacket/ Coat Over Shirt | Draped Off Shoulders | Jacket/ Coat Over Shirt: Draped Off Shoulders |
| Button Down Over Shirt | Draped Off Shoulders | Button Down Over Shirt: Draped Off Shoulders |
| Shirt Over Shirt | Draped Off Shoulders | Shirt Over Shirt: Draped Off Shoulders |
| Knitwear Over Shirt | Draped Off Shoulders | Knitwear Over Shirt: Draped Off Shoulders |
| Jacket/ Coat Over Shirt | Tied Around Waist | Jacket/ Coat Over Shirt: Tied Around Waist |
| Button Down Over Shirt | Tied Around Waist | Button Down Over Shirt: Tied Around Waist |
| Shirt Over Shirt | Tied Around Waist | Shirt Over Shirt: Tied Around Waist |
| Knitwear Over Shirt | Tied Around Waist | Knitwear Over Shirt: Tied Around Waist |
| Jacket/ Coat Over Shirt | Tied Around Shoulders | Jacket/ Coat Over Shirt: Tied Around Shoulders |
| Button Down Over Shirt | Tied Around Shoulders | Button Down Over Shirt: Tied Around Shoulders |
| Shirt Over Shirt | Tied Around Shoulders | Shirt Over Shirt: Tied Around Shoulders |
| Knitwear Over Shirt | Tied Around Shoulders | Knitwear Over Shirt: Tied Around Shoulders |
| Jacket/ Coat Over Shirt | Tied Cross Body | Jacket/ Coat Over Shirt: Tied Cross Body |
| Button Down Over Shirt | Tied Cross Body | Button Down Over Shirt: Tied Cross Body |
| Shirt Over Shirt | Tied Cross Body | Shirt Over Shirt: Tied Cross Body |
| Knitwear Over Shirt | Tied Cross Body | Knitwear Over Shirt: Tied Cross Body |
| Jacket/ Coat Over Shirt | Draped Over One Shoulder | Jacket/ Coat Over Shirt: Draped Over One Shoulder |
| Button Down Over Shirt | Draped Over One Shoulder | Button Down Over Shirt: Draped Over One Shoulder |
| Shirt Over Shirt | Draped Over One Shoulder | Shirt Over Shirt: Draped Over One Shoulder |
| Knitwear Over Shirt | Draped Over One Shoulder | Knitwear Over Shirt: Draped Over One Shoulder |

FIG. 63

| TYPE *(Full Length)* ▼↑ | STYLING ▼ | COMBINATIONS |
|---|---|---|
| Jeans | Down | Jeans: Down |
| Jeans | Cuffed | Jeans: Cuffed |
| Jeans | Rolled | Jeans: Rolled |
| Pants | Down | Pants: Down |
| Pants | Cuffed | Pants: Cuffed |

FIG. 64

SYSTEMS AND METHODS FOR USING MACHINE LEARNING MODELS TO EFFECT VIRTUAL TRY-ON AND STYLING ON ACTUAL USERS

CROSS-REFERENCE TO RELATED APPLICATIONS

The present application is a continuation of U.S. patent application Ser. No. 18/217,412, filed Jun. 30, 2023, which claims priority to U.S. Provisional Patent Application No. 63/358,038, filed Jul. 1, 2022, both of which are hereby expressly incorporated by reference herein.

FIELD

The disclosure relates generally to the field of image processing and, more particularly and not by way of limitation, some embodiments are related to image processing systems facilitating online try-on of articles of real-world clothing virtually.

BACKGROUND

The ubiquity of desktop and laptop computers, smart phones, tablet computer and other personal computing devices has enabled has made it commonplace to engage in personal and professional online activities on a daily basis. Because many such devices include cameras, users may capture images or video sequences of themselves or others and use the acquired images, either after editing them or otherwise, in social and commercial interactions.

In the commercial realm, there have been recent attempts to leverage personal computing devices including cameras in online shopping activities by enabling users to be virtually dressed in clothing articles available for online purchase. However, many of these systems have limitations which have impeded their widespread deployment. For example, certain systems require a user to provide views of themselves from a number of different perspectives, which may require the assistance of another person and can be tedious and time consuming. Existing systems are also not known to permit users to select a desired styling of a clothing article (e.g., sleeves rolled up, sleeves below wrist, garment tucked in or untucked, etc.) when virtually trying on the article. Moreover, existing try-on systems are generally incapable of manipulating clothing articles to be tried on to realistically drape or deform clothing on a variety of different user poses.

Accordingly, a need exists for an improved way of virtual try-on and styling of clothing on a user.

SUMMARY

In one example implementation, an embodiment includes systems and methods for virtual try-on and styling of real-world clothing virtually using computer vision and machine learning techniques.

Disclosed are example embodiments of systems and methods for virtual try-on of articles of real-world clothing virtually. An example method of virtual try-on of articles of clothing includes selecting a garment from a pre-existing database. The method also includes loading a photo of a source model wearing the selected garment. Additionally, the method includes generating a semantic segmentation of the model image. The method also includes extracting the selected garment from the photo of the model. Additionally, the method includes determining a correspondence between a target model and the source model by performing a feature point detection and description of the target model and the source model and performing feature matching and correspondence validation. The method also includes performing garment warping and alignment of the extracted garment. Additionally, the method includes overlaying and rendering the garment.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIGS. 15A-15O define an exemplary digital style taxonomy including a plurality of styling combinations conforming to a fashion standard.

FIGS. 16A-16J provide examples of options for the various styling segments included within the styling combination categories of FIGS. 15A-15O.

FIGS. 19A-19G are diagrams illustrating example photos of a photo shoot in accordance with the systems and methods described herein.

FIG. 22 is a diagram related to segmentation in accordance with the systems and methods described herein.

FIGS. 24A-24K are diagrams related to correspondence in accordance with the systems and methods described herein.

FIGS. 27A1-27F are diagrams related to warping in accordance with the systems and methods described herein.

FIGS. 29A-29B are diagrams related to post-processing in accordance with the systems and methods described herein.

FIG. 32 is a table illustrating data requirements in accordance with the systems and methods described herein.

FIG. 35 is a diagram illustrating items blocking one or more articles of clothing in accordance with the systems and methods described herein.

FIG. 38 is a diagram illustrating posing issues in accordance with the systems and methods described herein.

FIG. 39 is a diagram illustrating mobile styler sizes in accordance with the systems and methods described herein.

FIG. 43 is a diagram illustrating mobile styler sizes in accordance with the systems and methods described herein.

FIG. 52 is a diagram illustrating aspects of an example user flow in a virtual try-on system in accordance with the systems and methods described herein.

FIG. 57 is a flow diagram illustrating section 5.0 of the example flow diagram of FIGS. 49A-49D illustrating a user flow in a virtual try-on system in accordance with the systems and methods described herein.

FIG. 58 is a diagram illustrating aspects of an example user flow in a virtual try-on system in accordance with the systems and methods described herein.

FIGS. 62A-62AE forms a diagram illustrating example styling combinations in a virtual try-on system in accordance with the systems and methods described herein.

FIG. 63 is a diagram illustrating example styling combinations in a virtual try-on system in accordance with the systems and methods described herein.

FIG. 64 is a diagram illustrating example styling combinations in a virtual try-on system in accordance with the systems and methods described herein.

Figure 1:
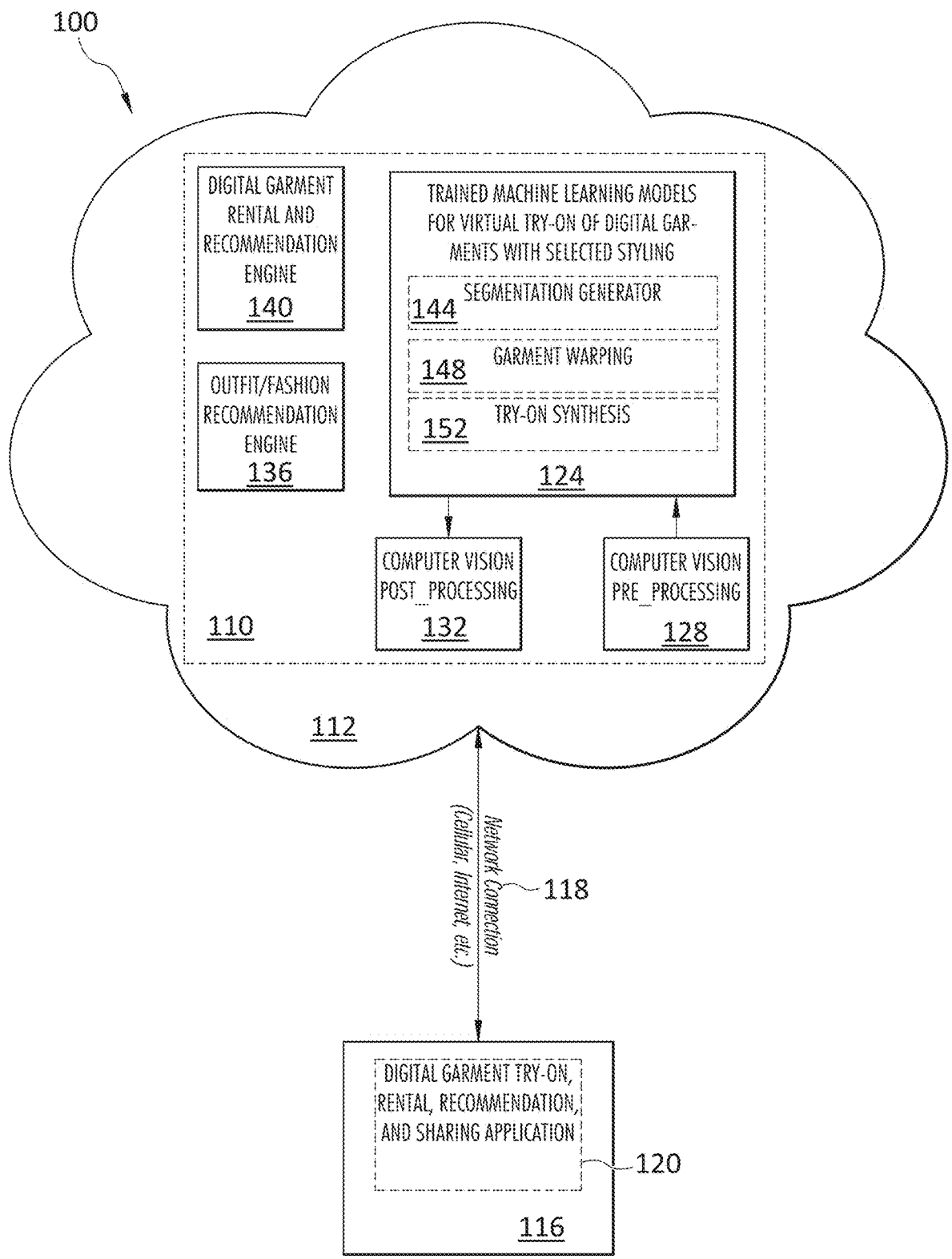
FIG. 1 provides an overview of an exemplary system for virtual try-on and rental of digital garments styled in conformity with a fashion standard using machine learning in accordance with the disclosure.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some embodiments of the systems and methods described herein include a virtual try-on system with enhanced styling capability for clothing and accessories. In some embodiments, the present invention relates to a virtual try-on system that allows users to virtually try on multiple clothing items (and accessories) and provides enhanced styling options. The system may employ advanced computer vision and machine learning and augmented reality technologies to create a realistic and immersive virtual try-on experience. By incorporating styling capabilities, users may be able to personalize and customize their virtual outfits to suit their preferences. The system utilizes an intuitive user interface and a vast database of clothing styles and accessories to provide a seamless and enjoyable virtual shopping experience.

In some embodiments, the virtual try-on system with enhanced styling capability for clothing described herein enables users to visualize and evaluate the appearance of clothing items without physically wearing them. Some example systems and methods may combine state-of-the-art computer vision algorithms, machine learning algorithms, augmented reality techniques, and a vast clothing style database to create a realistic and interactive virtual try-on experience.

In an example embodiment, the virtual try-on process may begin with a user selecting a clothing item from the system's extensive database. The database may include various garments such as tops, bottoms, dresses, jackets, and accessories. Each clothing item may be digitally rendered to accurately represent clothing item's design, color, texture, and fit, and each accessory's design, color, texture, or other attributes of the accessory.

In an example embodiment, once the user selects a clothing item, the system may initiate the virtual try-on process. Using computer vision and machine learning algorithms, the system detects and analyzes the user's body shape, size, and proportions based on images or video input. The algorithms map the user's body onto a virtual model, creating a personalized avatar that accurately represents the user's physique.

In some example embodiments, the selected clothing item may then be dynamically fitted onto the user's virtual avatar. Advanced simulation algorithms account for fabric draping, stretching, and body movement to provide a realistic representation of how the clothing would appear on the user.

An example embodiment may have enhanced styling capabilities. The virtual try-on system may go beyond mere visualization by incorporating enhanced styling capabilities. For example, in some embodiments, users may be able to personalize their virtual outfits by selecting different clothing combinations, adjusting garment parameters (e.g., sleeve length, neckline, top button unbuttoned, multiple unbuttoned buttons, or other styling), and experimenting with color variations. In an example embodiment, the system may allow users to mix and match various clothing items and/or accessories to create unique ensembles. The unique ensembles may be saved for later reference.

Additionally, the system may provide accessory options such as shoes, bags, jewelry, hats, and/or other accessory options, enabling users to complete their virtual outfits with coordinating elements. In some examples, users can preview different accessories on their avatar and evaluate the overall styling effect.

In an example embodiment, user interface and controls may be used to control the systems and methods described herein. In an example embodiment, the virtual try-on system features an intuitive and user-friendly interface that may facilitate easy navigation and customization. Users may interact with the system through a smartphone application, a computer application, a web-based platform, dedicated virtual reality (VR) headsets, or other electronic computing device.

The user interface may provide controls for selecting clothing items, adjusting garment parameters, and exploring styling options. Users can browse through the clothing database, filter items by category, style, color, or brand, and view detailed product descriptions and user reviews.

An example embodiment may include integration with one or more e-commerce platforms. To enhance the shopping experience, the virtual try-on system may seamlessly integrate with e-commerce platforms. Users may be able to directly purchase the clothing items they try on or add them to a Wishlist for future reference. The system provides links to online retailers, allowing users to access additional product information and make informed purchase decisions.

In addition to the core virtual try-on and styling capabilities, the system may include one or more supplementary features. These may include social sharing, e.g., users can share their virtual outfits on social media platforms, allowing friends and followers to provide feedback and suggestions. These may also include body measurement assistance. For example, the system may offer tools to help users accurately measure their body dimensions, ensuring better fitting virtual garments. An example may provide a virtual fitting room. In a virtual fitting room, users may be able to create personalized fitting rooms where they can store and organize their favorite clothing items for easy access during subsequent sessions. The virtual try-on system with enhanced styling capability for clothing described herein revolutionizes the way users interact with fashion in the digital.

In some embodiments, the present disclosure provides a system and method for virtual try-on of, and subscription access to, digital representations of real-world garments with selected styling using machine learning. The present system enables a user to experience online/virtual try-on of unlimited offered styles/articles of virtual clothing (e.g., representing real-world clothing) within a very short time (e.g., 5-10 seconds) following submission of a photo or image of the user. In an exemplary implementation the present system may utilize a first machine learning pipeline to create style-aware datasets based upon a large set of images of garments obtained from, for example, various open source repositories of images, via paid licenses of images, affiliate company's images, or any other sources of images. These style-aware datasets are then used in a second machine learning pipeline, i.e., a try-on/styling pipeline, to train a set of machine learning models. In one implementation these machine learning models include a segmentation generator, a warping model and a try-on synthesis model. During the training process quantitative and potentially qualitative evaluation of performance of the models may be used to infer or otherwise determine checkpoints to be promoted for each model.

Once the segmentation generator, warping model and try-on synthesis model have been trained, the try-on/styling pipeline may be utilized in conjunction with computer vision and machine learning pre-processing and post-processing modules to facilitate virtual try-on of digital garments, e.g., digital representations of real-world garments, styled in accordance with a fashion standard, e.g., a high-fashion standard. In one embodiment the virtual try-on process is initiated when a user application executing on a mobile device sends input information to a server platform (e.g., a cloud-based server or a hosted server) executing the try-on/styling pipeline. This input information may typically include information identifying a ghost image of a selected digital garment, a front facing image of a user desiring to virtually try-on the digital garment, and an indication of a fashion style in which the user desires to "wear" the garment. In accordance with one aspect of the disclosed system the result of the virtual try-on process is an image of the user wearing the digital garment in the user-selected fashion style.

Once the input information is received at the server platform, a computer vision and machine learning pre-processing operation may be performed pursuant to which various checks are made on the image provided by the user (e.g., only 1 person in the image, only certain poses permitted, etc.). Once these checks are performed various pre-processing operations may also be carried out (e.g., remove background and replace it with a white or other uniform background). These pre-processing operations will also include generating all features required by the segmentation generator, the warping model and the try-on synthesis model. The segmentation generator then utilizes a model (checkpoint) to, based on the selected garment and the initial body segmentation determined during pre-processing, predict the target area of the garment in the segmentation. The trained warping model (checkpoint) then deforms the garment based on the predicted segmentation. The trained try-on synthesis model (checkpoint) then executes, based upon styling customizations conforming to, for example, a high-fashion standard, or some other standard, the predicted segmentation, and the warped garment, transfer of a fashion styled garment to a cloth agnostic representation of the user. This results in a live generated image of the user wearing, in the user-selected style and/or styled look, the fashion styled digital garment in a pose identified from the user's input image in a very short time (e.g., 5 to 10 seconds).

In one embodiment post-processing of the generated image is employed to improve the generated machine learning output and to detect if the generated image is of sufficient quality to be returned to the user. For example, the generated image may be evaluated to determine if the image features are not within a distribution of images having styling features corresponding to a particular category of a digital styling taxonomy. The post-processing may also include, for example, performing segmentation and computing body part proportions. Other post-processing may include performing pose detection and identifying any anomalous poses or body configurations (e.g., 3 arms, 2 heads. 3 legs, and so on).

Attention is now directed to FIG. 1, which provides an overview of an exemplary system 100 for virtual try-on of a digital representation of a real-world garment and rental of garments styled in conformity with a fashion standard in accordance with the disclosure. System 100 includes a digital garment virtual try-on and rental platform 110 in communication with a mobile device 116 over a network connection 118, which may include multiple wireless and/or wired networks. The mobile device 116 executes a user application 120 which, in cooperation with platform 110, facilitates digital garment try-on and rental in accordance with the disclosure. In certain embodiments the user application 120 is also configured to support providing fashion styling recommendations, e.g., high-fashion styling recommendations, to a user of the mobile device 116 and to enable the sharing of images of the user wearing digital garments styled in conformity with the fashion standard.

In one embodiment platform 110 may be implemented using "cloud" computing capabilities 112. As is known, cloud computing may be characterized as a model for facilitating on-demand network access to a shared pool of configurable computing resources (e.g., networks, servers, storage, applications, and services) that can be rapidly provisioned and released with minimal management effort or service provider interaction. Cloud systems tend to automatically control resource use by utilizing some form of metering capability with respect to, for example, storage, processing, bandwidth, and active user accounts. Various cloud service models are possible, including cloud software as a service (SaaS), cloud platform as a service (PaaS), and cloud infrastructure as a service (laaS).

In other embodiments platform 110 may be implemented by using on-premises servers and other infrastructure rather than by using cloud-based services. Alternatively, hybrid implementations of the attribution computation platform 110 including a combination of on-premises and cloud-based infrastructure are also within the scope of the present disclosure.

As shown in FIG. 1, platform 110 includes a set of machine learning models 124 for enabling virtual try-on of digital representations of real-world garments styled in conformity with a fashion standard. The machine learning models 124, which may be trained in the manner described hereinafter, include a segmentation generator 144, a garment warping model 148, and a try-on synthesis model 152. Once trained, the machine-learning models 124 are provided with input images received by a computer vision and machine learning pre-processing module 128 from the user application 120 of the mobile device 116. As is discussed below, the pre-processing module 128 performs various checks on the received input images and executes various pre-processing operations, including generating features from the input images which are used by the machine learning models 124.

Based upon the pre-processed input image information generated by the computer vision and machine learning pre-processing module 128, the trained machine learning models 124 generate an image of a user wearing, in a user-selected style, a user-specified digital garment, e.g., a digital representation of a real-world garment, in a pose identified from the input image provided to the user application 120. A computer vision and machine learning post-processing module 132 is configured to post-process the image generated by the machine learning models 124 in order to, for example, detect if the generated image is of sufficient quality to be returned to the user of the mobile device 116. For example, the generated image may be evaluated by the post-processing module 132 in order to determine if the image features are not within a distribution of the images used during the machine learning training process. In certain embodiments the post-processing module 132 may be configured to perform other post-processing operations of the type described hereinafter.

As indicated above, given a front facing image of a user of the application 120 and a garment image specified the user via the application 120, the machine learning models 124 executed by the platform 110 synthesize a new image of the user wearing the target garment. In one embodiment the pipeline implemented by the machine learning models 124 does not alter the person's pose, the body shape or the person's identity. Users instead are, in some embodiments, encouraged to upload several various solo images of themselves in various different poses, hair styles, hats/headwear etc. via application 120 to allow them the option to garment transfer on to various different looks of themselves. In addition, the virtual try-on experience supports different styling options associated with a fashion standard to apply on the user-selected target garment; for example, the styling options for a target garment in the form of a blouse or shirt could include sleeves pushed up, sleeves cuffed, bodice tucked in, and so on, as contemplated by the fashion standard. As is discussed below, the available styles of the target garment may be defined within a digital styling taxonomy comporting with a fashion standard. To enable the machine learning models 124 to facilitate this style-aware virtual try-on process a set of style-aware garment datasets are generated in the manner described hereinafter. These style-aware datasets may then be utilized in a subsequent machine learning training process.

Figure 16A:
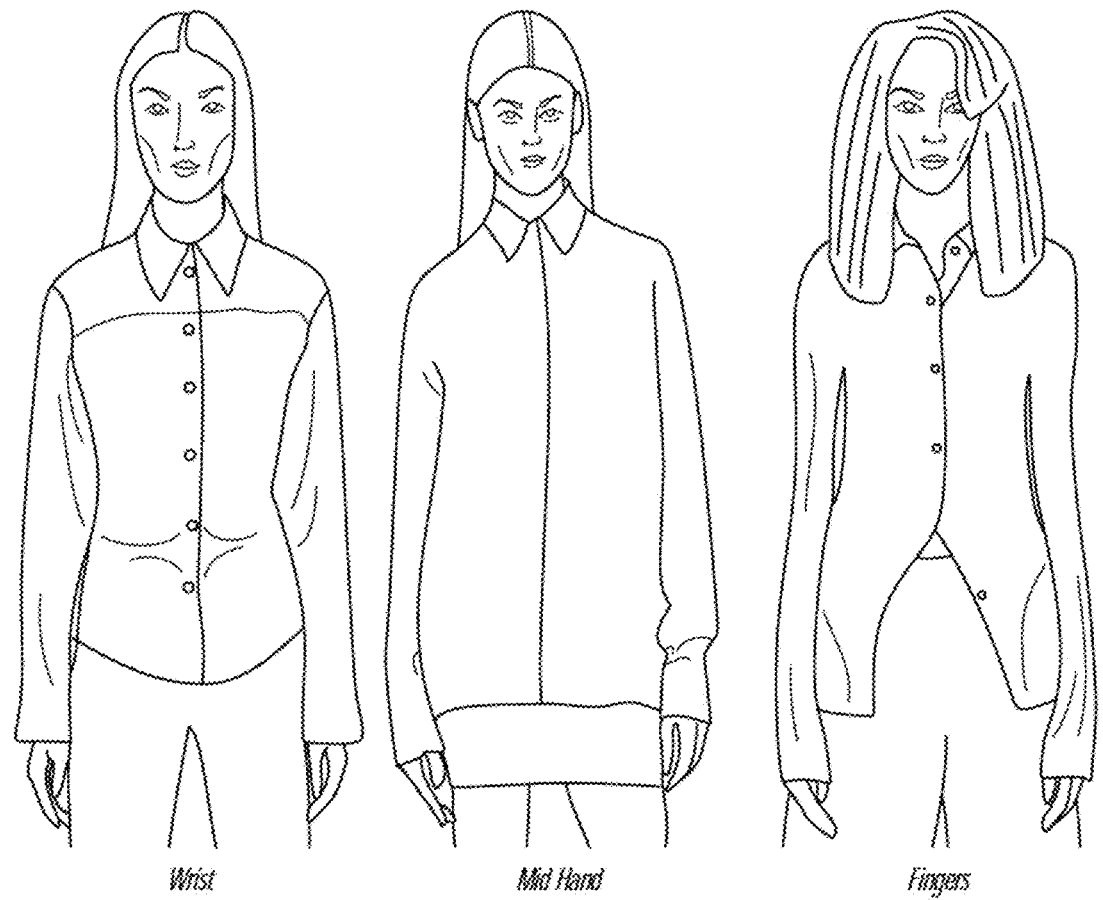
Figure 16B:
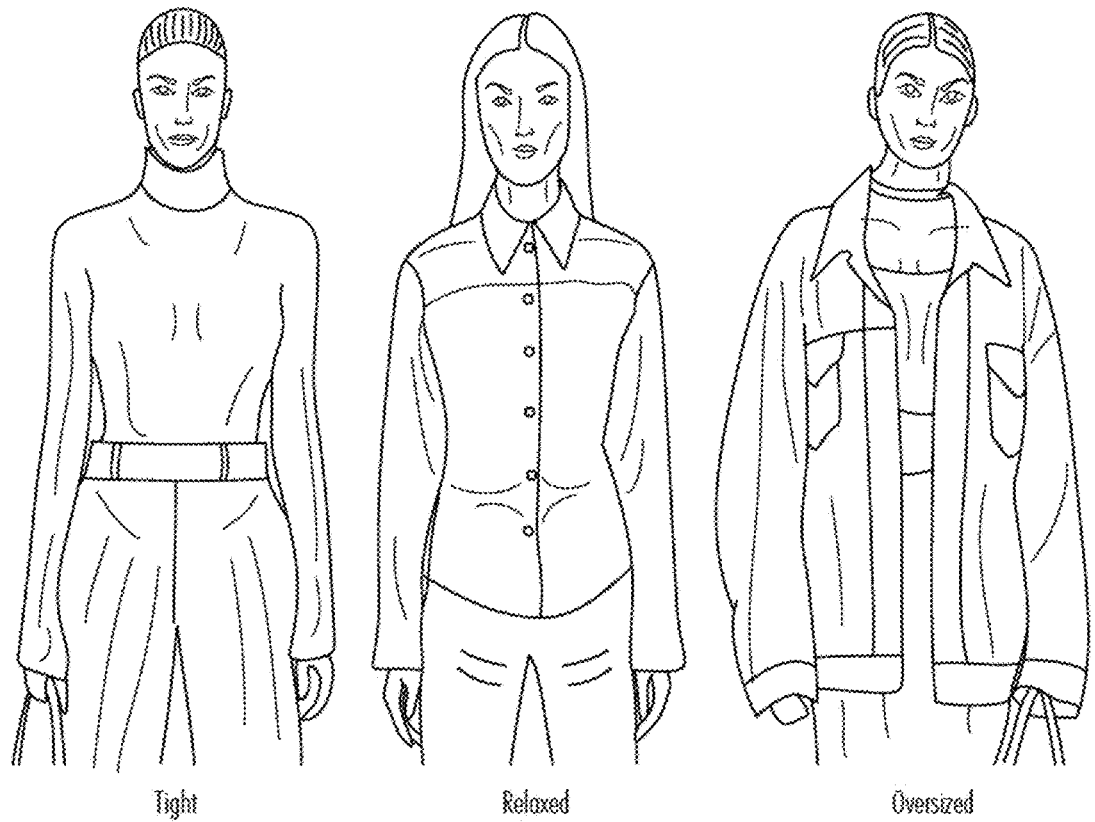
Figure 16D:
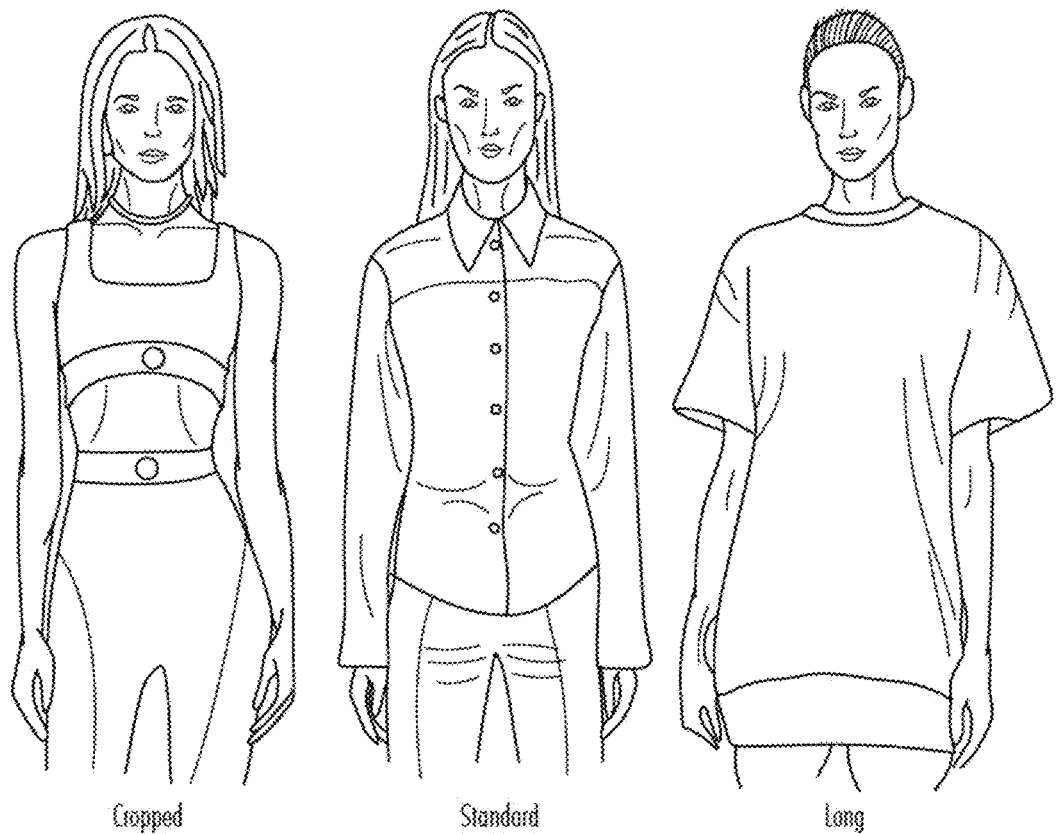
Figure 16E:
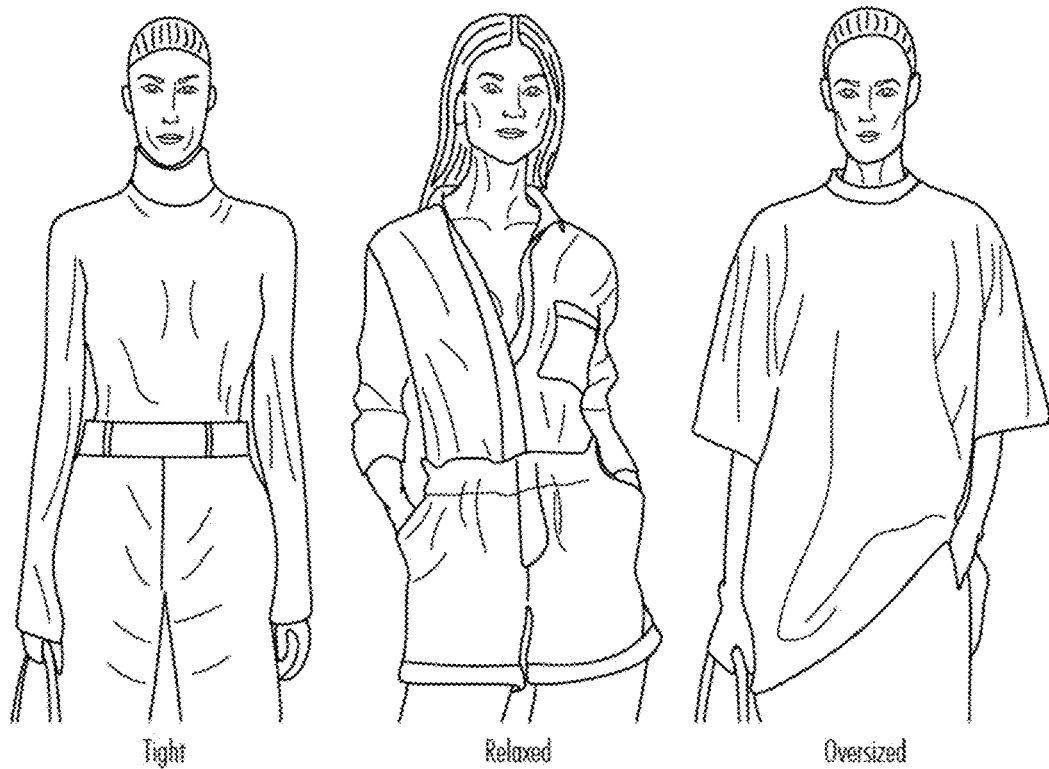
Figure 16F:
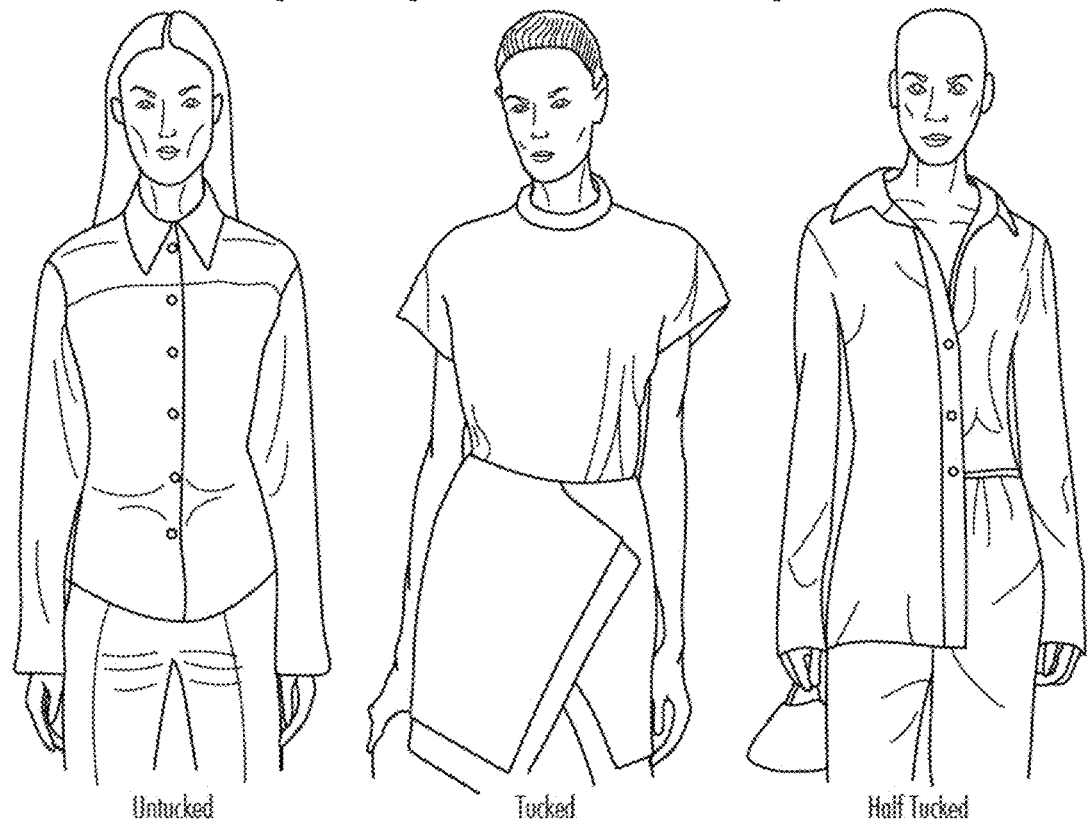
Figure 16H:
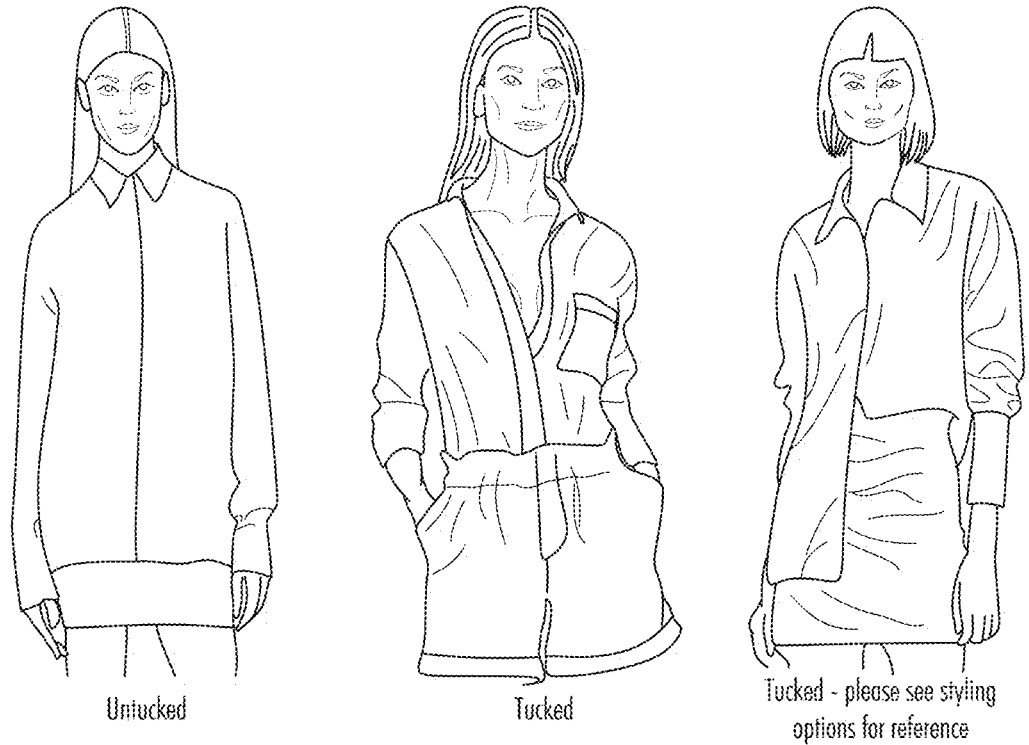
Figure 16I:
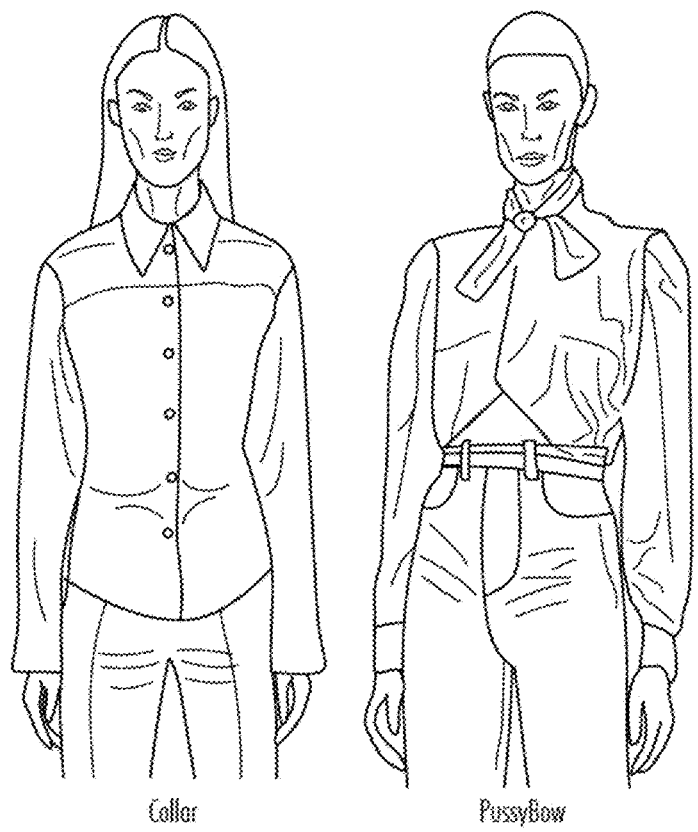

FIGS. 15A-15O define an exemplary digital style taxonomy 1500 including a plurality of styling combination categories conforming to a fashion standard, e.g., a high fashion standard. For example, a first styling combination category 1502 includes tops having the following styling segments: sleeves buttoned, half tucked, fully buttoned front portion and collar folded. FIGS. 16A-16J provide examples of options for the various styling segments included within the styling combination categories of FIGS. 15A-15O. For example, FIG. 16A illustrates a Sleeve Length styling segment having potential length values of Wrist, Mid Hand and Fingers. As another example, FIG. 16E illustrates a Bodice Fit styling segment having potential fit values of Tight, Relaxed and Oversized.

Figure 2:
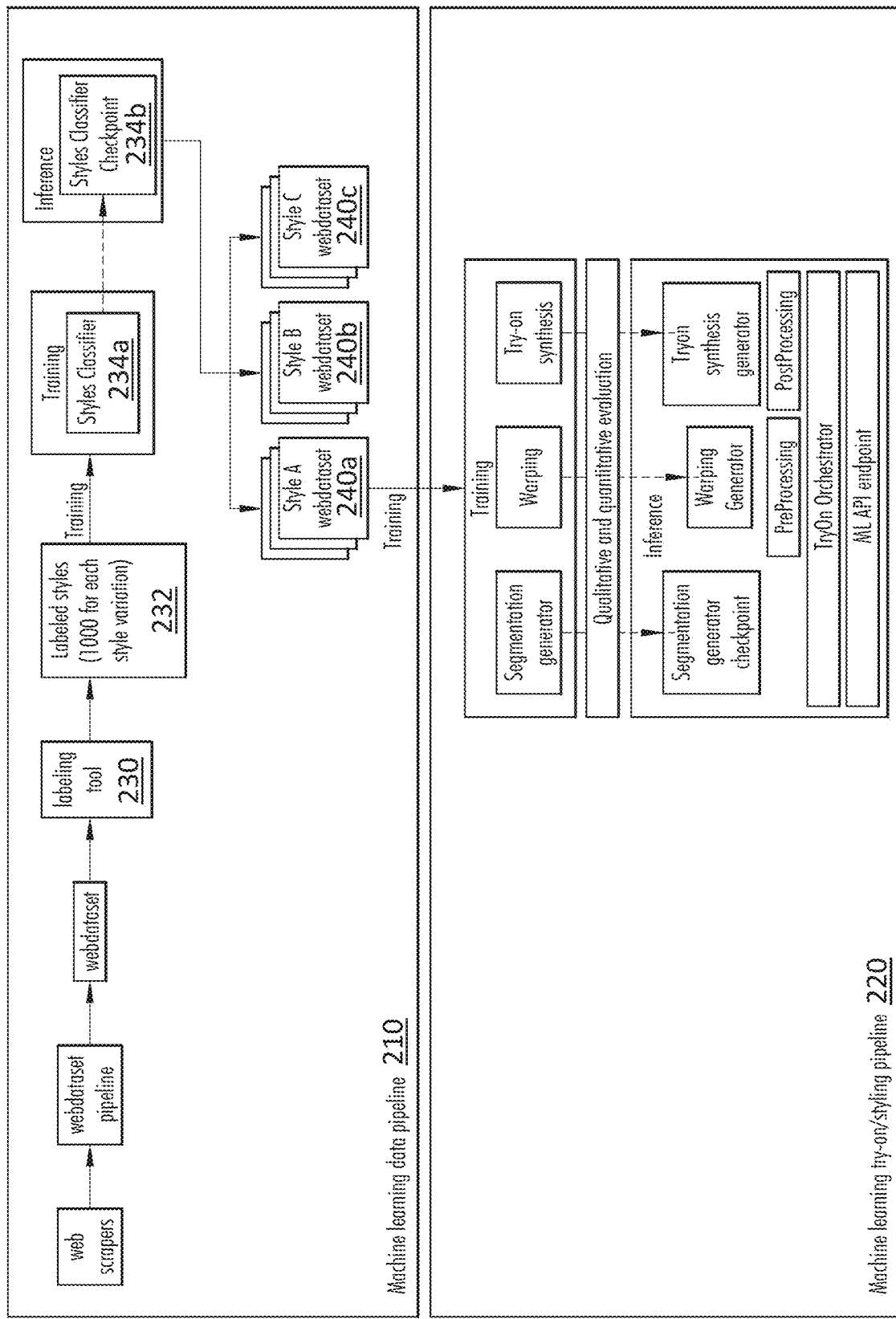
FIG. 2 is a process flow diagram which illustrates a machine learning data pipeline and a machine learning try-on/styling pipeline in accordance with the disclosure.

Turning now to FIG. 2, a process flow diagram is provided which illustrates a machine learning data pipeline 210 and a machine learning try-on/styling pipeline 220 in accordance with the disclosure. The machine learning data pipeline 210 prepares style aware datasets in the manner discussed below. The machine learning try-on/styling pipeline 220 exposes try-on and styling endpoints. In one embodiment the learning try-on/styling pipeline 220 includes three primary layers: a training layer, an evaluation layer and an inference layer. The training layer uses a style aware dataset generated by the machine learning data pipeline 210 in order to train the machine learning models 124. In one embodiment the evaluation layer applies quantitative (structural similarity Index: SSIM, Perceptual similarity, F1-Score, Fréchet Inception Distance: FID) and qualitative evaluations to determine the checkpoint to promote for each of the machine learning models 124. The inference layer exposes the try-on and styling via API endpoints, it also includes a Try-On/Styling Orchestration logic, Pre/Post processing.

The machine learning data pipeline 210 may be configured to start by capturing a person front facing image, a ghost garment image and PDP (product description page) text from a page of a website. In one embodiment this data capture is done using customized web crawlers: The information from each scraped website will generally be scraped or otherwise captured by a dedicated web crawler. This raw, captured data is cleaned, enriched and organized to be ready for large scale machine learning training. In one implementation the WebDataset standard is used as a standard utilizing in build the training dataset. The WebDataset is a PyTorch Dataset (IterableDataset) implementation providing efficient access to datasets stored in POSIX tar archives and uses only sequential/streaming data access. This advantageously brings substantial performance advantage in many compute environments, and is desirable and essential for very large scale training.

Exemplary embodiments of the machine learning data pipeline 210 do not use the raw garment and other web image data in the learning process. Rather, the raw data is first selected, manipulated, and then transformed into features to train the machine. In one embodiment the process of selecting from the raw, capture data results in exclusion of all corrupted images (e.g., images files that cannot be opened), person image with empty or unusable poses (e.g., poses with persons arms crossed), and all ghost images with an empty or invalid garment. Empty or invalid garment images include but are not limited to placeholder images that are included on websites when an item is no longer available and therefore does not show the intended garment. Also excluded during the selection process are person images with invalid segmentation (e.g., no top, top area height is larger than 70% of overall image height). Manipulation of the web image data may include resizing the captured images to a predefined pixel size, e.g., 1024×768.

Figure 3A:
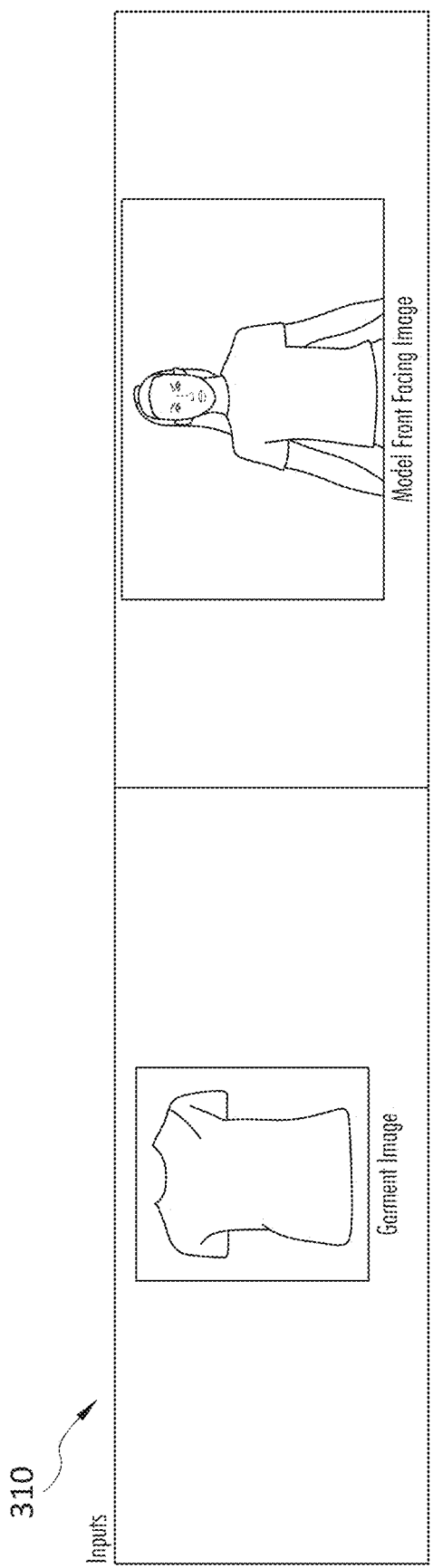
FIGS. 3A and 3B respectively illustrate exemplary inputs and outputs of the machine learning data pipeline 210.
Figure 3B:
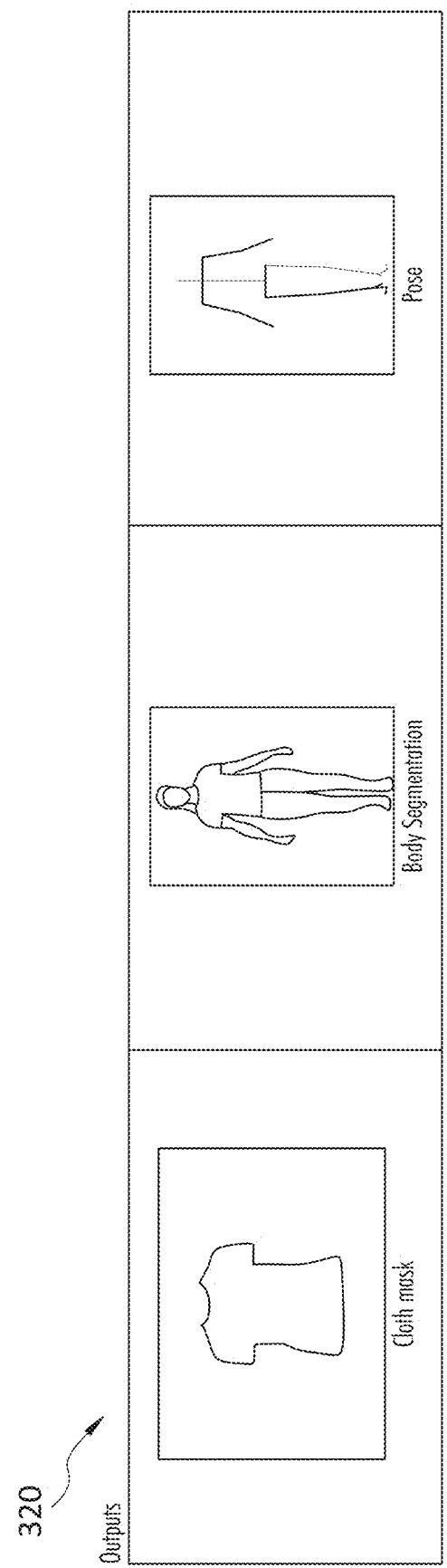

In one embodiment the captured image data is transformed by generating a body semantic segmentation using QNet and Part Grouping Network (PGN) in accordance with techniques described in, for example, "Instance-level Human Parsing via Part Grouping Network", Gong et al., ECCV 2018 and implemented on CIHP dataset. The transformation includes generating warped clothing for the try-on synthesis model using the best warping checkpoint. As used herein, the term "checkpoint" refers to a snapshot of a working model during the training process. The cloth-agnostic person image and cloth-agnostic person segmentation are then generated, FIGS. 3A and 3B respectively illustrate exemplary inputs 310 and outputs 320 of the machine learning data pipeline 210.

In some example embodiments, a correspondence between the target and source model may be calculated at this stage of the process. The correspondence between the target and source model is a fundamental step in this method, as it allows the system to warp and align the garment to the target model based on their unique body measurements and features.

Image correspondence in computer vision and machine learning refers to the process of identifying and matching the same features or points in two or more images.

The steps in establishing the correspondence in this method are as follow:

Feature point detection and description. In this step the goal is first to identify distinctive points (key points) in the images that can be easily recognized and matched across different images. Second, to create a descriptor for each keypoint that captures the local appearance or structure around the point. A deep learning method is used to simultaneously both detect the interest points and generate their descriptors. For example, see DeTone, Daniel, Tomasz Malisiewicz, and Andrew Rabinovich. "Superpoint: Self-supervised interest point detection and description." In Proceedings of the IEEE conference on computer vision and pattern recognition workshops, pp. 224-236. 2018.

SuperPoint uses a single CNN to perform both interest point detection and description tasks. The network is composed of two parts: an encoder, which extracts features from the input image, and two parallel decoders, one for detecting interest points and the other for generating descriptors. The network is trained using a self-supervised approach, eliminating the need for manual annotation. SuperPoint outperforms the state-of-the art models both in terms of the detection and description performance.

Feature matching and correspondence validation. In this step the goal is first to compare the descriptors from different images and identify the best matches. Second, to remove incorrect matches or outliers using a validation method. A deep learning-based method called SuperGlue may be utilized at this stage. (See Sarlin, Paul-Edouard, Daniel DeTone, Tomasz Malisiewicz, and Andrew Rabinovich. "Superglue: Learning feature matching with graph neural networks." In Proceedings of the IEEE/CVF conference on computer vision and pattern recognition, pp. 4938-4947. 2020.) SuperGlue simultaneously performs context aggregation, matching, and filtering in a single end-to-end architecture. SuperGlue is a Graph Neural Network (GNN) that leverages both spatial relationships of the keypoints and their visual appearance through self-(intra-image) and cross-(inter-image) attention. The attention mechanisms used in SuperGlue are inspired by the success of the Transformer architecture. Self-attention boosts the receptive field of local descriptors, while cross-attention enables cross-image communication and is inspired by how humans look back-and-forth when matching images. In addition to SuperGlue, tiling may be used in some embodiments. For example, in some embodiments, images may be split up to maximize the key points generated. In this procedure (tilling) an image may be split into at least two parts, e.g., two or more parts. In some examples, each part may be the same size. In other examples, each part may be different sizes, as needed. By splitting an image into multiple parts, the number of key points generated may be increased. By reducing the size of the image, e.g., by splitting the imagine into at least two smaller images, each image may be processed more extensively and thus, the two images generate more meaningful points than the original image.

The correspondence established at this step is highly accurate and in one embodiment, returns a minimum of 300 corresponding keypoints. This high number of keypoints ensures that the TPS warping can accurately capture the intricate details of the garment and the target model's body shape. It also helps in accounting for the variations in fabric behavior, draping, and folding patterns, which are essential to create a realistic virtual try-on and styling experience.

Some embodiments may be a realistic virtual try-on and luxury styling experience. Other embodiments may return 200 to 1000 keypoints, 100 to 2000 keypoints, or more keypoints. For example, some embodiments may return 100 to 3000 keypoints, 100 to 4000 keypoints, or more.

In some embodiments, having a minimum of 300 key points allows the system to distribute the correspondences across the garment and the target model's body more evenly. This distribution ensures that the TPS warping covers a wide range of garment areas and body parts, accounting for different levels of detail and complexity. As a result, the warped garment will more accurately conform to the target model's body shape and exhibit a natural-looking fit. Additionally, this high number of keypoints contributes to the system's robustness against various challenges, ensuring a reliable and high-quality virtual try-on and styling experience standard for a digital representation of a real-world garment.

Figure 4:
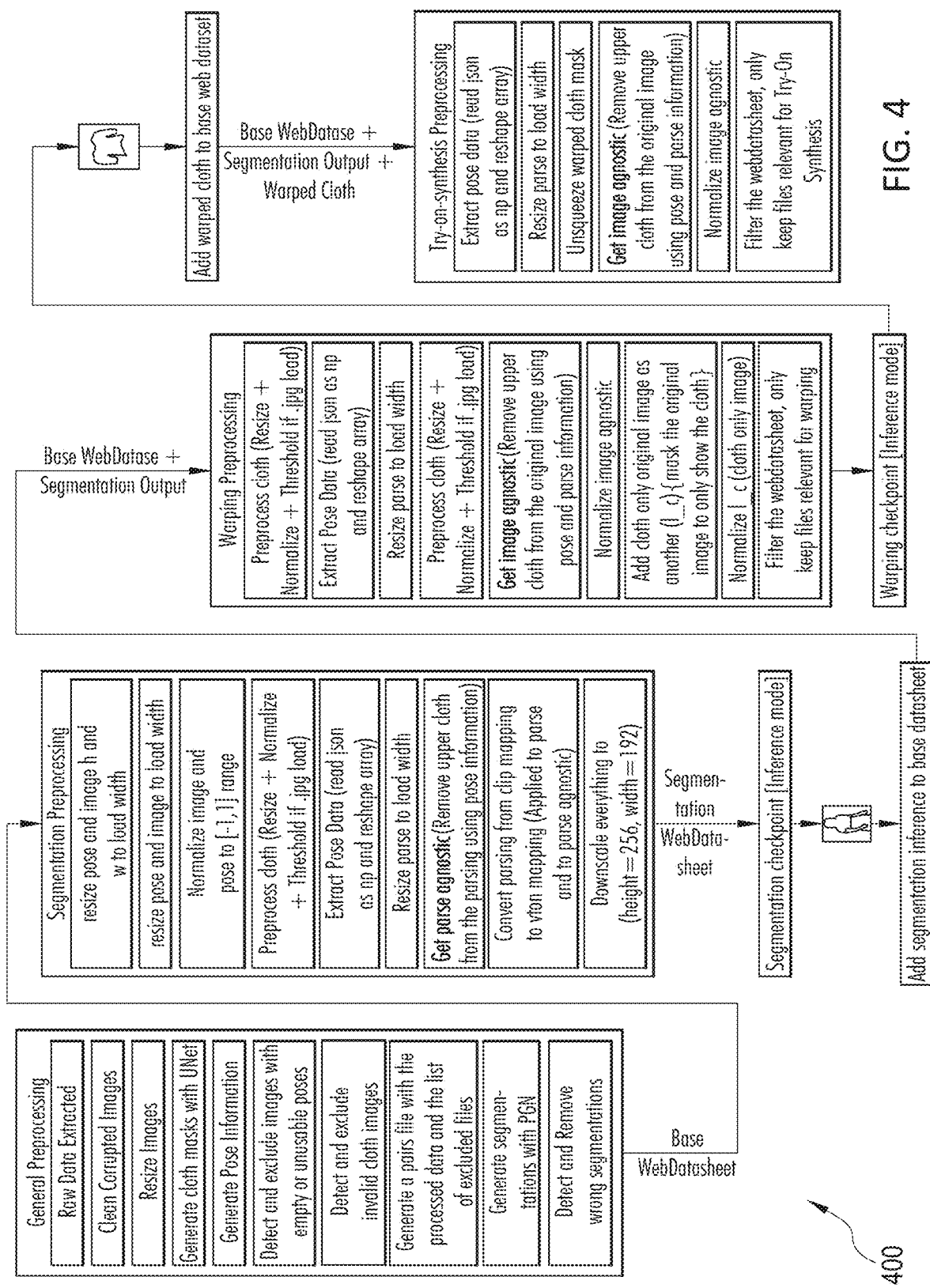
FIG. 4 provides a flowchart of an exemplary workflow for building a base webdataset and each specific version for different machine learning models used within the try-on/styling pipeline.

FIG. 4 provides a flowchart of an exemplary workflow 400 for building the base webdataset and each specific version for the different machine learning models 124. To build a dataset with a specific style conforming to a fashion standard (e.g., top sleeves pushed up, and tucked-in), images corresponding to the given style are identified from the entire base webdataset. In one embodiment this is a three-stage process. In a first stage, the training, test and evaluation datasets are built. In one embodiment this may be done using a taxonomy data tagging/labeling tool 230 (FIG. 2) in the form of, for example, an internal instance of label studio with an already setup labeling project. This may involve utilizing experts to label a large number (e.g., on the order of 1000) of images 232 (FIG. 2) of the target style. In a second stage the classifier 234a (FIG. 2) is trained and the trained model is evaluated. If, based on the evaluation, it is determined that additional training data is required, then experts may be utilized to label a larger set of images of the target style. In a third "inference" stage, the style classifier is executed against the entire dataset and an appropriate styles classifier checkpoint 234b is inferred. The output of this third stage is a ready to use fashion-aware dataset 240 which may be used to train the virtual try-on pipeline 220 for the target style.

Figure 5:
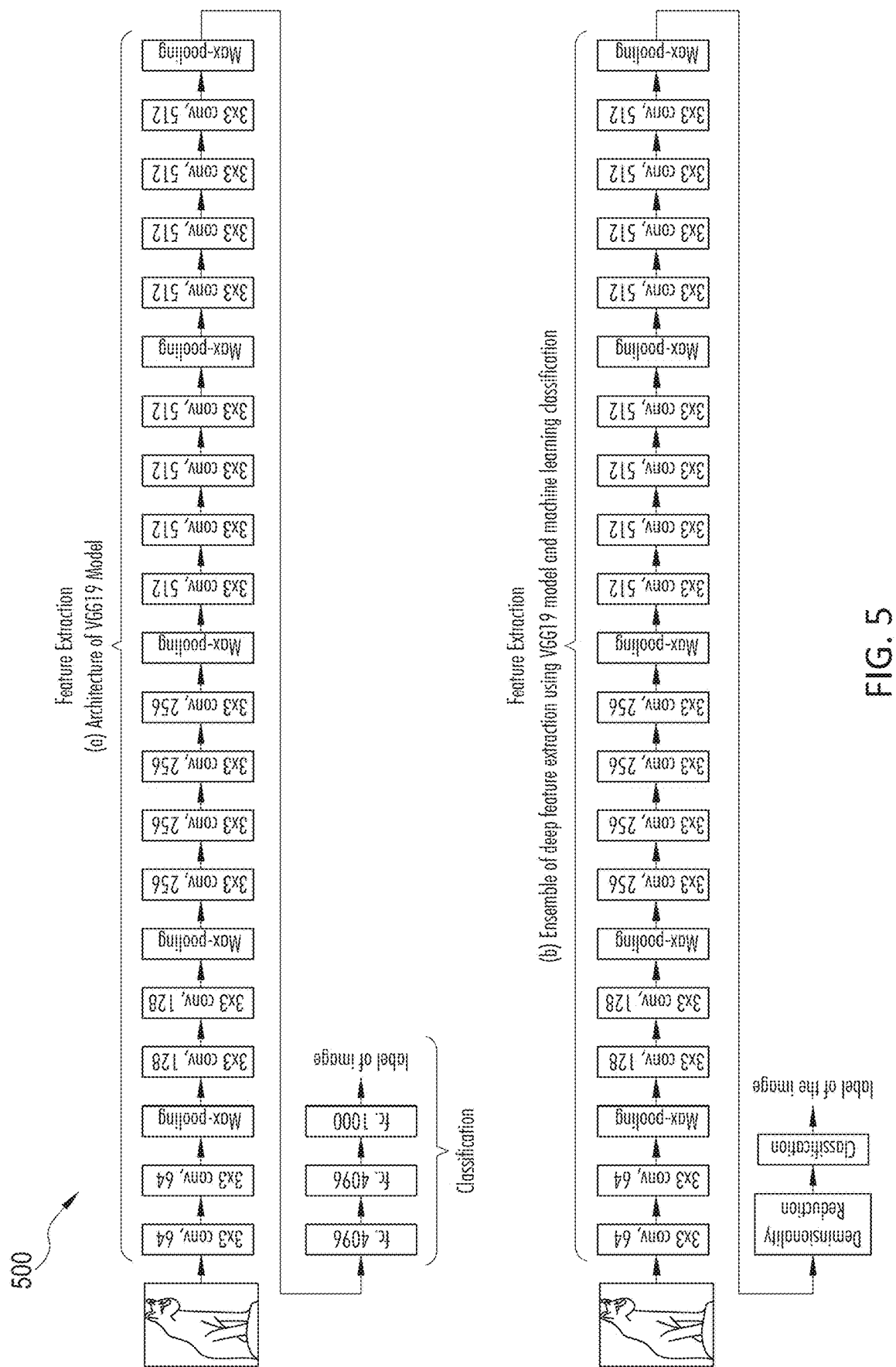
FIG. 5 shows an architecture for an exemplary implementation of a multi-class styles classifier which may be trained to recognize garment styles presented to it during a training process.

Turning now to FIG. 5, there is shown an architecture 500 for an exemplary implementation of a multi-class styles classifier 234 which may be trained to recognize garment styles presented to it during a training process. The architecture 500 of the classifier 234 is based on the transfer learning technique for image classification. As used herein, the term transfer learning refers to an approach to machine learning in which a model developed for a task is reused as the starting point for a model on a second task. In one embodiment transfer learning is conducted in the present context using Visual Geometry Group (VGG19) with 19 CNN (Convolutional Neural Network) layers, trained with ImageNet dataset.

Figure 6:
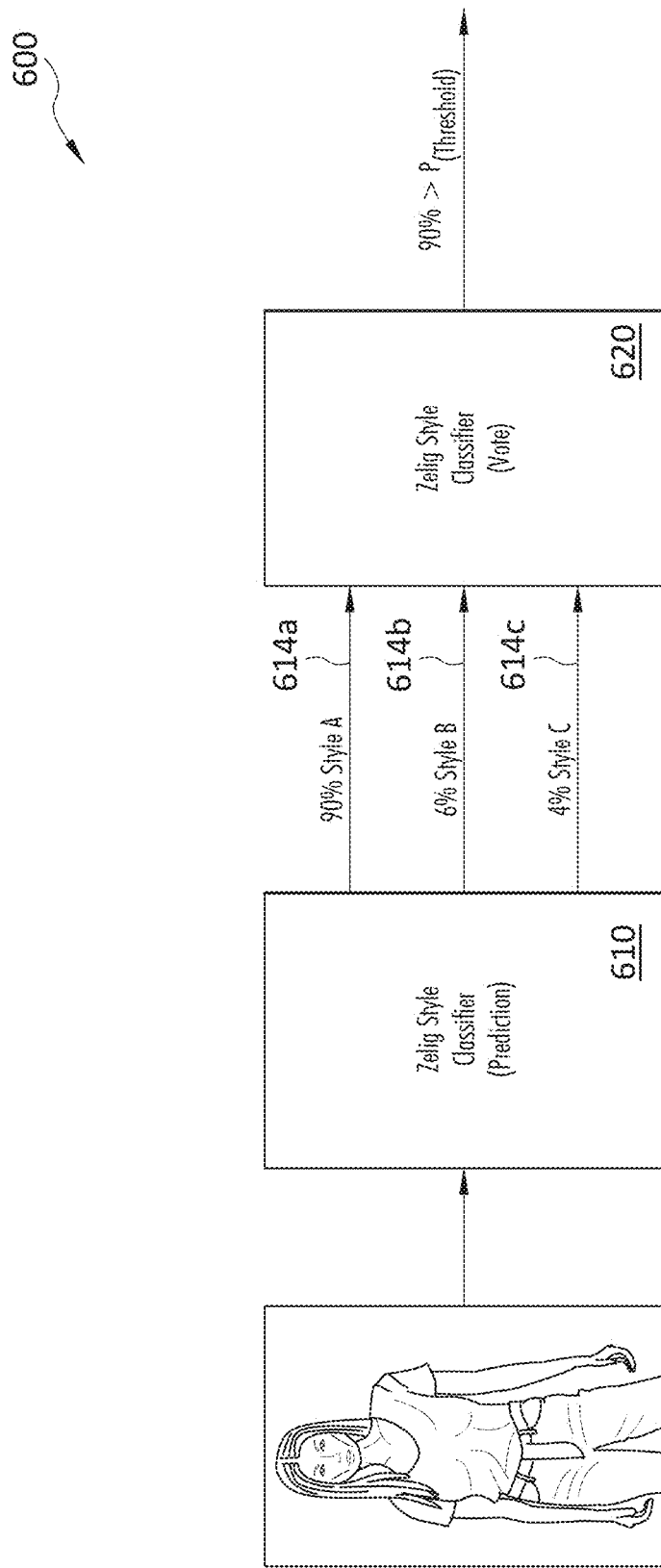
FIGS. 6 and 7 provide high-level representations of operation and training of a multi-class styles classifier implemented using the classifier architecture of FIG. 5.
Figure 7:
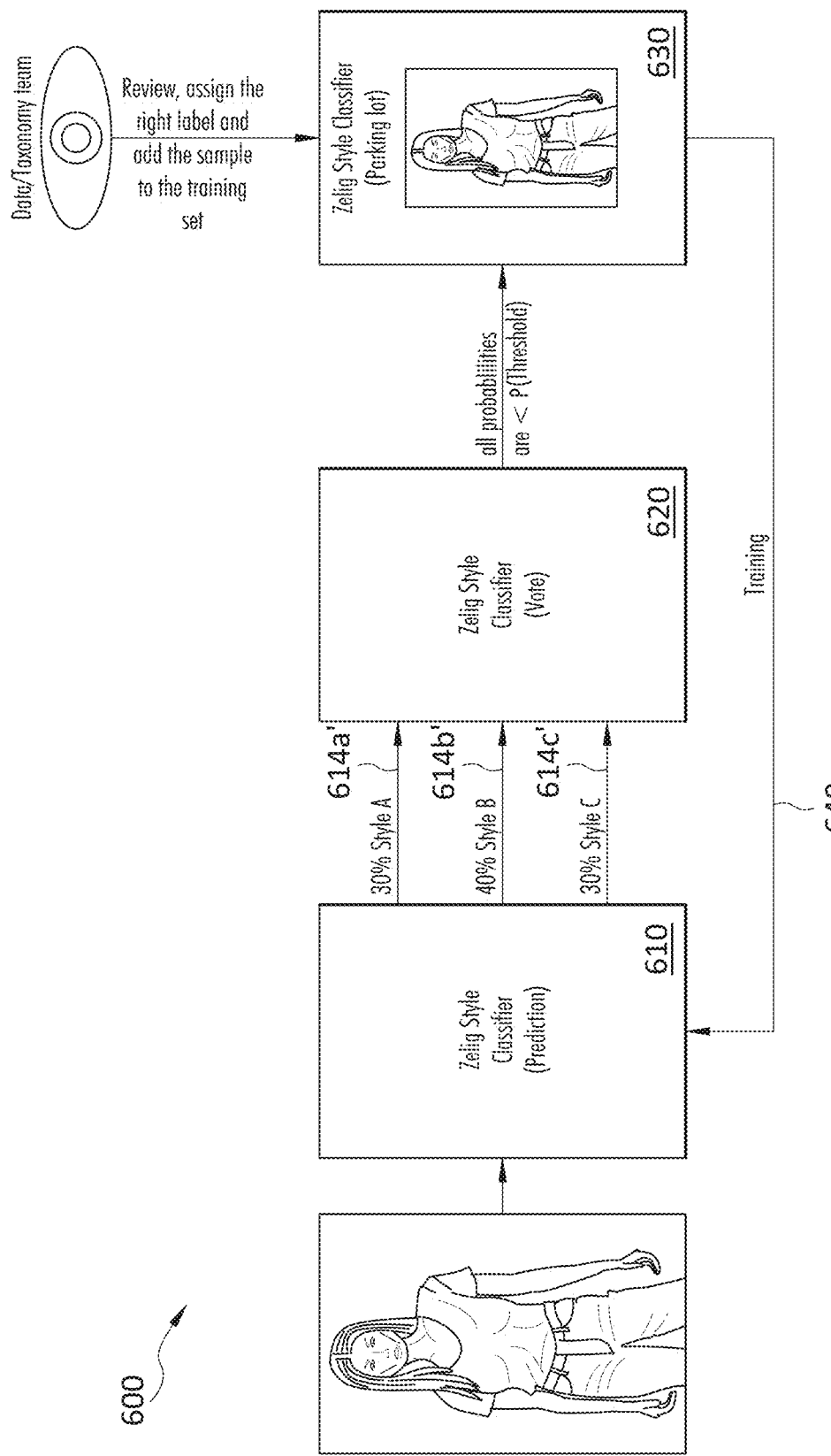

FIGS. 6 and 7 provide high-level representations of operation and training of a multi-class styles classifier 610 implemented using the classifier architecture 500. The classifier 610 is configured to assign a style (if applicable) to each image in the training data set 232 (FIG. 2). Specifically, classifier 610 determines, for each image in the data set 232, a probability 614 of the image depicting a garment of a specific style, To avoid mislabeled data, a probability threshold $P_{theshold}$ is set above which it is determined, during a voting stage 620, that sufficient confidence exists to assign the matching style variation to the image. This is the situation represented in FIG. 6, in which the probability associated with "style A" was determined to exceed $P_{theshold}$. If the voting 620 step fails (FIG. 7), the image is added to a parking lot 630 accessible to experts capable of reviewing the unclassified image and assigning the correct label. As illustrated in FIG. 7, the image will then be added 640 to the training dataset of the style matching the correct label.

Figure 8A:
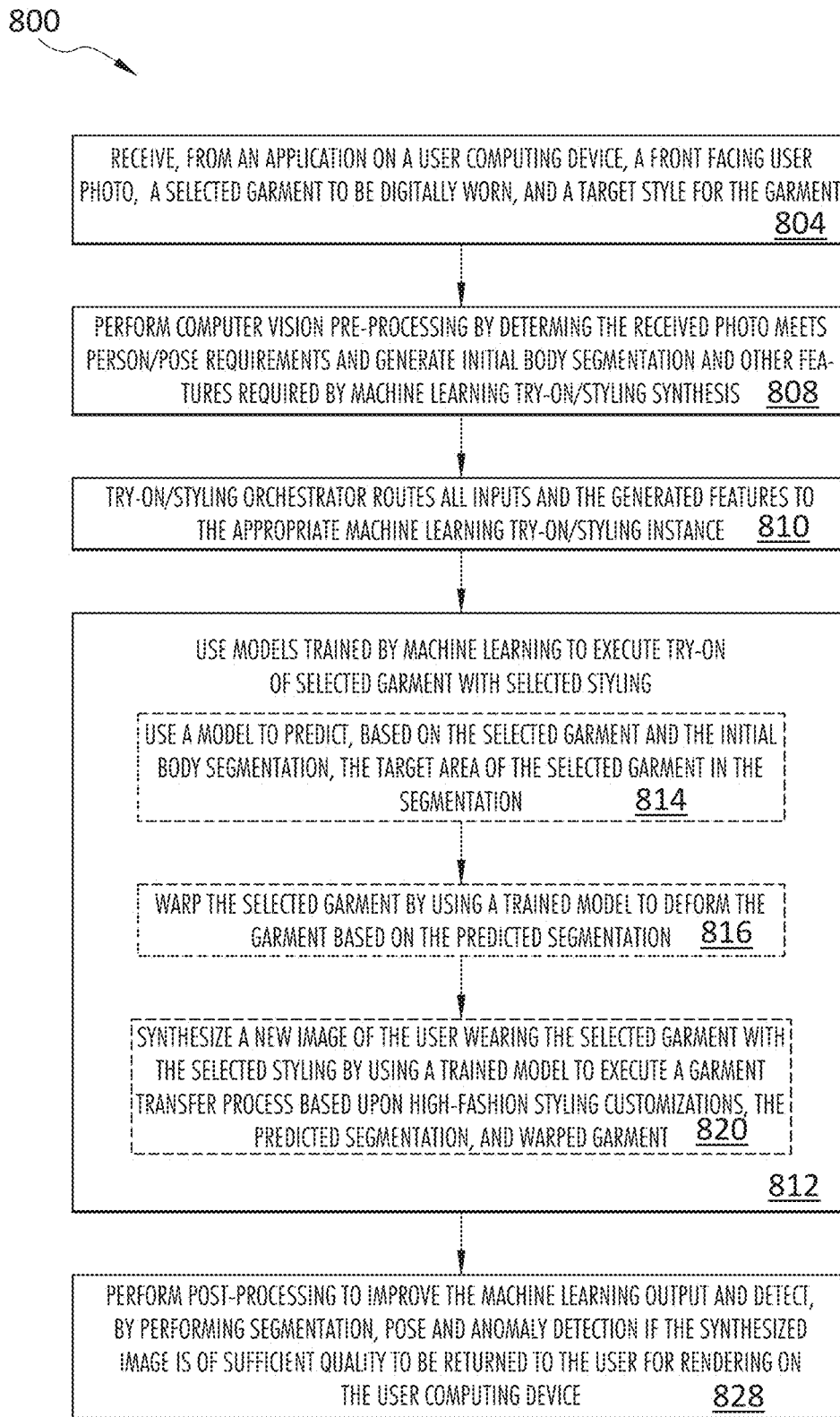
FIGS. 8A and 8B provide an overview of operation of an exemplary machine-learning try-on/styling pipeline in accordance with the disclosure.
Figure 8B:
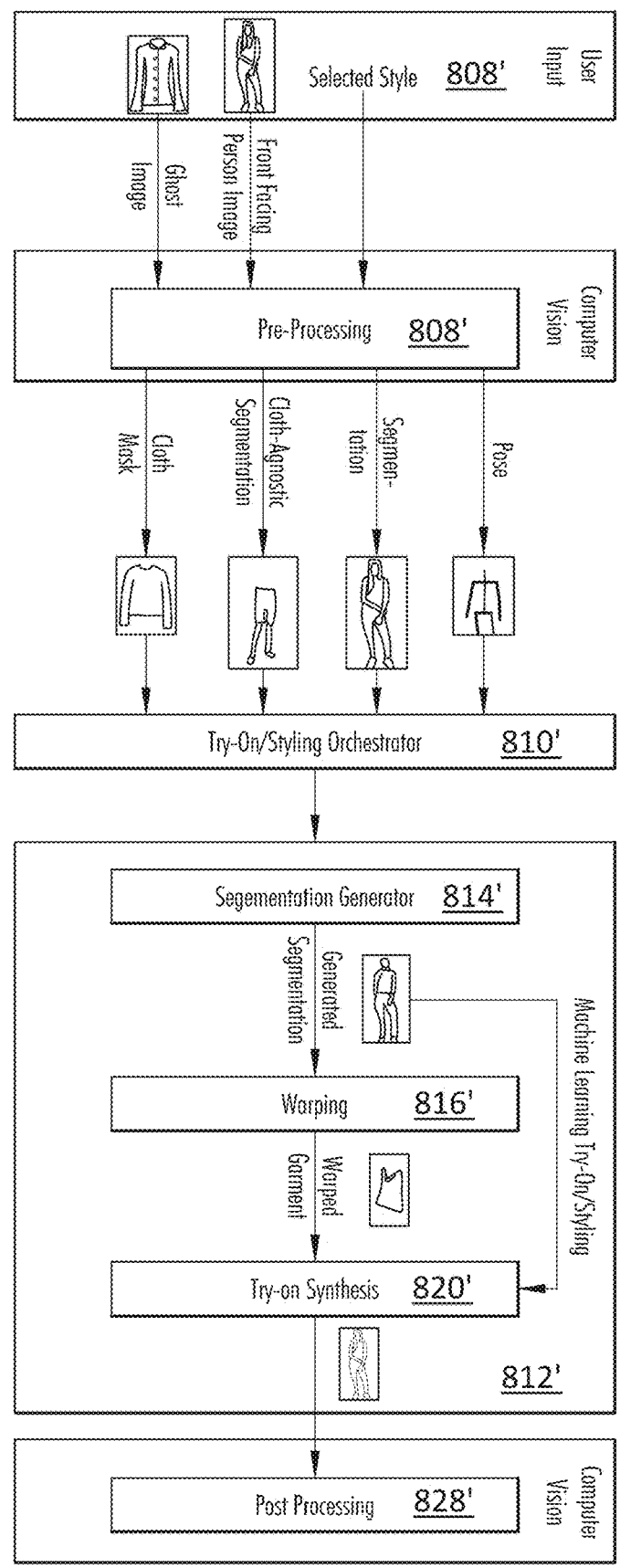

Turning now to FIGS. 8A and 8B, an overview is provided of operation of an exemplary machine-learning try-on/styling pipeline 800 in accordance with the disclosure. The pipeline 800 operates to receive from the user application 120, a front facing user photo, a selected garment to be digitally worn, and target garment styling options conforming to a fashion standard, e.g., high-fashion standard (stage 804). Computer vision and machine learning pre-processing may be performed by determining the received photo meets person/pose requirements and an initial body segmentation and other features required by machine learning try-on/styling synthesis are generated (stage 808). A try-on/styling orchestrator is responsible for routing all the inputs and the generated features to the appropriate machine learning try-on/styling instance (stage 810).

Figure 9:
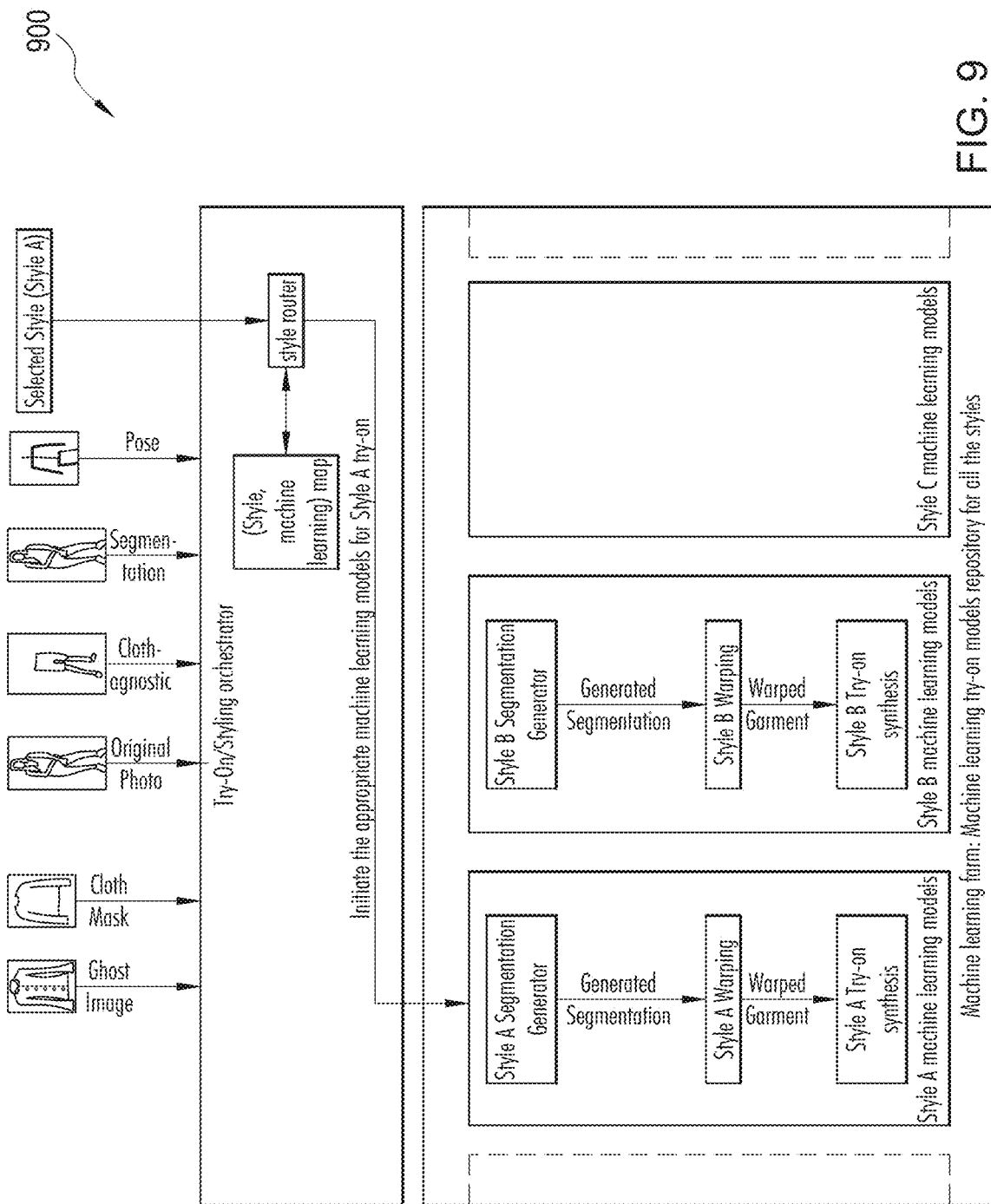
FIG. 9 illustrates an exemplary try-on/styling orchestrator in accordance with the disclosure.

FIG. 9 illustrates an exemplary try-on/styling orchestrator 900 in accordance with the disclosure. In one embodiment the orchestrator 900 has an internal factory that will instantiate the right machine learning models given the style. The orchestrator uses an internal map to determine the right machine learning models to use during the try-on process.

Models trained by machine learning may be used to execute try-on of garments styled in accordance with selected target styling options conforming to a fashion standard (stage 812). In particular, a model may be used to predict, based on the selected garment and the initial body segmentation, the target area of the selected garment in the segmentation (stage 814). The selected garment may be warped by using a trained model to deform the garment based on the predicted segmentation (stage 816). A new image of the user wearing the selected garment may be synthesized by using a trained model to execute a garment transfer process based upon the selected target styling options conforming to a fashion standard, the predicted segmentation, and the warped garment (stage 820). In one embodiment post-processing is performed to improve the machine learning output and detect, by performing segmentation, pose and anomaly detection if the synthesized image is of sufficient quality to be returned to the user for rendering on the user computing device (stage 828).

For example, once the corresponding key points between the source and target model is established, a non-affine transformation needs to be computed to warp the garment from the source model onto the target model. Non-affine transformations, as opposed to affine transformations, can handle more complex deformations, allowing for a better adaptation of the garment to the unique contours and features of the target model's body shape.

Thin-plate spline (TPS) warping is one such non-affine transformation technique that is commonly used for this purpose. The TPS transformation is a smooth, invertible mapping function that minimizes a certain bending energy, ensuring that the warped image remains smooth and does not introduce unwanted artifacts or distortions.

To compute the TPS warping, the system first calculates the coefficients of the thin-plate spline function using the established key points correspondence. This involves solving a linear system of equations, which results in a set of coefficients that define the smooth mapping between the key points in the source and target domains.

Next, the system applies the calculated TPS transformation to the entire garment image, not just the key points. This involves interpolating the transformation over the entire image, ensuring that the garment's pixels are smoothly warped onto the target model. This step is crucial for maintaining the visual integrity of the garment while adapting it to the target model's body shape.

An Image inpainting technique is employed to eliminate any visible artifacts or imperfections in the overlaid garment. A diffusion based inpainting method is utilized in this method. This algorithm fills in the imperfections by considering the surrounding texture and color information, resulting in a more visually appealing output. An embodiment may use dynamic dilation masks. The dynamic dilation masks may be used to identify artifacts, imperfections, or both artifacts and imperfections that are missing.

The computer vision module adjusts the colors, shading, and textures of the garment to ensure that it matches the lighting and appearance of the target model.

The systems and methods described herein may also perform styling. This process involves lifting a styled garment from the source model to the target model. To ensure the accuracy and realism of this process, semantic tags are utilized on the correspondence garments. These tags indicate landmarks specific to particular styles of clothing and provide positional information about the garment on the source model. By identifying and utilizing these landmarks, semantic tags can guide the lifting and pasting of the garment onto the target model both in the try on and the post processing module of the pipeline. For instance, in a denim jacket, semantic tags can help identify landmarks such as the collar, cuffs, and hemline. Through the incorporation of these landmarks, a virtual try-on system can realistically model the behavior of the jacket on the target model, e.g., a real-world jacket on a real-world target model. This includes simulating details such as where the sleeves would naturally push up when rolled or how the hemline would move when the jacket is half-tucked. By accurately representing these details, the virtual try-on system can create a more immersive and believable try-on experience for the user.

Figure 10:
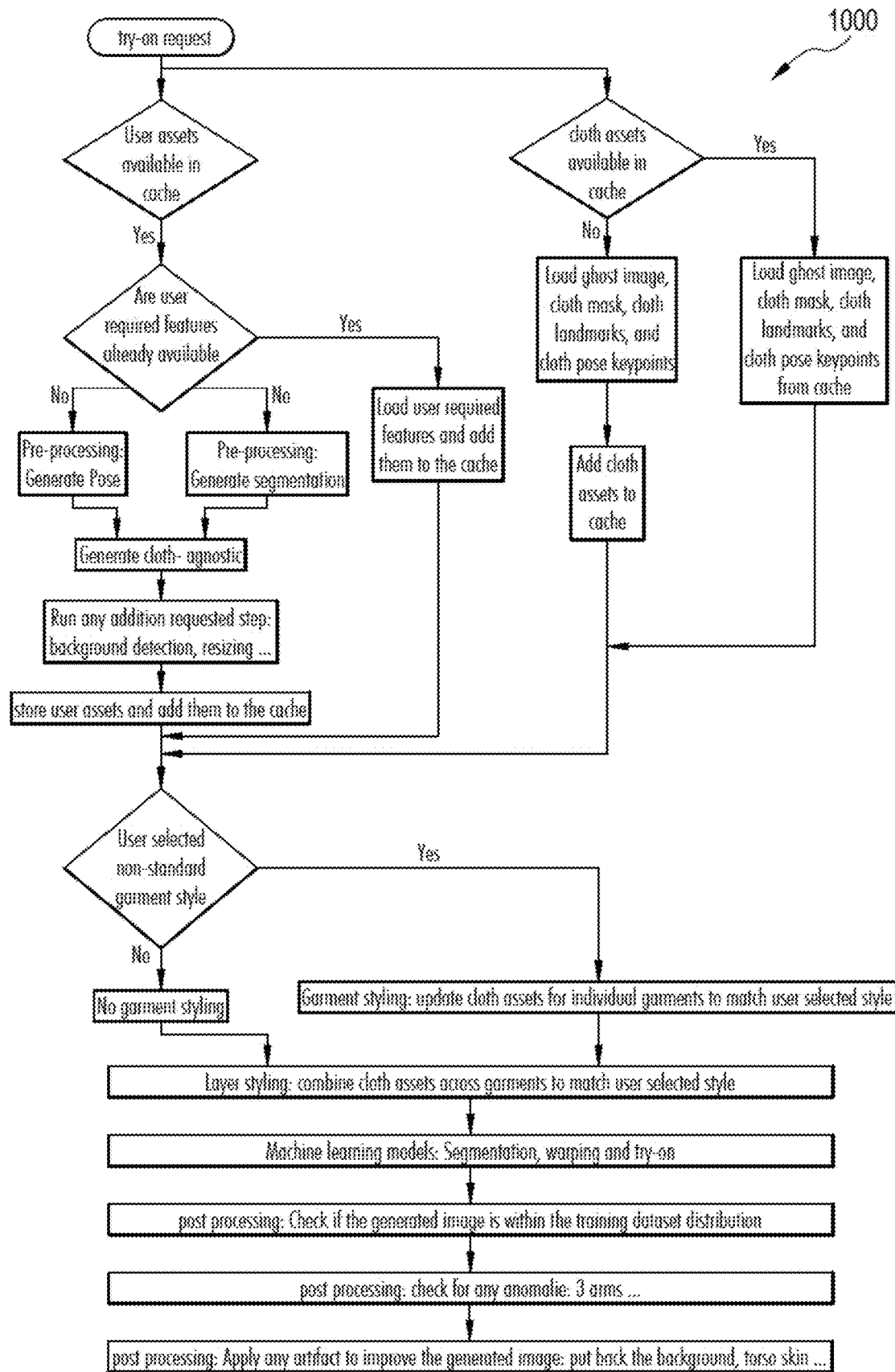
FIG. 10 illustratively represents an exemplary try-on/styling workflow in accordance with the disclosure.

FIG. 10 illustratively represents an exemplary try-on/styling workflow 1000 in accordance with the disclosure. The segmentation generators 144 may be implemented using a generative adversarial network (GAN) with, for example, a convolutional neural network such as a U-Net Generator and multi-scale patch discriminators. See, e.g., "U-Net: Convolutional Networks for Biomedical Image Segmentation", Ronneberger et al., arXiv:1505.04597v1 [cs.CV] 18 May 2015. As indicated by FIG. 10, the try-on/styling workflow 1000 utilizes machine learning models to implement segmentation, garment warping, and try-on operations. For example, once the garment has been warped to fit the target model, the computer vision module overlays the garment onto the target model image. This step involves blending techniques to seamlessly integrate the garment with the target model, ensuring a realistic appearance.

The system performs post-processing steps to refine the visual output further. This module includes several techniques to enhance the final results.

Fine tuning the garment fit. To eliminate any imperfections in the overlaid garment an iterative refinement technique is employed. This method iteratively adjusts the warped garment until the overlaid error falls below a pre-defined threshold.

The iterative refinement process begins by calculating the error between the overlaid garment and the target model.

This error is quantified by subtracting the target model upper body segmentation from the warped garment mask.

During each iteration, the system identifies regions in the overlaid garment that contribute to the error and makes appropriate adjustments. These adjustments involve re-warping the garment locally and modifying the blending weights. The error is then recalculated, and the process repeats until the error falls below the specified threshold or a maximum number of iterations are reached.

Figure 11:
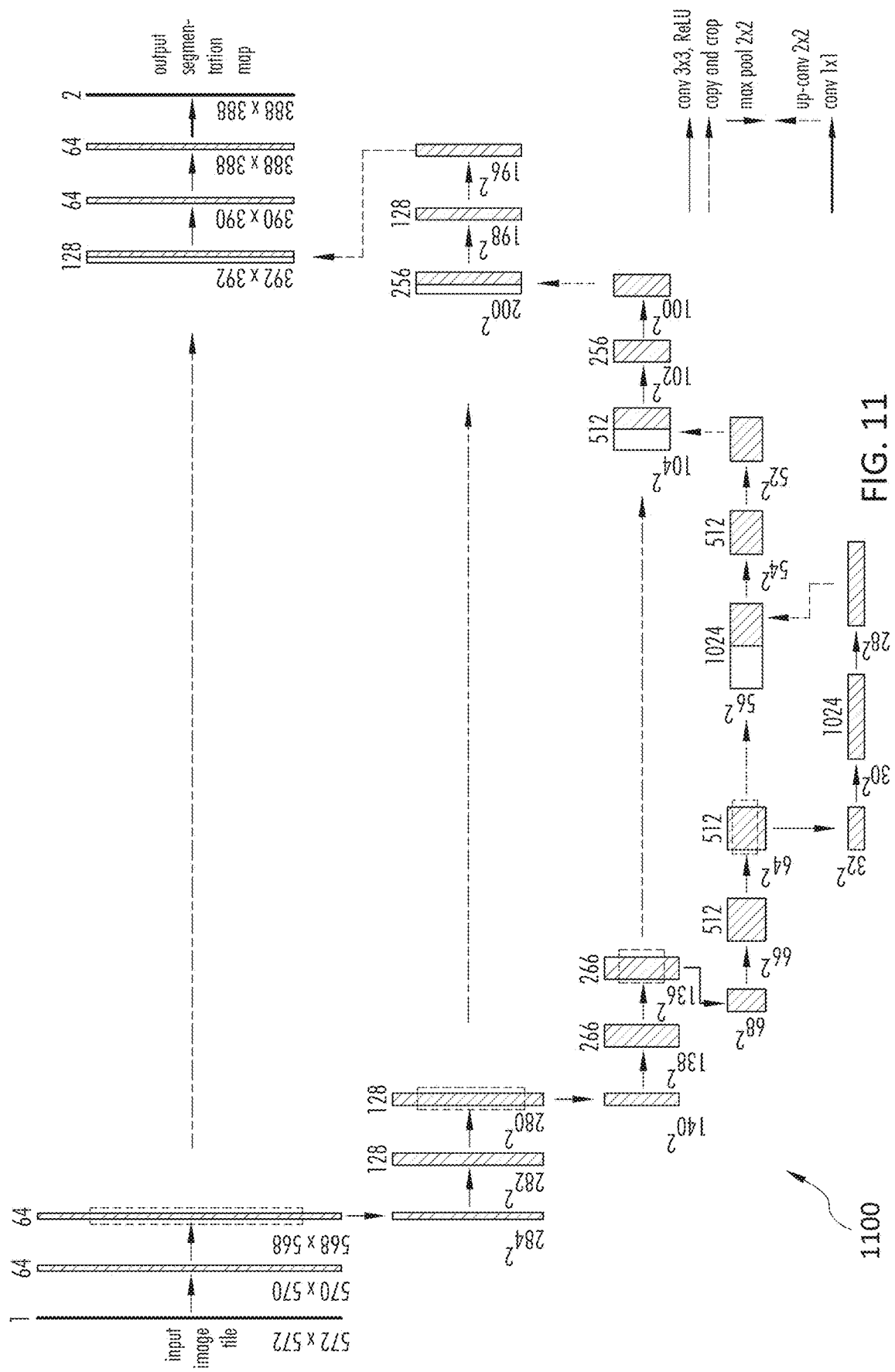
FIG. 11 represents a U-Net architecture of a type useful in implementing the segmentation generators utilized in the try-on/styling workflow of FIG. 10.
Figure 12A:
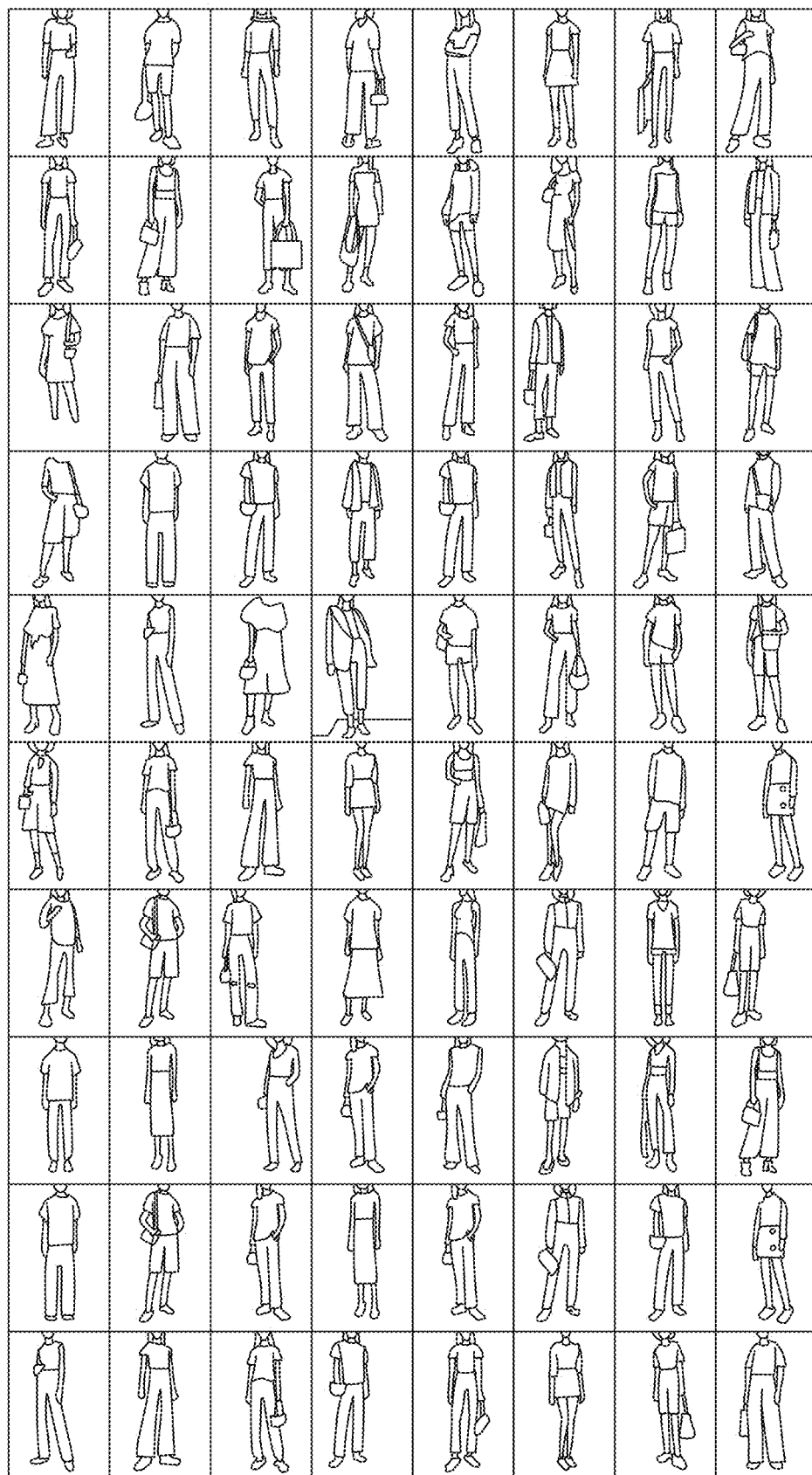
FIGS. 12A-12D illustrate various exemplary input and ground truth imagery for use with the segmentation generators of FIG. 10.
Figure 12B:
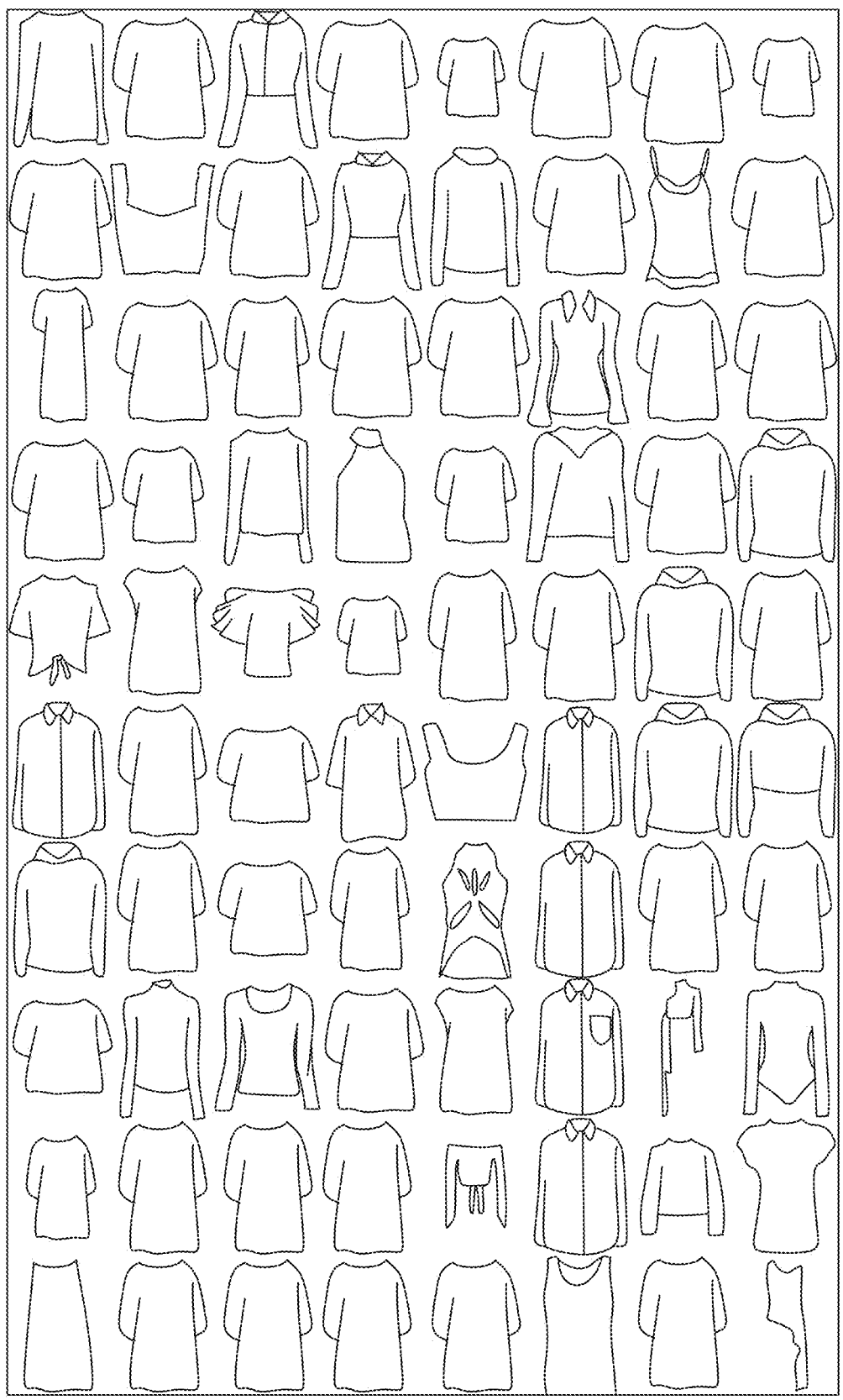
Figure 12C:
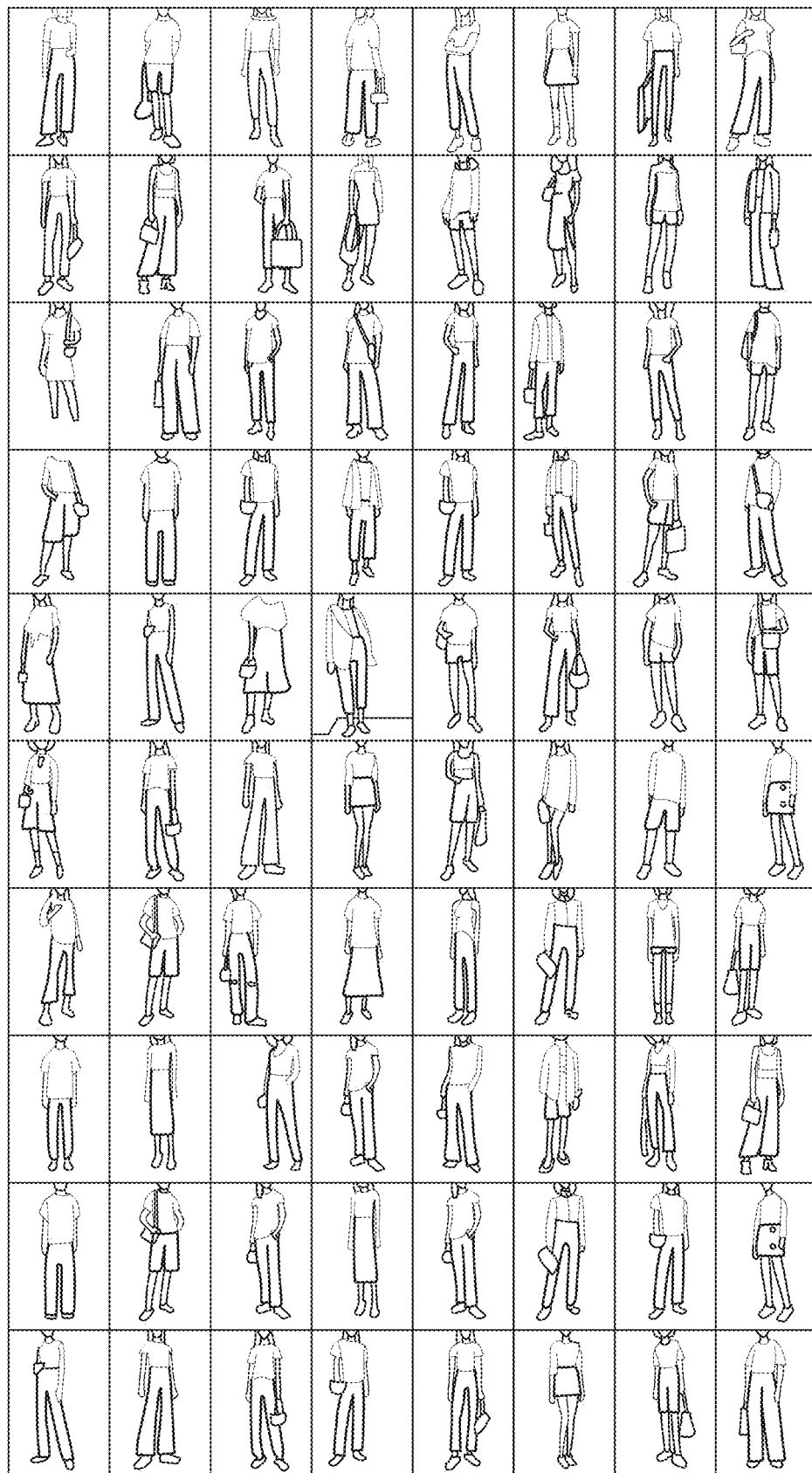
Figure 12D:
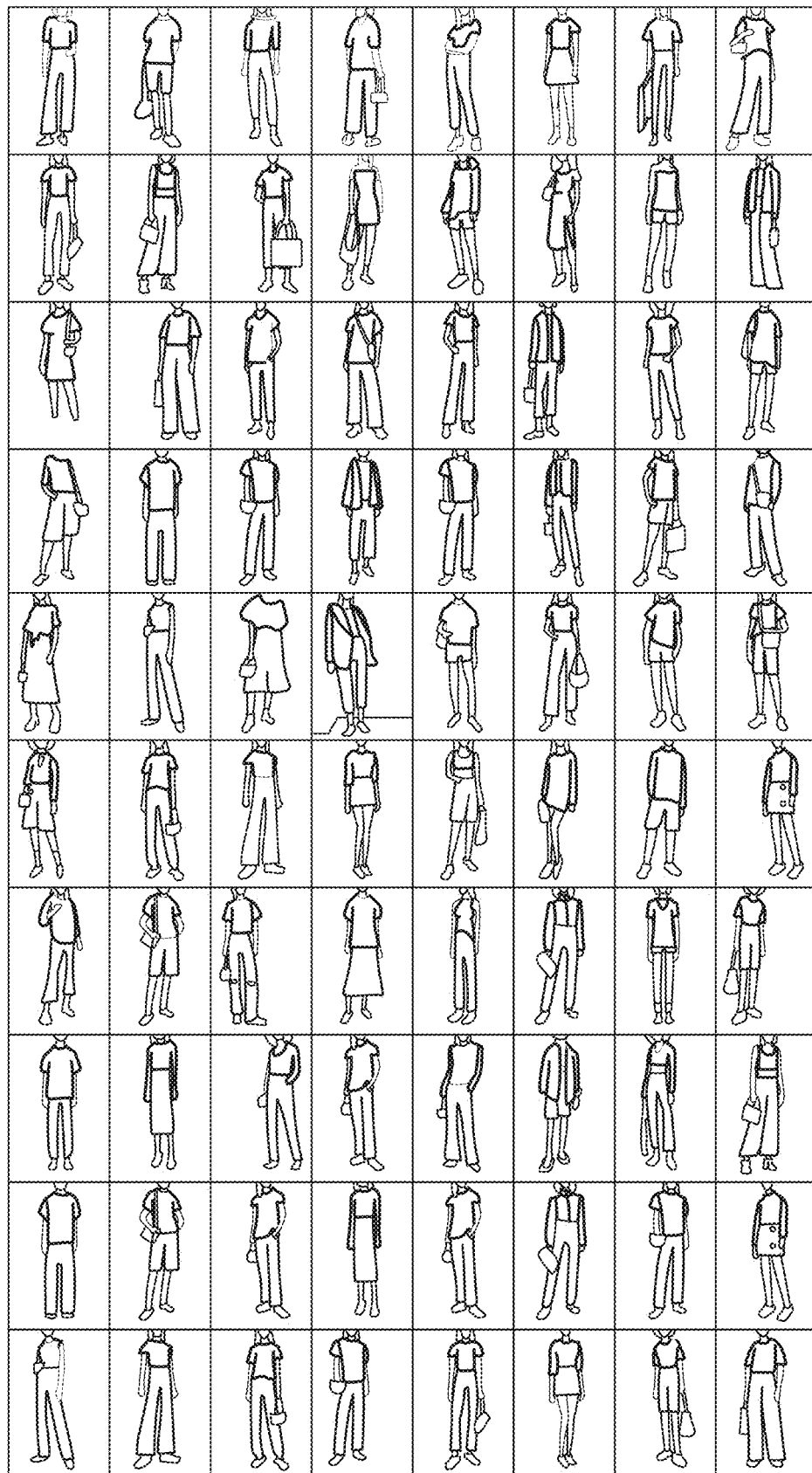

FIG. 11 represents a U-Net architecture of a type useful in implementing the segmentation generators 144 utilized in the try-on/styling workflow 1000. A principal objective of the model implemented by segmentation generators 144 is to predict the area of the target garment in the person body segmentation. In inference mode, the inputs to this model are: (i) the cloth-agnostic segmentation (FIG. 12); (ii) the person pose; (iii) the cloth (FIG. 12B); (iv) the cloth mask. During training the scraped images (FIG. 12B) are used to build the cloth agnostic image of the person wearing the target garment, where the ground truth is the person segmentation (FIG. 12D).

Figure 13A:
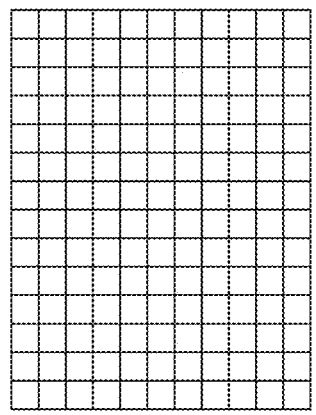
FIG. 13A depicts a grid utilized by a machine learning model for garment warping.
Figure 13B:
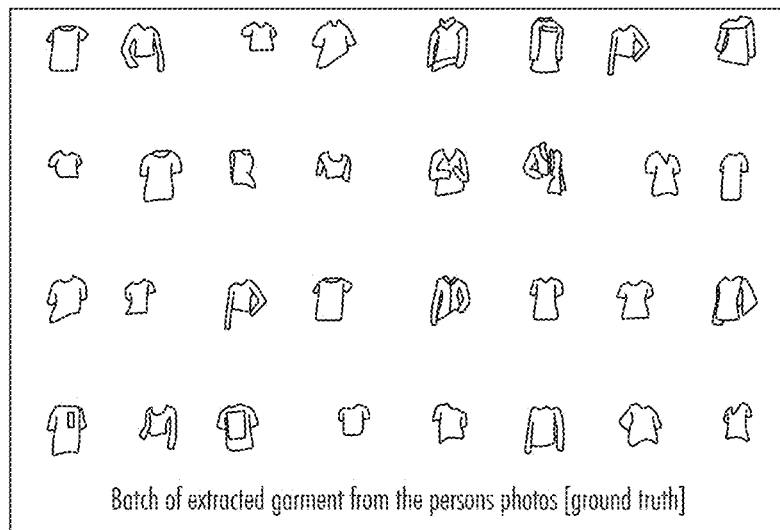
FIGS. 13B and 13C respectively illustrate ground truth and garment ghost imagery utilized by the model for garment warping.
Figure 13C:
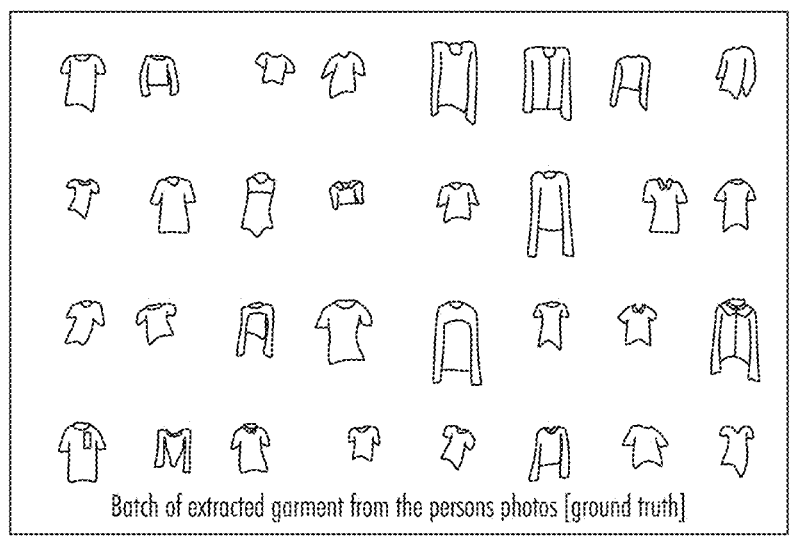

Turning now to FIG. 13, the machine learning model for garment warping 148 may be implemented using an architecture comprised of a Geometric Matching Module (GMM) with Thin Plate Spline (TPS). This architecture is described in, for example, in "Toward Characteristic-Preserving Image-based Virtual Try-On Network", Wang et al., arXiv: 1807.07688v3 [cs.CV] 12 Sep. 2018. The model implemented for garment warping 148 predicts the garment deformations to fill the target body part in the person segmentation. As shown in FIG. 13A, in one embodiment the model relies on a grid (e.g., 12×16) This grid is used in order to have a sense of the deformation using the grid key points (e.g., 192 points), During training, the model for garment warping takes the ghost images with no deformation FIG. 13C), the person pose and segmentation. In this case the ground truth is the garment extract from the person wearing it (FIG. 13B). The garment is extracted using the person semantic segmentation.

In one example embodiment, garment extraction may be performed. For example, users select garments from a pre-existing database provided by the retailer. In one example, a deep learning-based segmentation technique, such as in Gong, Ke, Xiaodan Liang, Yicheng Li, Yimin Chen, Ming Yang, and Liang Lin. "Instance-level Human Parsing Via Part Grouping Network" in *Proceedings of the European conference on computer vision (ECCV)*, pp. 770-785, 2018, may be employed to accurately separate the garment from the background and the source model.

In one embodiment the machine learning model for try-on synthesis 152 may be implemented using an architecture comprised of a generative adversarial network (GAN) with a pix2pixHD generator and multi-scale patch discriminators. Pix2pixHD is a method for synthesizing high resolution photo-realistic images from semantic label maps using conditional generative adversarial networks (CGANs). See, e.g., "High-Resolution Image Synthesis and Semantic Manipulation with Conditional GANs", Wang et al., arXiv: 1711.11585v2 [cs.CV] 20; August, 2018. In order to improve the overall result the perceptual loss (based a pre-trained VGG16) may be used to ascertain the overall loss function, See, e.g., "Perceptual Losses for Real-Time Style Transfer and Super-Resolution"; Johnson et al., arXiv: 1603.08155v1 [cs.CV] 27; March, 2016.

Figure 14A:
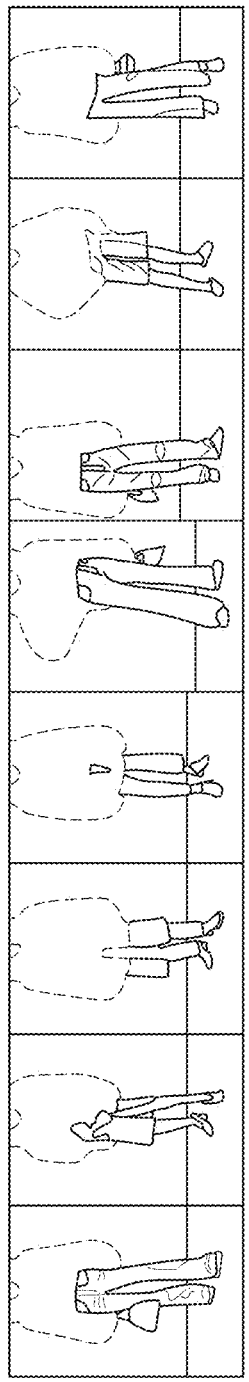
FIGS. 14A-14C illustrate exemplary inputs for a model for try-on synthesis in accordance with the disclosure.
Figure 14B:
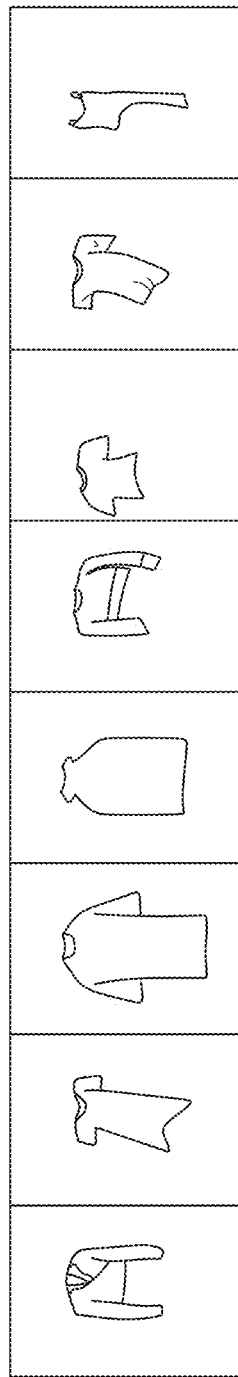
Figure 14C:
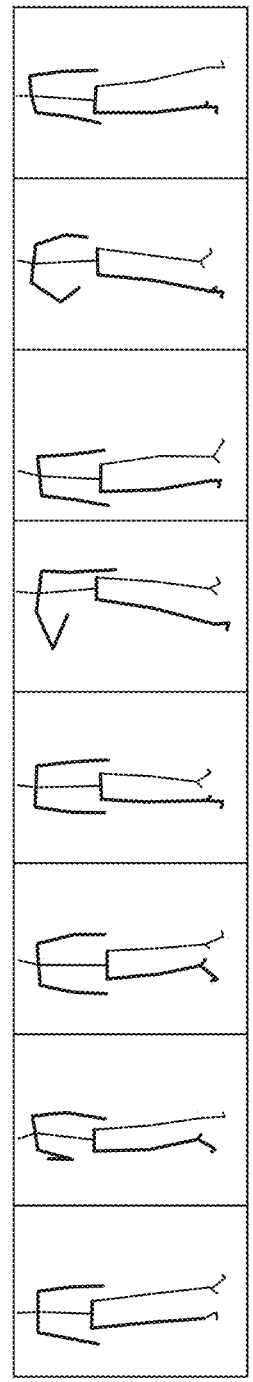

In one embodiment the model for try-on synthesis 152 is executed as a final step in completing the try-on/styling process. The model for try-on synthesis 152 operates utilizing the output of the previous models; that is, a generated segmentation (FIG. 14A) and warped garment (FIG. 14B). The model additionally utilizes the initial cloth-agnostic segmentation and pose (FIG. 14C).

Referring again to FIG. 1, in one embodiment the platform 110 further includes a digital garment rental and recommendation engine 136 and an outfit/fashion recommendation engine 140 configured to function with the user application 120 to facilitate rental and recommendation of digital garments, e.g., digital representations of real world garments. The digital garment rental and recommendation engine 136 enables a user to "rent" a digital garment that has been virtually tried on by the user in the manner described above. The rented digital garment may be stored within a digital closet for the user maintained by the user by platform 110 during the duration of the rental term. During this rental term the user may submit, via the user application 120, different images of the user to the platform 110 and in response receive versions of the different images in which some or all of the user's clothing within the submitted images is replaced by the rented digital garment.

The digital garment rental and recommendation engine 136 also enables a user to invite individuals via a link code or scannable image code to view the user's virtual try-on renderings via a mobile application. For example, with one click the user receiving the shared image can swap their own image with that of the original and see themselves in the same attire. Metadata for the outfit displayed enables any user in the sharing group to link to any item available in the original image.

The recommendation engine 136 can also enable users to create a fashion playlist. For example, from a basket of item(s) the user "shuffles" all permutations into a variety of styling and/or complete outfits which the user RANKS and/or LIKES. Based on rank order the system adds selected item(s) and/or styling choices to the shuffle basket. The resulting permutations, ensembles, individually styled item(s) and/or outfits can be tagged by use-case and user-generated keywords. Users can "save" item(s), individually styled item(s), ensembles and/or outfits and have the ability to share them. User-generated metadata and ranking is used to improve metadata and recommendations and create rank order "most popular" individually styled item(s) ensembles and/or outfits that can be further up-voted by the user community. Subtle semantic metadata can be gleaned from user keywords including mood, use case, style, demographic, psychographic, and other explicit and implicit factors.

The outfit/fashion recommendation engine 140 enables outfits to be selected and recommended based on mood. The metadata schema categorizes clothing by use cases taxonomy and emotional vector valence. Via user input, ensembles are assembled based on the use case taxonomy, mood and mood intensity. Users rank order recommendation results to improve precision of subsequent recommendations. Interactive environments are in need for believable characters. Their personality and emotions should affect the behavior in order to increase the emotional immersion of the player. In one proposed model, virtual characters (or agents) are equipped with an individual personality and dynamic emotions. Both models interact within the selection of appropriate actions, and are thus central for the exhibited behavior of autonomous agents. The proposed model is application- independent and allows to render a rich set of behaviors for virtual characters in learning environments. See, e.g., "Emotional Agents for Interactive Environments";

Masuch et al.; 4th Int. Conf. on Creating, Connecting and Collaborating through Computing (C5 2006), Jan. 26-27, 2006, Berkeley, California.

Figure 17:
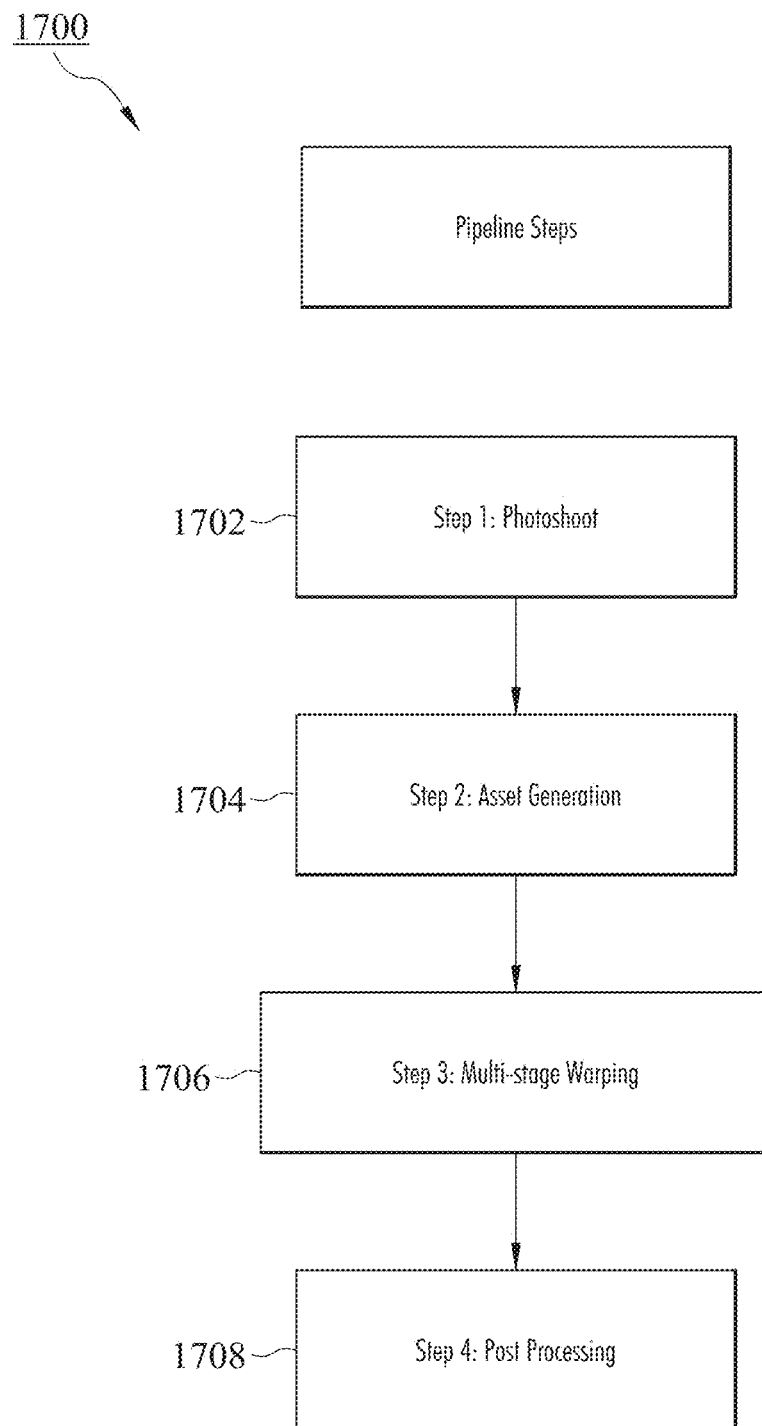
FIG. 17 is a flow diagram illustrating an example of steps within a pipeline in accordance with the systems and methods described herein.

FIG. 17 is a flow diagram illustrating an example of steps 1700 within a pipeline in accordance with the systems and methods described herein. Step 1 within the pipeline is a photo shoot (1702). Step 2 within the pipeline is asset generation (1704). Step three within the pipeline is multi-stage warping (1706). Step 4 within the pipeline is post processing (1708). Each of the steps within the example pipeline of FIG. 17 will be discussed in more detail below with respect to FIGS. 18-29B.

Figure 18:
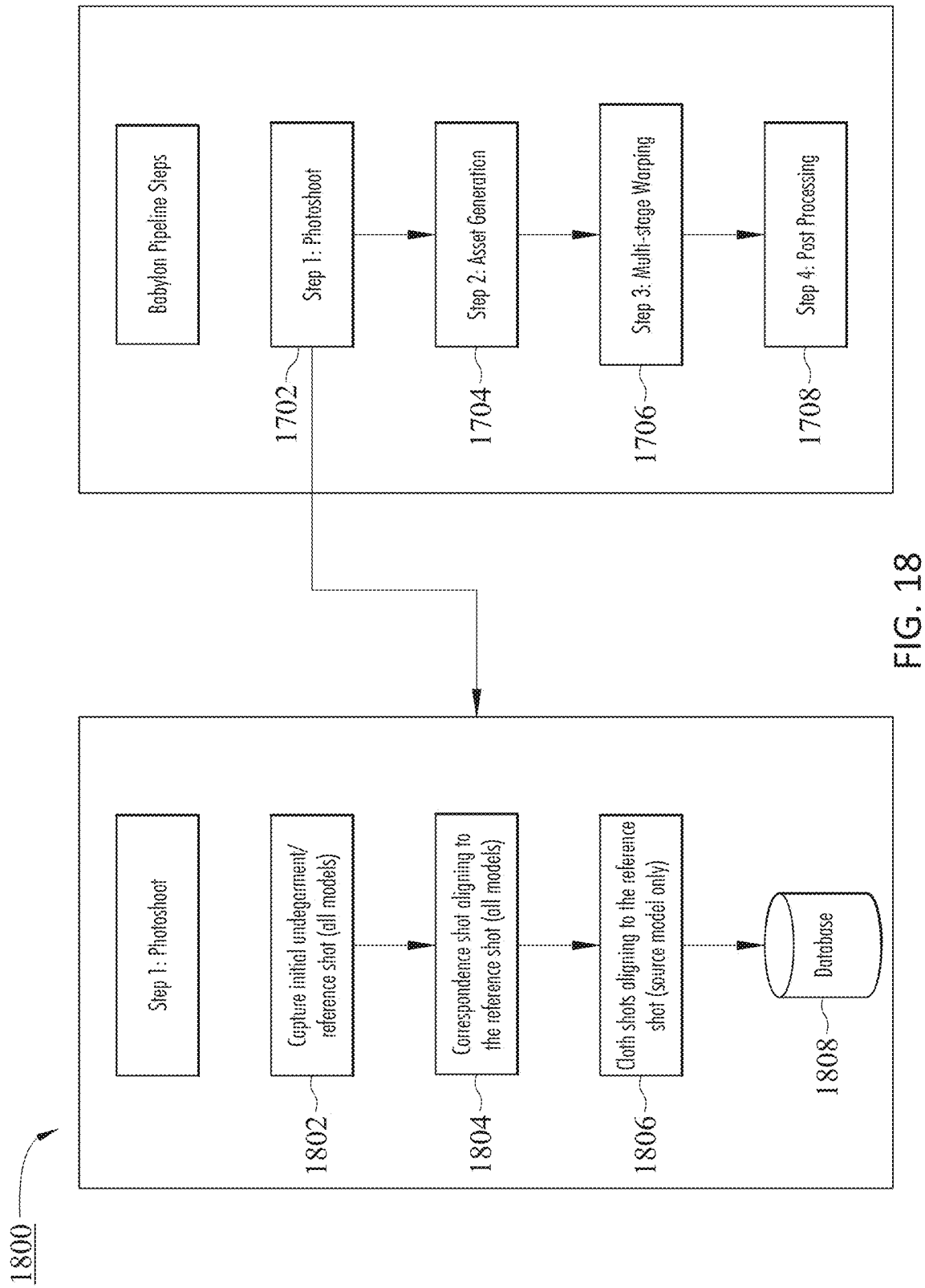
FIG. 18 is a flow diagram illustrating an example of steps and sub-steps within a pipeline in accordance with the systems and methods described herein.

FIG. 18 is a flow diagram illustrating an example of steps and sub-steps within a pipeline in accordance with the systems and methods described herein. More specifically, FIG. 18 illustrates sub-steps within the photo shoot 1702. The photo shoot 1702 may include capturing initial undergarment shots and/or reference (1802). In an example embodiment, capturing initial undergarment shots and/or reference (1802) may be for all models. A reference shot may refer to a photograph taken as a visual reference or guide for a specific purpose. The reference shot may serve as a benchmark or template that the systems and methods described herein may refer back to as a reference. The reference shot may be a shot of a model (or models) in undergarments.

The photo shoot 1702 may include taking one or more correspondence shots. The correspondence shots may align to the reference shot. For example, in some embodiments, the correspondence shots may align to the reference shot for all models 1804. The correspondence shot may be a type of photograph that captures a subject from different angles, distances, or perspectives. The correspondence shot may involve taking multiple shots of the same subject, and may include varying the composition, framing, or camera settings between each shot. The correspondence shots may provide a range of options for selecting the most visually appealing or compelling image from the series. By experimenting with different angles, perspectives, and settings, photographers may explore creative possibilities and find the best representation of the subject.

The photo shoot 1702 may include taking one or more cloth shots aligning to the reference shot source model only (1806). A cloth shot may refer to a photograph that focuses primarily on showcasing a particular item of clothing or fabric. The cloth shot may be a close-up or detailed shot that may highlight the texture, pattern, design, or other unique features of the cloth. When capturing a cloth shot, the photographer may aim to capture the essence and visual appeal of the fabric. This may involve zooming in on the fabric to reveal intricate details, emphasizing the texture by using lighting techniques, or capturing the fabric in a way that highlights one or more of the fabric's drape, flow, or movement. Cloth shots are commonly used in various fields such as fashion photography, textile industry, product catalogs, and advertising. The cloth shot may serve the purpose of showcasing the quality, craftsmanship, and aesthetic aspects of the fabric, enabling viewers to get a closer look at its characteristics. By focusing on the cloth itself, a cloth shot may communicate information about the material, color, pattern, and overall style. The cloth shot may allow viewers to assess the fabric's visual appeal, texture, and suitability for different purposes or fashion applications. The cloth shot in a photo shoot may refer to a specialized photograph that highlights the unique qualities of a fabric, allowing viewers to appreciate the fabric's details, texture, and overall aesthetic appeal.

Each of the shots, e.g., the reference shots, the correspondence shots, the cloth shots, or some combination of the reference shots, the correspondence shots, and the cloth shots may be stored in database 1808. The database 1808 may be stored on various types of hardware depending on the specific requirements and scale of the database system. Some common types of hardware used to store databases include servers, Storage Area Networks (SAN), Solid-State Drives (SSDs), Redundant Array of Independent Disks (RAID), cloud storage, or some combination of servers, SAN, SSDs, RAID, and cloud storage. While database 1808 may be stored on hardware, database 1808 may be managed and accessed through a database management system (DBMS) software, which provides the interface for interacting with the data stored on the hardware infrastructure.

Figure 19A:
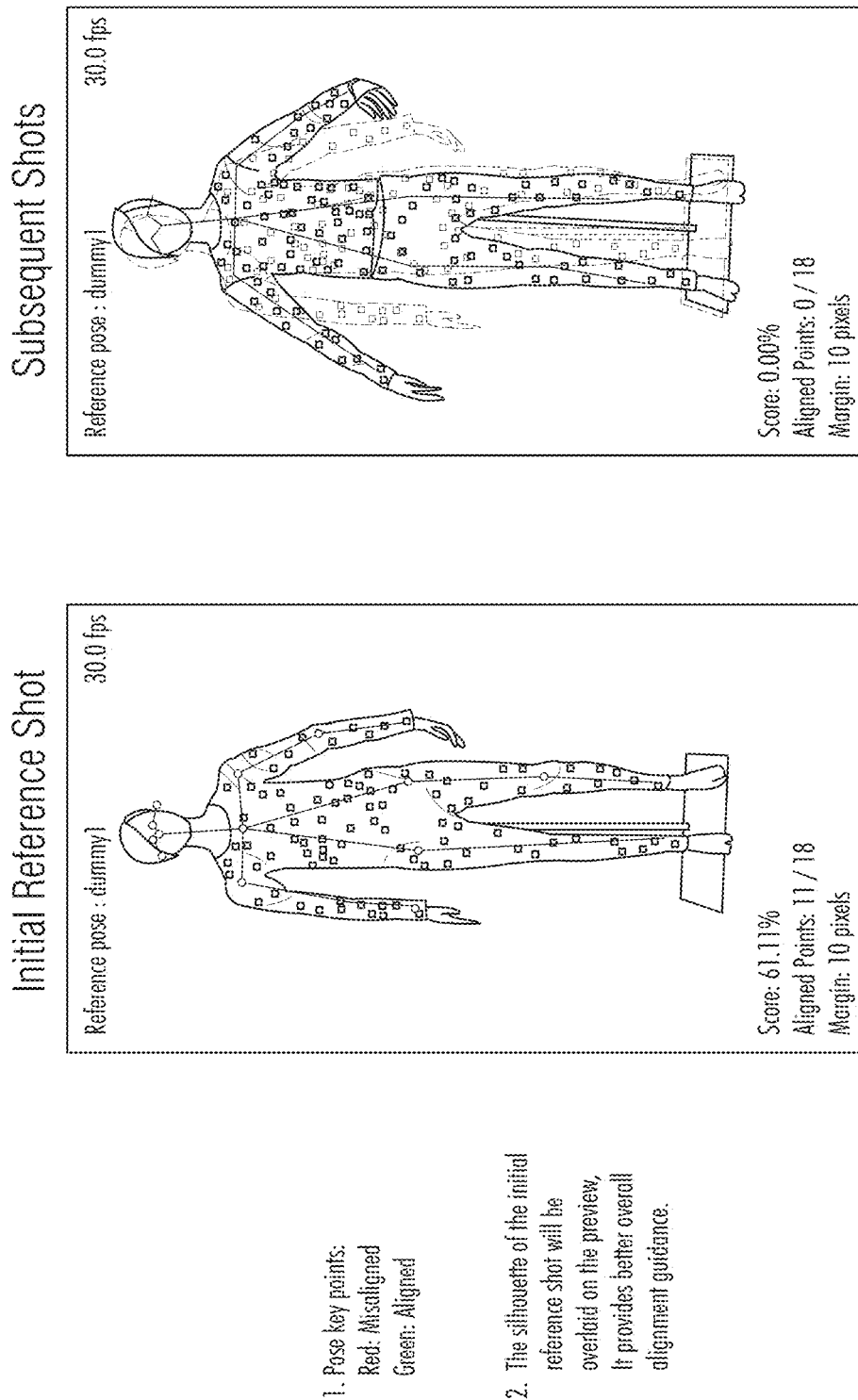
Figure 19B:
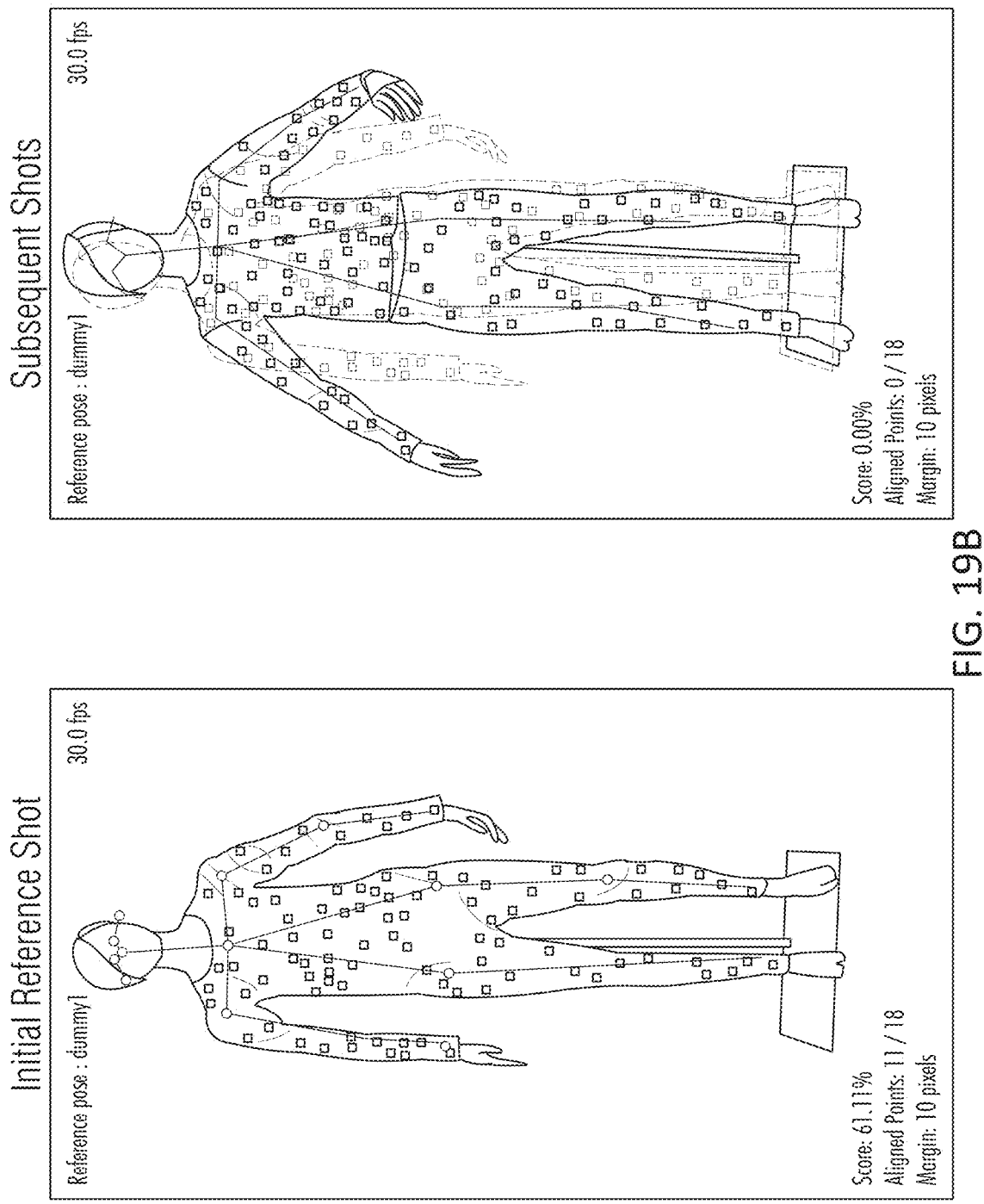

FIGS. 19A-19G are diagrams illustrating example photos of a photo shoot in accordance with the systems and methods described herein. FIGS. 19A-19B illustrate an initial reference shot and subsequent shots. In an example embodiment color coding may be used with respect to key points in the pose. For example, red may indicate misaligned key points and green may indicate aligned key points. As illustrated in FIG. 19, dots may be used to illustrate misalignment and alignment. For example, in color photos, a red dot may indicate misalignment and a green dot may indicate alignment. Additionally, in the illustrated example the silhouette of the initial reference shot may be overlaid on the preview. The silhouette of the initial reference shot may provide better overall alignment guidance.

Figure 19G:
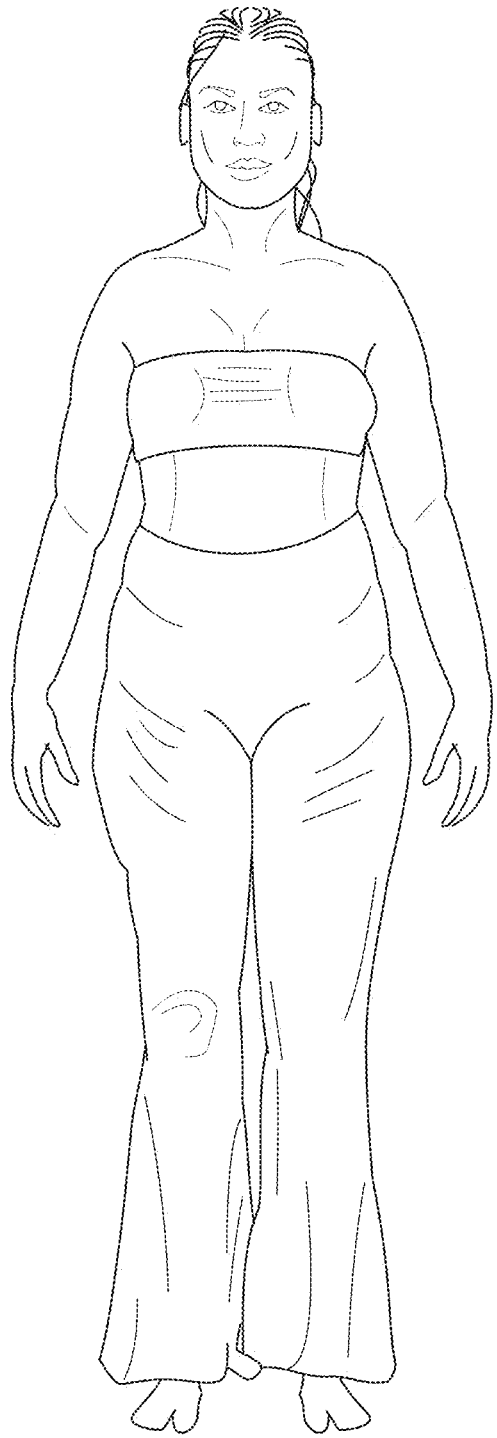

FIG. 19C illustrates various photographs (shots) of a source model in a photo shoot, including a reference shot, a correspondence shot, and a cloth shot. The reference shot, the correspondence shot, and the cloth shot are defined in the discussion of FIG. 18 above. FIG. 19D illustrates various photographs (shots) of a target model in a photo shoot, including a reference shot and a correspondence shot. FIG. 19E illustrates misalignment issues between the models. For example, a well aligned shot 1925 and a misaligned shot 1827 are illustrated. FIG. 19F also illustrates misalignment issues between the models and includes a cloth overlay 1929. In some example embodiments alignment may be performed manually. For example, some example embodiments may use manual alignment through the data pipeline. In such an example, a person operating the system may manually align the shots as illustrated in FIG. 19G.

In a virtual try-on system, manual alignment of a shot may refer to the process of manually adjusting or aligning a virtual garment or accessory, or manually adjusting or aligning a virtual representation of a person with, e.g., a reference shot of a model. In an example, a corresponding user's body in a captured or uploaded image or video. The manual alignment may involve carefully positioning and matching the virtual item (or model) with the user's or model's body landmarks or reference points to create a realistic and accurate virtual representation.

Steps may include User Image Acquisition, Landmark Detection, Virtual Garment Placement, Fine-Tuning and Refinement, Real-Time Visualization. By performing manual alignment of a shot in a virtual try-on system, the aim is to create a seamless integration of the virtual garment or accessory with the user's image or video, providing an accurate representation of how the clothing item would look on the user.

In other example embodiments A computing system may compare two or more shots and perform an automated alignment. Automated alignment of two shots in a virtual try-on system may refer to the process of automatically aligning a virtual garment or accessory with the user's body in two separate images or videos. Automated alignment may involve utilizing computer vision and image processing techniques to analyze and align the virtual item with the user's body in a consistent and accurate manner (or aligning a pose of a second model, e.g., the user with a first model, e.g., a reference model). Machine learning may also be used to analyze and align the virtual item with the user's body in a consistent and accurate manner.

Automated alignment may include Landmark Detection, where the system may use computer vision and machine learning algorithms to automatically detect and identify key landmarks or reference points on the user's body in both images and/or videos. These landmarks may act as anchor points for alignment. The system may perform Feature Matching where the system analyzes the features of the virtual garment and the user's body in both images or videos and identifies common features or patterns that can be matched between the two sets of data. The system may also perform Transformation Estimation based on the matched features and detected landmarks, the system estimates the necessary transformations, such as translation, rotation, and scaling, to align the virtual garment with the user's body. Some example embodiments may perform Alignment Adjustment. The estimated transformations may be applied to the virtual garment to align it with the user's body in the second image or video. This adjustment ensures that the virtual garment maintains consistent positioning and proportions across the two shots. An example embodiment may perform Real-Time Visualization. The system provides real-time visualization of the aligned virtual garment, allowing the user or operator to see how it fits on the user's body in the second image or video. This visualization aids in assessing the alignment quality and making any necessary refinements. Automated alignment in a virtual try-on system may reduce the need for manual intervention and streamlines the process of aligning virtual garments with the user's body. By leveraging computer vision and machine learning techniques, it enables efficient and accurate alignment, providing users with a realistic and personalized virtual try-on experience.

Figure 20:
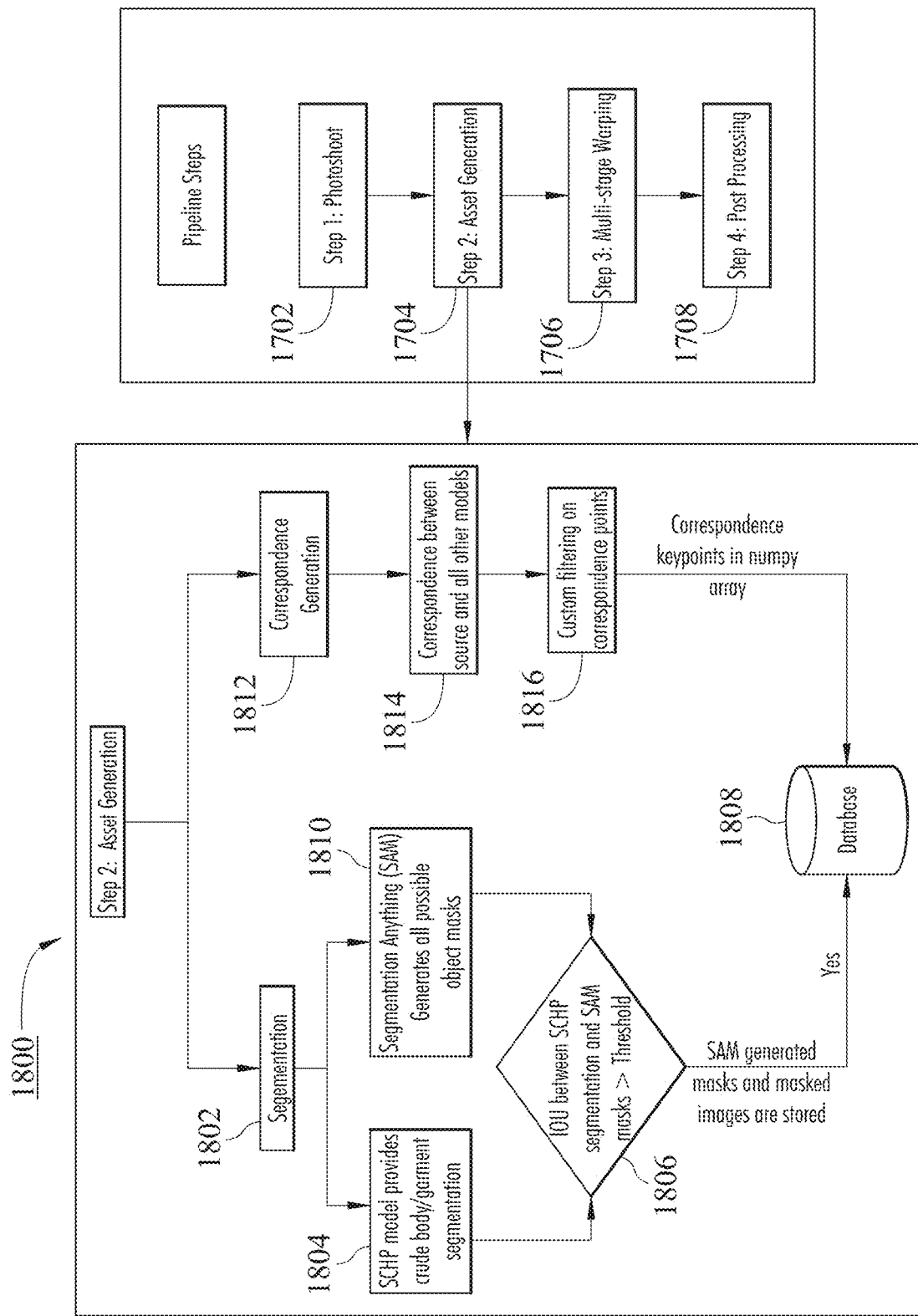
FIG. 20 is another flow diagram illustrating an example of steps and sub-steps within a pipeline in accordance with the systems and methods described herein.

FIG. 20 is another flow diagram illustrating an example of steps and sub-steps 1800 within a pipeline in accordance with the systems and methods described herein. The sub-steps 1800 include segmentation (1802), an Self Correction for Human Parsing (SCHP) model may provide crude body/garment segmentation (1804), a determination may be made that an Intersection over Union (IOU) between SCHP segmentation and Segment Anything Model (SAM) masks is greater than a threshold (1806). When the IOU between SCHP segmentation and the SAM masks are greater than a threshold (1806), the SAM generated masks and masked images may be stored in database (1808). SAM generates all possible object masks. The system may perform correspondence generation (1812), correspondence may be determined between source and all other models (1814). The system may also perform custom filtering on correspondence points (1816). Correspondence key points may be in a NumPy array.

IOU may be used as a metric in computer vision, including virtual try-on systems. IOU may be used to measure the overlap between two bounding boxes or regions of interest. For example, IOU may be used to evaluate the accuracy of the virtual garment's alignment with the user's body. IOU may quantify how well the virtual garment aligns with the corresponding region of the user's body in terms of spatial overlap.

IOU may be calculated using a Bounding Box Definition, an Intersection Calculation, a Union Calculation, or a IOU Calculation. An example formula for IOU is:

$$IOU = \text{Intersection Area}/\text{Union Area}.$$

The IOU score may range from 0 to 1, with a score of 1 indicating a perfect alignment or complete overlap between the virtual garment and the user's body. A higher IOU score signifies a better alignment and a closer fit of the virtual garment to the user's body.

Self-Correction for Human Parsing (SCHP) is a body-part and garment segmentation model which provides semantic labels and segmentation masks for person images. (See Li, Peike, Yunqiu Xu, Yunchao Wei, and Yi Yang. "Self-correction for human parsing." IEEE Transactions on Pattern Analysis and Machine Intelligence 44, no. 6 (2020): 3260-3271.) However, its masks are crude and often inaccurate.

Segment Anything Model (SAM) is another segmentation model that only provides segmentation masks for objects, including persons. (See Kirillov, Alexander, Eric Mintun, Nikhila Ravi, Hanzi Mao, Chloe Rolland, Laura Gustafson, Tete Xiao et al. "Segment anything." arXiv preprint arXiv:2304.02643 (2023).) SAM provides accurate object masks but it does not provide semantic labels for object masks. By incorporating SCHP guidance with SAM, this improves the localization of objects while providing semantic labels to them.

Figure 21:
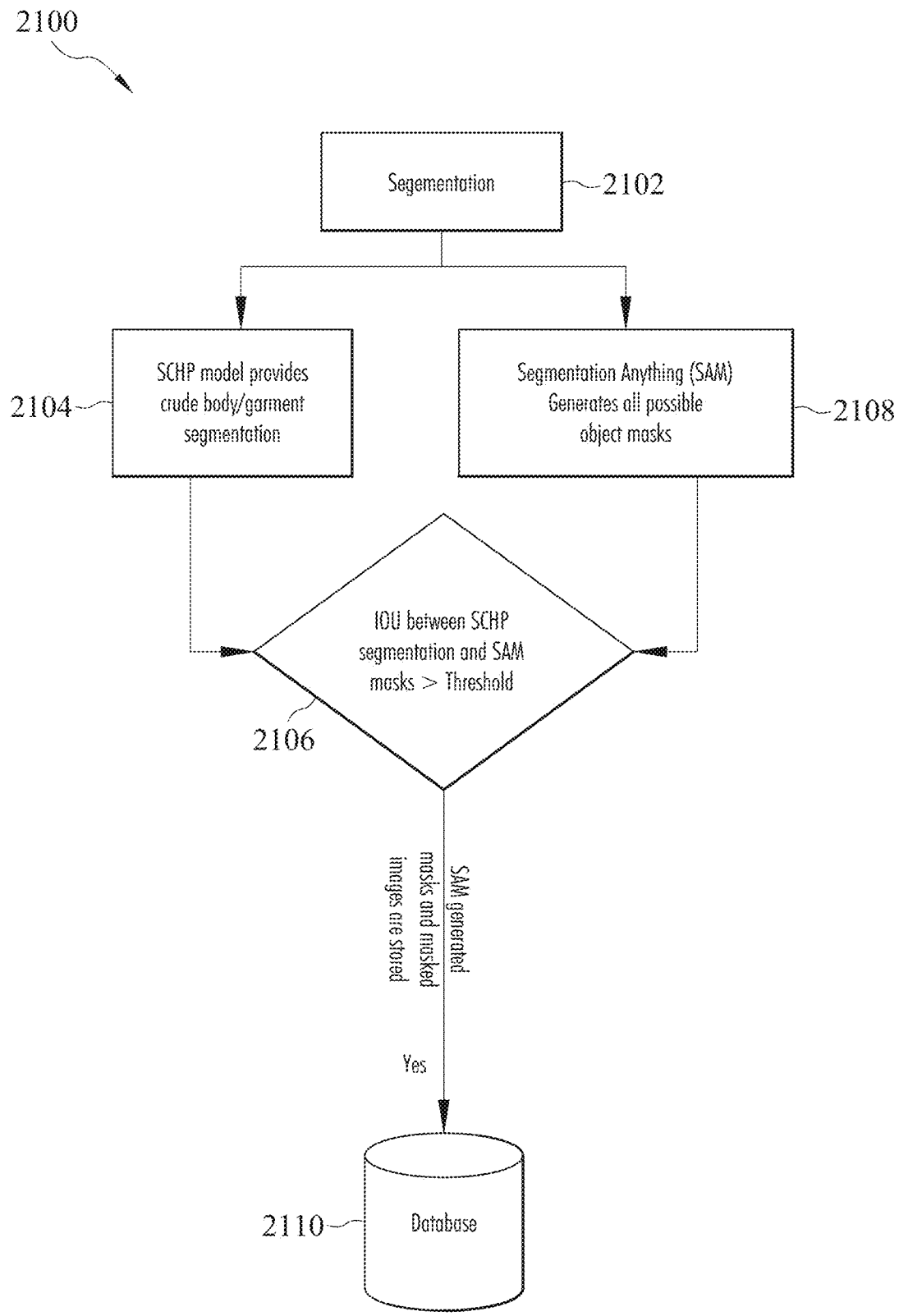
FIG. 21 is a flow diagram illustrating an example of steps related to segmentation in accordance with the systems and methods described herein.

FIG. 21 is a flow diagram illustrating an example of steps related to segmentation 2100 in accordance with the systems and methods described herein. Segmentation may begin at block (2102). The SCHP model may provide crude body and/or garment segmentation (2104). A determination may be made that the IOU between the SCHP segmentation and SAM masks is greater than a threshold (2106). SAM may generate all possible object masks (2108). The SAM generated masks and mask images may be stored in a database 2110.

FIG. 22 is a diagram related to segmentation in accordance with the systems and methods described herein. FIG. 22 further illustrates segmentation with SCHP-guided SAM. Segmentation may be used to identify which pixels in an image correspond to specific predefined labels.

Figure 23:
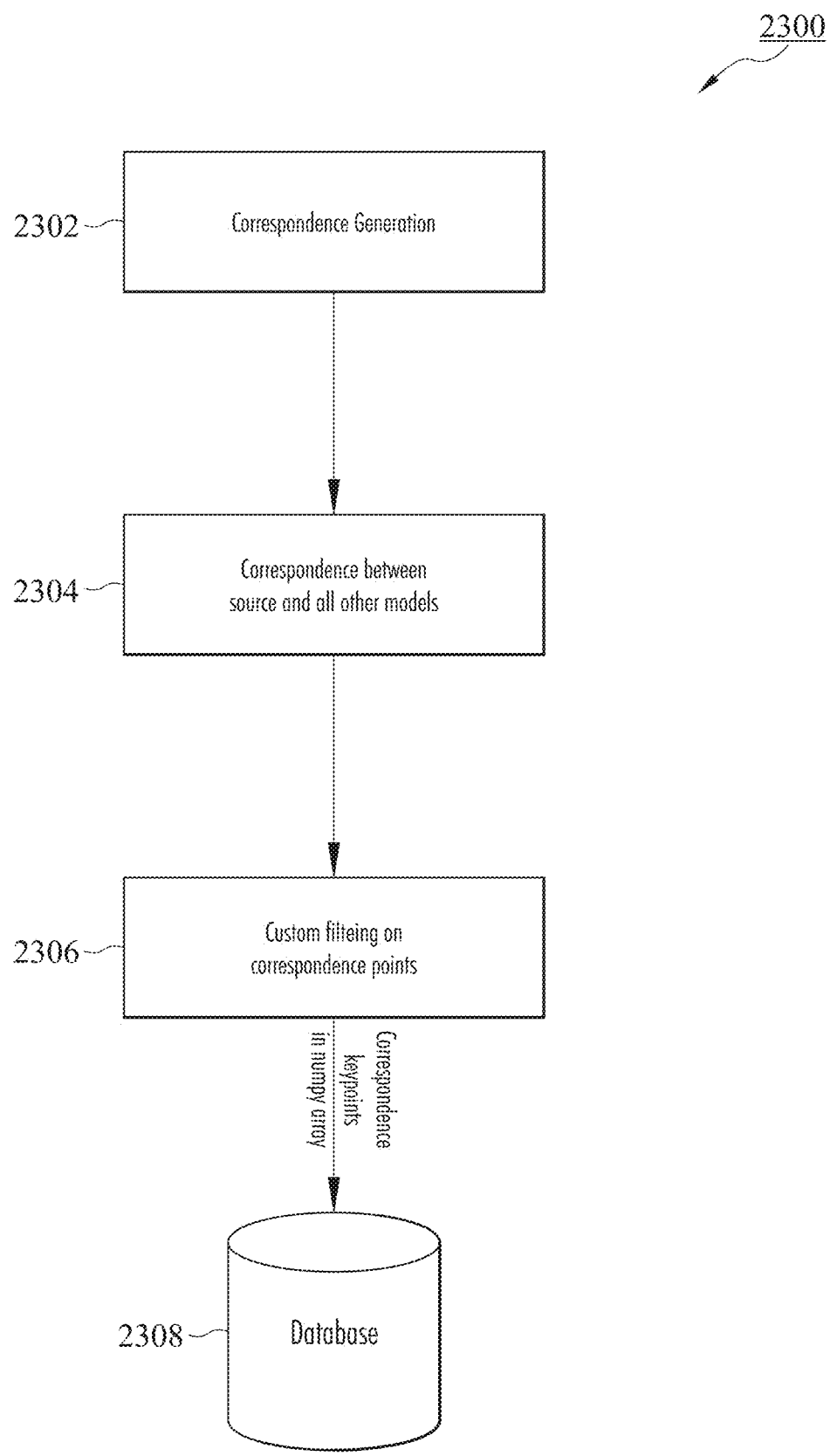
FIG. 23 is a flow diagram illustrating an example related to correspondence in accordance with the systems and methods described herein.

FIG. 23 is a flow diagram illustrating an example 2300 related to correspondence in accordance with the systems and methods described herein. Correspondence generation may begin at block (2302). In virtual try-on, correspondence refers to the process of establishing a meaningful relationship or association between the virtual garment and the user's body or image/video. Correspondence involves identifying and aligning specific points or regions of the garment with the corresponding points or regions on the user's body. The correspondence between source and all other models may be determined (2304). Custom filtering on correspondence points may be performed (2306). Custom filtering in correspondence for virtual try-on may refer to a technique or process that allows for the customization and refinement of the correspondence between the virtual garment and the user's body. The filtering may involve applying specific filters or adjustments to improve the accuracy and quality of the alignment. The correspondence keypoints may be stored in a database, e.g., using a numpy array (2308). A Numpy array is a fundamental data structure in the NumPy (Numerical Python) library, which is a popular package for numerical computations in Python. A NumPy array, also known as ndarray, is a multi-dimensional container that stores elements of the same data type in a contiguous block of memory.

Figure 24A:
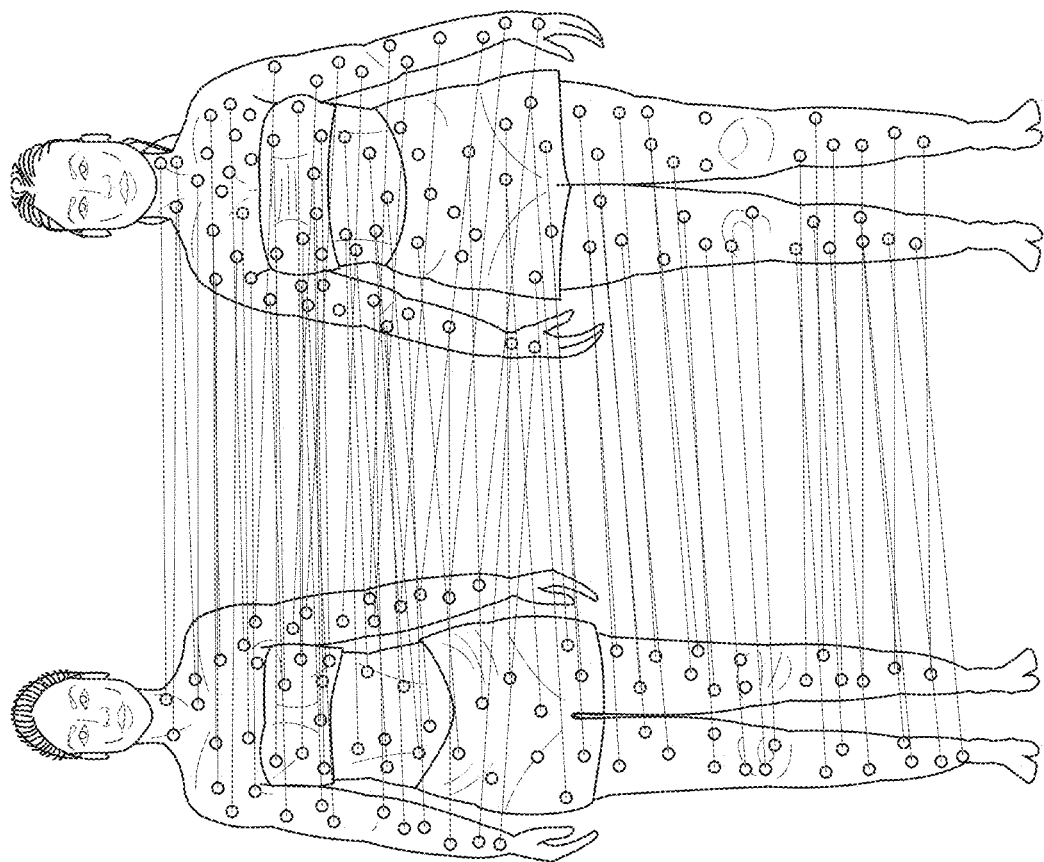
Figure 24H:
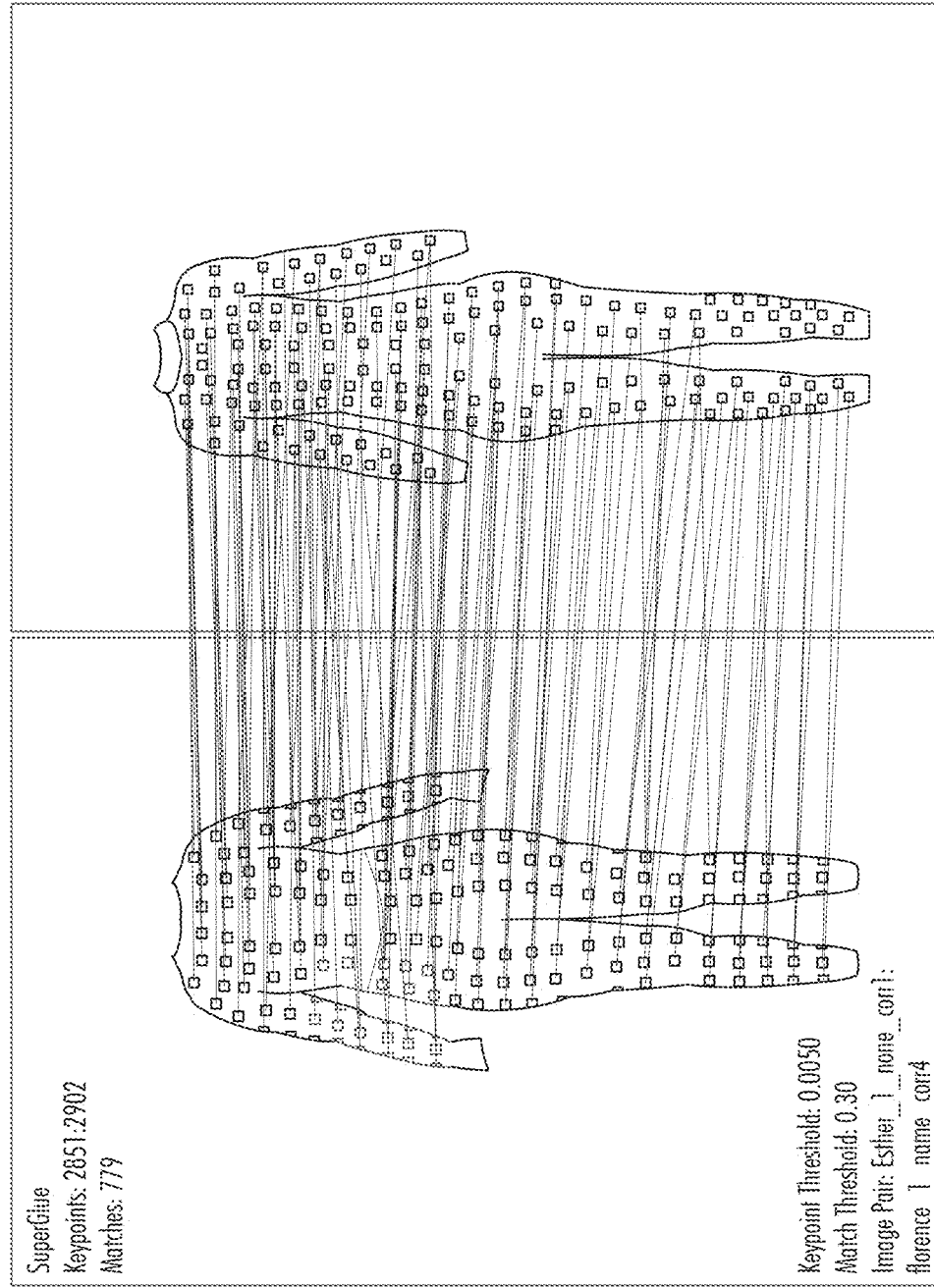
Figure 24J:
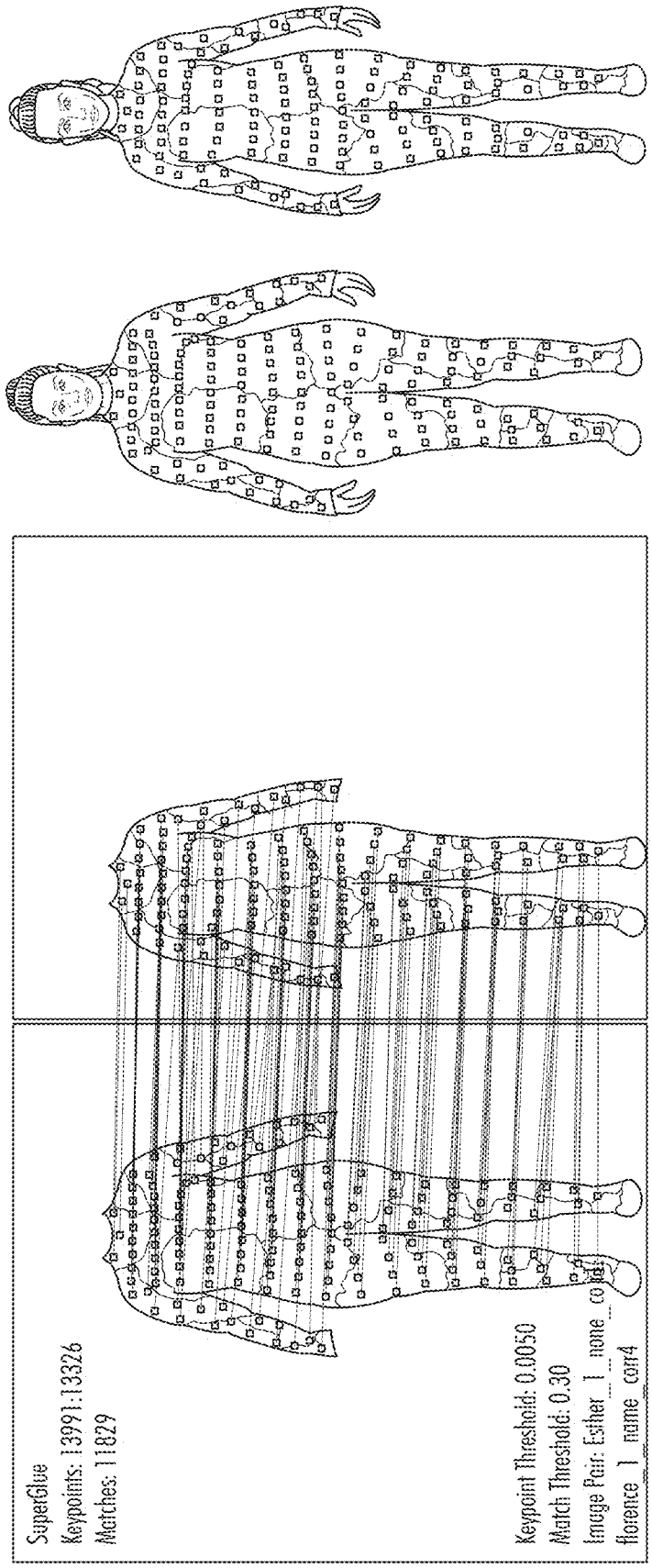

FIGS. 24A-24K are diagrams related to correspondence in accordance with the systems and methods described herein. FIG. 24A illustrates transferring correspondence points on an undergarment. FIG. 24B illustrates transferring correspondence points using off-the-self complex patterns. The example of version 1 (FIG. 24B) used a top only. FIG. 24C illustrates transferring correspondence points using a custom top that may have a pattern, and possibly a complex pattern in some examples. The example of version 2 (FIG. 24C) used a top only. FIG. 24D illustrates version 3 for transferring correspondence points using custom garments, e.g., a full bodysuit, in accordance with the systems and methods described herein. The example of version 3 may use a better off-the-shelf full bodysuit. FIG. 24E illustrates transferring correspondence points in version 4, using a custom garments that includes a custom top and a custom bottom in accordance with the systems and methods described herein. FIG. 24F illustrates transferring correspondence points using April Tag Focus in accordance with the systems and methods described herein. FIG. 24G illustrates transferring correspondence points using custom printed and/or stitched garments, e.g., April Tags and/or a triangle pattern in accordance with the systems and methods described herein. FIG. 24H illustrates transferring correspondence points in accordance with the systems and methods described herein. The example indicates that not all points on a garment are created equal. Some points are out of view. Some points are stretched apart, some points are closer together, e.g., based on body shape. FIG. 24I illustrates transferring correspondence points in accordance with the systems and methods described herein. FIG. 24J illustrates a seventh version for determining correspondence on complex patterns. Some examples may used "SuperGlue." Superglue is a specific algorithm or method used for establishing dense pixel-level correspondence between the virtual garment and the user's body or image/video.

FIG. 24K illustrates a custom garment for virtual try-on of fashion garments. In an example embodiment, the custom garment may include a fabric or material suitable for garment production. The fabric may form a form-fitting garment. The fabric may include a set of patterns integrated into the fabric. The patterns may be designed for body mapping. For example, the set of patterns may be configured to allow for a mapping system to digitally map a user's body measurements to the set of patterns such that a virtual try-on application may overlay another garment on the user's body based on the mapping using the custom garment.

In an example embodiment, the custom garment may be a full body, form-fitting suit, covering a user's body leaving only the hands and head exposed. In an example embodiment, the set of patterns integrated into the fabric further comprises one or more of a proprietary mix of colors, a proprietary mix of patterns, and AprilTags. In an example embodiment, the set of patterns integrated into the fabric are configured to maximize correspondence points between two different people when both parties wear such a custom garment. In an example embodiment, the set of patterns integrated into the fabric are configured to maximize correspondence points between two different people when one party wears the custom garment, and a corresponding custom garment is applied to a second party digitally. In an example embodiment, the set of patterns integrated into the fabric further comprises one or more of a proprietary mix of colors, a proprietary mix of patterns, and AprilTags, wherein the set of patterns integrated into the fabric are configured to maximize correspondence points between two different people when a first party and a second party both wear the custom garment digitally.

Figure 25:
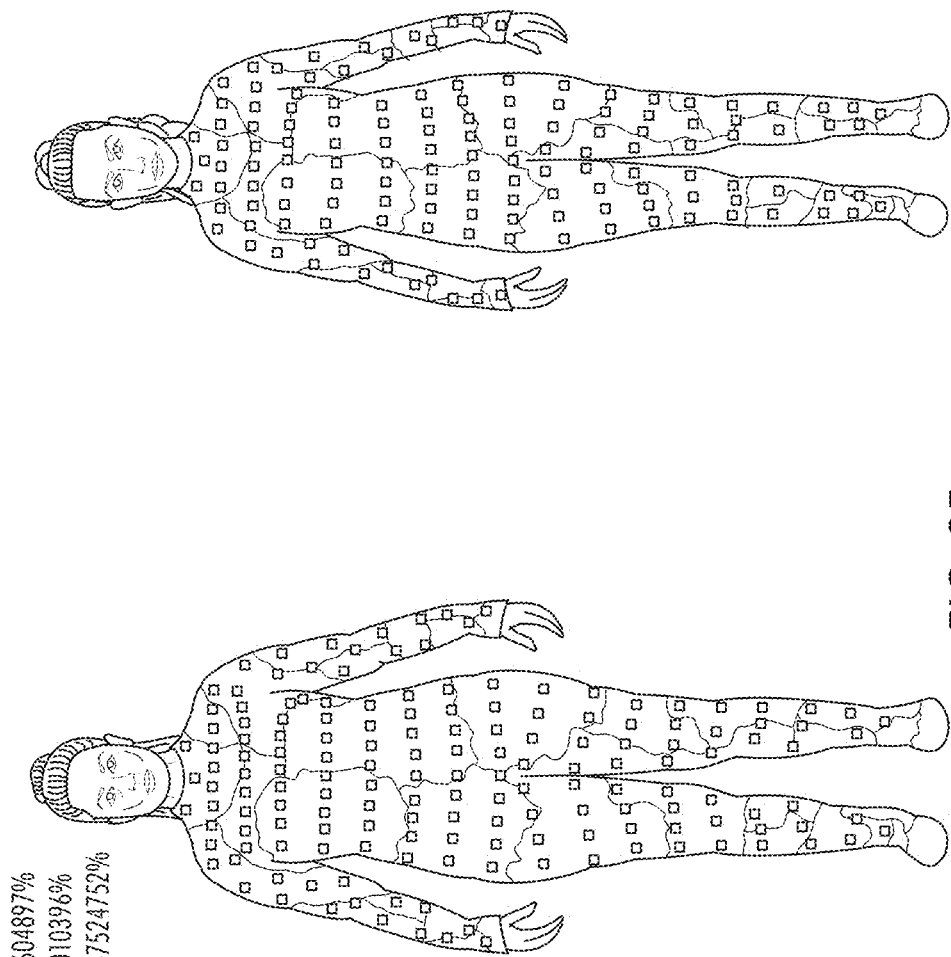
FIG. 25 is another diagram related to correspondence in accordance with the systems and methods described herein.

FIG. 25 is another diagram related to correspondence in accordance with the systems and methods described herein. The figure illustrates a number of different shapes, lines, colors, and areas. The example uses a full bodysuit. It will be understood that these shapes, lines, colors, and areas can be used on other garments, e.g., tops, bottoms, or any other garment. Generally covering a greater portion of a user's body may be preferable. Additionally, typically covering the area that is generally covered by clothing may also be preferable.

Figure 26:
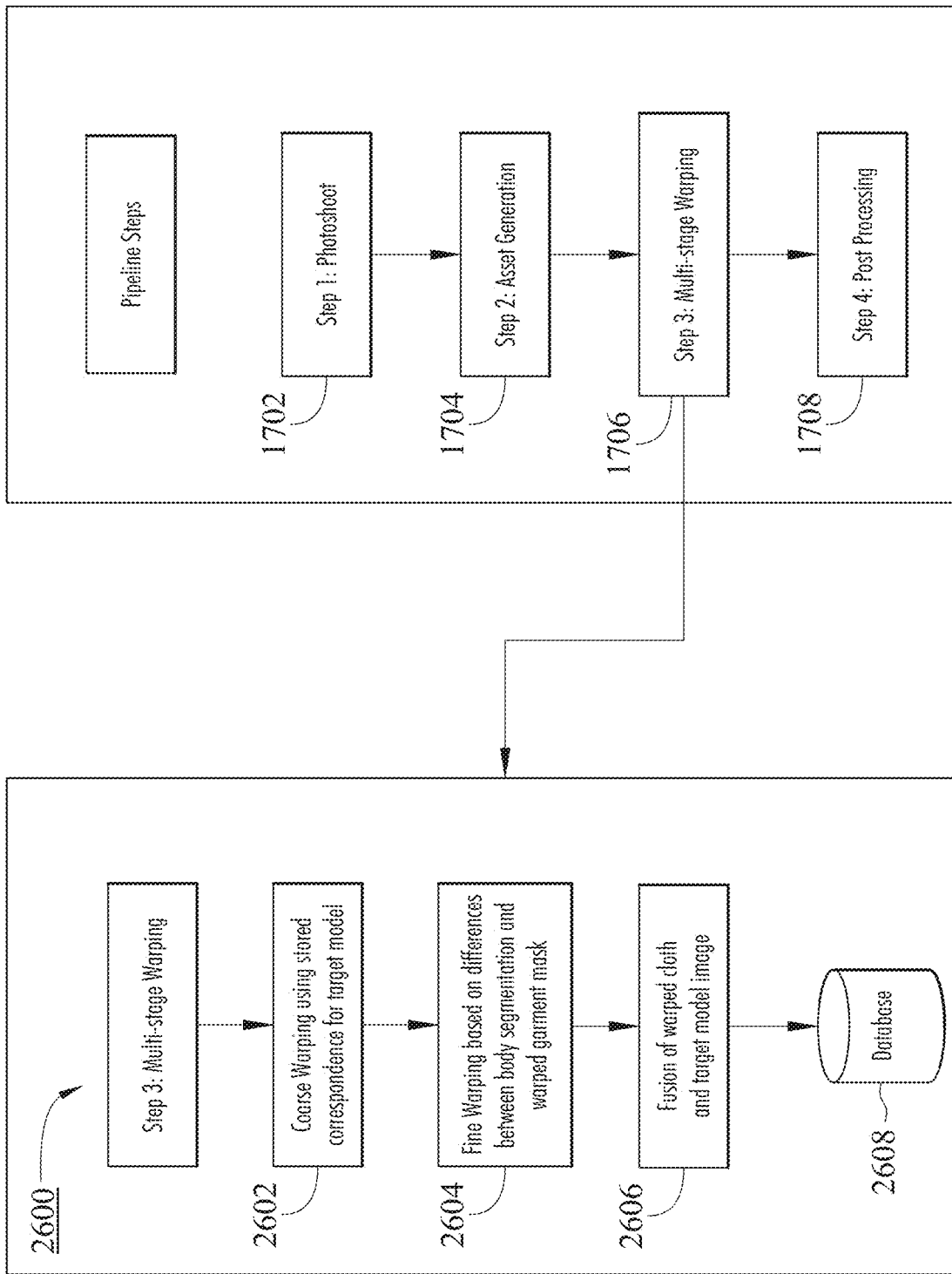
FIG. 26 is another flow diagram illustrating an example of steps and sub-steps within a pipeline in accordance with the systems and methods described herein.

FIG. 26 is another flow diagram illustrating an example of steps and sub-steps within a pipeline in accordance with the systems and methods described herein. More specifically, FIG. 26 illustrates sub-steps to Step 3, multi dash stage warping. In the illustrated example coarse warping using the stored correspondence for the target model may be performed (2602). Fine warping based on differences between body segmentation and warped garment mask may be performed (2604). Fusion of warped cloth and target model image may be performed (2606). The images may be stored in database 2608.

Figure 27C:
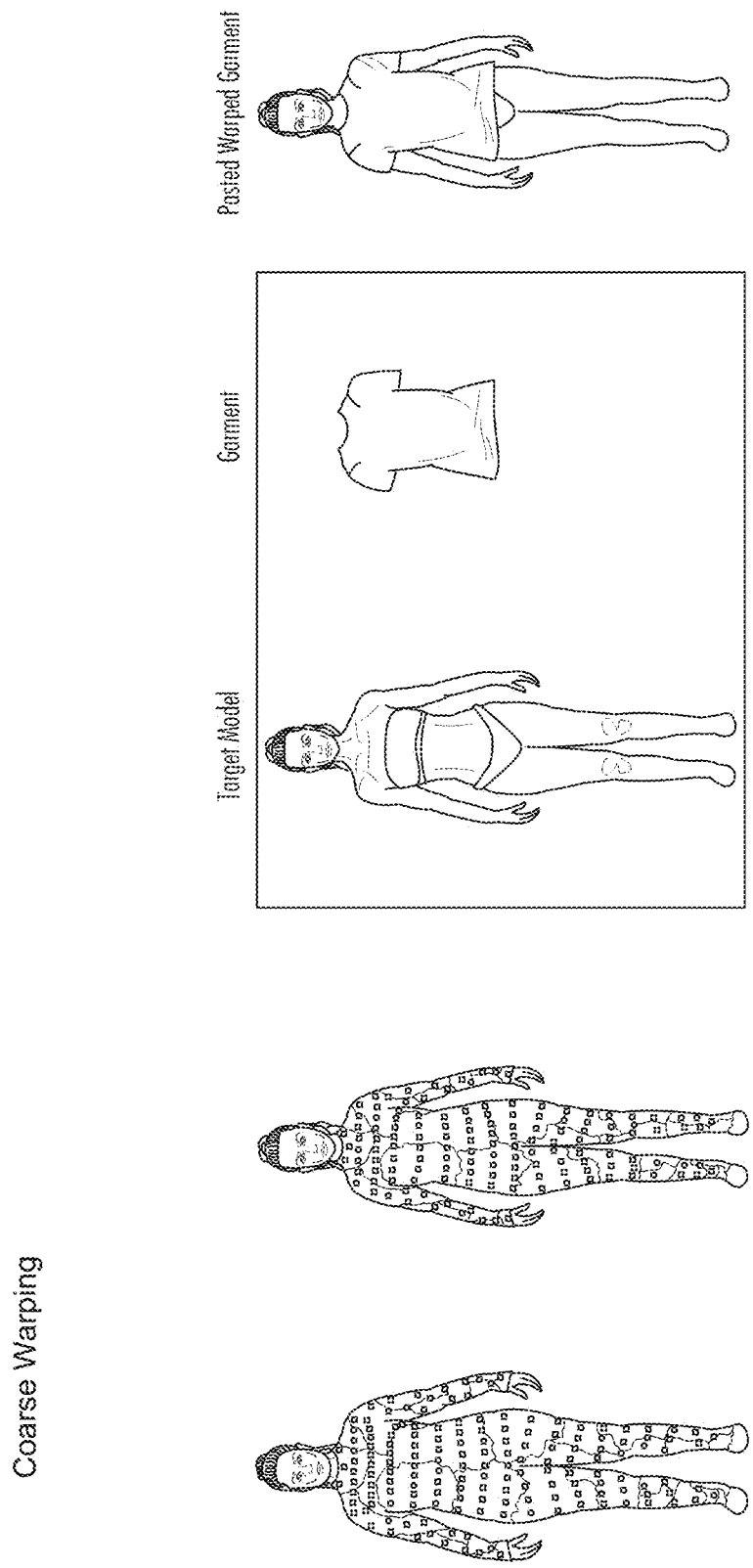
Figure 27D:
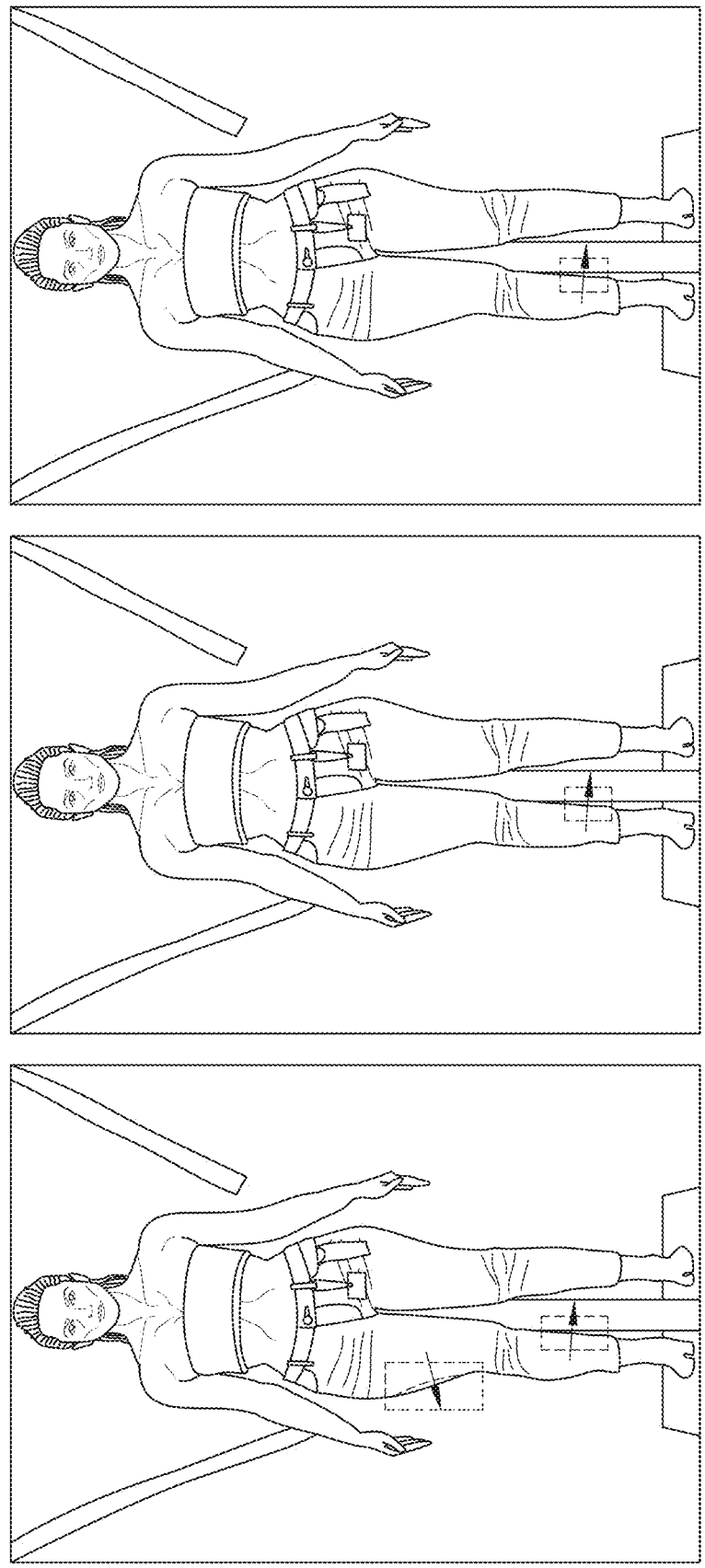

FIGS. 27A1-27F are diagrams related to warping in accordance with the systems and methods described herein. In the illustrated example of FIGS. 27A1-27A2, the warping method of perspective may be compared to thin plate splines (TPS) between the perspective warp and the TPS warp misalignments may be commonly seen during the perspective warp. FIG. 27B illustrates the puppet warp and the TPS warp. FIG. 27C illustrates a coarse warp. FIG. 27D illustrates a fine warp (left leg). FIG. 27E illustrates a fine warp (right leg). FIG. 27E illustrates a fine warp (before and after).

Figure 28:
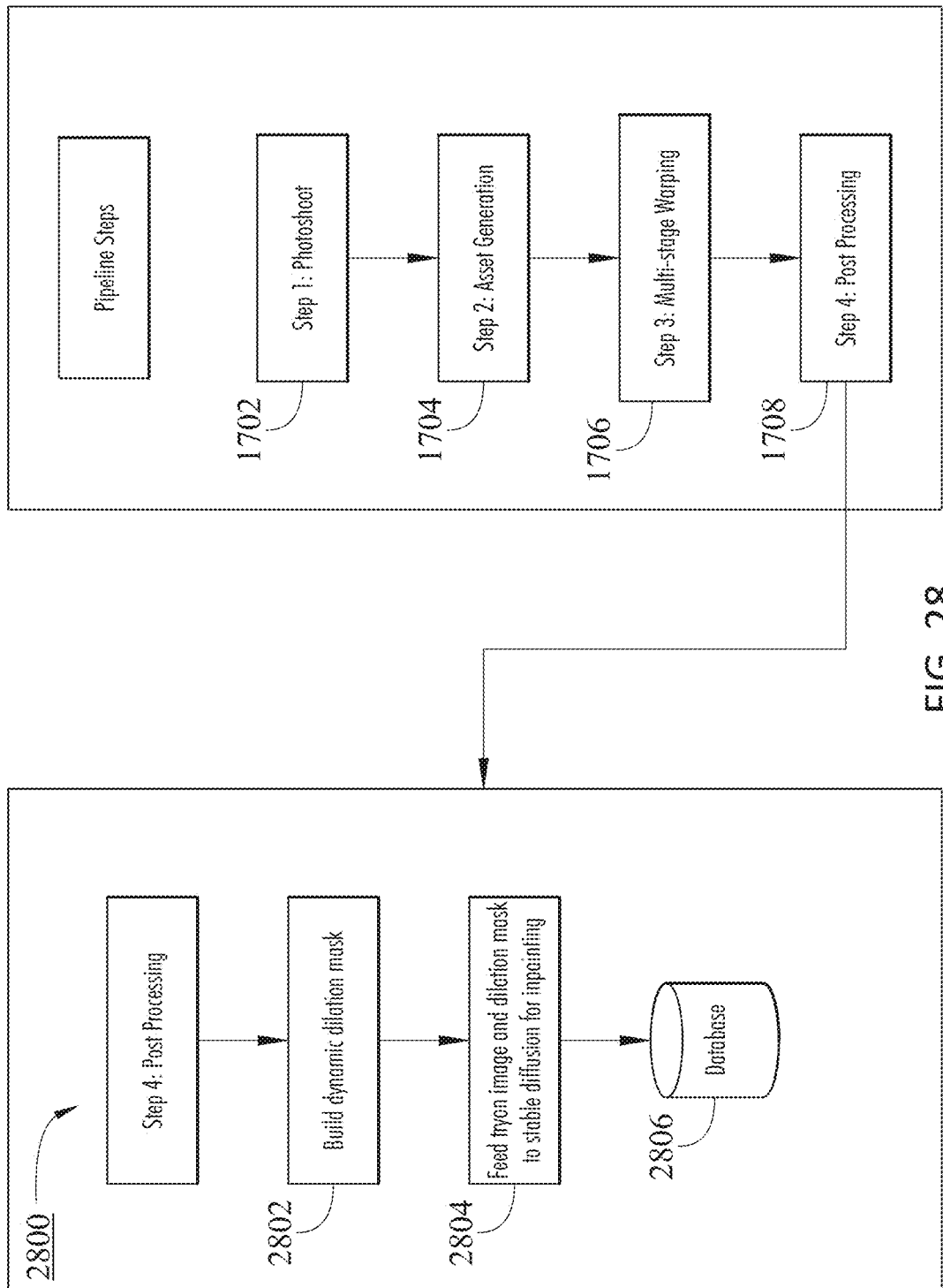
FIG. 28 is another flow diagram illustrating an example of steps and sub-steps within a pipeline in accordance with the systems and methods described herein.

FIG. 28 is another flow diagram illustrating an example of steps and sub-steps 2800 within a pipeline in accordance with the systems and methods described herein. The post-processing (1708) may include building a dynamic dilation mask (2802), feeding a try-on image and dilation mask to an inpainting model (2804), and storing one or more of the post processed images in the database (2806). The dynamic dilation masks is used to identify artifacts, imperfections, or both artifacts and imperfections that are missing. Inpainting is discussed below.

Figure 29B:
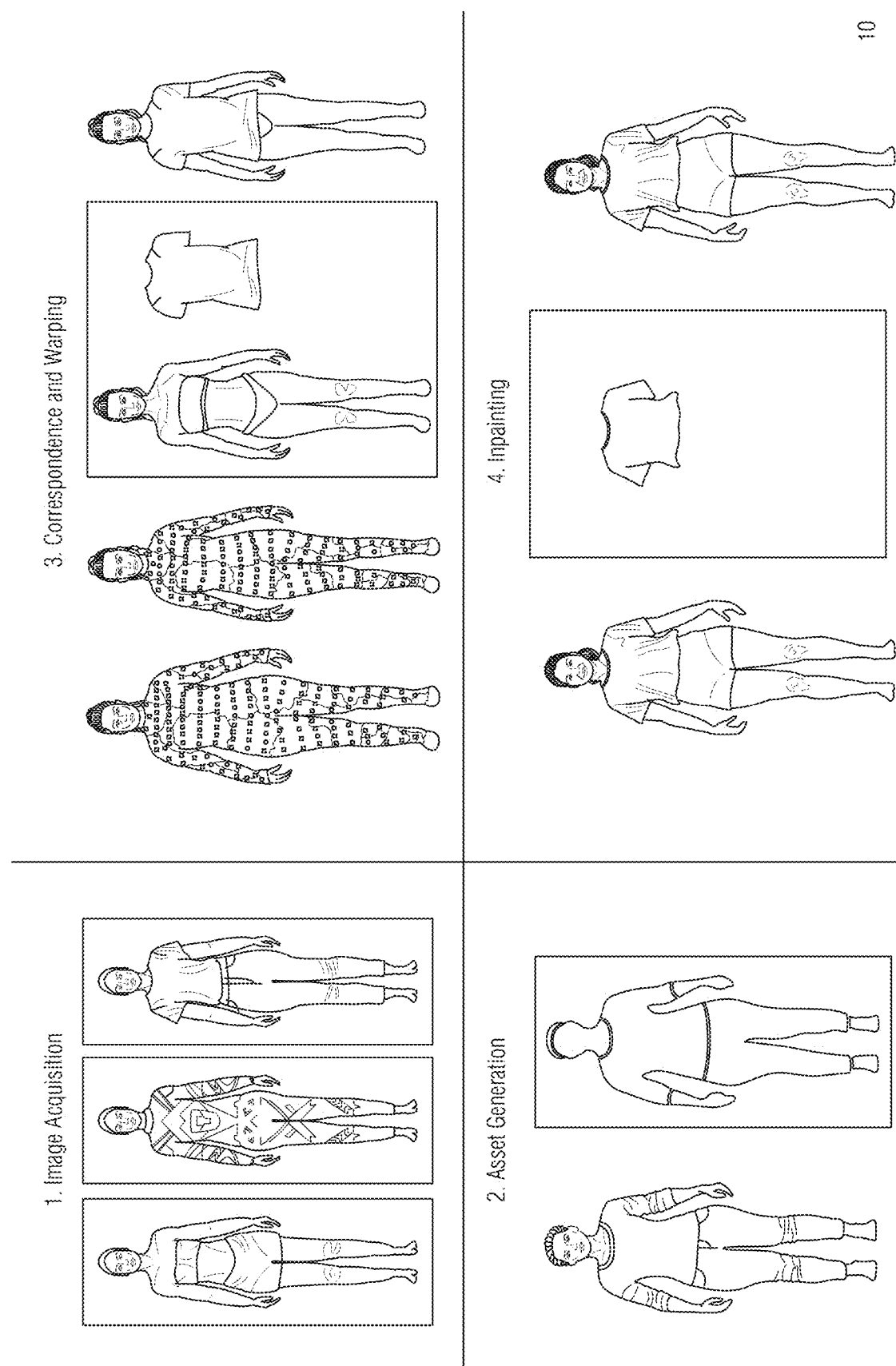

FIGS. 29A-29B are diagrams related to post-processing in accordance with the systems and methods described herein. Inpainting, is a technique used in computer vision and image processing to fill in the missing or occluded regions of a person's appearance when trying on virtual garments or accessories. Inpainting aims to create a visually realistic representation of a person wearing the virtual items, even when certain parts of the body are hidden or obstructed. An example inpainting model used is Stable Diffusion; see Rombach, Robin, Andreas Blattmann, Dominik Lorenz, Patrick Esser, and Bjorn Ommer. "High-resolution image synthesis with latent diffusion models." In Proceedings of the IEEE/CVF Conference on Computer Vision and Pattern Recognition, pp. 10684-10695. 2022. FIG. 29A illustrates inpainting, including an example dynamic dilation mask. FIG. 29B illustrates the inpainting in the context of other steps, e.g., image processing, asset generation, correspondence and warping, and inpainting.

Figure 30:
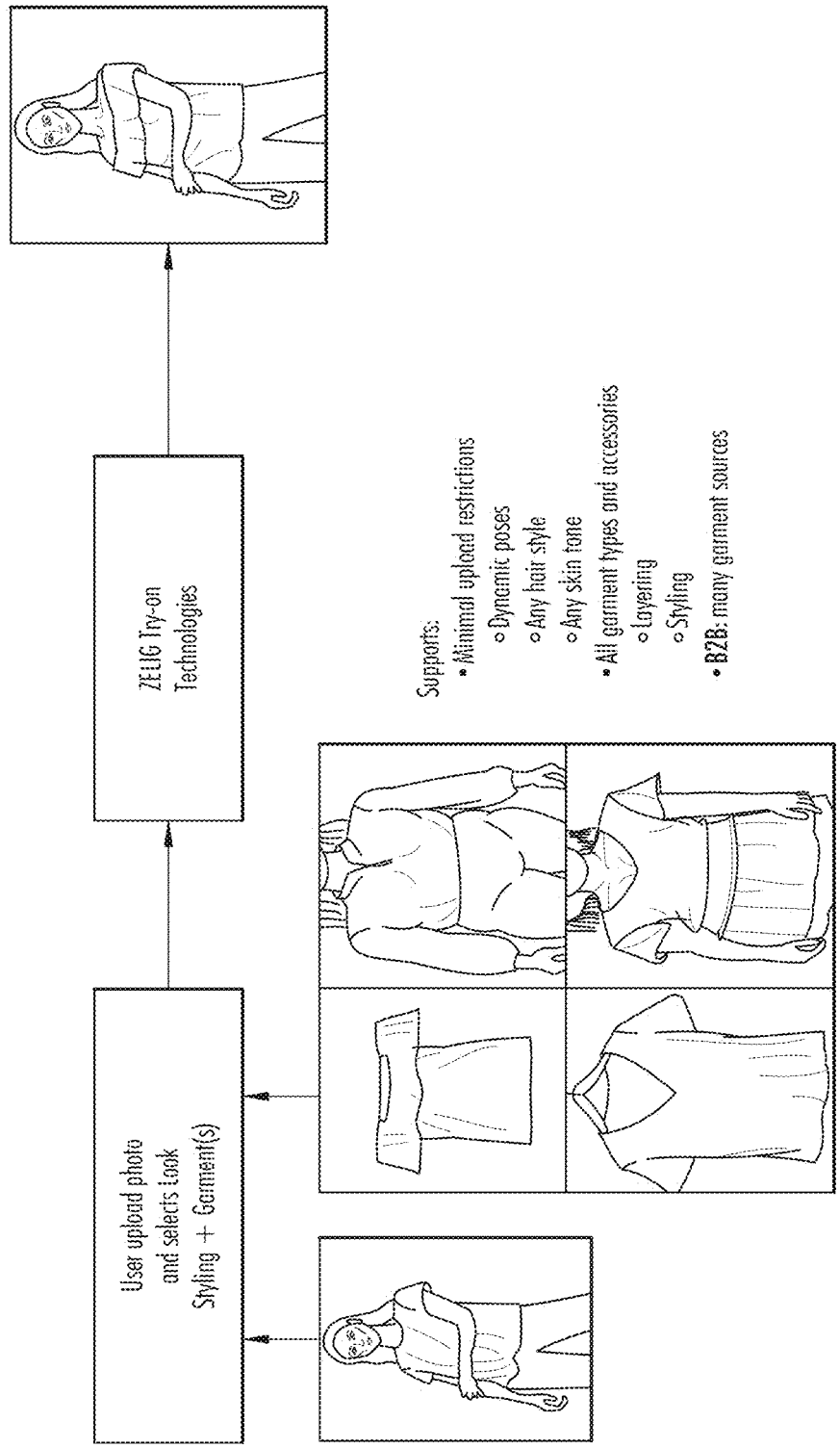
FIG. 30 is a diagram illustrating vision for machine learning virtual try-on in accordance with the systems and methods described herein.

FIG. 30 is a diagram illustrating vision for machine learning virtual try-on in accordance with the systems and methods described herein. In the illustrated example, a user uploads a photo and selects a look styling and garments (3002). The user uploaded photo may then be processed using virtual try-on technology described herein (3004) to generate a picture of a person in the uploaded photograph in the selected look, styling and garments (3006). An example system may support minimal upload restrictions. For example, some examples may include one or more of dynamic poses, any hairstyle, and/or any skin tone. All garment types and accessories may be supported, and may include layering and styling. Through business to business connections many different garments may be provided.

Figure 31:
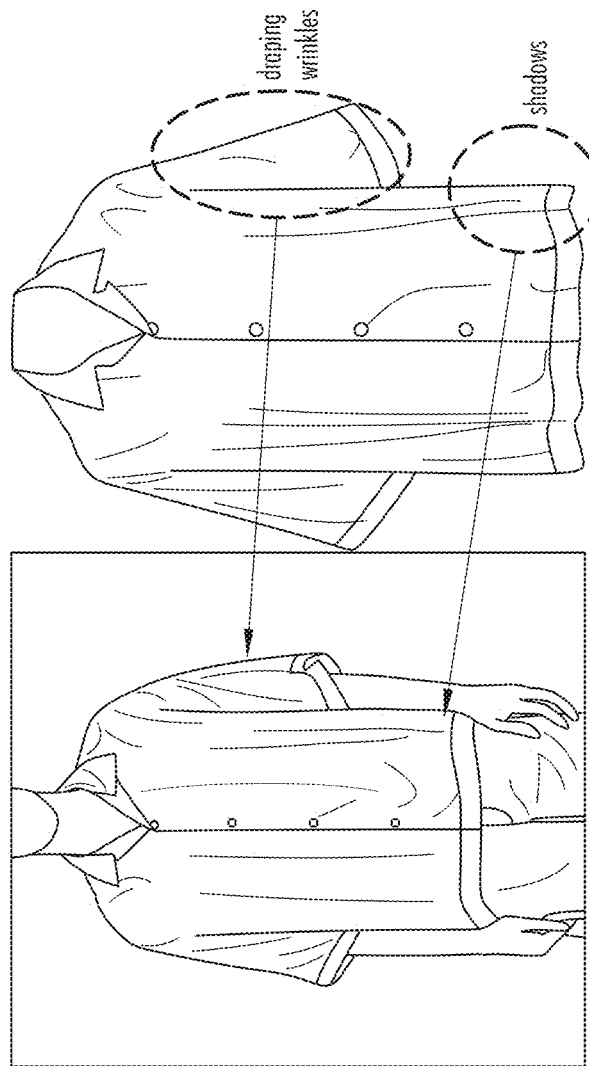
FIG. 31 is a diagram related to limitations of computer vision and/or machine learning in accordance with the systems and methods described herein.

FIG. 31 is a diagram related to limitations of computer vision and/or machine learning in accordance with the systems and methods described herein. While computer vision and/or machine learning has made significant advancements in virtual try-on applications, there are still some limitations and challenges that researchers and developers face. In some examples, computer vision and/or machine learning may not be able to generate content such as draping wrinkles and/or shadows.

FIG. 32 is a table illustrating data requirements in accordance with the systems and methods described herein. The figure illustrates data requirements of Computer Vision (CV) versus Machine Learning (ML). The data quality for CV may be near pixel perfect. The data quality for ML may be higher and better. The ML data quality may be sufficient volume of quality can overcome imperfections. The data characteristic of CV may be that every piece contains exactly everything required. The data characteristic for ML may be that pieces contain disparate information that needs to be aggregated. The data volume for CV may be linear to range of products, poses, and/or body shapes required. The data volume for ML may be ideally the same as for CV, but may depend on the desired generalization (for scale).

Figure 33A:
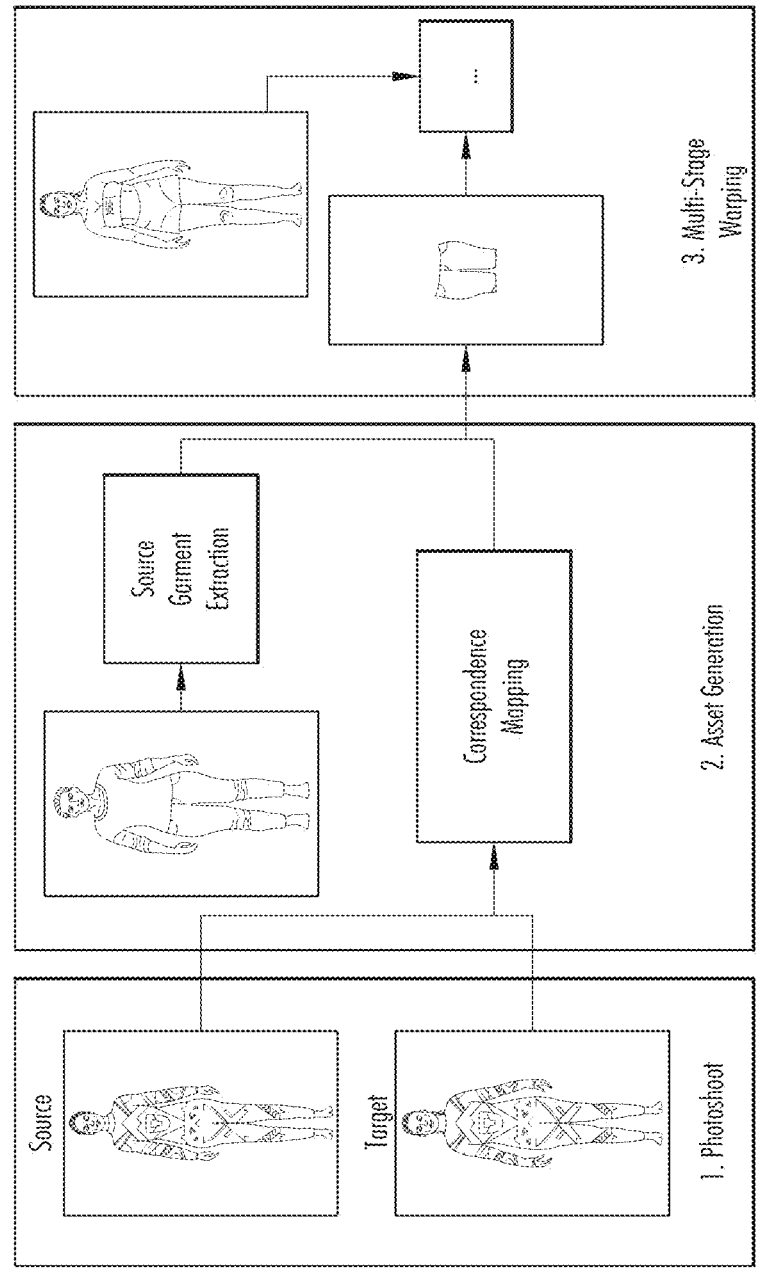
FIGS. 33A-33E are diagrams related to example approaches in accordance with the systems and methods described herein.
Figure 33B:
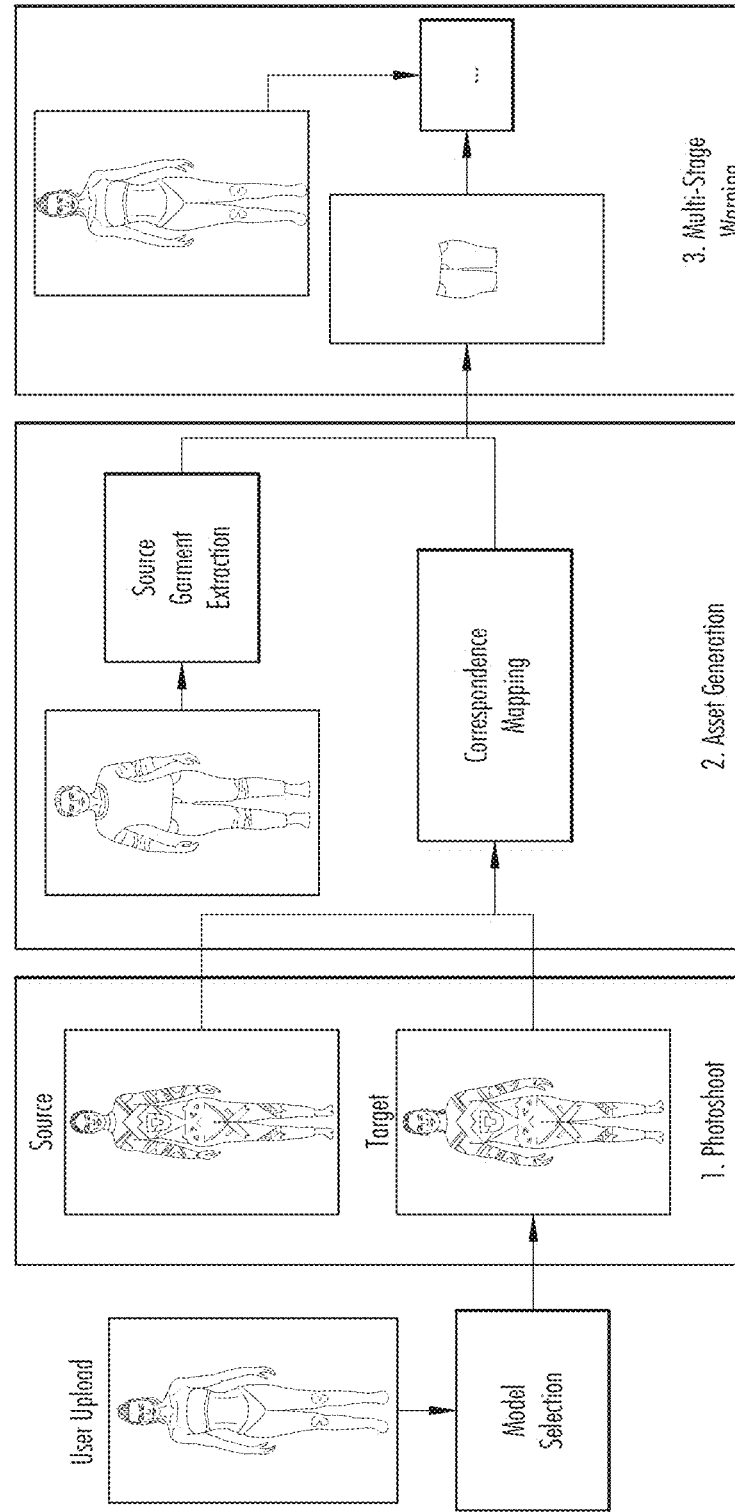
Figure 33C:
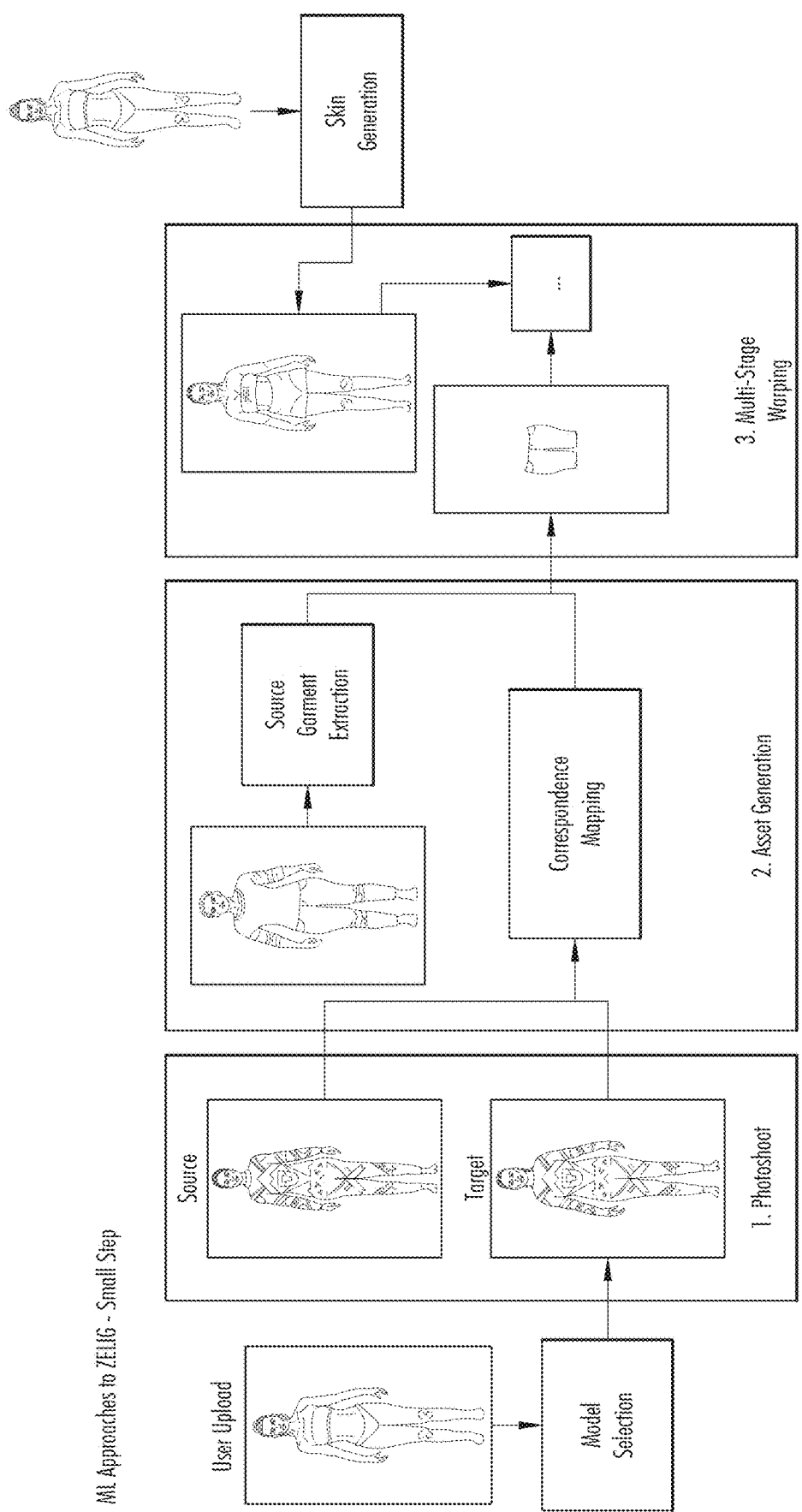
Figure 33D:
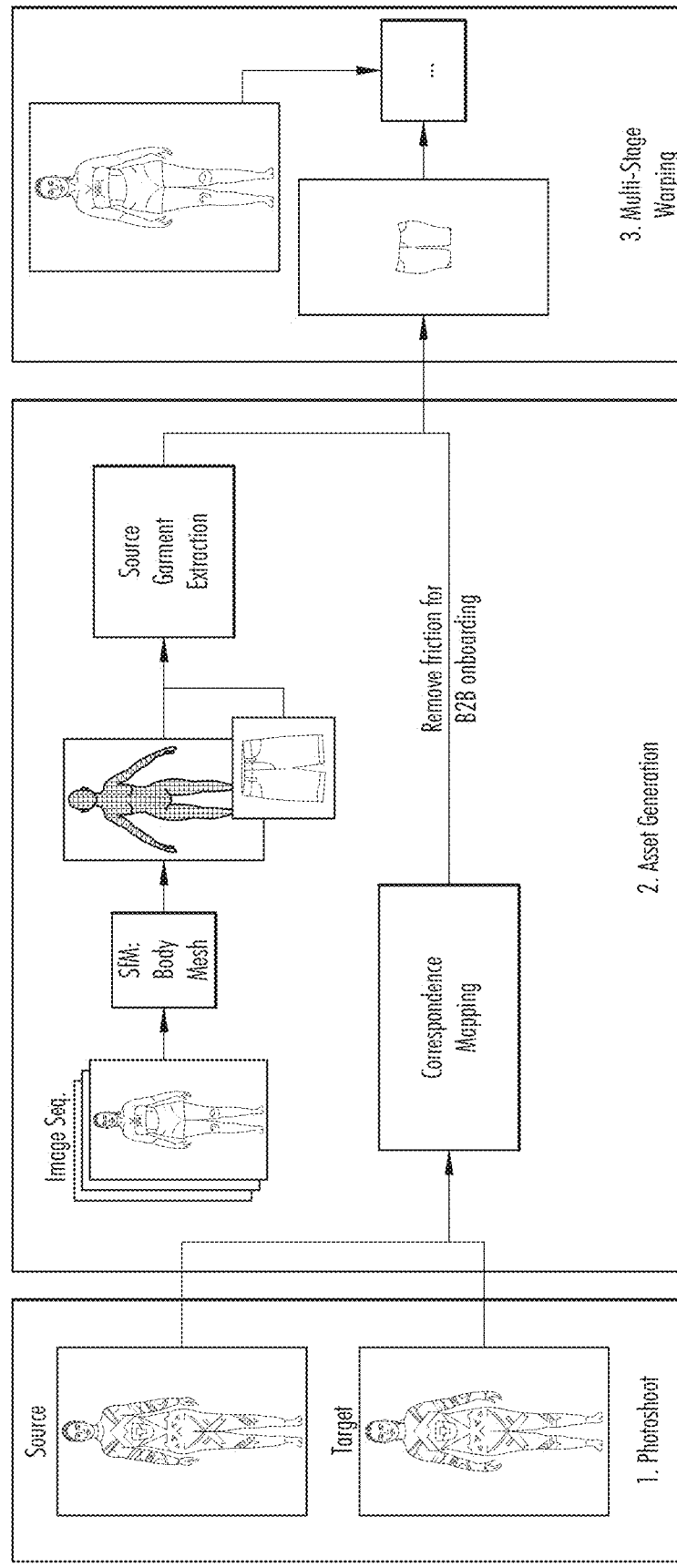
Figure 33E:
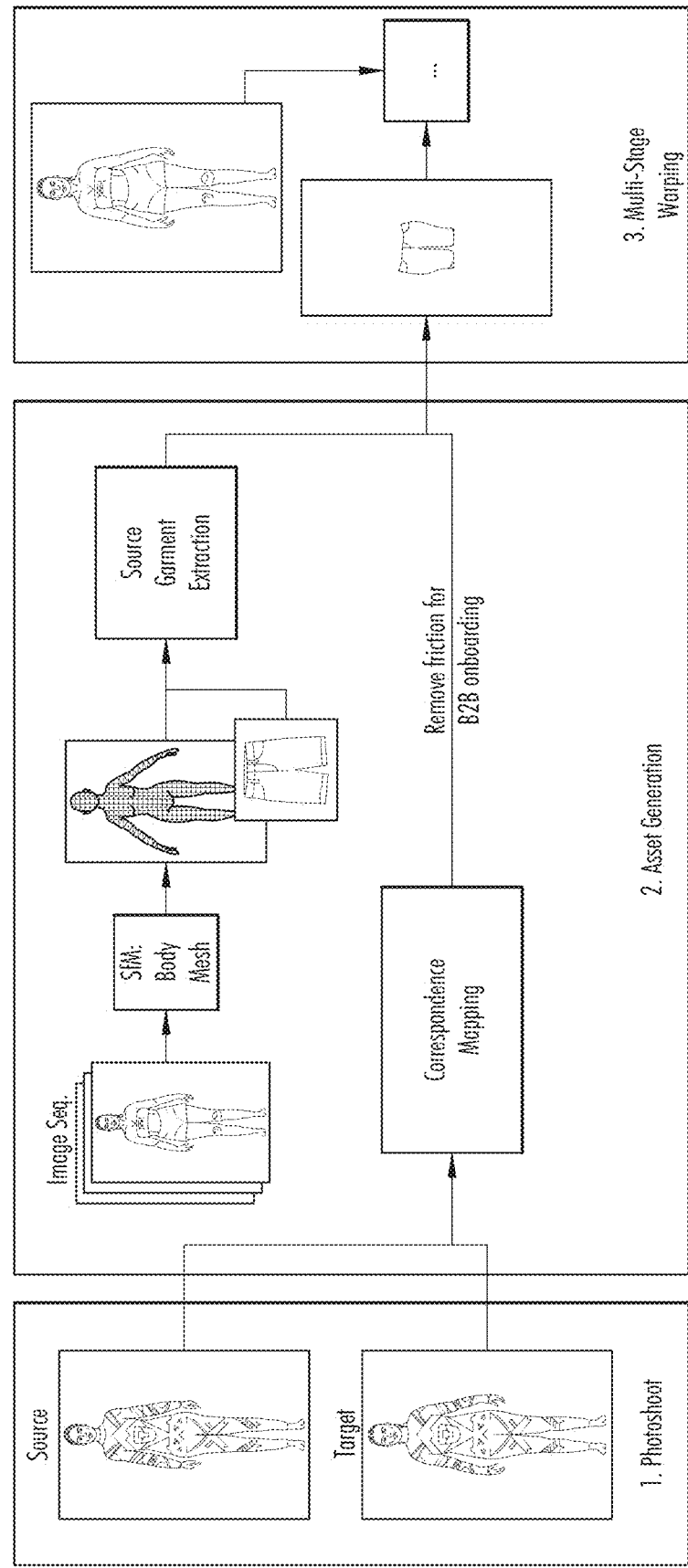

FIGS. 33A-33E are diagrams related to example approaches in accordance with the systems and methods described herein. The figures illustrate the photoshoot, asset generation, and multi-stage warping. The photoshoot may include a source and a target. Asset generation may perform correspondence mapping and source garment extraction. The multi-stage warping may be performed from the output of the correspondence mapping and the source garment extraction. FIG. 33B also includes a user upload and model selection. FIG. 33C also includes a user upload and model selection as well as skin generation, which may generate an input for the warping block. The asset generation of FIGS. 33D-33E may include a multiple image sequence as well as a body mesh and source garment renderer.

Figure 34:
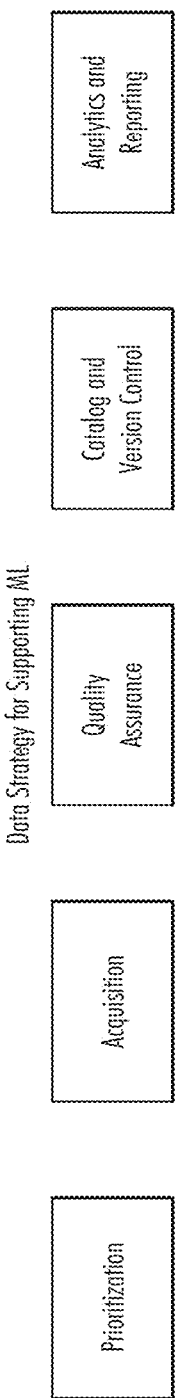
FIG. 34 is a diagram illustrating a data strategy in accordance with the systems and methods described herein.

FIG. 34 is a diagram illustrating a data strategy in accordance with the systems and methods described herein. The data strategy for supporting ML may include prioritization, acquisition, quality assurance, catalog and version control, and analytics and reporting.

FIG. 35 is a diagram illustrating items blocking one or more articles of clothing in accordance with the systems and methods described herein. In FIG. 35, a jacket may block portions of the pants and shirt, as illustrated. Similarly, a jacket may block parts of the arms and parts of the skirt. For example, the arms may be blocked in a non-standard way, e.g., a middle section of the arms may be visible while the top of the arms and the lower portion of the arms may be blocked.

Figure 36:
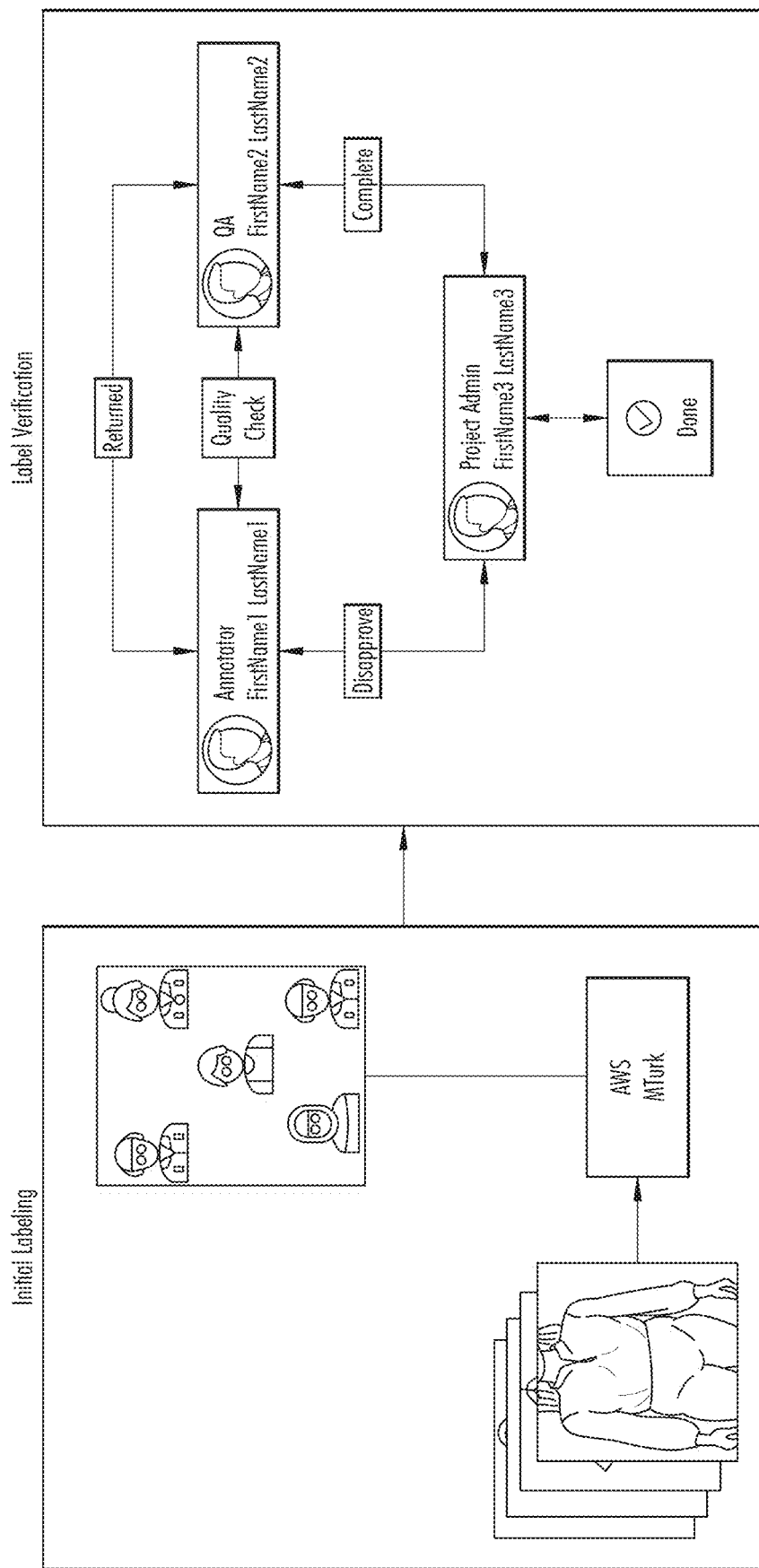
FIG. 36 is a diagram illustrating labeling in accordance with the systems and methods described herein.

FIG. 36 is a diagram illustrating labeling in accordance with the systems and methods described herein. The figure illustrates initial labeling and label verification. In some cases, a system may first use AWS's Mechanical Turk service to get an initial labeling on our data. Then, the system may, for further refinement, pass it off to a second pass of more highly trained labelers.

Figure 37:
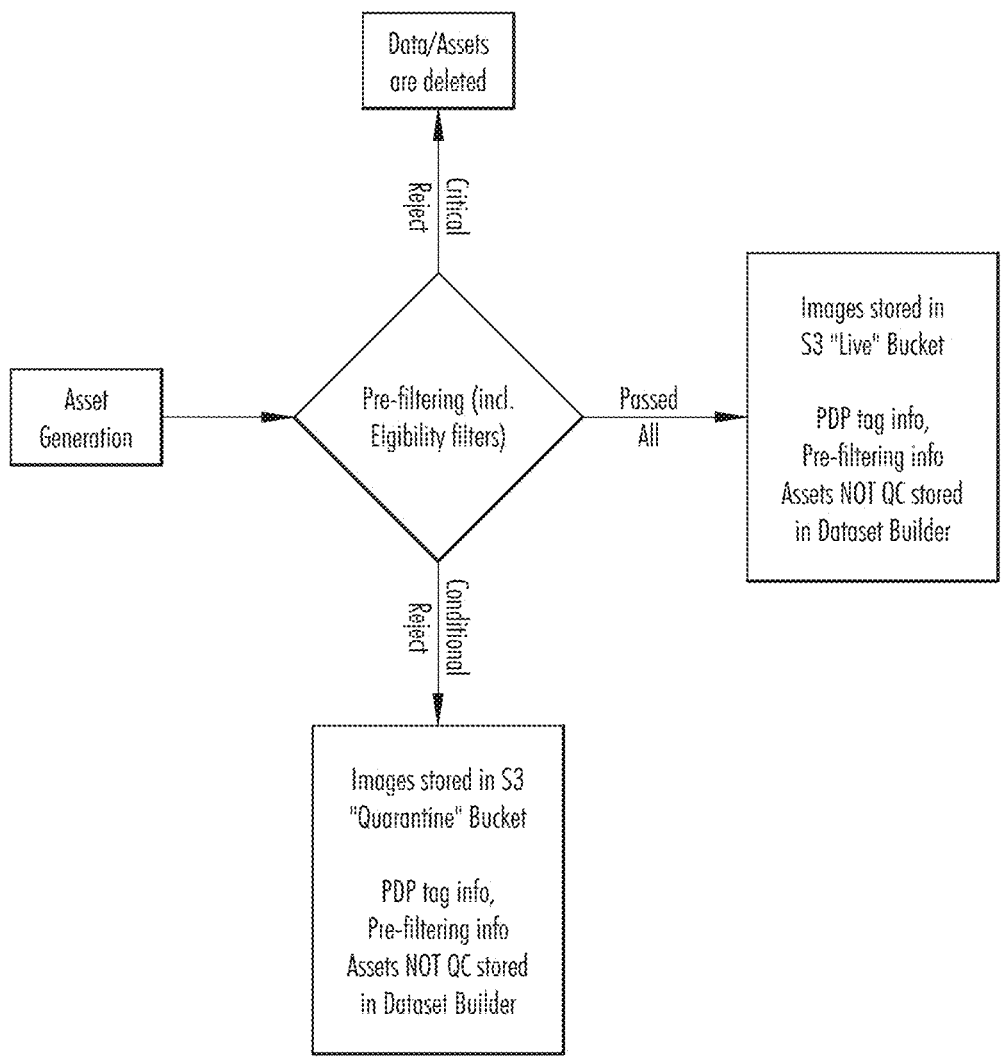
FIG. 37 is a diagram illustrating an example of data curation within a data pipeline in accordance with the systems and methods described herein.

FIG. 37 is a diagram illustrating an example of data curation within a data pipeline in accordance with the systems and methods described herein. In an example embodiment, a system may perform asset generation. The output of the asset generation may be prefiltered. The prefilters may include eligibility filters. Filtering may include critical rejections and conditional rejections. With critical rejections data and or assets may be deleted. With conditional rejections images may be stored in a quarantine bucket. These may include PDP tag information, pre filtering information, and assets not quality control (QC) stored in dataset builder. For example, the system may have some assets in its dataset that have yet to be verified by a quality control (QC) person and/or algorithm. Those assets may be put into a quarantine bucket to ensure that those asset's status as not validated is well-known and documented. Assets that pass all pre-filtering may then be stored in a "live" bucket, e.g., images and/or other assets may be stored in a live bucket, including PDP tag information, pre-filtering information, assets not QC stored in the dataset builder. Assets, e.g., segmentations, masks, pose annotation information, that were automatically generated using computer vision techniques or machine learning models are initially marked as "Not QC" until it has been processed through the quality control process. This QC process may be similar to FIG. 36, where an initial assessment of the quality is provided but is subsequently verified.

FIG. 38 is a diagram illustrating posing issues in accordance with the systems and methods described herein. Pose issues may occur in training data. For example, virtual try-on systems may rely on pre-captured training data to model the interaction between garments and the human body. The training data may cover a limited range of poses and postures. Accordingly, issues may occur when a user does not pose using the limited range of poses and postures used by models for real world garments on the model that have been turned into virtual garments for virtual try-on by the user.

FIG. 39 is a diagram illustrating mobile styler sizes in accordance with the systems and methods described herein. You run on a the mobile styler may be run on, for example a mobile telephone handset, or other mobile electronic device. The mobile styler may come in various sizes. The illustrated examples come in small (FIG. 40), medium (FIG. 41), and large (FIG. 42). It will be understood however that the mobile styler can come in many other sizes.

Figure 40:
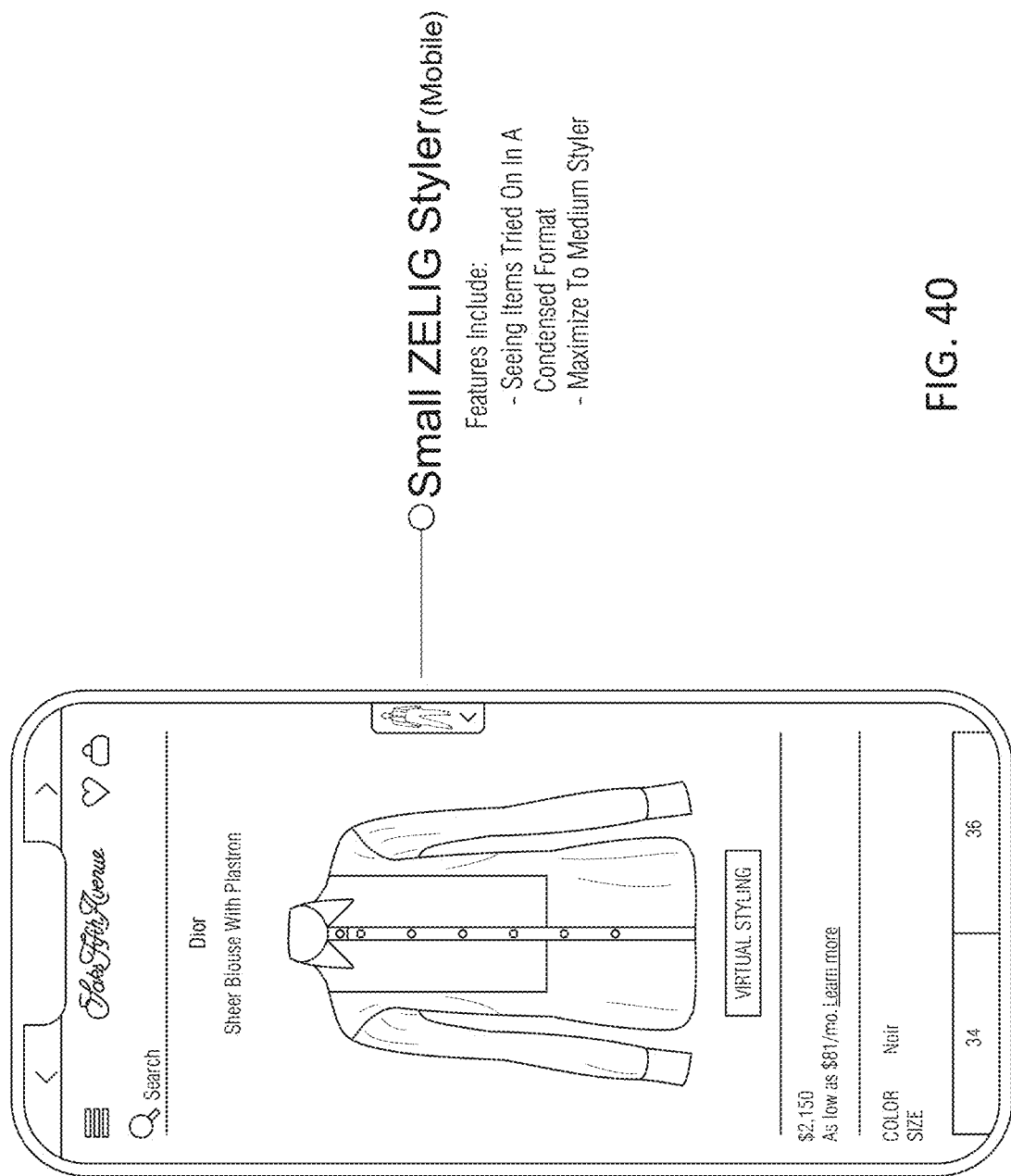
FIG. 40 is a diagram illustrating a small mobile styler in accordance with the systems and methods described herein.

FIG. 40 is a diagram illustrating a small mobile styler in accordance with the systems and methods described herein. In the illustrated example features of the small mobile styler may include seeing items tried on in a condensed format and maximizing to show medium styler.

Figure 41:
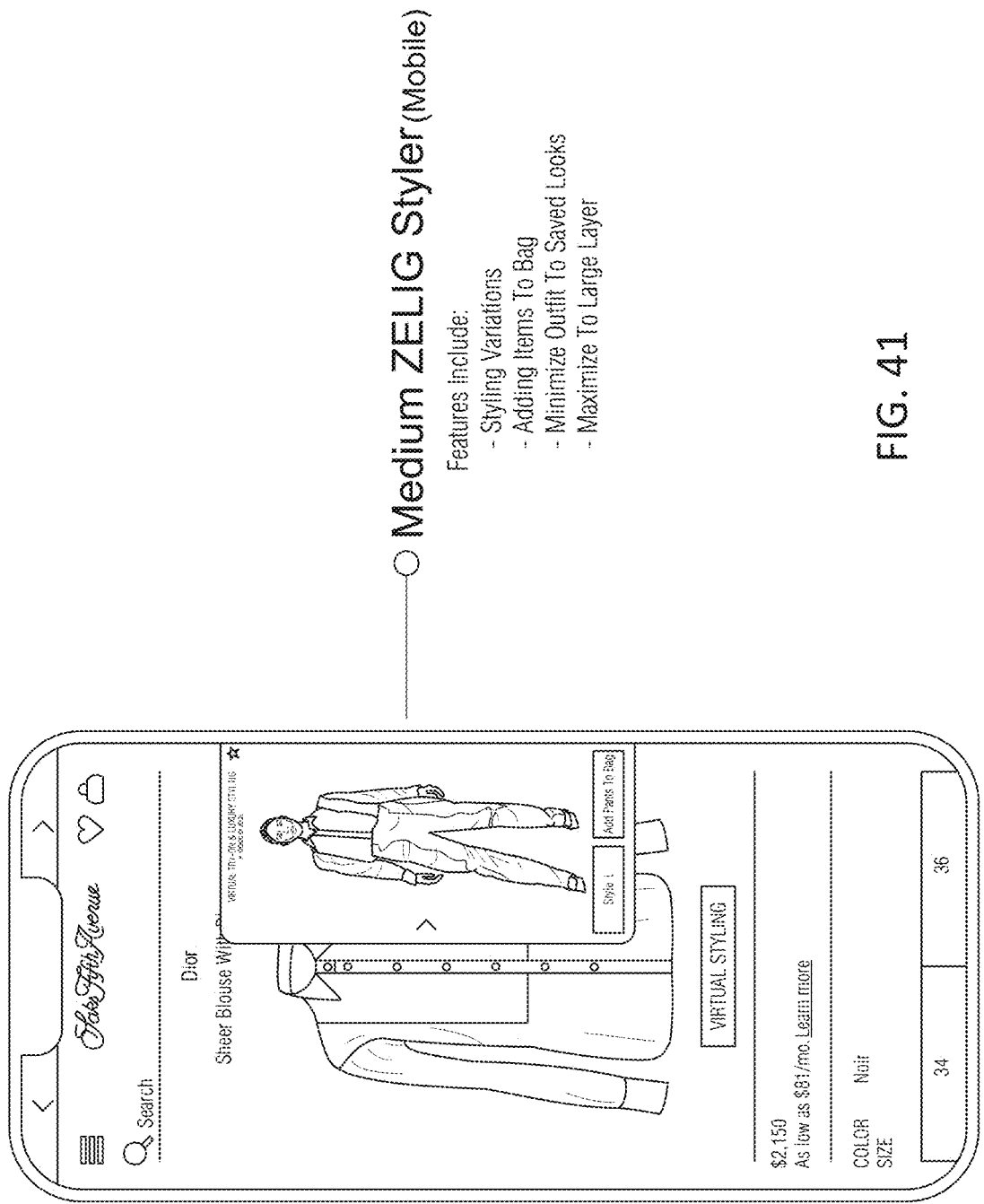
FIG. 41 is a diagram illustrating a medium mobile styler in accordance with the systems and methods described herein.
Figure 42:
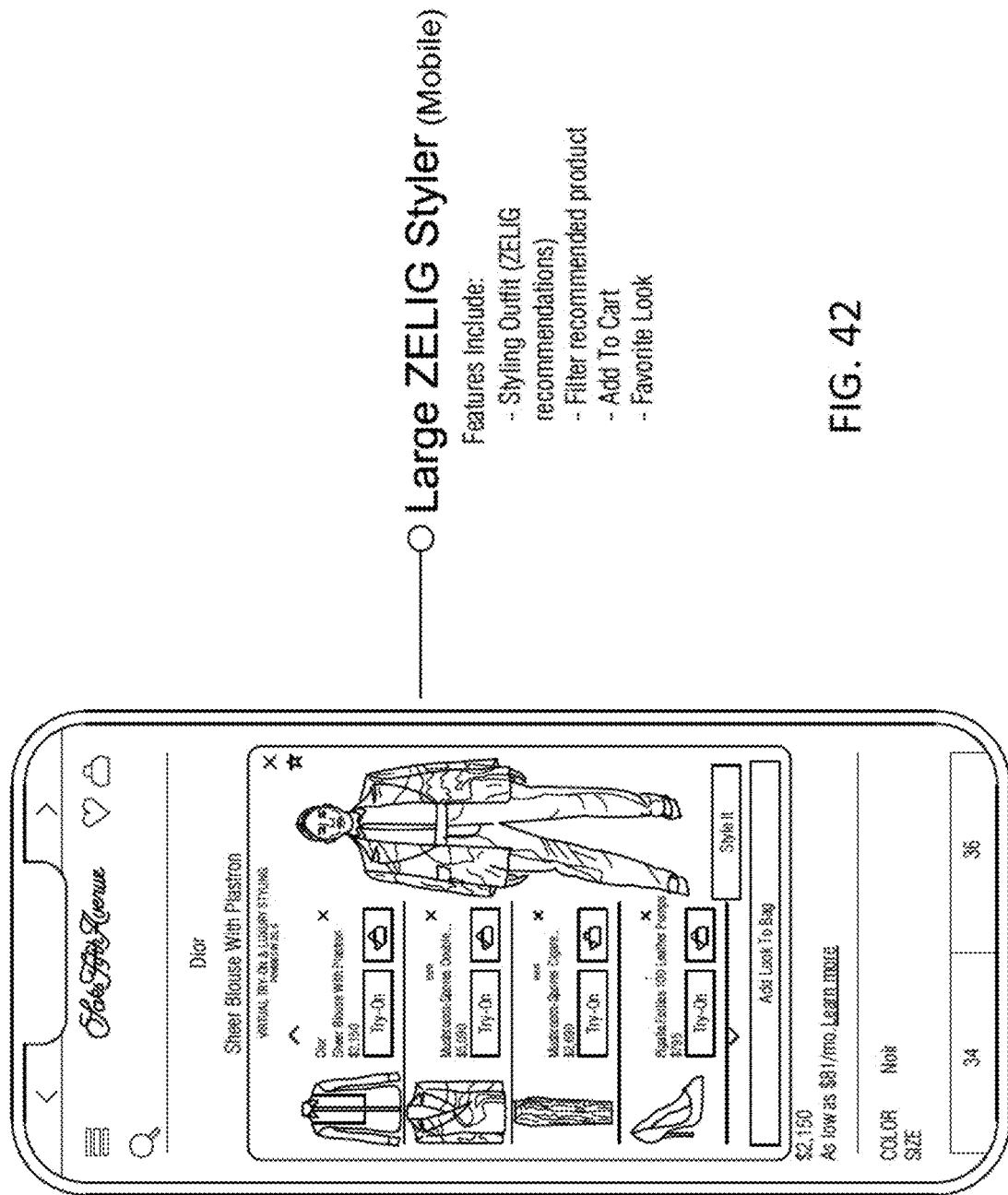
FIG. 42 is a diagram illustrating a large mobile styler in accordance with the systems and methods described herein.

FIG. 41 is a diagram illustrating a medium mobile styler in accordance with the systems and methods described herein. In the illustrated example, features of the medium mobile styler may include styling variations, adding items to a bag, adding outfits to saved looks, minimizing to the small styler and maximizing to the large styler.

FIG. 42 is a diagram illustrating a large mobile styler in accordance with the systems and methods described herein. In the illustrated example the features of the large mobile styler include styling an outfit with recommendations, filtering recent products, adding to the cart and favorite looks.

FIG. 43 is a diagram illustrating desktop styler sizes in accordance with the systems and methods described herein. The desktop styler may run on a laptop computer, desktop computer, or other computing platforms. The desktop styler may come in many different sizes. The illustrated examples include a small desktop styler (FIG. 44), a medium desktop styler (FIG. 45), and a large desktop styler (FIG. 46).

Figure 44:
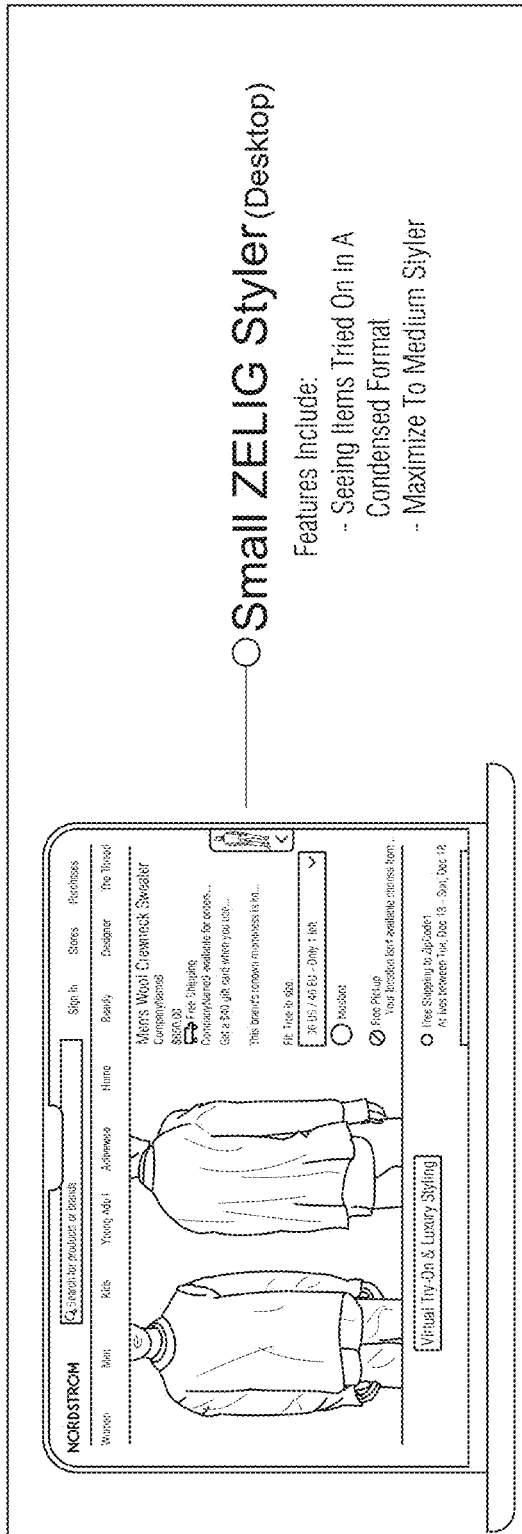
FIG. 44 is a diagram illustrating a small desktop styler in accordance with the systems and methods described herein.

FIG. 44 is a diagram illustrating a small desktop styler in accordance with the systems and methods described herein. The small desktop styler includes features such as seeing items tried on in a condensed format and maximizing to medium styler.

Figure 45:
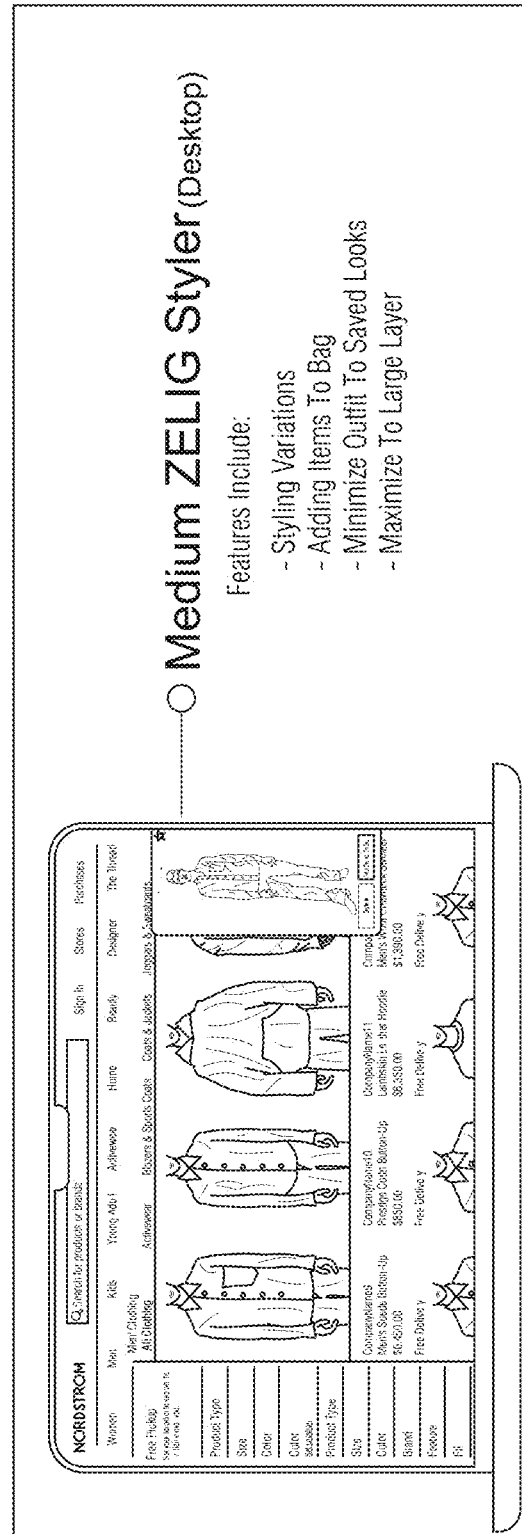
FIG. 45 is a diagram illustrating a medium desktop styler in accordance with the systems and methods described herein.

FIG. 45 is a diagram illustrating a medium desktop styler in accordance with the systems and methods described herein. The medium desktop styler may include features such as styling variations, adding items to a bag, adding outfits to saved looks, minimizing to the smaller styler, and maximizing to the larger styler.

Figure 46:
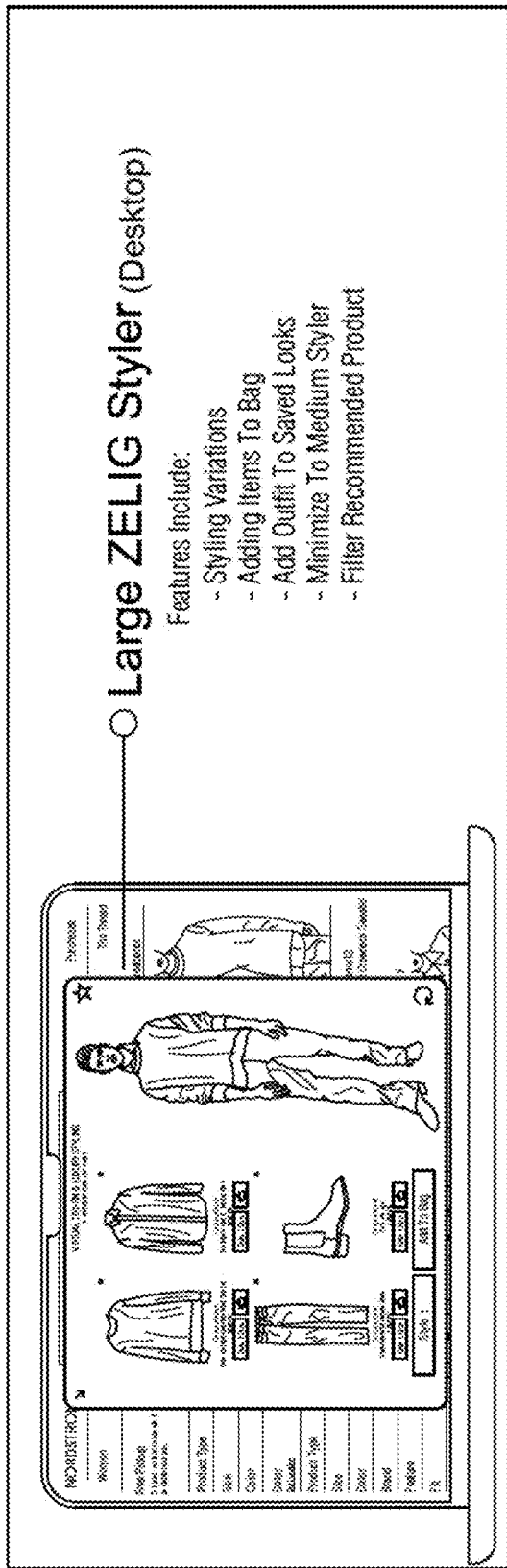
FIG. 46 is a diagram illustrating a large desktop styler in accordance with the systems and methods described herein.

FIG. 46 is a diagram illustrating a large desktop styler in accordance with the systems and methods described herein. The large desktop styler may include features such as styling variations, adding items to a bag, adding outfits to saved looks, and minimizing to the medium styler as well as filtering recommended products.

Figure 47:
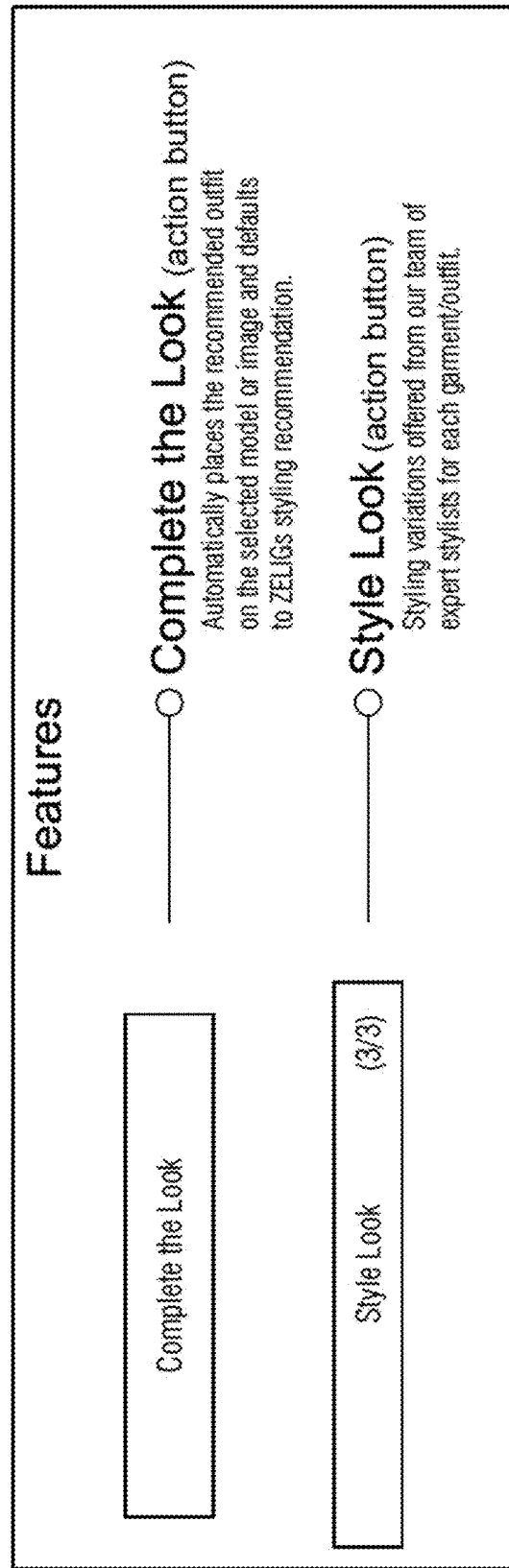
FIG. 47 is a diagram illustrating features of a virtual try-on system in accordance with the systems and methods described herein.

FIG. 47 is a diagram illustrating features of a virtual try-on system in accordance with the systems and methods described herein. Features of the systems and methods described herein may include "complete the look" and "style the look." "Complete the look" may automatically place the recommended outfit on the selected model or image and default to styling recommendations. "Style the look" may style variations offered from a team of expert stylists for each garment or outfit or a style as determined by the user, by another stylist, by an AI stylist.

Figure 48:
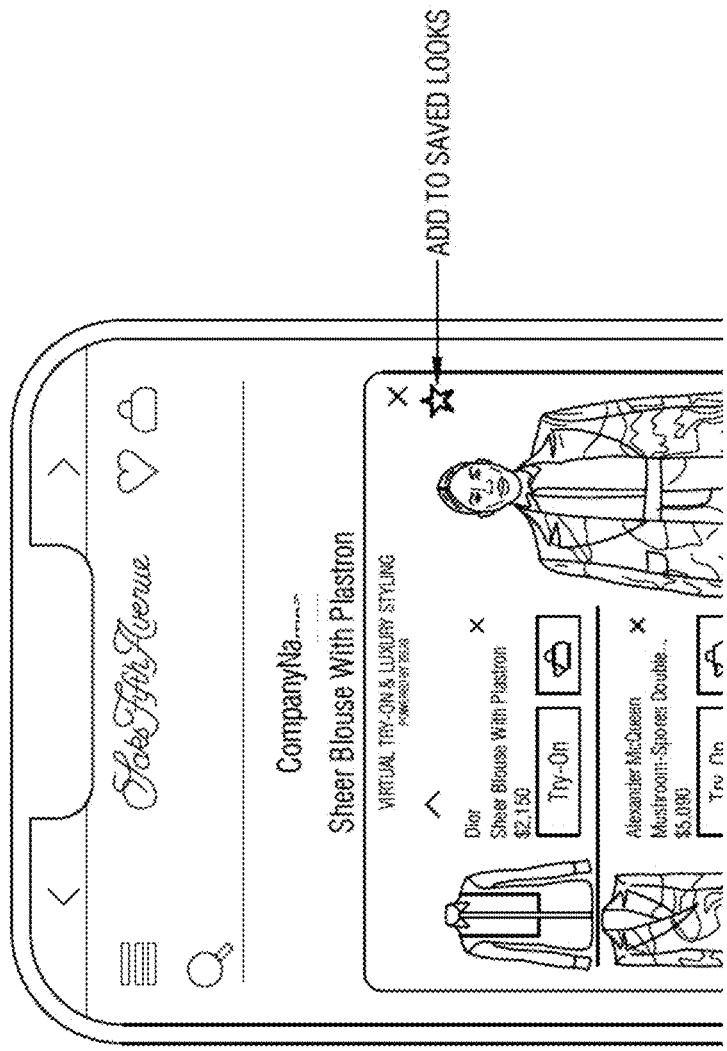
FIG. 48 is a diagram illustrating saving a combination of clothing (e.g., a "look") in a virtual try-on system in accordance with the systems and methods described herein.
Figure 49A:
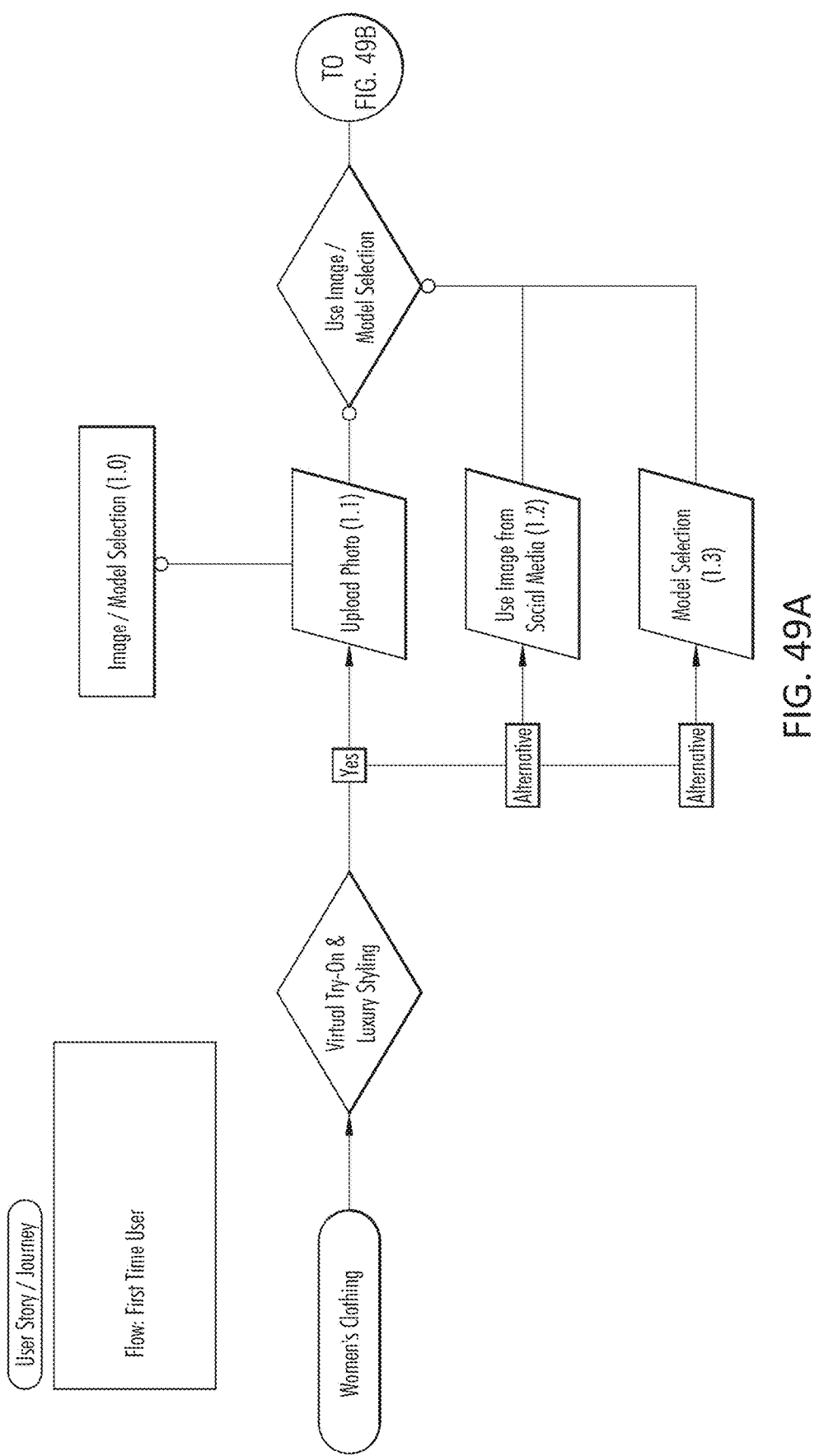
FIGS. 49A-49D are portions of a flow diagram illustrating an example user flow in a virtual try-on system in accordance with the systems and methods described herein.
Figure 49B:
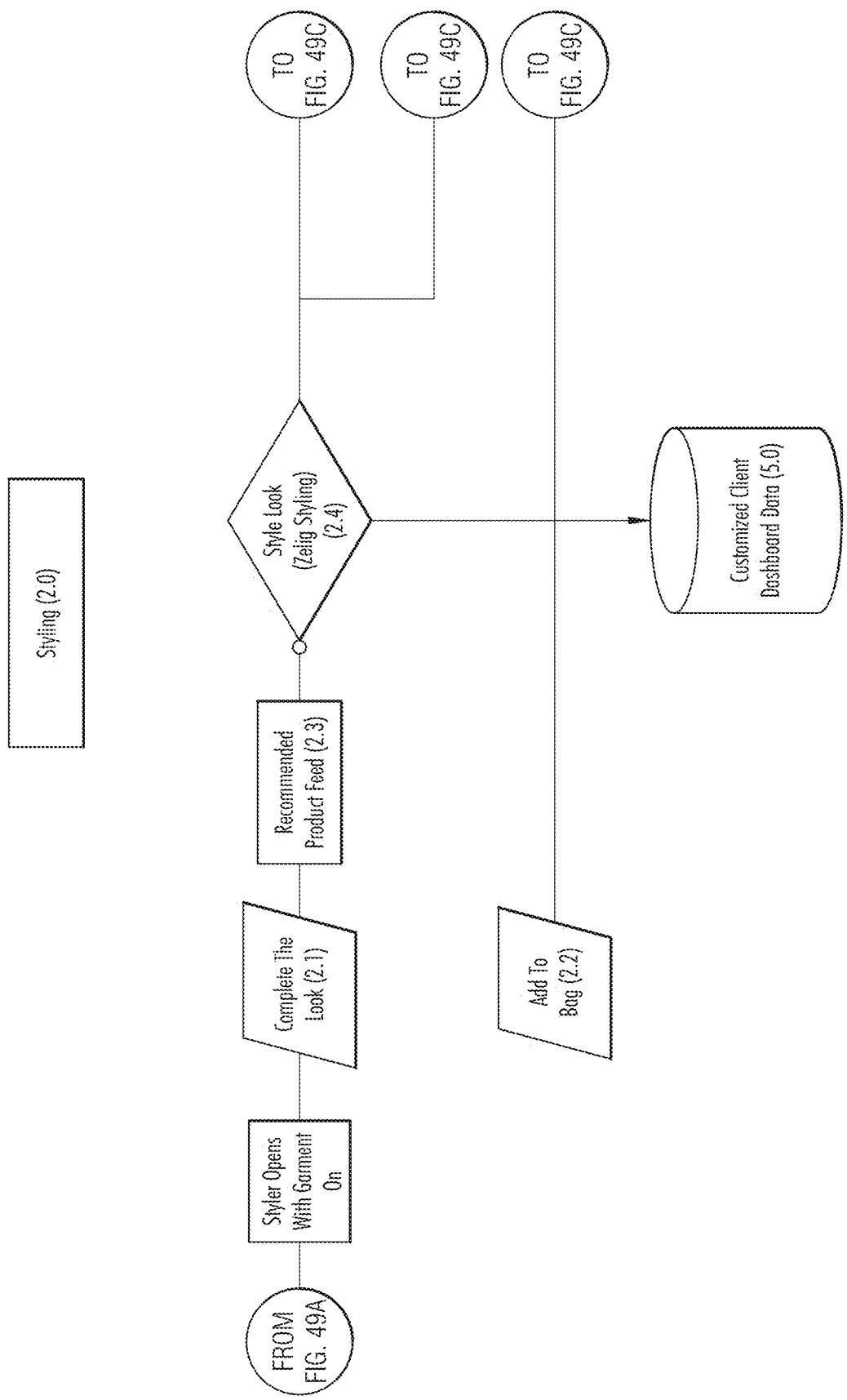
Figure 49C:
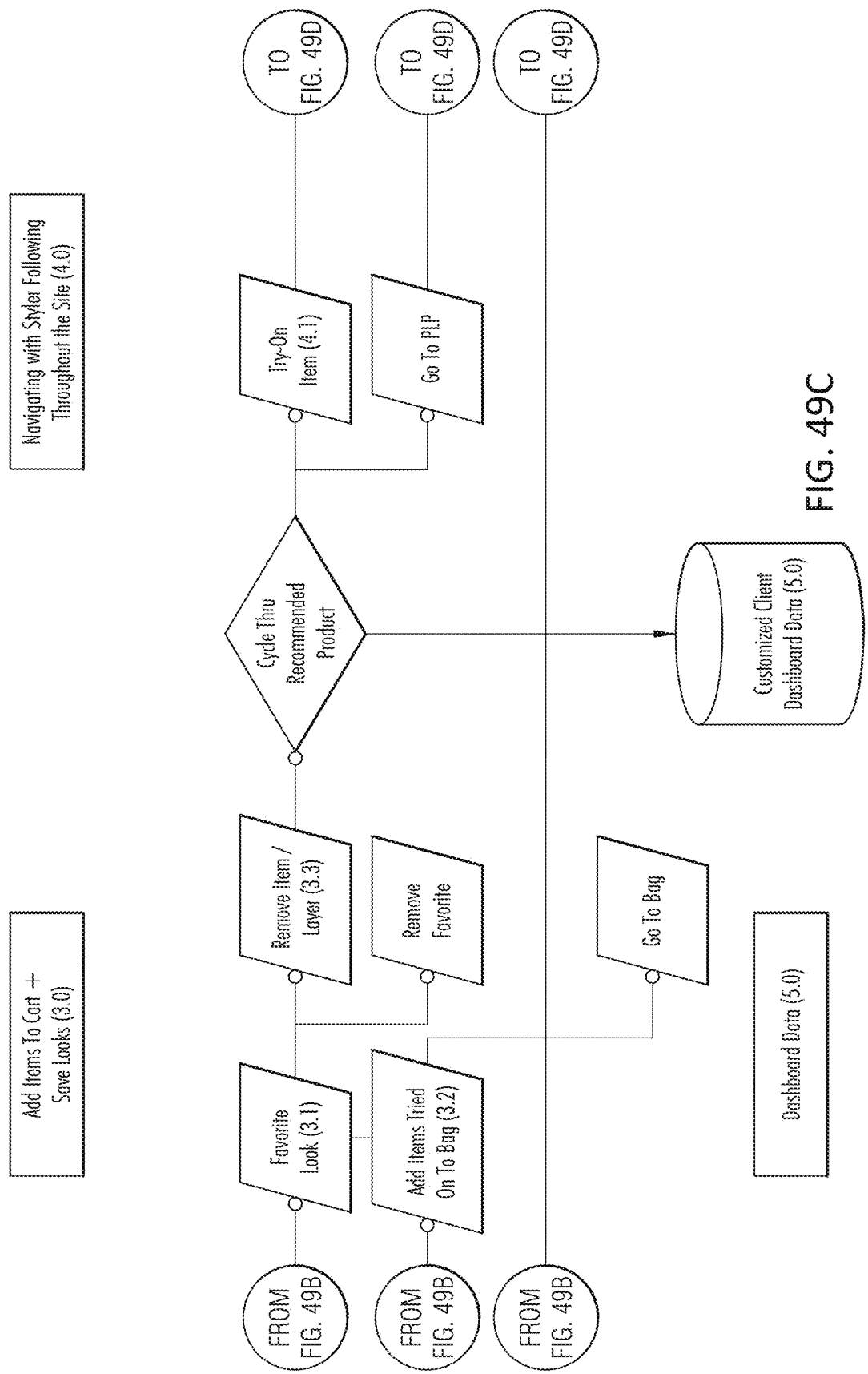
Figure 49D:
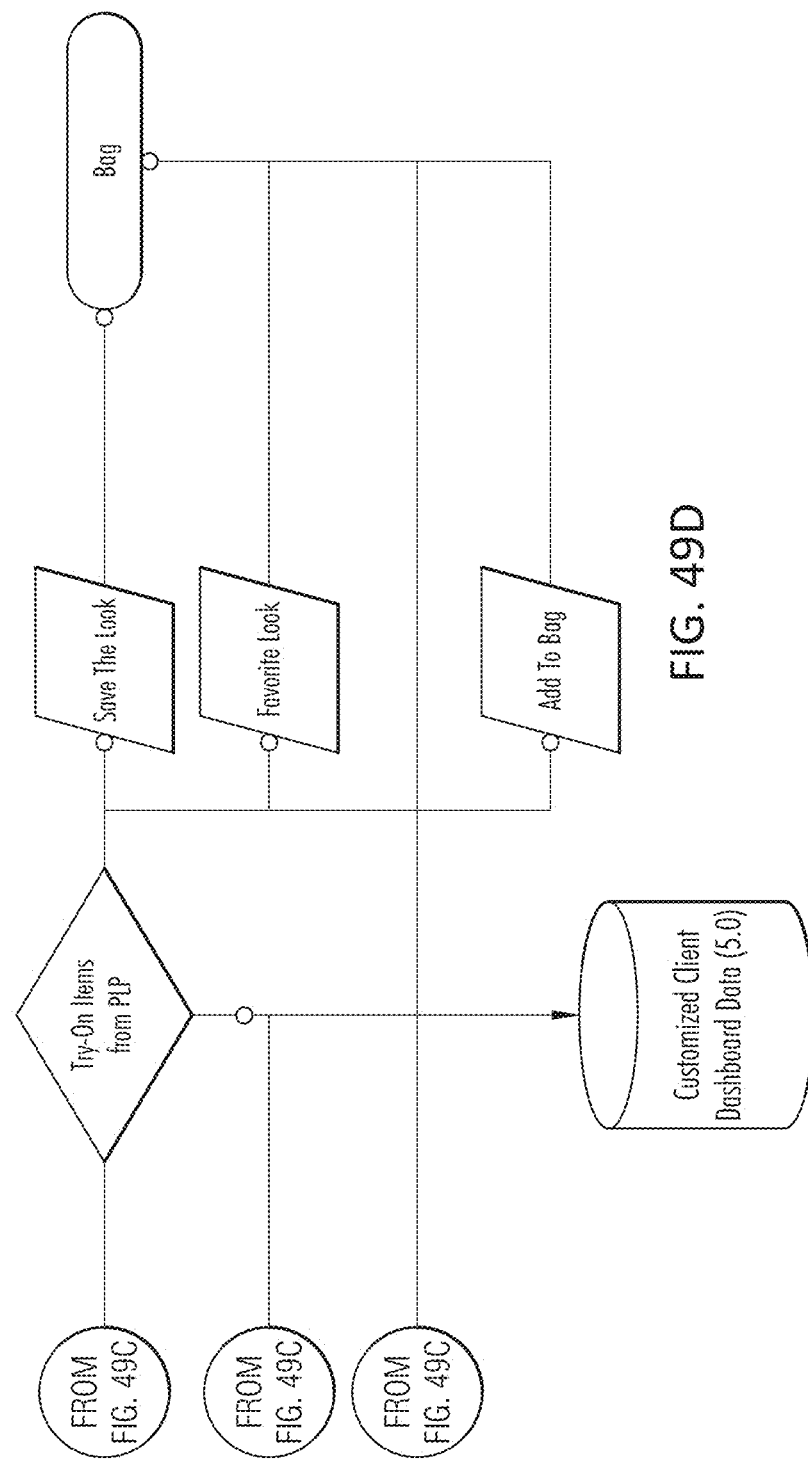

FIG. 48 is a diagram illustrating saving a combination of clothing (e.g., a "look") in a virtual try-on system in accordance with the systems and methods described herein. Combinations of clothing also referred to as a look, may be saved so that the look may be referred to later. In the illustrated example the star in the upper right hand corner of the screen just below the button to close the window may be used to add a combination of clothing (a look) to the saved looks. When a look is not saved the star may not be filled in. When a look has been added to the saved looks, the star may be filled in. In some examples the star may be color-coded. For example, the star may be red when a look is saved. It will be understood, of course, that any other color can be used as long as it is different from the background color immediately surrounding the star.

FIGS. 49A-49D are portions of a flow diagram illustrating an example user flow in a virtual try-on system in accordance with the systems and methods described herein. The user flow will be discussed in more detail below.

Figure 50:
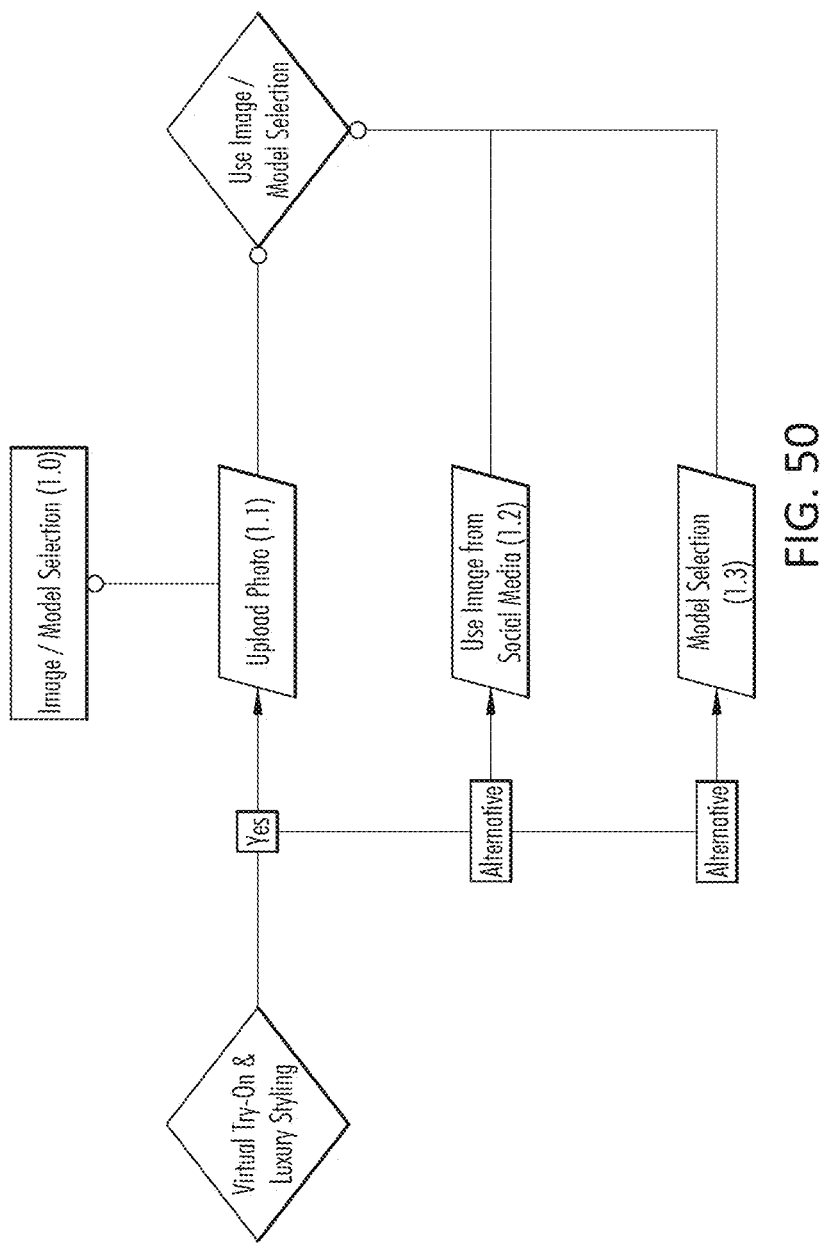
FIG. 50 is a flow diagram illustrating sections 1.1-1.3 of the example flow diagram of FIGS. 49A-49D illustrating a user flow in a virtual try-on system in accordance with the systems and methods described herein.

FIG. 50 is a flow diagram illustrating sections 1.1-1.3 of the example flow diagram of FIGS. 49A-49D illustrating a user flow in a virtual try-on system in accordance with the systems and methods described herein. The figure illustrates image model selection (1.0). For virtual try-on and luxury styling a user may upload a photo (1.1). The image may be used for model selection. As another alternative, a user image may be captured from social media (1.2). The image captured from social media may be used for model selection. In another example, a model may be selected directly (1.3).

Figure 51:
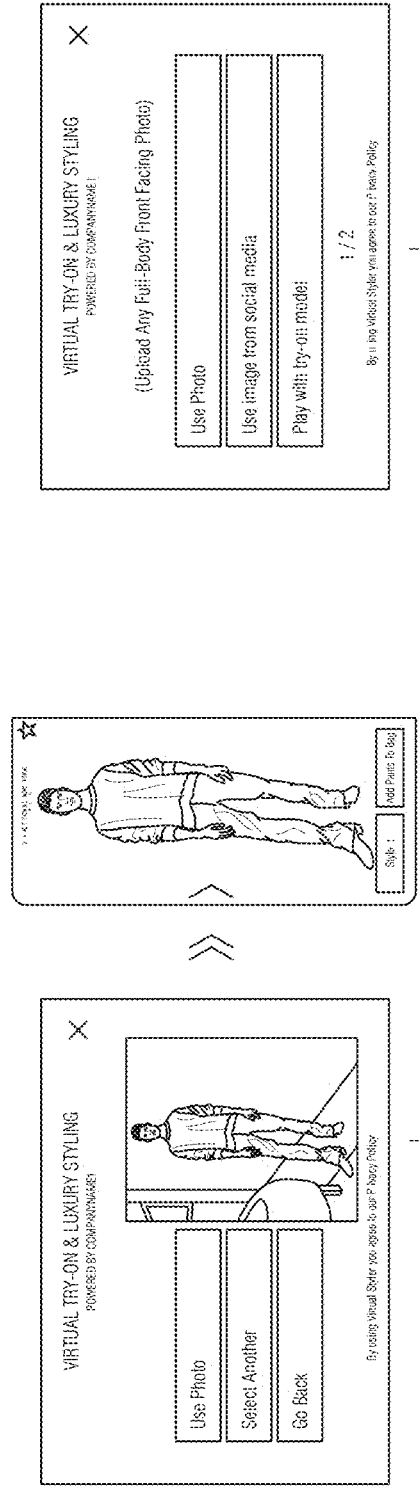
FIG. 51 is a diagram illustrating aspects of an example user flow in a virtual try-on system in accordance with the systems and methods described herein.

FIG. 51 is a diagram illustrating aspects of an example user flow in a virtual try-on system in accordance with the systems and methods described herein. In some example embodiments features include Bing background from uploaded image. For example, the systems and methods described herein may automatically remove any and all background from uploaded images of applying the item selected for try-on to the model. As discussed above, in some examples an image may be used from social media. The image from social media may have its background removed, e.g., automatically.

FIG. 52 is a diagram illustrating aspects of an example user flow in a virtual try-on system in accordance with the systems and methods described herein. The figure illustrates model selection. In some examples the systems and methods described herein may fit a model for try-on. The illustrated example a model may be selected closest to the size and shape of the user for try-on and styling. Models may be available in a large variety of sizes such that a wide variety of users may be able to select a model having a similar size and shape to themselves.

As illustrated in FIG. 52, and discussed above, a user (or some other person) may select a model that is sized and shaped like them. The selected model may then be the "target," see FIGS. 33A-33E, and the corresponding discussion, for example. The user (or some other person) may further select a picture of themselves, i.e., the user. The selected photo of the user will then become the new "target." The user (or some other person) does not directly select what becomes the "source," see FIGS. 33A-33E, and the corresponding discussion, for example.

In another embodiment, one or more of the photos may be selected by the systems and methods described herein. For example, the system may take a photo of the user and then compare attributes of that user, e.g., based on the photo of that user to select a model that has the same or similar attributes, e.g., is about the same size as the user. For example, estimated measurements of the model(s) and the user, based on estimates from the various photos may be compared. Furthermore, one or more of the model(s) and/or the user may wear the custom garment described herein for one or more of the photos used to select the model. For example, in some embodiments a number of models may wear custom garments and the user may wear a custom garment. The custom garments may provide better estimates regarding the size and shape of the various models and the user. Accordingly, a better model selection may be obtained.

Figure 53:
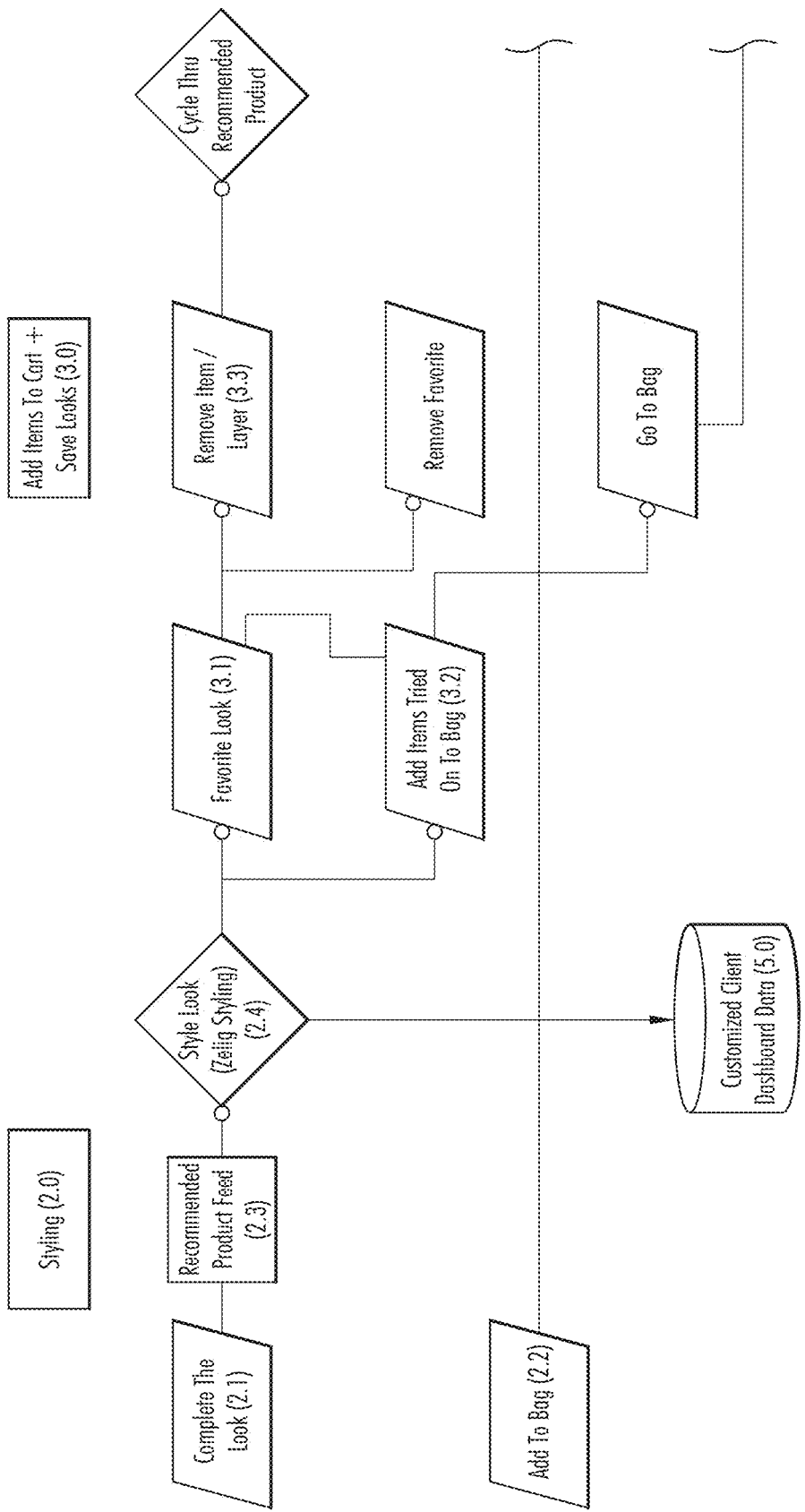
FIG. 53 is a flow diagram illustrating sections 2.1-3.1 of the example flow diagram of FIGS. 49A-49D illustrating a user flow in a virtual try-on system in accordance with the systems and methods described herein.

FIG. 53 is a flow diagram illustrating sections 2.1-3.1 of the example flow diagram of FIGS. 49A-49D illustrating a user flow in a virtual try-on system in accordance with the systems and methods described herein. Styling (2.0) may include completing the look (2.1) where a product may be recommended (2.3), e.g., a bag may be added (2.2). The system is and methods described herein may include styling the look (2.4) and storing the look in a database (5.0). Styling the look (2.4) may include a favorite look (3.1) and adding items tried into a "bag" (3.2), e.g., for purchase in an electronic purchasing system. Styling the look (2.4) May also lead to removing an item or a layer (3.3), removing a favorite item or going to a bag or cart (e.g., an online purchasing storage location). As illustrated in the figure, a user may cycle through the recommended products.

Figure 54:
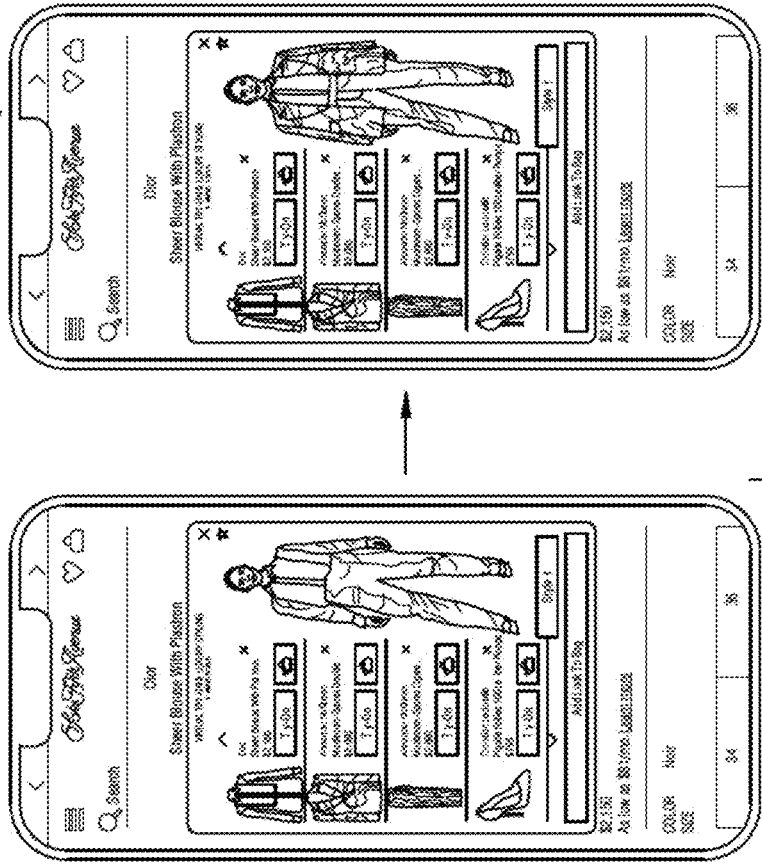
FIG. 54 is a diagram illustrating aspects of an example user flow in a virtual try-on system in accordance with the systems and methods described herein.

FIG. 54 is a diagram illustrating aspects of an example user flow in a virtual try-on system in accordance with the systems and methods described herein. As illustrated in the figure, the systems and methods described herein may include features such as complete the look which may be a recommendation tool that may be used by the user to automatically place the recommended outfit on the selected model or image and default to a predetermined styling recommendation. The systems and methods described herein may also include a recommended product feed. For example these systems and methods may analyze customer data and point to provide the most accurate recommendations that the customer can select for try-on. Items that are tried on may easily be added to a cart.

Figure 55:
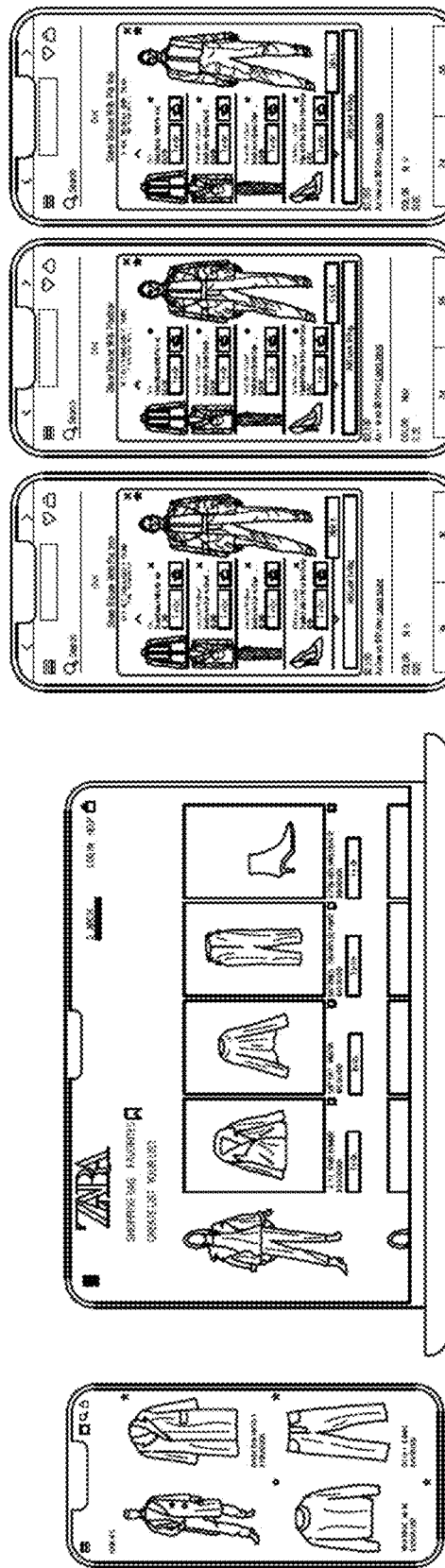
FIG. 55 is a diagram illustrating aspects of an example user flow in a virtual try-on system in accordance with the systems and methods described herein.

FIG. 55 is a diagram illustrating aspects of an example user flow in a virtual try-on system in accordance with the systems and methods described herein. As illustrated in the figure, styled looks may be available to the user. The styled look may be saved. Such an outfit or outfits may be kept in a predetermined area, e.g., a saved looks section of the application, accessible by the user. These styled looks may provide products tried on in an outfit and have the outfit available for purchase. The outfit may also be displayed in an image that is styled for easy reference. A gallery of all a user's tried on looks may be provided. The systems and methods described herein may provide styling variations. The styling variations may be from an expert team of stylists. The styling variations may be provided for each garment or outfit.

Figure 56:
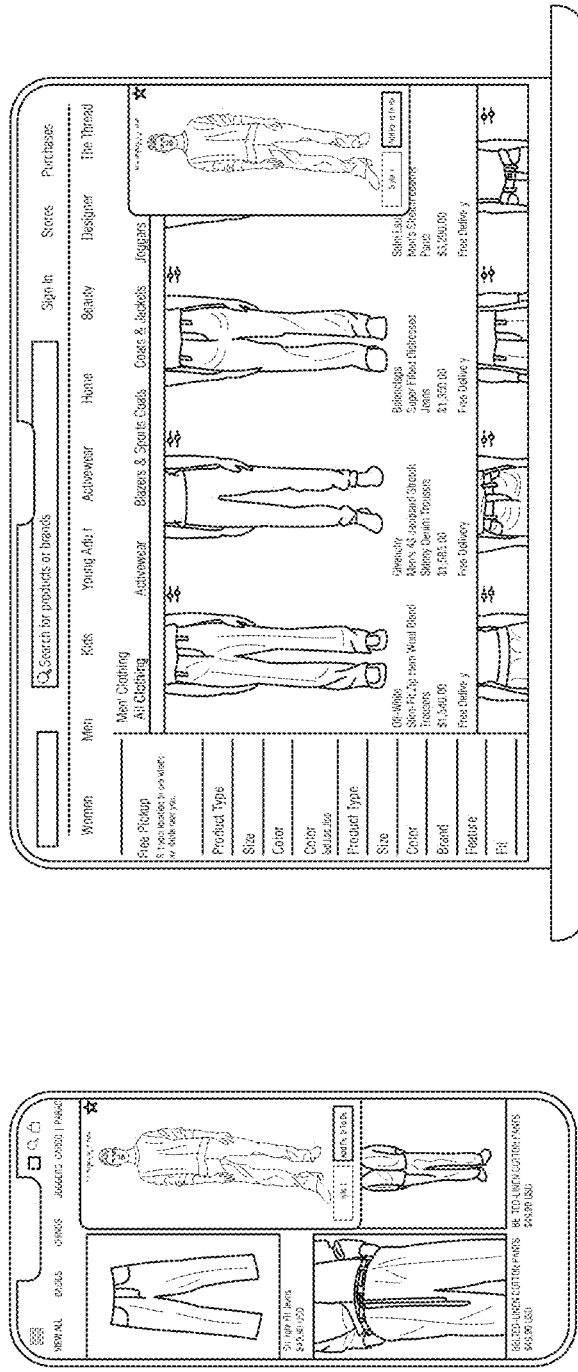
FIG. 56 is a diagram illustrating aspects of an example user flow in a virtual try-on system in accordance with the systems and methods described herein.

FIG. 56 is a diagram illustrating aspects of an example user flow in a virtual try-on system in accordance with the systems and methods described herein. As illustrated in the figure, a user may try-on items using a styler. The styler may allow the user to see how they will look in any available garment. The systems and methods described herein may be used by the user throughout the shopping experience. In the illustrated example, a user may use the small styler for simple try-ons of items, expand to the medium styler for styling and adding to the cart, and favoriting a look, or open up the large styler for all of the options.

FIG. 57 is a flow diagram illustrating section 5.0 of the example flow diagram of FIGS. 49A-49D illustrating a user flow in a virtual try-on system in accordance with the systems and methods described herein. The figure generally illustrates that various points in the methods described herein may lead to saving of data. For example, styling the look (2.4) may lead to saving the look in the customized client dashboard data database (5.0). Cycling through recommended products may also lead to saving in the customized client dashboard data database (5.0). Trying on items from the PLP may also lead to saving data in the customized client dashboard data database (5.0).

FIG. 58 is a diagram illustrating aspects of an example user flow in a virtual try-on system in accordance with the systems and methods described herein. The figure illustrates A customized client dashboard for data, allowing access to data by the user. The systems and methods described herein may enable new and unique levels of customer insights powered by usage of the styler. Natural language AI powered queries may be possible in some embodiments. Direct access to opt in customers during live shopping sessions may be available in some environments. The systems and methods described here and make provide unique shopping insights related to all the fashion experience including outfit preferences category preferences, brand preferences, material preferences and any other user preferences. In some examples, and ability to assess impact of styler usage to AOV return reductions and ESG impact may be provided.

Figure 59:
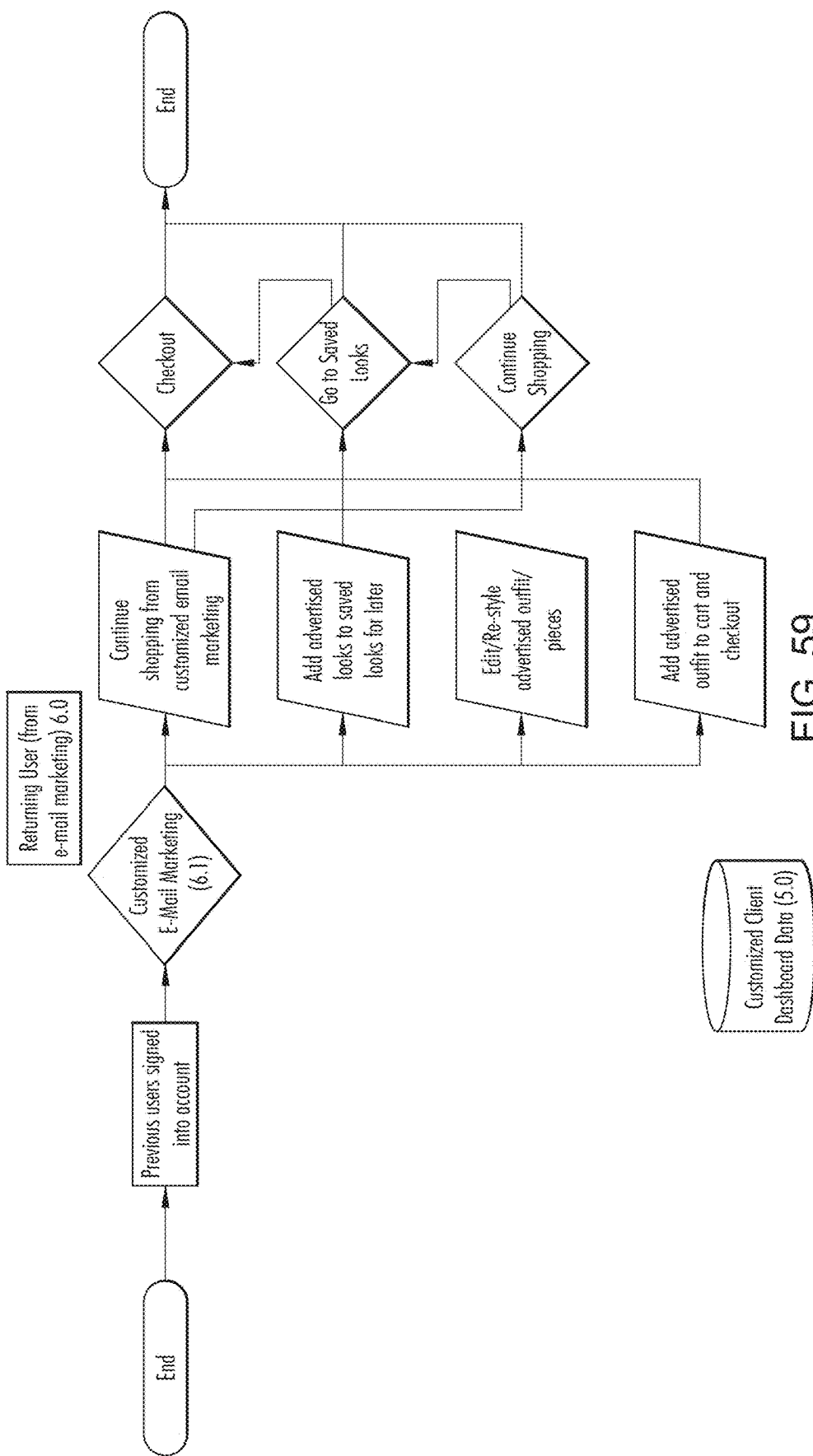
FIG. 59 is a flow diagram illustrating sections 6.0-6.1 of the example flow diagram of FIGS. 49A-49D illustrating a user flow in a virtual try-on system in accordance with the systems and methods described herein.

FIG. 59 is a flow diagram illustrating sections 6.0-6.1 of the example flow diagram of FIGS. 49A-49D illustrating a user flow in a virtual try-on system in accordance with the systems and methods described herein. As illustrated in the figure some example embodiments may include customized e-mail marketing (6.1). Customized e-mail marketing may provide continued shopping from customized e-mail marketing emails, add advertised looks to saved looks for later, edit and or restyle advertised outfits or pieces, and add advertised outfits to a cart and checkout. The e-mail marketing may also be linked to check out, save looks, and to continue shopping.

Figure 60:
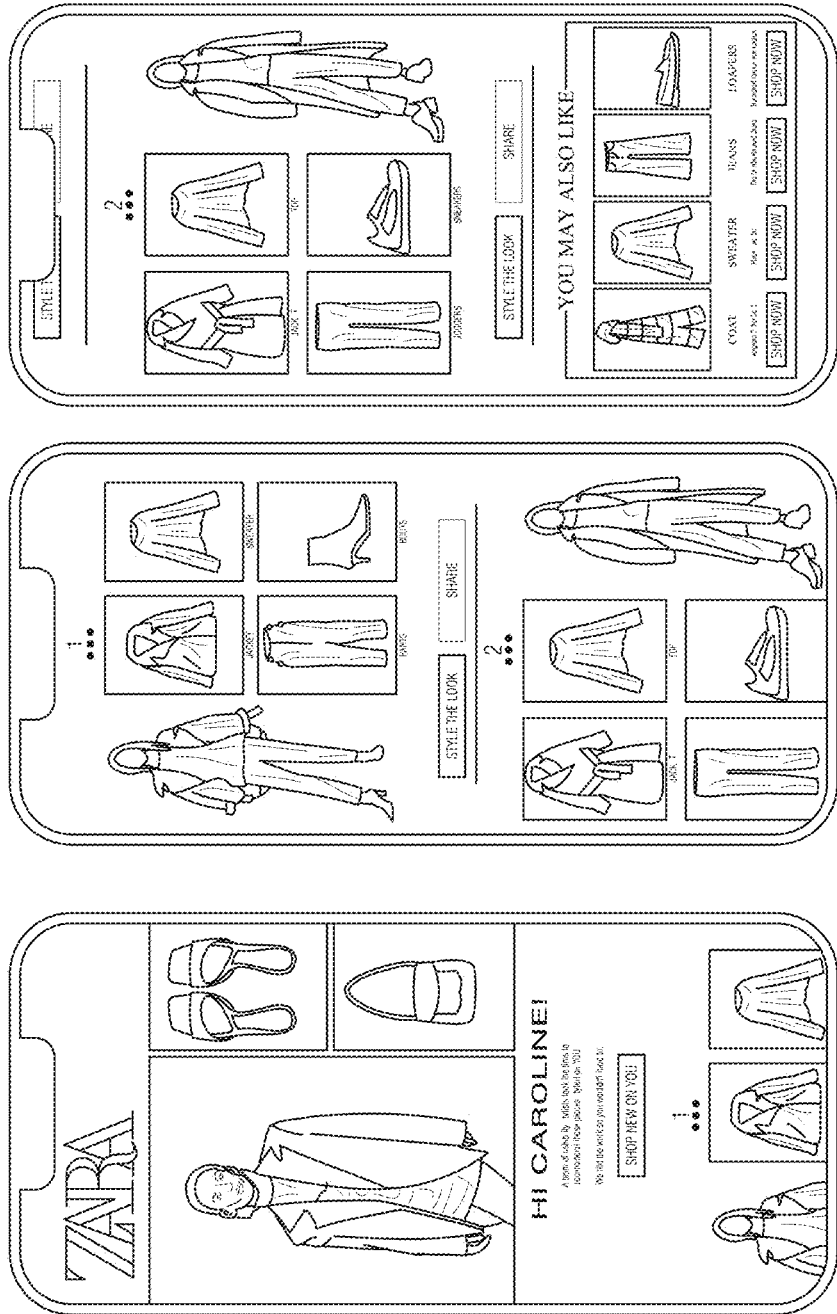
FIG. 60 is a diagram illustrating aspects of an example user flow in a virtual try-on system in accordance with the systems and methods described herein.

FIG. 60 is a diagram illustrating aspects of an example user flow in a virtual try-on system in accordance with the systems and methods described herein. In customized e-mail marketing, as illustrated in the figure, a customer may log in or an account may be required. The system may utilize data and photos acquired during usage of the systems and methods described herein to personalize communication with customers that have opted-in to the e-mail marketing, for example, a reminder of saved looks may be e-mailed to the user using that user's personal photos to present recommendations outfits and styling options.

Figure 61A:
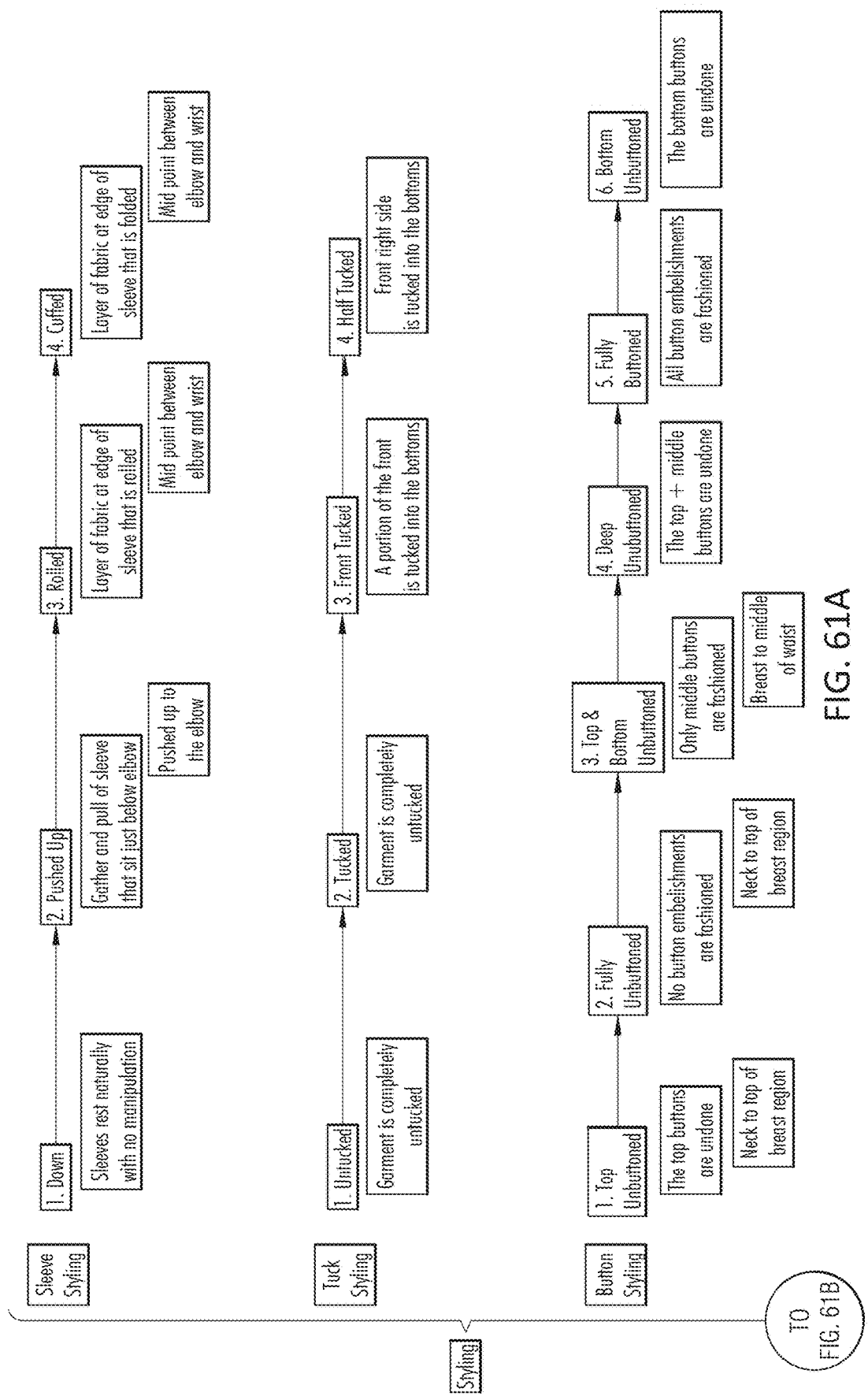
FIGS. 61A-61B forms a diagram illustrating styling examples in a virtual try-on system in accordance with the systems and methods described herein.
Figure 61B:
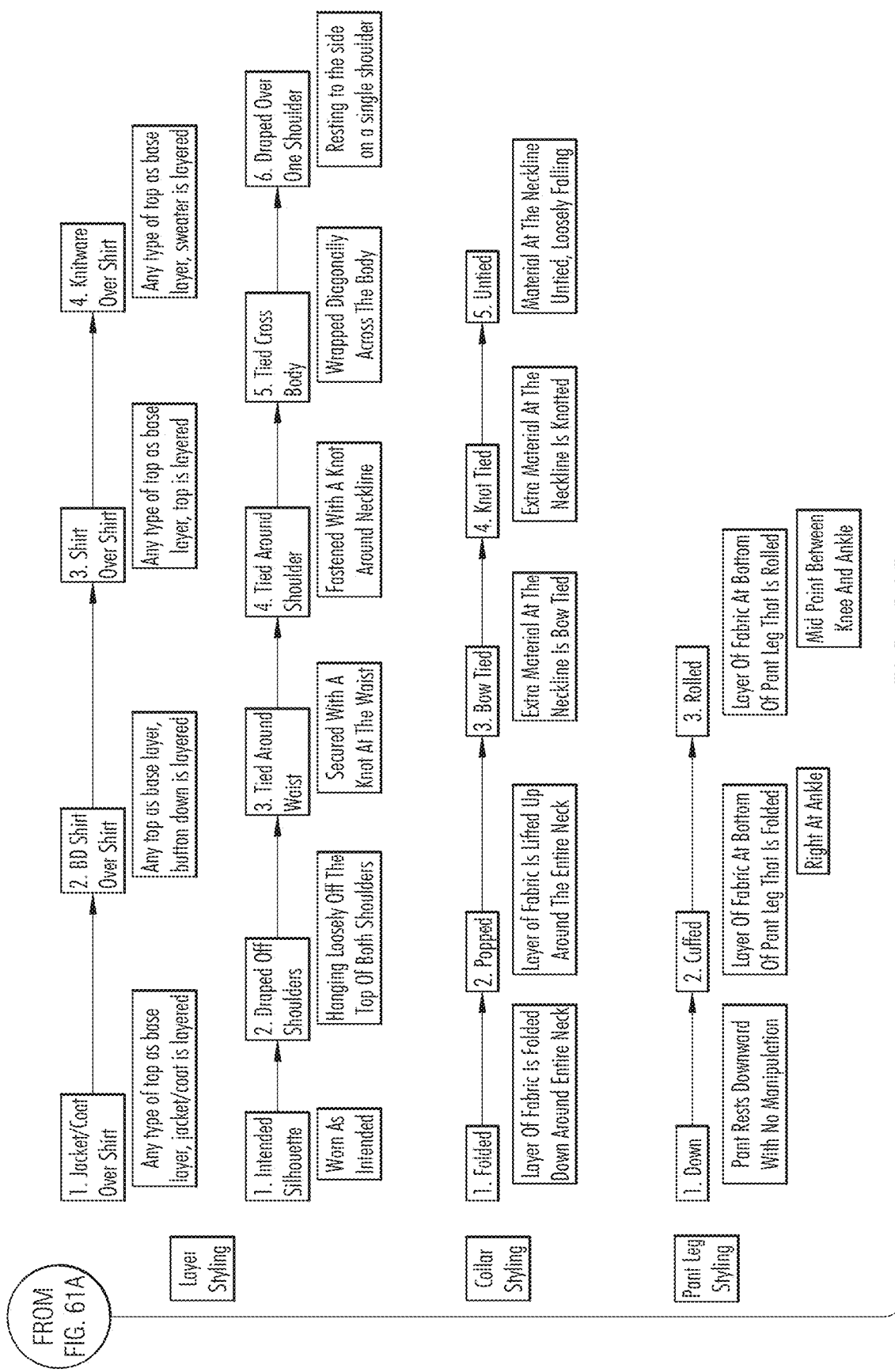

FIGS. 61A-61B forms a diagram illustrating styling examples in a virtual try-on system in accordance with the systems and methods described herein. The figure illustrates various example stylings. For example, multiple sleeve stylings, tuck stylings, and button stylings are provided. Additionally different layering stylings are provided as well as color stylings and pant leg stylings. Sleeve stylings may include down, pushed up, rolled, or cuffed. Tuck stylings may include untucked, tucked, front tucked, or half tucked, for example. Button stylings may include top unbuttoned, fully unbuttoned, top and bottom unbuttoned, deep unbuttoned, fully buttoned, or bottom unbuttoned comma for example. Layering can include the use of items such as jackets or shirts for draping and other layered looks. Collar styling can include folded, popped, bow tied, not tied, or untied, for example. Pant leg styling can include down, cuffed, or rolled, for example.

FIGS. 62A-62AE forms a diagram illustrating example styling combinations in a virtual try-on system in accordance with the systems and methods described herein. The figure includes different examples of combinations, including sleeves, tucks, buttons, and collars, as well as a column for describing the combinations.

FIG. 63 is a diagram illustrating example styling combinations in a virtual try-on system in accordance with the systems and methods described herein. The figure includes a table for type, styling, and combinations.

FIG. 64 is another diagram illustrating example styling combinations in a virtual try-on system in accordance with the systems and methods described herein. The figure also includes a table for type, styling, and combinations.

Some embodiments relate to a virtual styling system for clothing that enables users to virtually style and customize their outfits. The system incorporates advanced technologies, including computer vision, augmented reality, and artificial intelligence, to provide an immersive and interactive styling experience. Users can select clothing items, experiment with different combinations, adjust parameters, and visualize the styling effects in a realistic virtual environment. The system also offers personalized recommendations and suggestions to assist users in creating unique and fashionable ensembles.

Some embodiments of the virtual styling system for clothing described herein revolutionizes the way users engage with fashion by providing a dynamic and interactive platform for virtual styling. The system utilizes cutting-edge technologies to simulate real-world clothing interactions, allowing users to explore various styles and personalize their outfits. Through an intuitive user interface and intelligent algorithms, users can experiment, receive recommendations, and create personalized looks that reflect their unique fashion preferences.

Some embodiments of the virtual styling system feature an extensive database of clothing items, including tops, bottoms, dresses, jackets, and accessories. Users can browse the database, filter items by category, style, color, or brand, and select garments to incorporate into their virtual outfits. Each clothing item may be digitally rendered to accurately represent its design, color, texture, and fit.

In some example embodiments, the virtual styling process begins with users selecting clothing items from the database and adding them to their virtual wardrobe. Users can mix and match different garments to create outfits and experiment with various styling combinations.

Some example embodiments of the system may employ computer vision and/or machine learning algorithms to analyze the user's body shape, size, and proportions based on images or video input. These algorithms generate a personalized virtual avatar that accurately represents the user's physique. The selected clothing items are dynamically fitted onto the user's virtual avatar, taking into account fabric draping, stretching, and body movement, resulting in a realistic and visually accurate representation of the outfit.

In an example embodiment, the virtual styling system offers a wide range of customization options to users. They can adjust garment parameters such as sleeve length, neckline, waistline, and hemline, enabling them to tailor the clothing items to their desired style. Users can experiment with color variations, patterns, and textures to further customize their outfits.

In some example embodiments, the system provides interactive controls that allow users to easily modify the appearance of virtual garments. Users can resize, rotate, and position clothing items on their avatar, ensuring a precise and personalized fit. Furthermore, the system offers suggestions and recommendations based on user preferences, fashion trends, and compatibility between different clothing items.

In some embodiment, to enhance the realism of the virtual styling experience, the system employs augmented reality techniques. Users can visualize their styled outfits on their virtual avatar in a realistic virtual environment. Lighting, shadows, and reflections are simulated to accurately represent how the clothing would appear in different settings and under varying conditions.

Users may view their virtual outfits from different angles, zoom in for detailed inspection, and interact with the garments through virtual touch gestures. The system provides a visually immersive experience that allows users to evaluate the styling effects and make informed decisions.

Some embodiments may include a virtual styling system utilizes artificial intelligence and machine learning algorithms to offer personalized recommendations to users. By analyzing user preferences, past interactions, and fashion trends, the system can suggest complementary clothing items, accessories, and styling ideas that align with the user's fashion taste and individual style.

In some embodiments, the virtual styling system seamlessly integrates with e-commerce platforms, allowing users to directly purchase the clothing items they style or add them to a wishlist for future reference. The system provides links to online retailers, enabling users to access additional product information and make informed purchase decisions. Users may also share their styled outfits on social media platforms, receive feedback from friends.

The present invention relates to a shirt designed with specialized markings to enhance the mapping of clothing between a model's body and a user's body in virtual try-on systems. By incorporating these markings strategically on the shirt, accurate and precise alignment of virtual clothing items on the user's body can be achieved. The shirt enables the virtual try-on system to provide a realistic and visually appealing representation of how clothing would appear on the user. Additionally, the system includes styling capabilities that allow users to personalize and customize their virtual outfits, providing an immersive and engaging virtual shopping experience.

One or more elements or aspects or steps, or any portion(s) thereof, from one or more of any of the systems and methods described herein may be combined with one or more elements or aspects or steps, or any portion(s) thereof, from one or more of any of the other systems and methods described herein and combinations thereof, to form one or more additional implementations and/or claims of the present disclosure.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of virtual try-on and styling (VTO-S) of articles of clothing, the method comprising:
    loading a user image, the user image including at least one of an image of a person performing the virtual try-on and styling (VTO-S), an image of a person related to the person performing the VTO-S, or any other image that the person performing the VTO-S wants to use for the virtual try-on and styling;
    selecting a garment from a pre-existing database;
    loading an image as a source of the selected garment, the image of the source of the selected garment forming a garment source image;
    generating a semantic segmentation of the image;
    extracting the selected garment from the image of the source based on the semantic segmentation;
    determining a correspondence between a target from a user uploaded image or target option presented and a source by:
        performing a feature point detection and description of both the target and the source using machine learning techniques, and
        performing feature matching and correspondence validation;
    performing garment warping and alignment of the extracted garment including deforming the extracted garment to match a shape and a pose of the target by utilizing a warping algorithm; and
    overlaying the garment to generate an overlaid garment and rendering the overlaid garment on a user uploaded image with realistic texture mapping and shadow generation.

2. The method of claim 1, further comprising fine tuning the garment fit to eliminate an imperfection in the overlaid garment using an iterative refinement technique and wherein the iterative refinement technique and a machine learning algorithm trained to identify and rectify common garment fitting imperfections are applied solely or in conjunction to eliminate imperfections.

3. The method of claim 2, wherein the iterative refinement technique comprises calculating an error between the overlaid garment and the target, wherein the error calculation is based on factors including one or more of a garment's positioning, warping, and visual congruity with the target.

4. The method of claim 1, further comprising performing an inpainting technique to eliminate visible artifacts or imperfections in the overlaid garment, wherein the inpainting technique utilizes both texture and image completion methodologies to maintain integrity of a visual appearance of the overlay garment.

5. The method of claim 1, further comprising adjusting one or more of colors, shading, and textures of the overlaid garment to improve a match to lighting and appearance of the target, wherein the adjustment of colors, shading, and textures of the overlaid garment is performed using a combination of texture synthesis and color transfer techniques that account for the lighting and appearance and color of an image of the target.

6. The method of claim 1, wherein the step of selecting a garment from a pre-existing database includes browsing and filtering garments based on category, style, color, or brand, wherein the browsing and filtering of garments in the pre-existing database is facilitated by an interactive user interface that provides options to sort and filter garments based on user preferences and previous interactions.

7. The method of claim 1, wherein a user can upload the image of a target to wear the selected garment through a mobile or web application, and the method further includes a step to validate and process the uploaded image.

8. The method of claim 1, wherein the step of generating a semantic segmentation of the image includes utilizing computer vision and machine learning algorithms to identify and separate regions of the image corresponding to the garment from a background, wherein the semantic segmentation of the image is performed using a machine learning algorithm trained on a large dataset of images with diverse garment types, body shapes, and poses.

9. The method of claim 1, wherein the step of extracting the selected garment from the image of the source includes applying image processing techniques to isolate pixels corresponding to the garment based on the generated semantic segmentation, wherein the step of extracting the selected garment from the image of the source involves applying a mask generated from the semantic segmentation to the image.

10. The method of claim 1, wherein the step of determining a correspondence between a target and the source includes utilizing feature point detection and description algorithms to identify distinctive points and descriptors on the target and the source, followed by feature matching and correspondence validation to establish corresponding points between the target and the source.

11. The method of claim 1, wherein a correspondence model returns one or more corresponding key points such that more key points more accurately capture details of the garment and the shape of a body of the target, and wherein a warping model generates key points to capture deformations in the garment and a body shape of the target.

12. The method of claim 1, wherein the step of overlaying and rendering the garment on the user uploaded image includes seamlessly blending the warped garment onto an image of the target, considering factors such as lighting, shadows, and reflections, and wherein the seamlessly blending of the warped garment onto the image of the target involves a blending technique to maintain consistency.

13. The method of claim 1, further comprising performing automatic background removal and body segmentation on the garment source image before a garment warping, alignment, and rendering step.

14. The method of claim 1, wherein the method further comprises adjusting a position, size, or orientation of the rendered garment on the user uploaded image, allowing a user to customize the virtual try-on experience, and wherein the user can manually adjust the position, size, or orientation of the rendered garment through a user interface that provides interactive controls and a real-time preview of the adjustments.

15. The method of claim 1, wherein the method further comprises providing a comparison view that allows a user to switch between the rendered garment and a user's original image, facilitating a visual comparison of a user's appearance with and without the selected garment, and wherein the comparison view provides a side-by-side or overlay comparison, and the method further includes an option for the user to save or share the comparison view.

16. The method of claim 1, further comprising applying a post-processing smoothing algorithm to the overlaying of the garment to improve visual integration of the garment with a body of the target.

17. The method of claim 1, wherein the step of performing garment warping and alignment includes accounting for fabric behavior in fabric of the garment, characteristics of which are stored in the pre-existing database.

18. The method of claim 1, wherein the user image is a full-body image, and the method further comprises automatically adjusting a size and position of the garment to maintain proportionality and correct placement on the target.

19. The method of claim 1, further comprising providing a user interface that allows users to manually adjust a fit and position of the overlaid garment on the image of the target, the manually adjusting the fit and position of the overlaid garment including styling the clothing.

20. The method of claim 1, wherein the step of overlaying and rendering the garment includes simulating an interaction of the garment with a target's body movements in a video uploaded by a user, providing a dynamic virtual try-on experience.

* * * * *